US008991466B2

(12) United States Patent
Lawson et al.

(10) Patent No.: US 8,991,466 B2
(45) **Date of Patent: *Mar. 31, 2015**

(54) SYSTEM AND METHOD FOR PROCESSING A TIRE-WHEEL ASSEMBLY

(75) Inventors: Lawrence J. Lawson, Troy, MI (US); Robert Reece, Clarkston, MI (US); Joshua J. Hicks, Clarkston, MI (US); Barry A. Clark, Ortonville, MI (US)

(73) Assignee: Android Industries LLC, Auburn Hills, MI (US)

( * ) Notice: Subject to any disclaimer, the term of this patent is extended or adjusted under 35 U.S.C. 154(b) by 503 days.

This patent is subject to a terminal disclaimer.

(21) Appl. No.: 13/340,315

(22) Filed: Dec. 29, 2011

(65) Prior Publication Data

US 2013/0168032 A1 Jul. 4, 2013

(51) Int. Cl.

| | |
|---|---|
| ***B60C 25/132*** | (2006.01) |
| ***B60C 25/12*** | (2006.01) |
| ***B60C 25/128*** | (2006.01) |
| ***B60C 25/122*** | (2006.01) |
| *B60C 25/05* | (2006.01) |

(52) U.S. Cl.

CPC ........... *B60C 25/132* (2013.01); *B60C 25/0515* (2013.01)

USPC ......................... 157/1.21; 157/1.17; 157/1.28

(58) Field of Classification Search

CPC .......................... B60C 25/132; B60C 25/0515

USPC ............... 157/1.1, 1.21, 1.24, 1.28, 917, 1.17

See application file for complete search history.

(56) References Cited

U.S. PATENT DOCUMENTS

| | | | | |
|---|---|---|---|---|
| 2,597,268 A | * | 5/1952 | Simpson | 157/1.1 |
| 2,665,747 A | | 1/1954 | Harrison | |
| 2,816,604 A | | 12/1957 | Greenly et al. | |
| 2,817,394 A | | 12/1957 | Kriebel, Jr. et al. | |
| 2,900,018 A | | 8/1959 | Harrison | |
| 2,907,379 A | * | 10/1959 | Tuttle | 157/1.1 |
| 3,545,463 A | * | 12/1970 | Mueller | 157/1.24 |
| 4,093,015 A | * | 6/1978 | Malinski | 157/1.1 |
| 4,621,671 A | * | 11/1986 | Kane et al. | 157/1.1 |
| 4,830,079 A | | 5/1989 | Onuma | |

(Continued)

FOREIGN PATENT DOCUMENTS

| | | |
|---|---|---|
| EP | 0493073 A1 | 7/1992 |
| EP | 1841606 B1 | 5/2010 |

(Continued)

OTHER PUBLICATIONS

International Search Report for Application No. PCT/US2012/072132 Dated Apr. 19, 2013.

(Continued)

*Primary Examiner* — Bryan R Muller

(74) *Attorney, Agent, or Firm* — Honigman Miller Schwartz and Cohn LLP

(57) ABSTRACT

An apparatus for processing a tire and a wheel for forming a tire wheel assembly is disclosed. The apparatus includes a tire support member including a first tire support member, a second tire support member and a third tire support member. Each of the first, second and third tire support members include an upper surface and a lower surface. The apparatus includes a plurality of tire engaging devices including a first tire tread engaging post and a second tire tread engaging post. A method for processing a tire and a wheel for forming a tire wheel assembly is also disclosed.

5 Claims, 62 Drawing Sheets

(56) References Cited

U.S. PATENT DOCUMENTS

| | | | | |
|---|---|---|---|---|
| 4,858,667 | A | 8/1989 | Igari et al. | |
| 7,044,188 | B2 | 5/2006 | Pellerin et al. | |
| 7,584,775 | B2 | 9/2009 | Nomura | |
| 7,664,576 | B2 | 2/2010 | Ichinose et al. | |
| 8,567,453 | B2 * | 10/2013 | Donnay et al. | 141/38 |
| 2007/0256794 | A1 | 11/2007 | Azam | |
| 2010/0163189 | A1 * | 7/2010 | Lawson et al. | 157/1.22 |

FOREIGN PATENT DOCUMENTS

| | | | |
|---|---|---|---|
| JP | 11105515 | A | 4/1999 |
| JP | 2001041291 | A | 2/2001 |
| JP | 2002087033 | A | 3/2002 |
| JP | 2011011702 | A | 1/2011 |
| KR | 20040098256 | A | 11/2004 |
| KR | 100765657 | B1 | 10/2007 |
| KR | 20100010762 | A | 2/2010 |
| WO | WO-2009148544 | A2 | 12/2009 |
| WO | WO-2010028233 | A2 | 3/2010 |
| WO | WO-2010078438 | A2 | 7/2010 |

OTHER PUBLICATIONS

International Search Report for Application No. PCT/US2012/072152 Dated Apr. 26, 2013.

International Search Report for Application No. PCT/US2012/072158 Dated Apr. 26, 2013.

International Search Report for Application No. PCT/US2012/072159 Dated May 13, 2013.

International Search Report for Application No. PCT/US2012/072141 Dated Apr. 16, 2013.

* cited by examiner

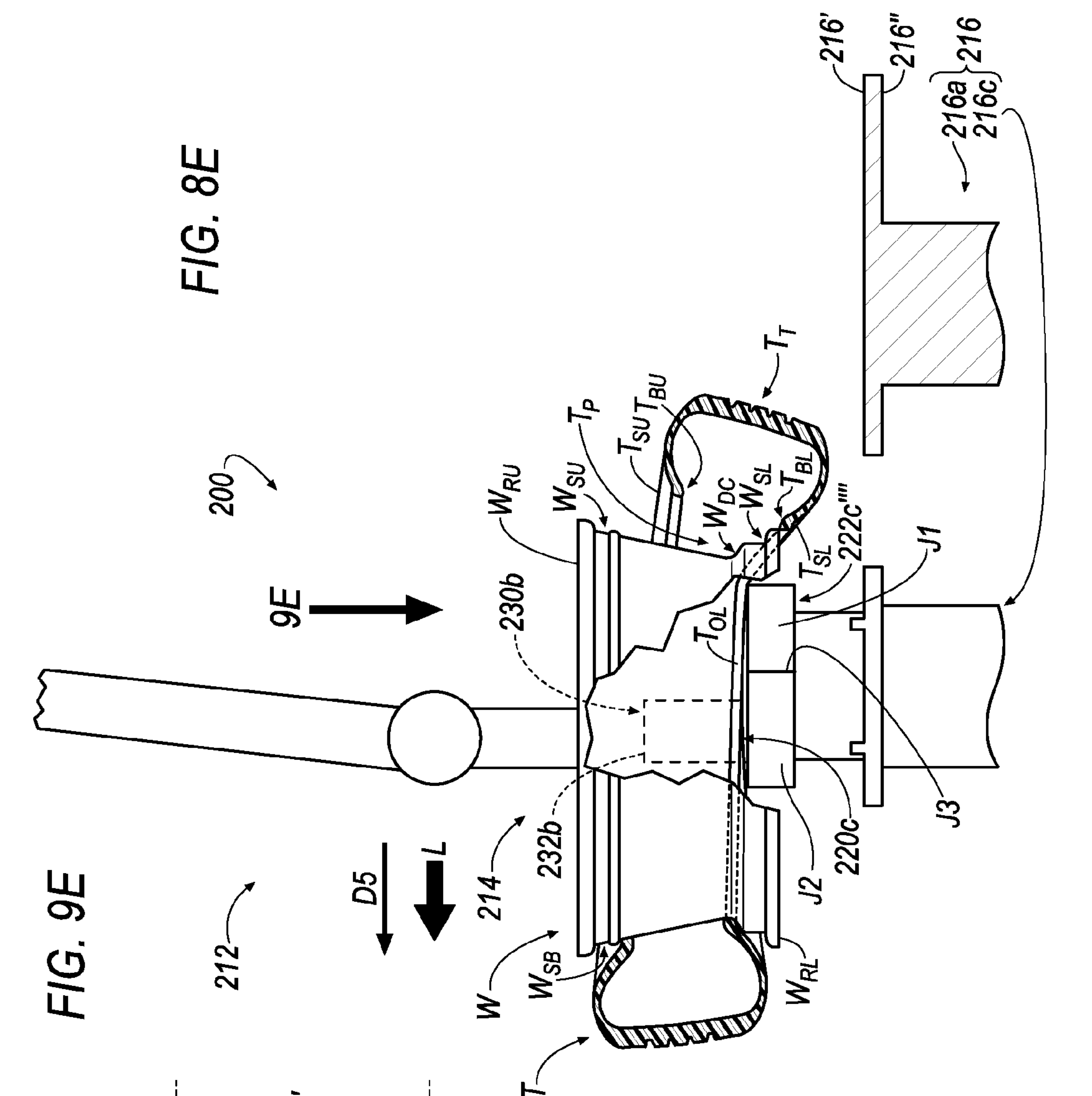
FIG. 8E
FIG. 9E
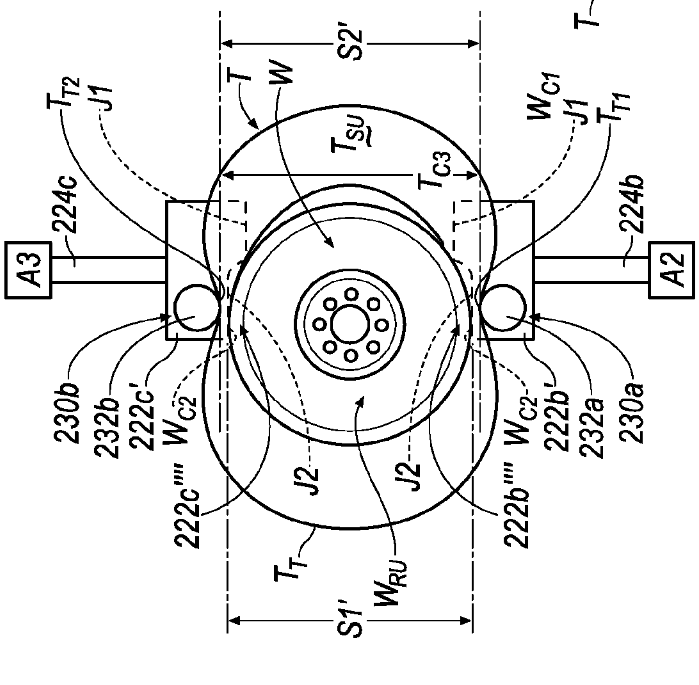

FIG. 11A
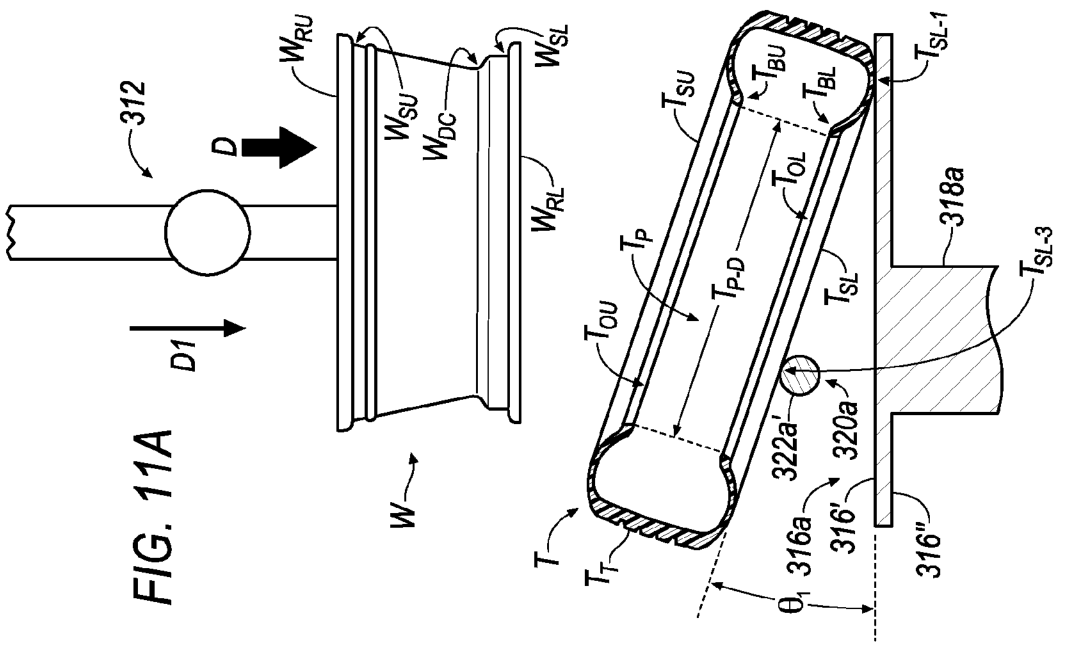
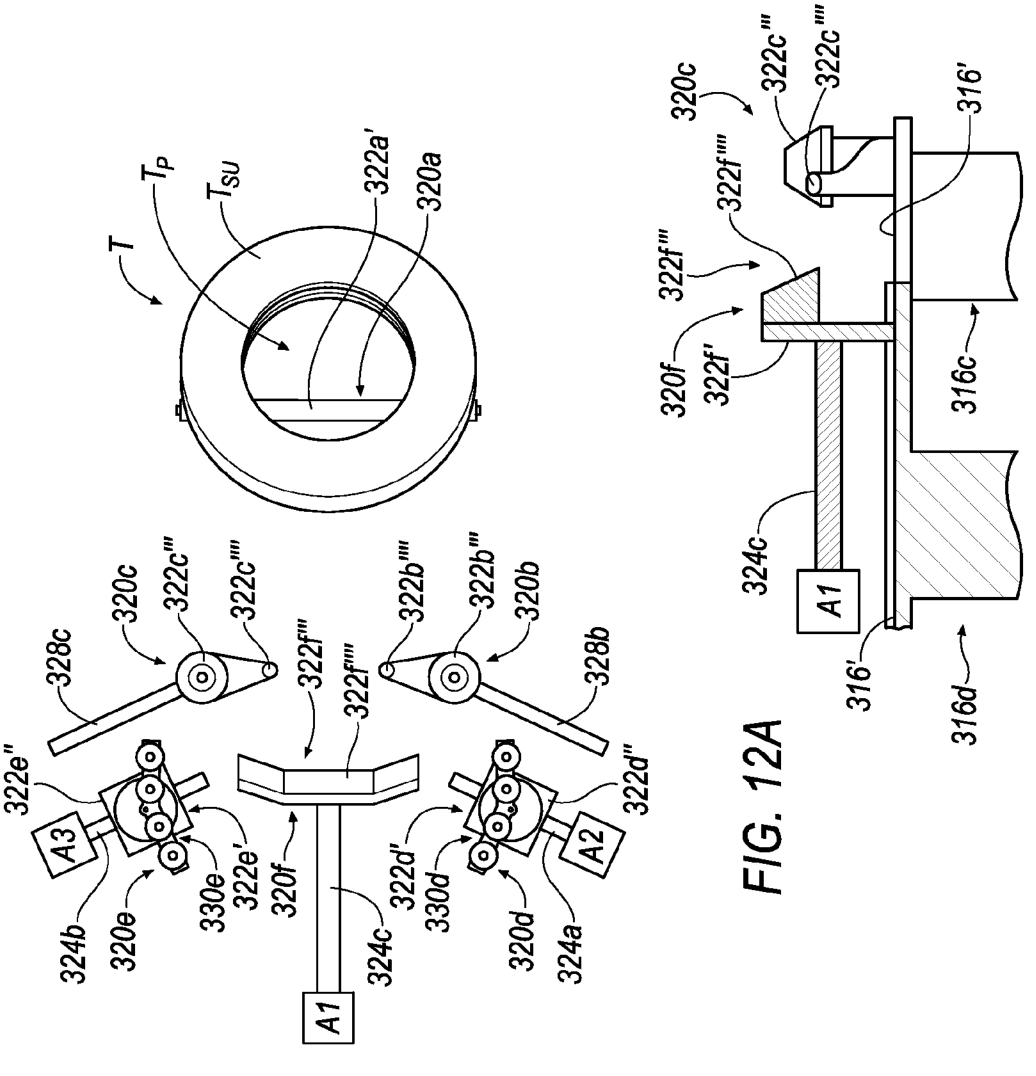
FIG. 12A

FIG. 11E
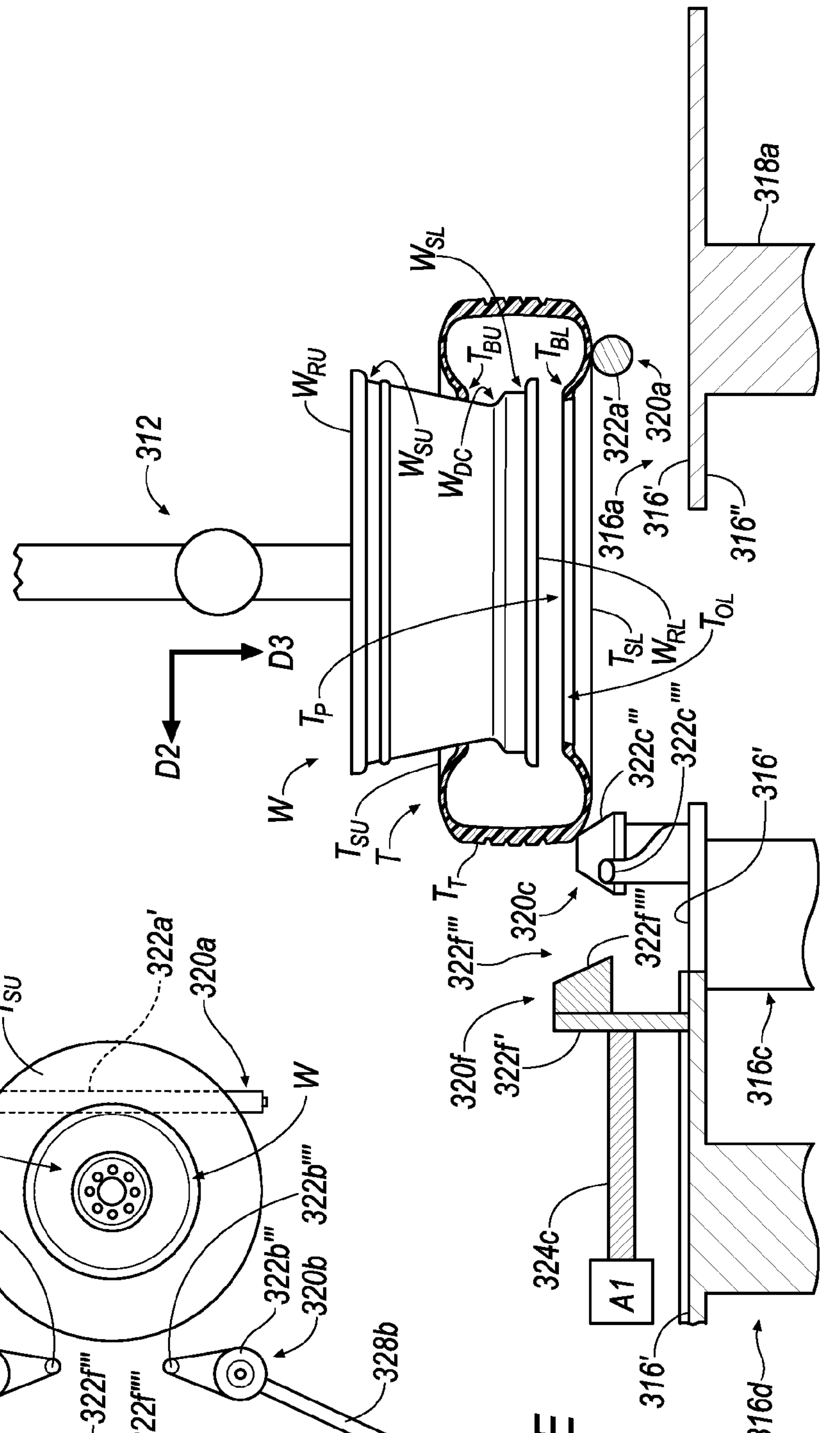
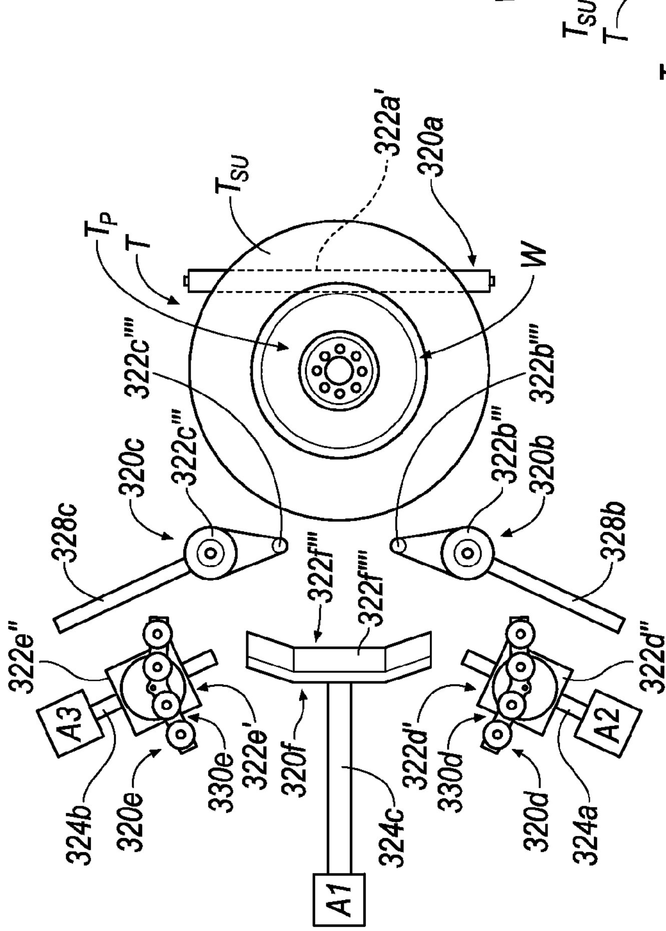
FIG. 12E

FIG. 11F
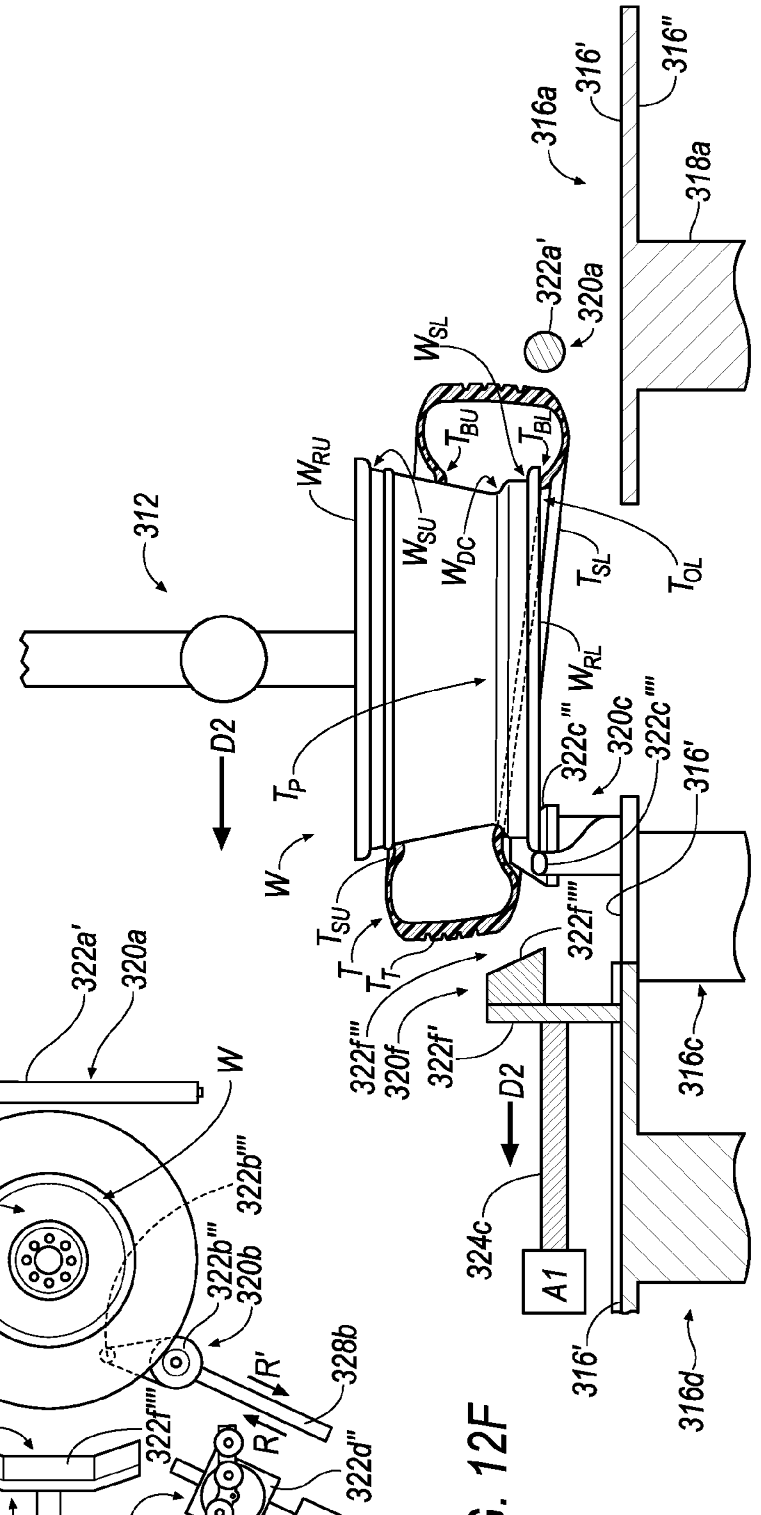
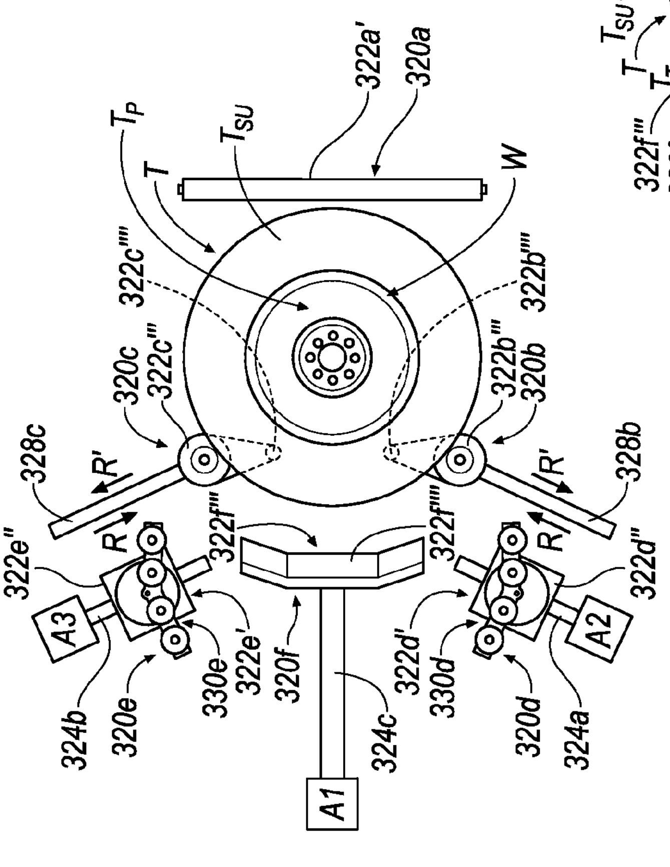
FIG. 12F

SYSTEM AND METHOD FOR PROCESSING A TIRE-WHEEL ASSEMBLY

FIELD OF THE INVENTION

The disclosure relates to tire-wheel assemblies and to a system and method for assembling a tire-wheel assembly.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method for assembling a tire-wheel assembly.

BRIEF DESCRIPTION OF THE DRAWINGS

The disclosure will now be described, by way of example, with reference to the accompanying drawings, in which:

FIGS. 5D' and 5E' illustrate side, partial cross-sectional views of the sub-station, tire and wheel according to line 5A-5A of FIG. 4A in accordance with an exemplary embodiment of the invention;

FIGS. 8A-8G illustrate side, partial cross-sectional views of the sub-station, tire and wheel according to line 8A-8A of FIG. 7A in accordance with an exemplary embodiment of the invention;

FIG. 9A-9G illustrate a partial top view of the sub-station, tire and wheel according to lines 9A-9G of FIGS. 8A-8G in accordance with an exemplary embodiment of the invention;

FIGS. 11A-11J illustrate side, partial cross-sectional views of the sub-station, tire and wheel according to line 11A-11A of FIG. 10A in accordance with an exemplary embodiment of the invention;

FIG. 12A-12J illustrate a partial top view of the sub-station, tire and wheel according to lines 12A-12J of FIGS. 11A-11J in accordance with an exemplary embodiment of the invention;

DETAILED DESCRIPTION OF THE INVENTION

Figure 1A:
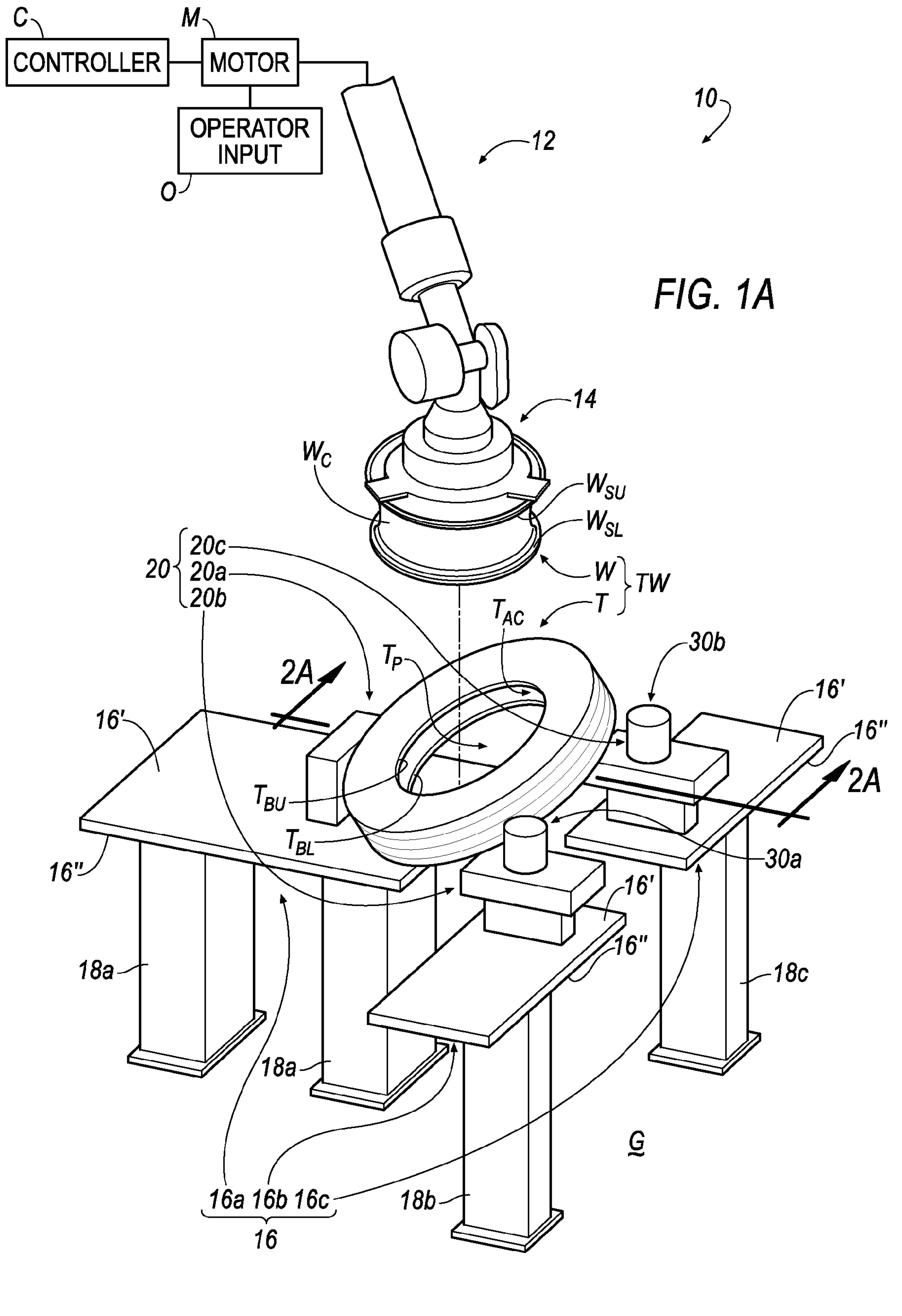
FIG. 1A is a perspective view of a sub-station for processing a tire and a wheel in accordance with an exemplary embodiment of the invention.

The Figures illustrate exemplary embodiments of apparatuses and methods for assembling a tire-wheel assembly. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIGS. 16A-16D, which illustrate an exemplary tire, T. Further, starting at FIG. 1A in the present disclosure, reference may be made to the "upper," "lower," "left," "right" and "side" of the tire, T; although such nomenclature may be utilized to describe a particular portion or aspect of the tire, T, such nomenclature may be adopted due to the orientation of the tire, T, with respect to structure that supports the tire, T. Accordingly, the above nomenclature should not be utilized to limit the scope of the claimed invention and is utilized herein for exemplary purposes in describing an embodiment of the invention.

In an embodiment, the tire, T, includes an upper sidewall surface, $T_{SU}$ (see, e.g., FIG. 16A), a lower sidewall surface, $T_{SL}$ (see, e.g., FIG. 16D), and a tread surface, $T_T$ (see, e.g., FIGS. 16B-16C), that joins the upper sidewall surface, $T_{SU}$, to the lower sidewall surface, $T_{SL}$. Referring to FIG. 16B, the upper sidewall surface, $T_{SU}$, may rise away from the tread surface, $T_T$, to a peak and subsequently descend at a slope to terminate at and form a circumferential upper bead, $T_{BU}$; similarly, the lower sidewall surface, $T_{SL}$, may rise away from the tread surface, $T_T$, to a peak and subsequently descend at a slope to terminate at and form a circumferential lower bead, $T_{BL}$.

As seen in FIG. 16B, when the tire, T, is in a relaxed, unbiased state (see also, e.g., FIGS. 3A-3F, 6A-6G, 9A-9C), the upper bead, $T_{BU}$, forms a circular, upper tire opening, $T_{OU}$; similarly, when the tire, T, is in a relaxed, unbiased state, the lower bead, $T_{BL}$, forms a circular, lower tire opening, $T_{OL}$. It will be appreciated that when an external force is applied to the tire, T, the tire, T, may be physically manipulated, and, as a result, one or more of the upper tire opening, $T_{OU}$, and the lower tire opening, $T_{OL}$, may be temporality upset such that one or more of the upper tire opening, $T_{OU}$, and the lower tire opening, $T_{OL}$, is/are not entirely circular, but, may, for example, be manipulated to include an oval shape (see, e.g., FIGS. 3G-3I, 6H-6I, 9D-9F).

Referring to FIG. 16B, when in the relaxed, unbiased state, each of the upper tire opening, $T_{OU}$, and the lower tire opening, $T_{OL}$, form, respectively, an upper tire opening diameter, $T_{OU-D}$, and a lower tire opening diameter, $T_{OL-D}$. Further, as seen in FIGS. 16A-16B, when in the relaxed, unbiased state, the upper sidewall surface, $T_{SU}$, and the lower sidewall surface, $T_{SL}$, define the tire, T, to include a tire diameter, $T_D$.

Figure 16A:
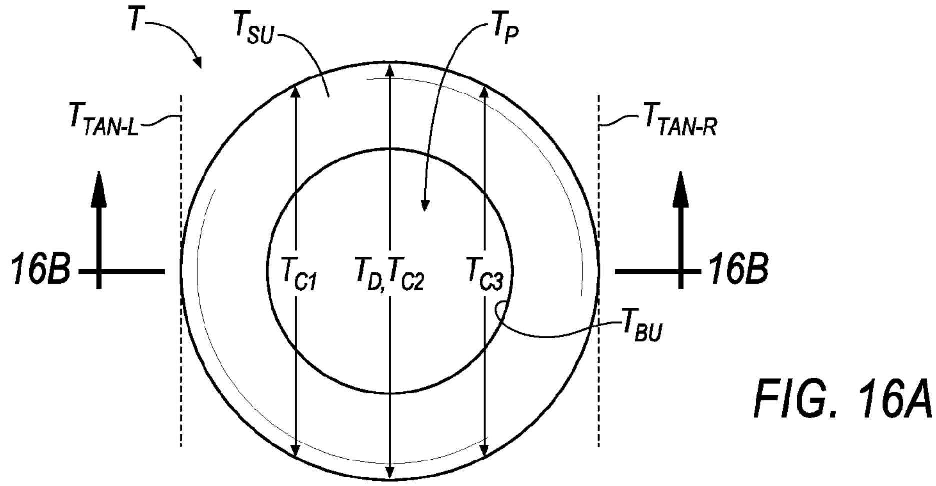
FIG. 16A is a top view of an exemplary tire.
Figure 16B:
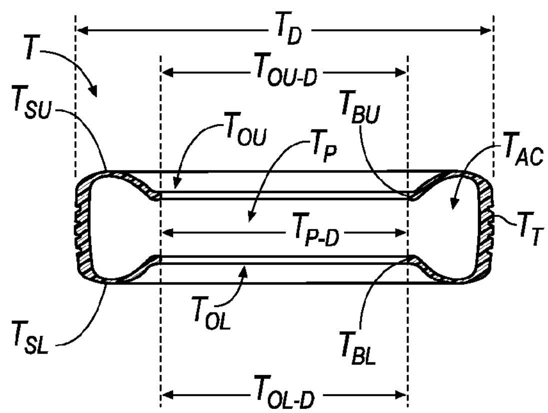
FIG. 16B is a cross-sectional view of the tire according to line 16B-16B of FIG. 16A.
Figure 16C:
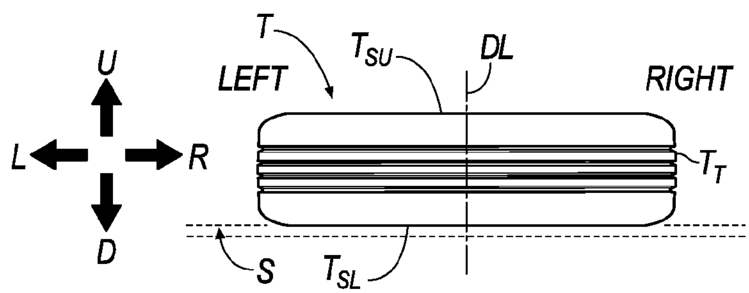
FIG. 16C is a side view of the tire of FIG. 16A.
Figure 16D:
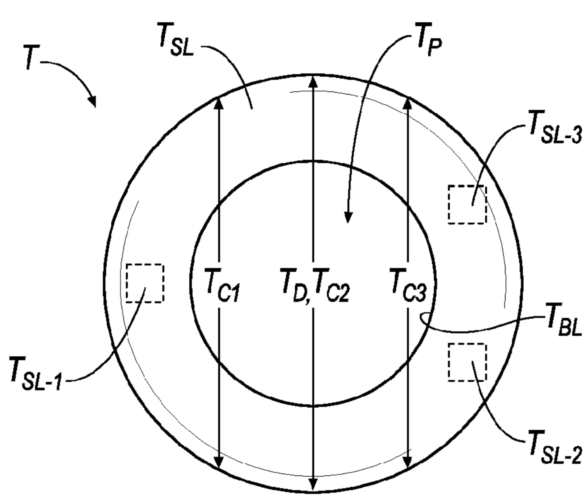
FIG. 16D is a bottom view of the tire of FIG. 16A.

Referring to FIGS. 16A-16B and 16D, the tire, T, also includes a passage, $T_P$. Access to the passage, $T_P$, is permitted by either of the upper tire opening, $T_{OU}$, and the lower tire opening, $T_{OL}$. Referring to FIG. 16B, when the tire, T, is in a relaxed, unbiased state, the upper tire opening, $T_{OU}$, and the lower tire opening, $T_{OL}$, define the passage, $T_P$, to include a diameter, $T_{P-D}$. Referring also to FIG. 16B, the tire, T, includes a circumferential air cavity, $T_{AC}$, that is in communication with the passage, $T_P$. After joining the tire, T, to a wheel, W, pressurized air is deposited into the circumferential air cavity, $T_{AC}$, for inflating the tire, T.

When the tire, T, is arranged adjacent structure as described in the following disclosure starting at FIG. 1A, a portion of the lower sidewall surface, $T_{SL}$, of the tire, T, may be disposed adjacent the structure. In some circumstances, the structure may provide three points of support, and, as such, three portions of the lower sidewall surface, $T_{SL}$, of the tire, T, may be disposed adjacent the structure. Accordingly, reference is made to FIG. 16D in order to identify three exemplary portions of the lower sidewall surface, $T_{SL}$, of the tire, T, that may be disposed adjacent the structure at reference signs, $T_{SL\text{-}1}$, $T_{SL\text{-}2}$ and $T_{SL\text{-}3}$, which may be respectively be referred to as a "first portion of the lower sidewall surface, $T_{SL}$, of the tire, T," a "second portion of the lower sidewall surface, $T_{SL}$, of the tire, T" and a "third portion of the lower sidewall surface, $T_{SL}$, of the tire, T." Because the tire, T, may be moved relative to the structure, the three points of support may not necessarily be limited to the illustrated identification at FIG. 16D, and, as such the three points of support may be located at other regions of the lower sidewall surface, $T_{SL}$, of the tire, T.

Further, when the tire, T, is arranged adjacent structure or a wheel, W (see, e.g., FIGS. 17A-17B), as described in the following disclosure, the written description may reference a "left" portion or a "right" portion of the tire, T. Referring to FIG. 16C, the tire, T, is shown relative to a support member, S; the support member, S, is provided (and shown in phantom) in order to establish a frame of reference for the "left" portion and the "right" portion of the tire, T. In FIG. 16C, the tire, T, is arranged in a "non-rolling" orientation such that the tread surface, $T_T$, is not disposed adjacent the phantom support member, S, but, rather the lower sidewall surface, $T_{SL}$, is disposed adjacent the phantom support member, S. A center diving line, DL, equally divides the "non-rolling" orientation of the tire, T, in half in order to generally indicate a "left" portion of the tire, T, and a "right" portion of the tire, T.

As discussed above, reference is made to several diameters, $T_{P-D}$, $T_{OU-D}$, $T_{OL-D}$ of the tire, T. According to geometric theory, a diameter passes through the center of a circle, or, in the present disclosure, the axial center of the tire, T, which may alternatively be referred to as an axis of rotation of the tire, T. Geometric theory also includes the concept of a chord, which is a line segment that whose endpoints both lie on the circumference of a circle; according to geometric theory, a diameter is the longest chord of a circle.

In the following description, the tire, T, may be moved relative to structure; accordingly, in some instances, a chord of the tire, T, may be referenced in order to describe an embodiment of the invention. Referring to FIG. 16A, several chords of the tire, T, are shown generally at $T_{C1}$, $T_{C2}$ (i.e., the tire diameter, $T_D$) and $T_{C3}$.

The chord, $T_{C1}$, may be referred to as a "left" tire chord. The chord, $T_{C3}$, may be referred to as a "right" tire chord. The chord, $T_{C2}$, may be equivalent to the tire diameter, $T_D$, and be referred to as a "central" chord. Both of the left and right tire chords, $T_{C1}$, $T_{C3}$, include a geometry that is less than central chord, $T_{C2}$/tire diameter, $T_D$.

In order to reference the location of the left chord, $T_{C1}$, and the right chord, $T_{C3}$, reference is made to a left tire tangent line, $T_{TAN\text{-}L}$, and a right tire tangent line, $T_{TAN\text{-}R}$. The left chord, $T_{C1}$, is spaced apart approximately one-fourth (¼) of the tire diameter, $T_D$, from the left tire tangent line, $T_{TAN\text{-}L}$. The right chord, $T_{C3}$, is spaced apart approximately one-fourth (¼) of the tire diameter, $T_D$, from the right tire tangent line, $T_{TAN\text{-}R}$. Each of the left and right tire chords, $T_{C1}$, $T_{C3}$, may be spaced apart about one-fourth (¼) of the tire diameter, $T_D$, from the central chord, $T_{C2}$. The above spacings referenced from the tire diameter, $T_D$, are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 16C, the movement may be referenced by an arrow, U, to indicate upwardly movement or an arrow, D, to indicate downwardly movement. Further, the movement may be referenced by an arrow, L, to indicate left or rearwardly movement or an arrow, R, to indicate right or forwardly movement.

Figure 17A:
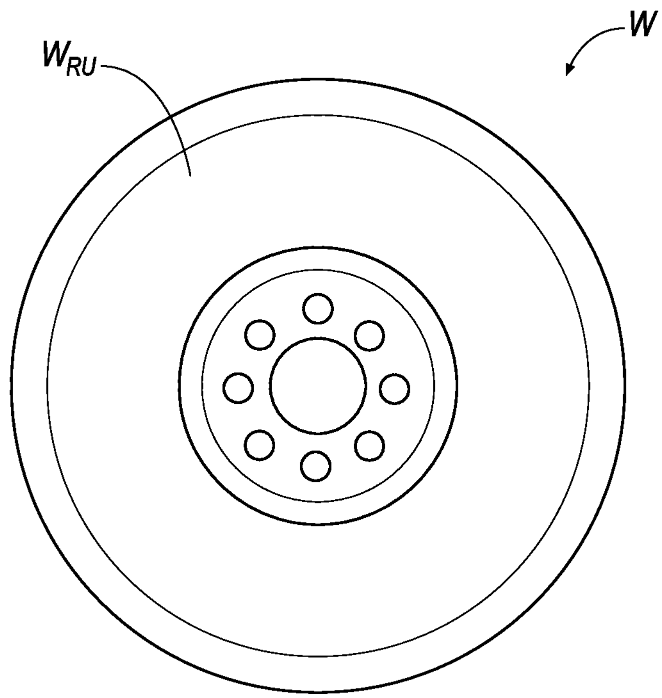
FIG. 17A is a top view of an exemplary wheel.
Figure 17B:
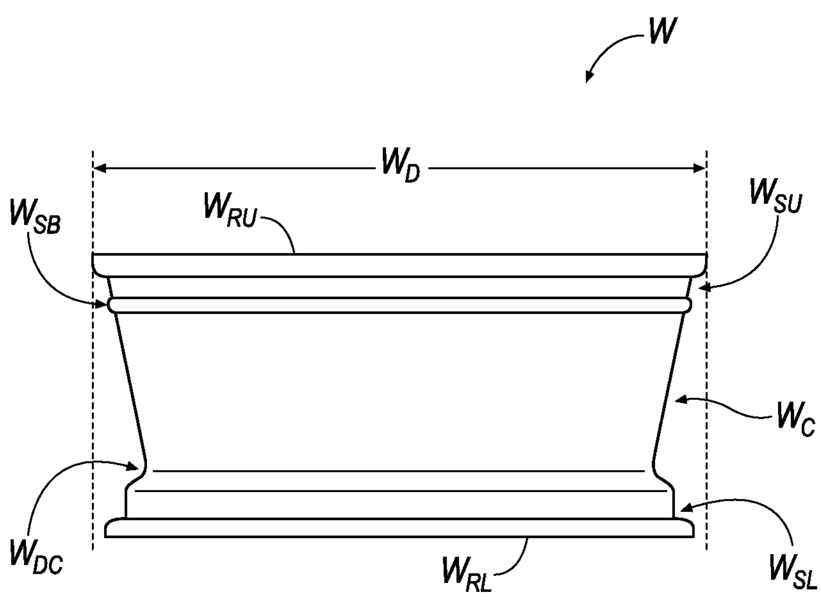
FIG. 17B is a side view of the wheel of FIG. 17A.

Prior to describing embodiments of the invention, reference is made to FIGS. 17A-17B, which illustrate an exemplary wheel, W. Further, starting at FIG. 1A in the present disclosure, reference may be made to the "upper," "lower," "left," "right" and "side" of the wheel, W; although such nomenclature may be utilized to describe a particular portion or aspect of the wheel, W, such nomenclature may be adopted due to the orientation of the wheel, W, with respect to structure that supports the wheel, W. Accordingly, the above nomenclature should not be utilized to limit the scope of the claimed invention and is utilized herein for exemplary purposes in describing an embodiment of the invention.

In an embodiment, the wheel, W, includes an upper rim surface, $W_{RU}$, a lower rim surface, $W_{RL}$, and an outer circumferential surface, $W_C$, that joins the upper rim surface, $W_{RU}$, to the lower rim surface, $W_{RL}$. Referring to FIG. 17B, upper rim surface, $W_{RU}$, forms a wheel diameter, $W_D$. The wheel diameter, $W_D$, may be non-constant about the circumference, $W_C$, from the upper rim surface, $W_{RU}$, to the lower rim surface, $W_{RL}$. The wheel diameter, $W_D$, formed by the upper rim surface, $W_{RU}$, may be largest diameter of the non-constant diameter about the circumference, $W_C$, from the upper rim surface, $W_{RU}$, to the lower rim surface, $W_{RL}$. The wheel diameter, $W_D$, is approximately the same as, but slightly greater than the diameter, $T_{P-D}$, of the passage, $T_P$, of the tire, T; accordingly, once the wheel, W, is disposed within the passage, $T_P$, the tire, T, may flex and be frictionally-secured to the wheel, W, as a result of the wheel diameter, $W_D$, being approximately the same as, but slightly greater than the diameter, $T_{P-D}$, of the passage, $T_P$, of the tire, T.

The outer circumferential surface, $W_C$, of the wheel, W, further includes an upper bead seat, $W_{SU}$, and a lower bead seat, $W_{SL}$. The upper bead seat, $W_{SU}$, forms a circumferential cusp, corner or recess that is located proximate the upper rim surface, $W_{RU}$. The lower bead seat, $W_{SL}$, forms a circumferential cusp, corner or recess that is located proximate the lower rim surface, $W_{RL}$. Upon inflating the tire, T, the pressurized air causes the upper bead, $T_{BU}$, to be disposed adjacent and "seat" in the upper bead seat, $W_{SU}$; similarly, upon inflating the tire, T, the pressurized air causes the lower bead, $T_{BL}$, to be disposed adjacent and "seat" in the lower bead seat, $W_{SL}$.

The non-constant diameter of the outer circumference, $W_C$, of the wheel, W, further forms a wheel "drop center," $W_{DC}$. A wheel drop center, $W_{DC}$, may include the smallest diameter of the non-constant diameter of the outer circumference, $W_C$, of the wheel, W. Functionally, the wheel drop center, $W_{DC}$, may assist in the mounting of the tire, T, to the wheel, W.

The non-constant diameter of the outer circumference, $W_C$, of the wheel, W, further forms an upper "safety bead," $W_{SB}$. In an embodiment, the upper safety bead may be located proximate the upper bead seat, $W_{SU}$. In the event that pressurized air in the circumferential air cavity, $T_{AC}$, of the tire, T, escapes to atmosphere, the upper bead, $T_{BU}$, may "unseat" from the upper bead seat, $W_{SU}$; because of the proximity of the safety bead, $W_{SB}$, the safety bead, $W_{SB}$, may assist in the mitigation of the "unseating" of the upper bead, $T_{BU}$, from the upper bead seat, $W_{SU}$, by assisting in the retaining of the upper bead, $T_{BU}$, in a substantially seated orientation relative to the upper bead seat, $W_{SU}$. In some embodiments, the wheel, W, may include a lower safety bead (not shown); however, upper and/or lower safety beads may be included with the wheel, W, as desired, and are not required in order to practice the invention described in the following disclosure.

Referring to FIG. 1A, a processing sub-station 10 for processing a tire-wheel assembly, TW, is shown according to an embodiment. The "processing" conducted by the processing sub-station 10 may include the act of "joining" or "mounting" a tire, T, to a wheel, W, for forming the tire-wheel assembly, TW. The act of "joining" or "mounting" may mean to physically couple, connect or marry the tire, T, and wheel, W, such that the wheel, W, may be referred to as a male portion that is inserted into a passage, $T_P$, of a tire, T, being a female portion.

As described and shown in the following Figures, although the desired result of the processing sub-station 10 is the joining or mounting of the tire, T, and wheel, W, to form a tire-wheel assembly, TW, it should be noted that the processing sub-station 10 does not inflate the circumferential air cavity, $T_{AC}$, of the tire, T, of the tire-wheel assembly, TW, nor does the processing sub-station 10 contribute to an act of "seating" the upper bead, $T_{BU}$, or the lower bead, $T_{BL}$, of the tire, T, adjacent the upper bead seat, $W_{SU}$, and the lower bead seat, $W_{SL}$, of the wheel, W (because the act of "seating" typically arises from an inflating step where the wheel assembly, TW, is inflated). Accordingly, upon joining or mounting the tire, T, to the wheel, W, the upper bead, $T_{BU}$, or the lower bead, $T_{BL}$, of the tire, T, may be arranged about and/or disposed adjacent the outer circumferential surface, $W_C$, of the wheel, W.

In an implementation, the processing sub-station 10 may be included as part of a "single-cell" workstation. A single-cell workstation may include other sub-stations (not shown) that contribute to the processing of a tire-wheel assembly, TW; other sub-stations may include, for example: a soaping sub-station, a stemming sub-station, an inflating sub-station, a match-marking sub-station, a balancing sub-station and the like. The term "single-cell" indicates that the sub-stations contribute to the production of a tire-wheel assembly, TW, without requiring a plurality of successive, discrete workstations that may otherwise be arranged in a conventional assembly line such that a partially-assembled tire-wheel assembly, TW, is "handed-off" along the assembly line (i.e., "handed-off" meaning that an assembly line requires a partially-assembled tire-wheel assembly, TW, to be retained by a first workstation of an assembly line, worked on, and released to a subsequent workstation in the assembly line for further processing). Rather, a single cell workstation provides one workstation having a plurality of sub-stations each performing a specific task in the process of assembling a tire-wheel assembly, TW. This assembling process takes place wherein the tire and/or wheel "handing-off" is either minimized or completely eliminated. As such, a single-cell workstation significantly reduces the cost and investment associated with owning/renting the real estate footprint associated with a conventional tire-wheel assembly line while also having to provide maintenance for each individual workstation defining the assembly line. Thus, capital investment and human oversight is significantly reduced when a single cell workstation is employed in the manufacture of tire-wheel assemblies, TW.

Referring to FIG. 1A, the processing sub-station 10 includes a device 12. The device 12 may be referred to as a robotic arm. The robotic arm 12 may be located in a substantially central position relative to a plurality of sub-stations (including, e.g., the processing sub-station 10) of a single-cell workstation. The robotic arm 12 may be attached to and extend from a base/body portion (not shown) connected to ground, G.

The robotic arm 12 may include an end effecter 14. The end effecter 14 may include a claw, gripper, or other means for removably-securing the wheel, W, to the robotic arm 12. The end effecter 14 permits the robotic arm 12 to have the ability to retain and not release the wheel, W, throughout the entire procedure performed by the processing sub-station 10 (and, if applied in a single-cell workstation, the ability to retain and not release the wheel, W, throughout the entire assembling procedure of the tire-wheel assembly, TW). Accordingly, the end effecter 14 minimizes or eliminates the need of the robotic arm 12 to "hand-off" the tire-wheel assembly, TW, to (a) subsequent sub-station(s) (not shown).

The processing sub-station 10 may perform several functions/duties including that of: (1) a tire repository sub-station and (2) a mounting sub-station. A tire repository sub-station typically includes one or more tires, T, that may be arranged in a "ready" position for subsequent joining to a wheel, W. A mounting sub-station typically includes structure that assists in the joining of a tire, T, to a wheel, W (e.g., the disposing of a wheel, W, within the passage, $T_P$, of the tire, T).

Referring to FIG. 1A, the processing sub-station 10 may be initialized by joining a wheel, W, to the robotic arm 12 at the end effecter 14. The processing sub-station 10 may also be initialized by positioning the tire, T, upon a support member 16. The support member 16 may include a first support member 16a, a second support member 16b and a third support member 16c. Each of the first, second and third support members 16a, 16b, 16c include an upper surface 16' and a lower surface 16".

The lower surface 16" of each of the first, second and third support members 16a, 16b, 16c may be respectively connected to at least one first leg member 18a, at least one second leg member 18b and at least one third leg member 18c. Each of the at least one first, second and third leg members 18a, 18b, 18c respectively include a length for elevating or spacing each of the first, second and third support members 16a, 16b, 16c from an underlying ground surface, G. Although the robotic arm 12 is not directly connected to the support member 16 (but, rather may be connected to ground, G), the robotic arm 12 may be said to be interfaceable with (as a result of the movements D1-D12 described in the following disclosure) and/or indirectly connected to the support member 16 by way of a common connection to ground, G, due the leg members 18a-18c connecting the support member 16 to ground, G.

The processing sub-station 10 may further include a plurality of tire-engaging devices 20. The plurality of tire-engaging devices 20 may include a first tire-engaging device 20a connected to the upper surface 16' of the first support member 16a, a second tire-engaging device 20b connected to the upper surface 16' of the second support member 16b and a third tire-engaging device 20c connected to the upper surface 16' of the third support member 16c.

Figure 1B:
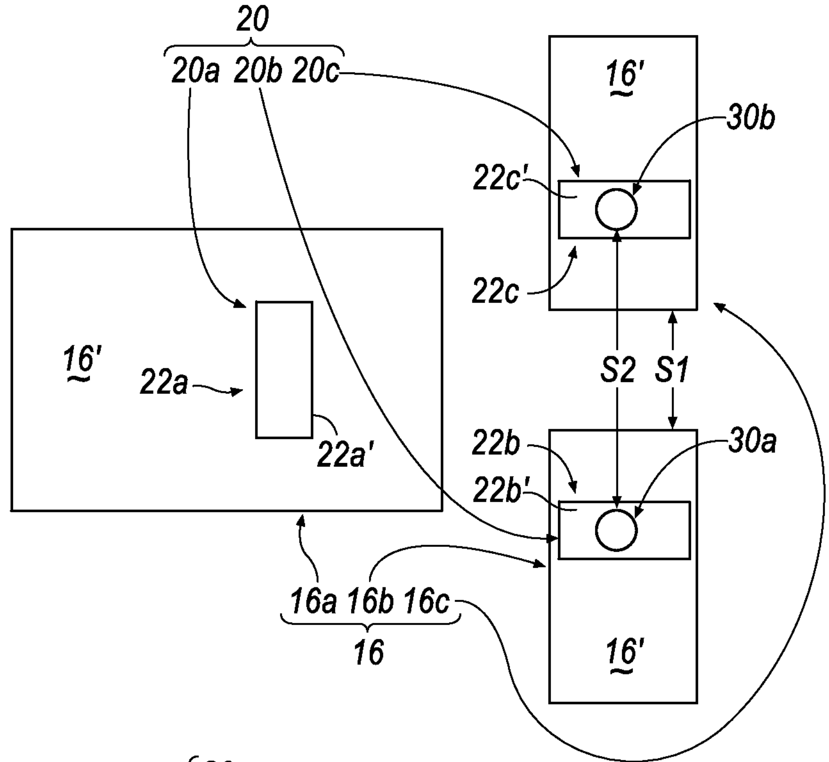
FIG. 1B is a top view of the sub-station of FIG. 1A.
Figure 1C:
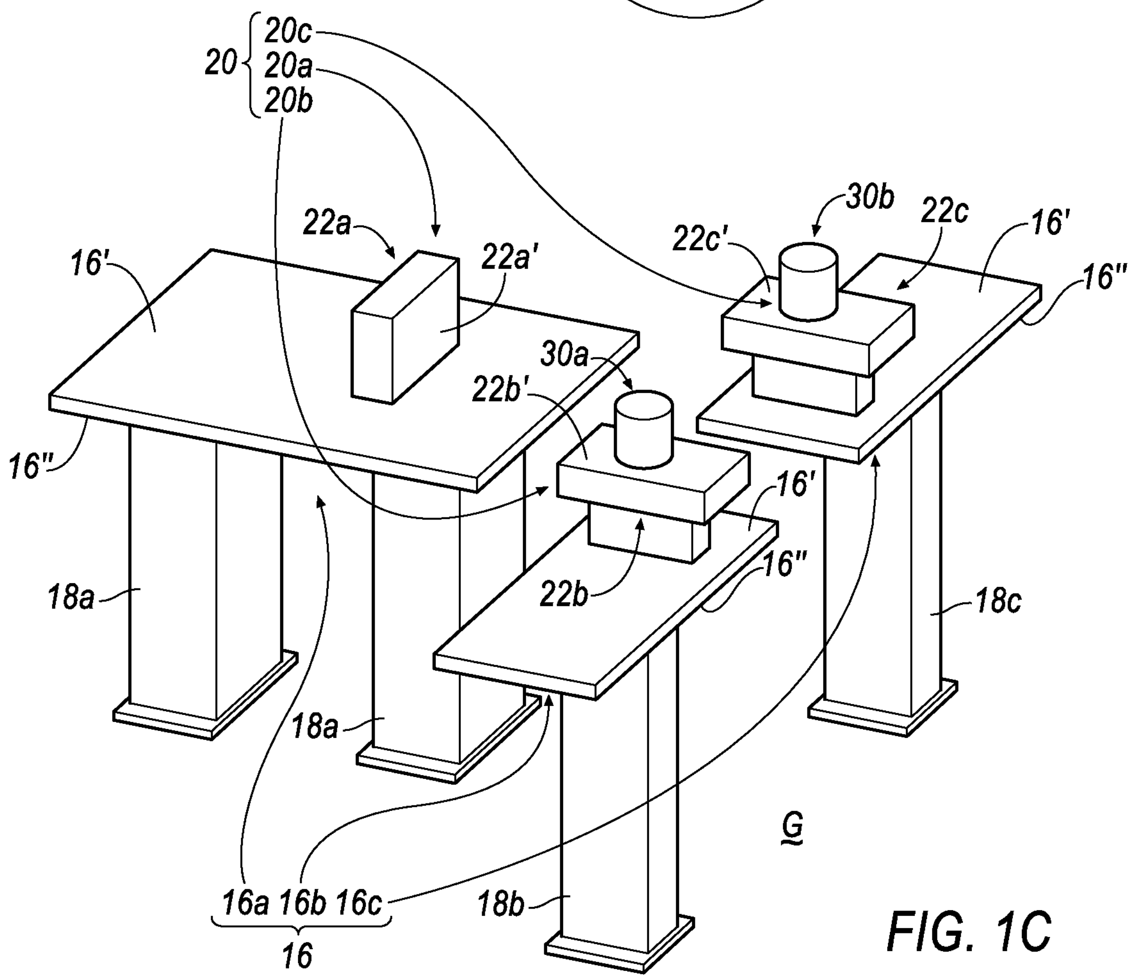
FIG. 1C is a perspective view of a portion of the sub-station of FIG. 1A.

Referring to FIGS. 1B-1C, the first tire-engaging device 20a may include a body 22a having a side, tire-tread-engaging surface 22a'. Each of the second and third tire-engaging devices 20b, 20c may include a body 22b, 22c having an upper, tire-sidewall-engaging surface 22b', 22c'.

The upper sidewall-engaging surfaces 22b', 22c' of the second and third tire-engaging devices 20b, 20c may be co-planar with one another. The upper sidewall-engaging surfaces 22b', 22c' of the second and third tire-engaging devices 20b, 20c may be arranged in a spaced-apart relationship with respect to ground, G, that is greater than that of the spaced-apart relationship of the upper surface 16' of the first support member 16a; accordingly, the upper sidewall-engaging surfaces 22b', 22c' of the second and third tire-engaging devices 20b, 20c may be arranged in a non-co-planar relationship with respect to the upper surface 16' of the first support member 16a.

A first tire-tread-engaging post 30a may extend from the upper, tire-sidewall-engaging surface 22b' of the second tire-engaging device 20b. A second tire-tread-engaging post 30b may extend from the upper, tire-sidewall-engaging surface 22c' of the third tire-engaging device 20c.

Referring to FIG. 1B, the second and third support members 16b, 16c are separated by a gap or first spacing, S1. The first tire-tread-engaging post 30a is separated from the second tire-tread-engaging post 30b by a gap or second spacing, S2. The second spacing, S2, is greater than the first spacing, S1. The first spacing, S1, may be approximately equal to, but slightly greater than the diameter, $W_D$, of the wheel, W; further, the tire diameter, $T_D$,/central chord, $T_{C2}$, may be greater than the first spacing, S1. The second spacing, S2, may be approximately equal to the left chord, $T_{C1}$, and the right chord, $T_{C3}$, of the tire, T; further, the tire diameter, $T_D$,/central chord, $T_{C2}$, may be greater than the second spacing, S2.

Figure 2A:
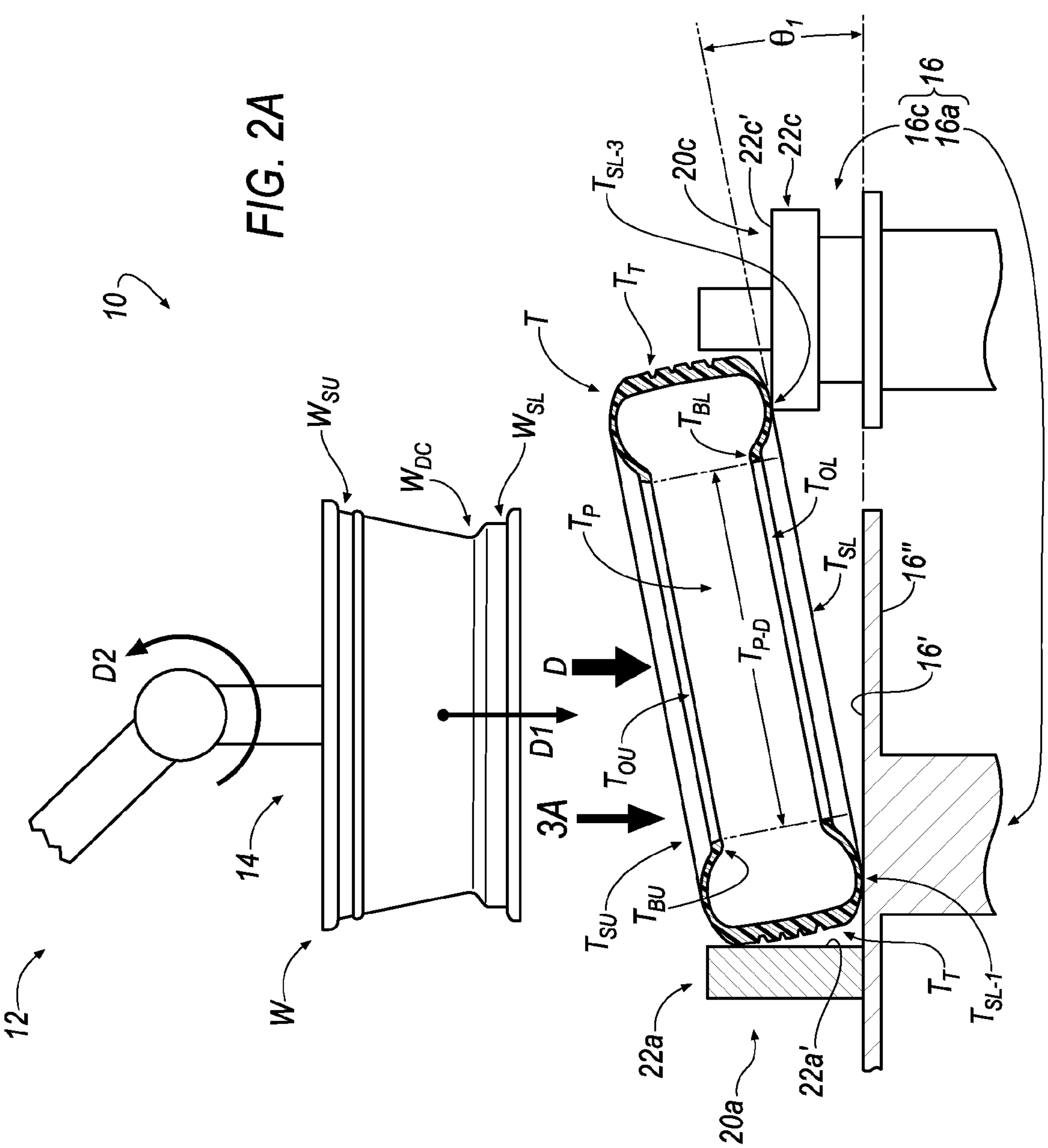
FIGS. 2A-2J illustrate side, partial cross-sectional views of the sub-station, tire and wheel according to line 2A-2A of FIG. 1A in accordance with an exemplary embodiment of the invention.
Figure 3A:
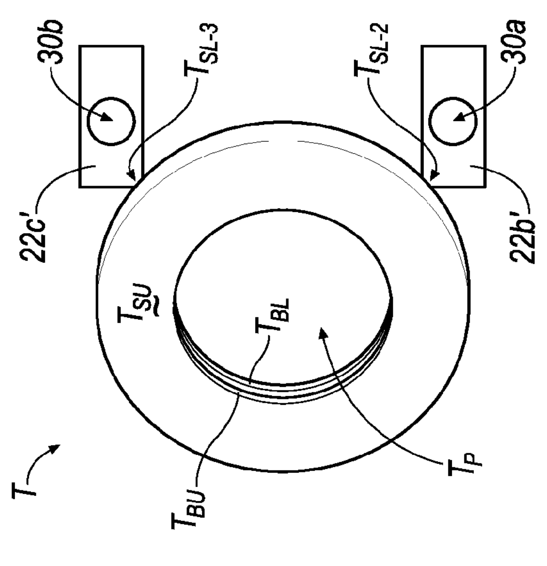
FIG. 3A-3J illustrate a partial top view of the sub-station, tire and wheel according to lines 3A-3J of FIGS. 2A-2J in accordance with an exemplary embodiment of the invention.

As seen in FIG. 2A with reference to FIG. 3A, prior to joining the tire, T, to the wheel, W, the tire, T, may be said to be arranged in a first relaxed, unbiased orientation such that the upper tire opening, $T_{OU}$, and the lower tire opening, $T_{OL}$, define the passage, $T_P$, to include a diameter, $T_{P-D}$. When the tire, T, is eventually joined to the wheel, W (see, e.g., FIG. 2J), the upper bead, $T_{BU}$, and the lower bead, $T_{BL}$, may be arranged proximate but not seated adjacent, respectively, the upper bead seat, $W_{SU}$, and the lower bead seat, $W_{SL}$, of the wheel, W; later, upon inflating the tire, T, at, e.g., an inflation sub-station (not shown), the upper bead, $T_{BU}$, and the lower bead, $T_{BL}$, may be seated (i.e., disposed adjacent), respectively, the upper bead seat, $W_{SU}$, and the lower bead seat, $W_{SL}$, of the wheel, W. Further, when the tire, T, is joined to the wheel, W (see, e.g., FIG. 2J), the tire, T, may be said to be arranged in a second substantially relaxed, but somewhat biased orientation such that the diameter, $T_{P-D}$, of the passage, $T_P$, is substantially circular and substantially similar to its geometry of the first relaxed, unbiased orientation of the tire, T.

Referring to FIG. 2A, the robotic arm 12 is arranged in a spaced-apart orientation with respect to the support member 16, which includes the tire, T, arranged in a "ready" position. The "ready" position may include the tread surface, $T_T$, of the tire, T, arranged adjacent the front, tire-tread-engaging surface 22a' of the body 22a of the first tire-engaging device 20a. The "ready" position may further include the tire, T, being arranged in a first angularly-offset orientation, $\theta_1$, with respect to the upper surface 16' of the first support member 16a.

The first angularly-offset orientation, $\theta_1$, of the tire, T, may result from the non-co-planar relationship the upper sidewall-engaging surfaces 22b', 22c' of the second and third tire-engaging devices 20b, 20c with that of the upper surface 16' of the first support member 16a such that: (1) the first portion, $T_{SL-1}$, of the lower sidewall surface, $T_{SL}$, being arranged adjacent the upper surface 16' of the first support member 16a, (2) the second portion, $T_{SL-2}$, of the lower sidewall surface, $T_{SL}$, being arranged adjacent the upper tire-sidewall-engaging surface 22b' of the body 22b of the second tire-engaging device 20b (noting that, in FIG. 2A, the second portion, $T_{SL-2}$, is not represented due to the line-of-view of the cross-sectional reference line of FIG. 1A, but, however, is shown in FIG. 3A), and (3) a third portion, $T_{SL-3}$, of the lower sidewall surface, $T_{SL}$, being arranged adjacent the upper tire-sidewall-engaging surface 22c' of the body 22c of the third tire-engaging device 20c. Accordingly, the support member 16 may provide a three-point support (which is more clearly shown at FIG. 1A) at $T_{SL-1}$, $T_{SL-2}$, $T_{SL-3}$ for the lower sidewall surface, $T_{SL}$, of the tire, T, while remaining portions of the lower sidewall surface, $T_{SL}$, of the tire, T, are not in direct contact with any other portion of the upper surface surfaces 16', 22b', 22c' of the support member 16 when the tire, T, is arranged in the first angularly-offset orientation, $\theta_1$.

The processing sub-station 10 may execute a mounting procedure by causing a controller, C (see, e.g., FIG. 1A) to send one or more signals to a motor, M (see, e.g., FIG. 1A), that drives movement (according to the direction of the arrows, D1-D12—see FIGS. 2A-2J) of the robotic arm 12. Alternatively or in addition to automatic operation by the controller, C, according to inputs stored in memory, the movement, D1-D12, may result from one or more of a manual, operator input, O (e.g., by way of a joystick, depression of a button or the like).

As seen in FIG. 2A, a first, down, D, movement according to the direction of arrow, D1, may reduce the spaced-apart orientation of robotic arm 12 with respect to the support member 16. A second movement according to the direction of arrow, D2, may cause the end effecter 14 to rotate the wheel, W, in, for example, a counter-clockwise direction. The movement according to the direction of the arrows, D1, D2, may be conducted separately or simultaneously, as desired.

Figure 2B:
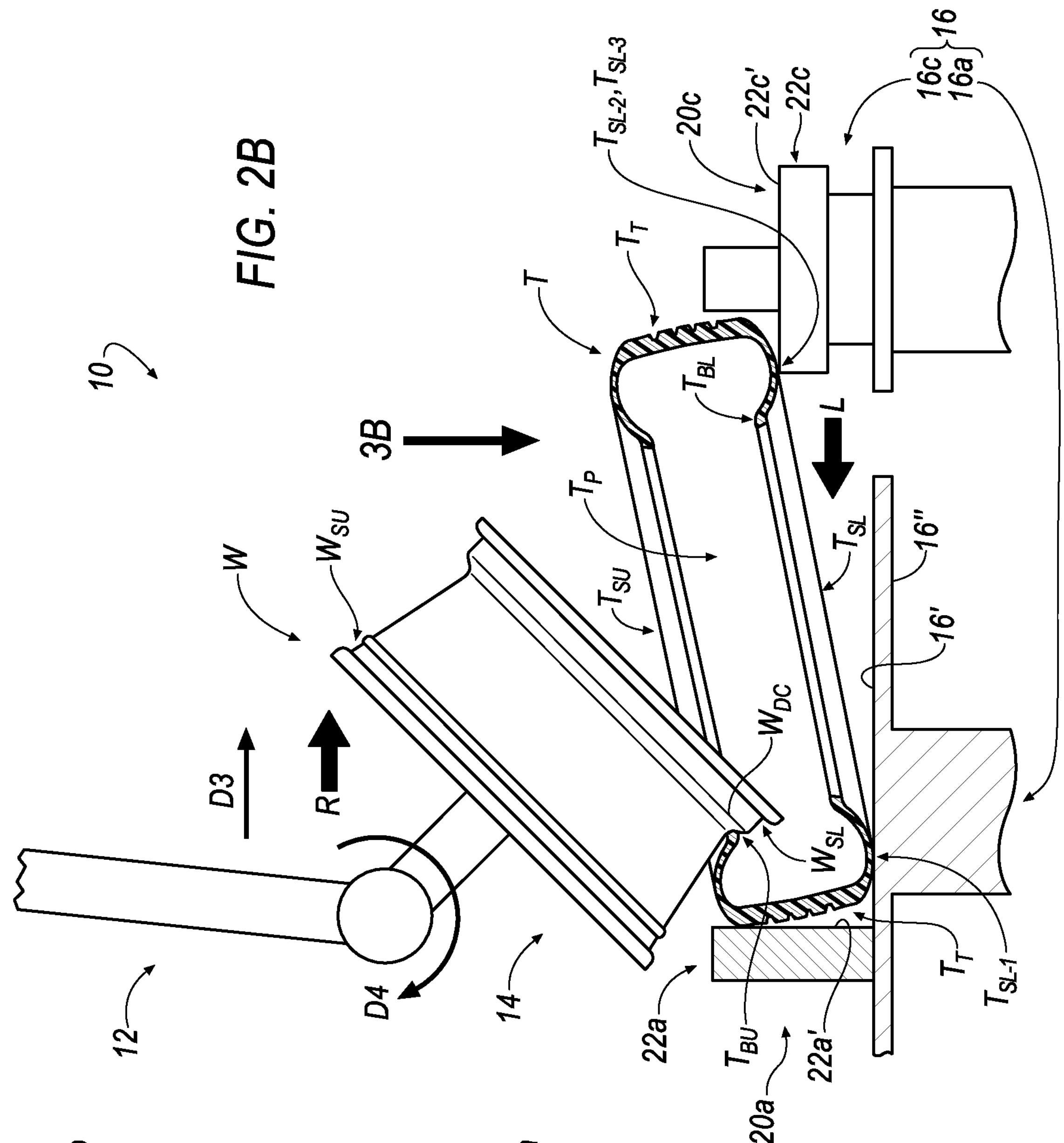
Figure 3B:
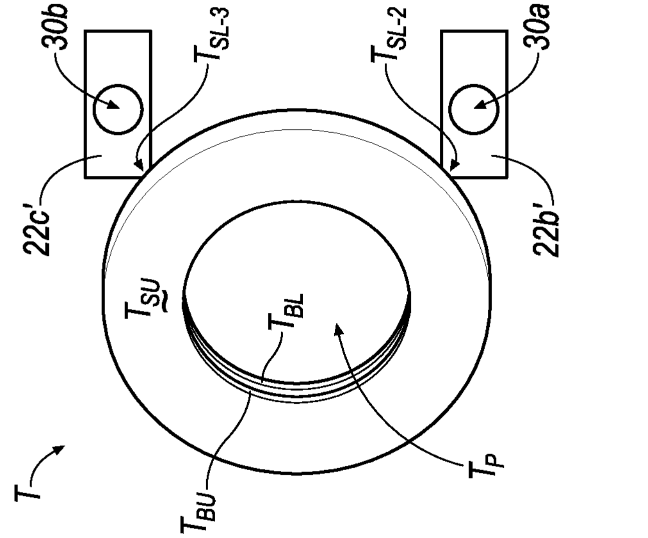

Referring to FIG. 2B, the movement according to the direction of the arrows, D1, D2, may cease upon locating a first (e.g., left) portion of the lower bead seat, $W_{SL}$, and drop center, $W_{DC}$, of the wheel, W, within the passage, $T_P$, of the tire, T, such that a first (e.g., left) portion of the drop center, $W_{DC}$, of the wheel, W, is disposed adjacent a first (e.g., left) portion of the upper bead, $T_{BU}$, of the tire, T. Because a first (e.g., left) portion the tread surface, $T_T$, of the tire, T, is arranged adjacent the front, tire-tread-engaging surface 22*a*' of the body 22*a* of the first tire-engaging device 20*a*, subsequent movements of the wheel, W, resulting from movement of the robotic arm 12 prevents the tire, T, from moving away (e.g., to the left, L) from the second and third support members 16*b*, 16*c*.

With continued reference to FIG. 2B, a third movement according to the direction of arrow, D3, may cause forwardly (e.g., to the right, R) movement of the wheel, W. A fourth movement according to the direction of arrow, D4, may cause the end effecter 14 to rotate the wheel, W, in, for example, a clockwise direction (i.e., rotationally opposite that of the direction of arrow, D2). The movement according to the direction of the arrows, D3, D4, may be conducted separately or simultaneously, as desired.

Figure 2C:
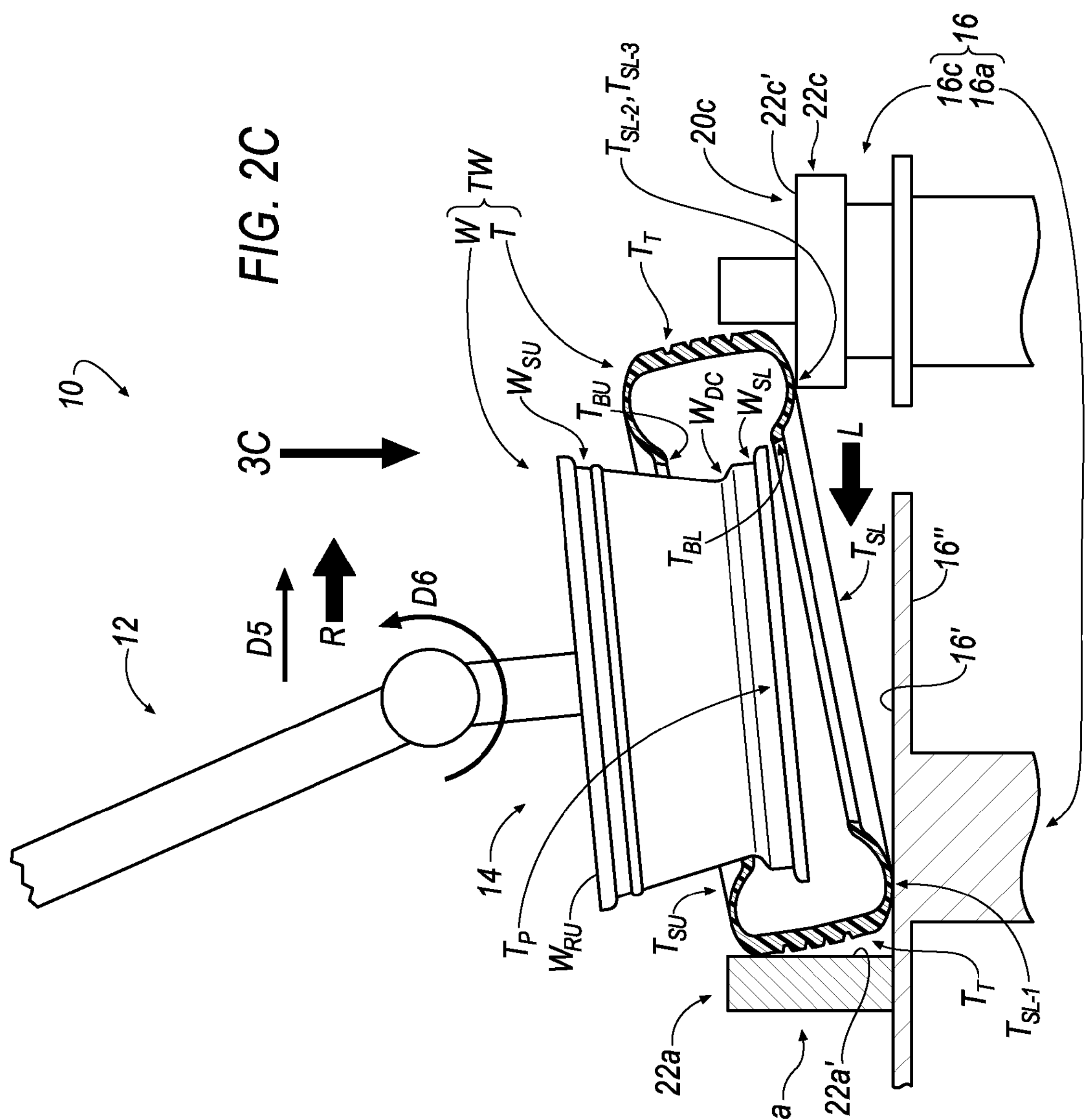
Figure 3C:
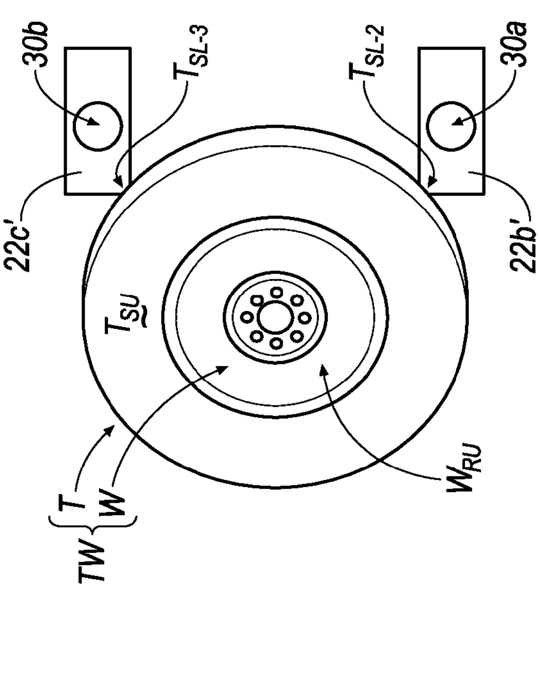

Referring to FIG. 2C, the movement according to the direction of the arrows, D3, D4, may cease upon locating a second (e.g., right) portion of the lower bead seat, $W_{SL}$, and drop center, $W_{DC}$ of the wheel, W, within the passage, $T_P$, of the tire, T, such that a second (e.g., right) portion of the drop center, $W_{DC}$, and lower bead seat, $W_{SL}$, of the wheel, W, are disposed proximate but not adjacent a second (e.g., right) portion of the lower bead, $T_{BL}$, and away from the second (e.g., right) portion of the upper bead, $T_{BU}$, of the tire, T. As stated above, because the first (e.g., left) portion the tread surface, $T_T$, of the tire, T, is arranged adjacent the front, tire-tread-engaging surface 22*a*' of the body 22*a* of the first tire-engaging device 20*a*, the movements, D3, D4, of the wheel, W, resulting from movement of the robotic arm 12 prevents the tire, T, from moving away (e.g., to the left, L), from the second and third support members 16*b*, 16*c*.

With continued reference to FIG. 2C, a fifth movement according to the direction of arrow, D5, may cause further forwardly (e.g., to the right, R) movement of the wheel, W. A sixth movement according to the direction of arrow, D6, may cause the end effecter 14 to rotate the wheel, W, in, for example, a counter-clockwise direction (i.e., rotationally opposite that of the direction of arrow, D4). The movement according to the direction of the arrows, D5, D6, may be conducted separately or simultaneously, as desired.

Figure 2D:
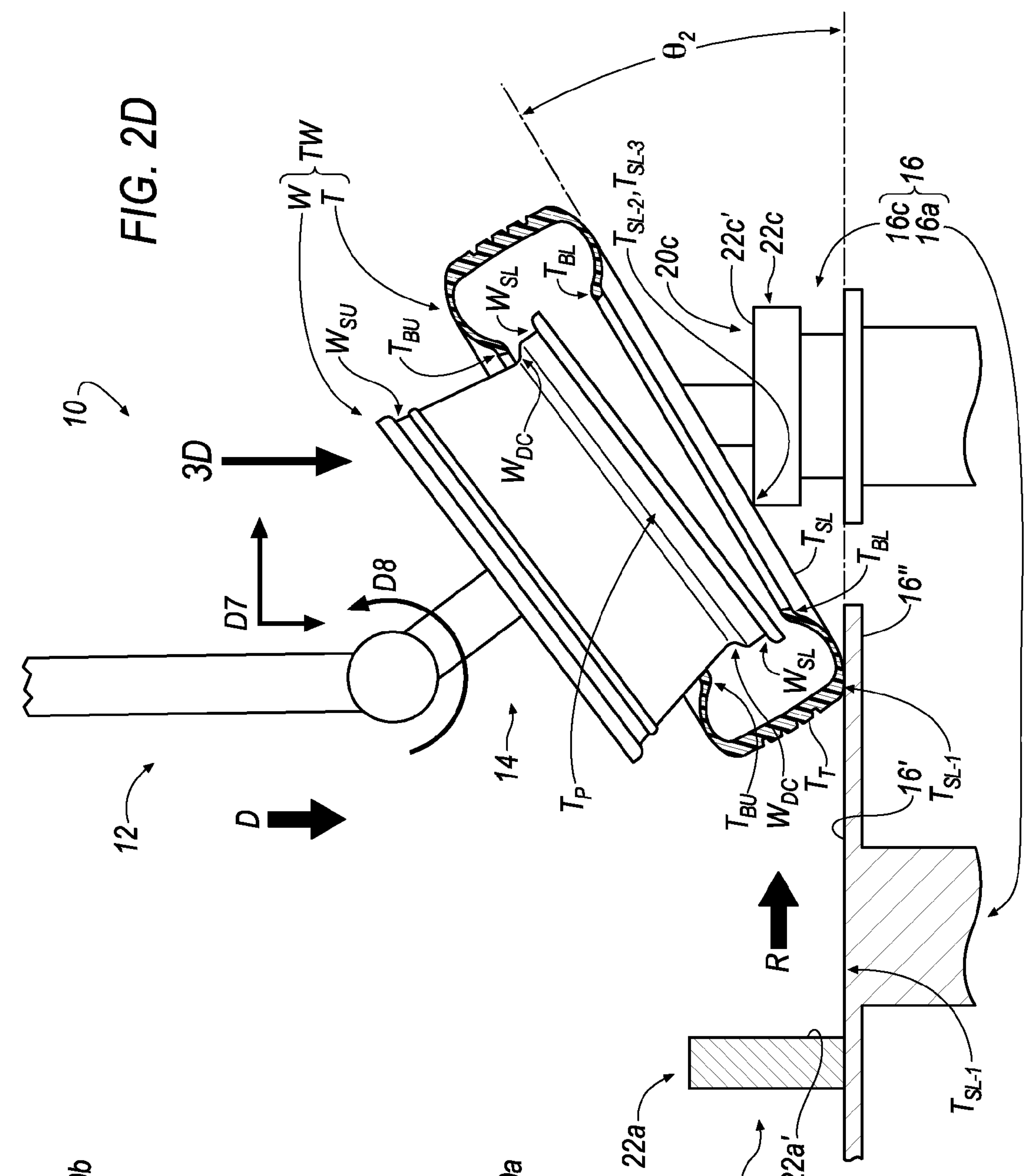
Figure 3D:
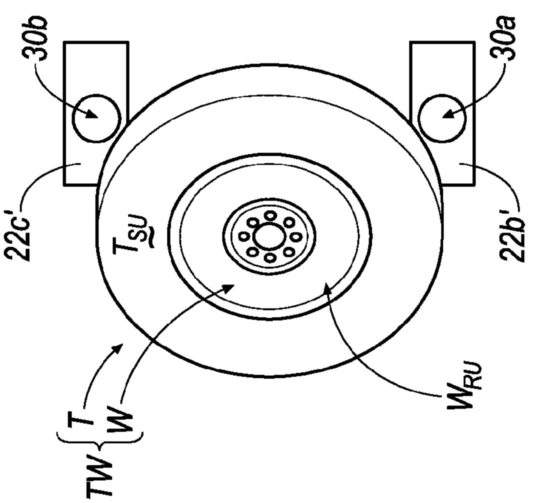

Referring to FIG. 2D, the movement according to the direction of the arrows, D5, D6, may cease upon adjusting an orientation of the wheel, W, relative to the tire, T, as follows: (1) the first (e.g., left) portion of the lower bead seat, $W_{SL}$, and drop center, $W_{DC}$ of the wheel, W, are orientated within the passage, $T_P$, of the tire, T, but away from and not disposed adjacent the first (e.g., left) portion of the upper bead, $T_{BU}$, but, rather, proximate but not adjacent to the lower bead, $T_{BL}$, of the tire, T, and (2) the second (e.g., right) portion of the lower bead seat, $W_{SL}$, and drop center, $W_{DC}$, of the wheel, W, are orientated within the passage, $T_P$, of the tire, T, but away from and not proximate the second (e.g., right) portion of the lower bead, $T_{BL}$, but, rather, proximate but not adjacent to the second (e.g., right) portion of the upper bead, $T_{BU}$, of the tire, T.

Further, as seen in FIG. 2D, the movement according to the direction of the arrows, D5, D6, may result in the wheel, W, being disposed within the passage, $T_P$, of the tire, T, and partially connected to the tire, T, such that the robotic arm 12 utilizes the wheel, W, to move the tire, T, forwardly (e.g., to the right, R) from the "ready" position to a "partially mounted" position. When the tire, T, is arranged, in the "partially mounted" position with respect to the wheel, W, the front, tire-tread-engaging surface 22*a*' of the body 22*a* of the first tire-engaging device 20*a* is no longer arranged adjacent the tread surface, $T_T$, of the tire, T, but, rather, one or more of a portion of the tread surface, $T_T$, and the lower sidewall surface, $T_{SL}$, of the tire, T, are arranged partially adjacent the upper surface 16' of the first support member 16*a*.

Although no longer arranged in the "ready" position, the support member 16 still provides a three-point support for the lower sidewall surface, $T_{SL}$, of the tire, T, such that the first portion, $T_{SL-1}$, of the lower sidewall surface, $T_{SL}$, is arranged adjacent the upper surface 16' while the second and third portions, $T_{SL-2}$, $T_{SL-3}$, of the lower sidewall surface, $T_{SL}$, of the tire, T, are still arranged adjacent the upper tire-sidewall-engaging surface 22*b*', 22*c*' of the body 22*b*, 22*c* of the second and third tire-engaging devices 20*b*, 20*c*. However, when the orientation of the tire, T, in FIG. 2D is compared to the orientation of the tire, T, of FIGS. 2A-2C, the three points of support are have converged closer together in FIG. 2D, and, as a result, the tire, T, is arranged at a second angularly-offset orientation, $\theta_2$, that is greater than the first angularly-offset orientation, $\theta_1$.

With continued reference to FIG. 2D, a seventh movement according to the direction of arrow, D7, may cause one or more of a further forwardly movement and a further downwardly, D, and a further forwardly (e.g., to the right, R) movement of the wheel, W. An eighth movement according to the direction of arrow, D8, may cause the end effecter 14 to rotate the wheel, W, in, for example, a further counter-clockwise direction. The movement according to the direction of the arrows, D7, D8, may be conducted separately or simultaneously, as desired.

Figures 2E, 3E:
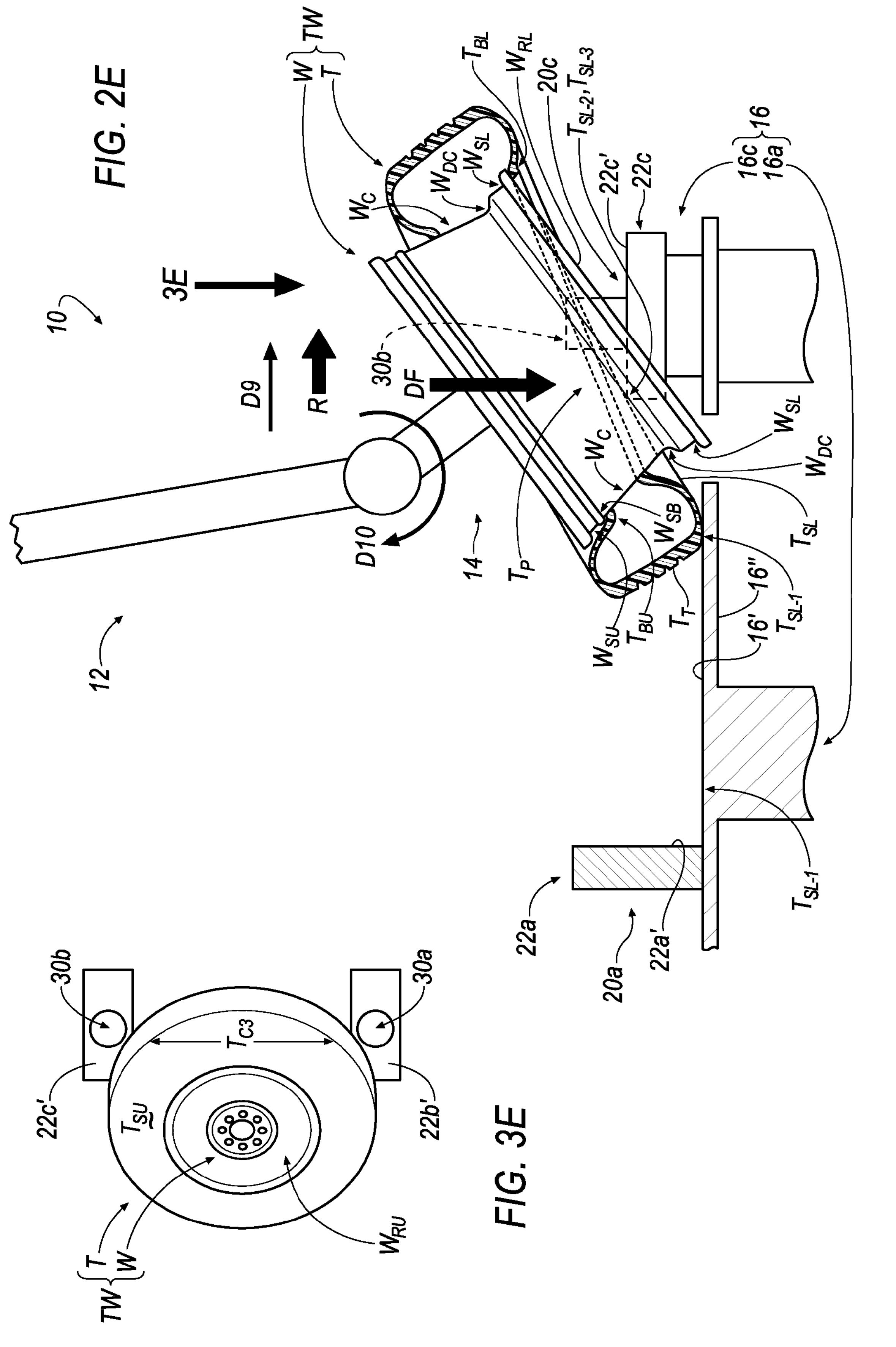

Referring to FIG. 2E, the movement according to the direction of the arrows, D7, D8, may cease upon adjusting an orientation of the wheel, W, relative to the tire, T, as follows: (1) the first (e.g., left) portion of the lower bead seat, $W_{SL}$, and drop center, $W_{DC}$, of the wheel, W, are orientated out of the passage, $T_P$, of the tire, T, and in a spaced-apart, opposing orientation with the lower sidewall surface, $T_{SL}$, of the tire, T, and (2) a portion (e.g., a right portion) of a lower, outer rim surface, $W_{RL}$, of the wheel, W, (proximate the second (e.g., right) portion of the lower bead seat, $W_{SL}$, and drop center, $W_{DC}$, of the wheel, W), is disposed within the passage, $T_P$, of the tire, T, and adjacent to the second (e.g., right) portion of the lower bead, $T_{BL}$, of the tire, T.

Per the phantom lines of the body 22*c* of the third tire-engaging device 20*c* (as a result of the orientation of the wheel, W, and tire, T), the movement of the robotic arm 12 according to the direction of the arrows, D7, D8 results in a portion of the wheel, W, being arranged in the gap or first spacing, S1, and the right tire chord, $T_{C3}$ (see, e.g., corresponding top view FIG. 3E), being arranged proximate but slightly to the left of the first and second tire-tread-engaging posts 30*a*, 30*b* such that a portion of the tire, T, is arranged in the gap or second spacing, S2, but not adjacent the first and second tire-tread-engaging posts 30*a*, 30*b*.

Because the gap or first spacing, S1, may be approximately equal to but greater than a diameter of the wheel, W, the robotic arm 12 is permitted to move the wheel, W, into/through the gap or first spacing, S1, and below the upper tire-sidewall-engaging surface 22*b*', 22*c*' of the body 22*b*, 22*c* of the second and third tire-engaging devices 20*b*, 20*c*; however, because the diameter of the tire, T, is greater than that of the gap or first spacing, S1, the movement of robotic arm 12 prohibits movement of the tire, T, through the gap or first spacing, S1, with that of the wheel, W. As a result of the wheel, W, being permitted to pass through the gap or first spacing, S1, without the tire, T, at least the first (e.g., left) portion of the wheel, W, of the wheel, W, described above (proximate, e.g., the first (e.g., left) portion of the lower bead seat, $W_{SL}$, and drop center, $W_{DC}$, of the wheel, W) is permitted to "plunge" through the passage, $T_P$, of the tire, T, such that the first (e.g., left) portion of the lower bead seat, $W_{SL}$, and drop center, $W_{DC}$, of the wheel, W, is arranged in the spaced-apart, opposing orientation with the lower sidewall surface, $T_{SL}$, of the tire, T.

As a result of the wheel, W, plunging through the passage, $T_P$, of the tire, T, a first (e.g., left) portion of the safety bead, $W_{SB}$, of the wheel, W, is disposed adjacent the first (e.g., left) portion of the upper bead, $T_{BU}$, of the tire, T. Further, as a result of the arrangement of the safety bead, $W_{SB}$, adjacent the first (e.g., left) portion of the upper bead, $T_{BU}$, of the tire, T, and the arrangement of the portion of the lower, outer rim surface, $W_{RL}$, of the wheel, W, adjacent the second (e.g., right) portion of the lower bead, $T_{BL}$, of the tire, T, a substantially downwardly force, DF, is transmitted from the robotic arm 12, to the wheel, W, and to the contact points of the wheel, W, with the tire, T, described above at the safety bead, $W_{SB}$, and lower, outer rim surface, $W_{RL}$, such that the substantially downwardly force, DF, is distributed from the wheel, W, and to the tire, T. The substantially downwardly force, DF, from the wheel, W, to the tire, T, arrives at and is distributed from the first, second and third portions, $T_{SL-1}$, $T_{SL-2}$, $T_{SL-3}$, of the lower sidewall surface, $T_{SL}$, of the tire, T, to upper surfaces 16', **22*b*', 22*c*' of the support member 16**.

With continued reference to FIG. 2E, a ninth movement according to the direction of arrow, D9, may cause further forwardly movement (e.g., to the right, R) of the wheel, W. A tenth movement according to the direction of arrow, D10, may cause the end effecter 14 to rotate the wheel, W, in, for example, a clockwise direction (i.e., rotationally opposite that of the direction of arrow, D8). The movement according to the direction of the arrows, D9, D10, may be conducted separately or simultaneously, as desired.

Figures 2F, 3F:
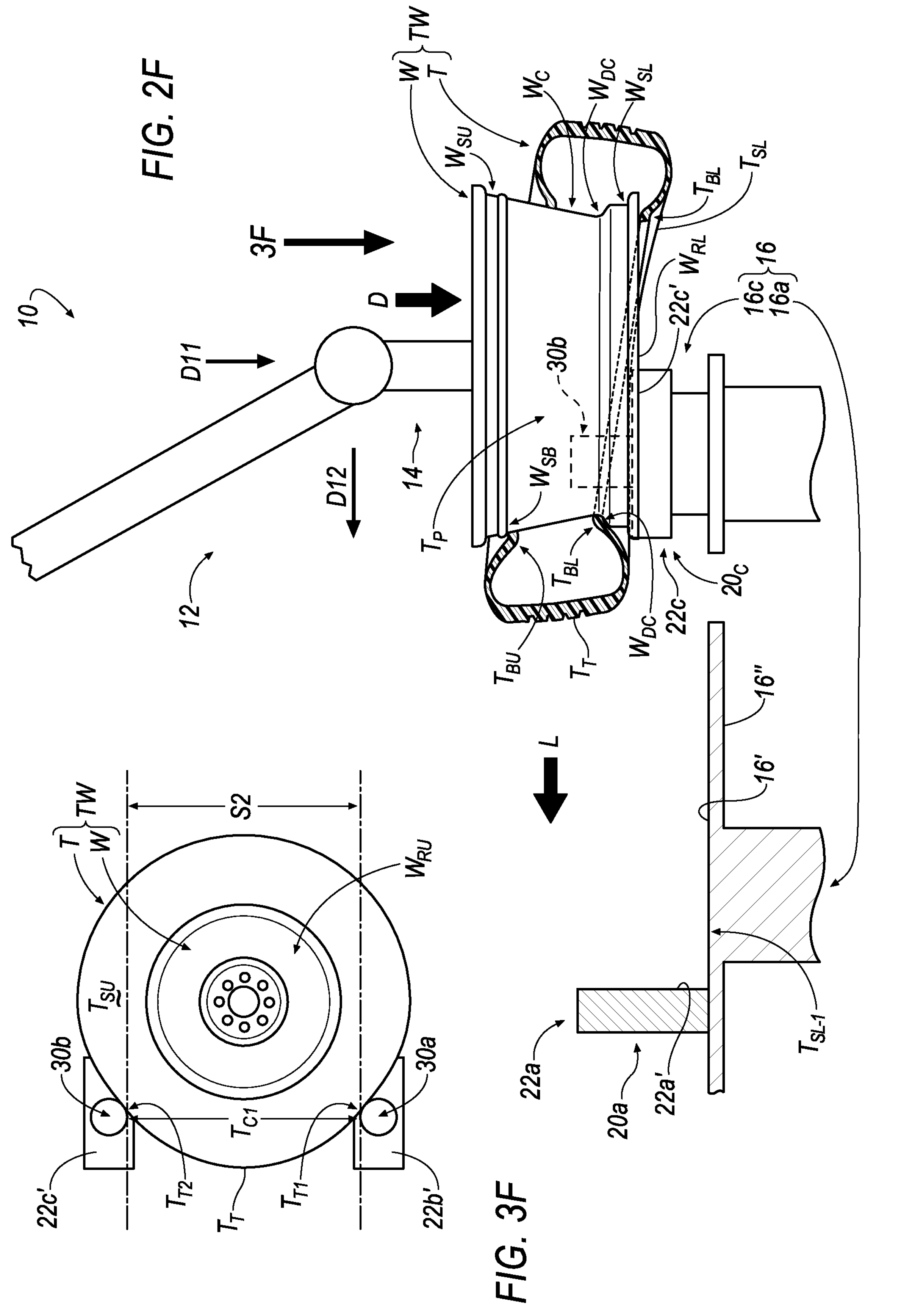

Referring to FIGS. 2F and 3F, the movement according to the direction of the arrows, D9, D10, may cease upon adjusting an orientation of the wheel, W, relative to the tire, T, as follows: (1) the wheel, W, and tire, T, had previously "hopped over" the first and second tire-tread-engaging posts **30*a*, 30*b* such that the wheel, W, and tire, T, are oriented forwardly (e.g., to the right, R) of the first and second tire-tread-engaging posts 30*a*, 30*b*, (2) as a result of the forwardly orientation of the tire, T, and wheel, W, relative to the first and second tire-tread-engaging posts 30*a*, 30*b*, approximately three-quarters (¾) of the tire, T, is arranged forwardly of the first and second tire-tread-engaging posts 30*a*, 30*b* (as shown, for example in FIG. 3F) such that the left chord, $T_{C1}$, of the tire, T, is aligned with the second spacing, S2, of the first and second tire-tread-engaging posts 30*a*, 30*b*; as a result of the alignment of the left chord, $T_{C1}$, with the second spacing, S2, the a first tread surface portion, $T_{T1}$, and a second tread surface portion, $T_{T2}$, of the tread surface, $T_T$, of the tire, T, are disposed adjacent to and in direct contact with, respectively, the first and second tire-tread-engaging posts 30*a*, 30*b*, (3) the lower, outer rim surface, $W_{RL}$, of the wheel, W, is arranged in a substantially co-planar relationship with the upper tire-sidewall-engaging surface 22*b*', 22*c*' of the body 22*b*, 22*c* of the second and third tire-engaging devices 20*b*, 20*c***, (4) the first (e.g., left) portion of the lower bead, $T_{BL}$, of the tire, T, is disposed adjacent the first (e.g., left) portion of the drop center, $W_{DC}$, of the wheel, W, and (5) the portion of the outer rim surface, $W_{RL}$, of the wheel, W, (proximate the second (e.g., right) portion of the lower bead seat, $W_{SL}$, and drop center, $W_{DC}$, of the wheel, W) remains disposed within the passage, $T_P$, of the tire, T, and adjacent to the second (e.g., right) portion of the lower bead, $T_{BL}$, of the tire, T.

Because the lower, outer rim surface, $W_{RL}$, of the wheel, W, is arranged in a substantially co-planar relationship with the upper tire-sidewall-engaging surface **22*b*', 22*c*' of the body 22*b*, 22*c* of the second and third tire-engaging devices 20*b*, 20*c*, the tire, T, is no longer in direct contact with the first support member 16*a*. Further, as explained above, because the diameter, $T_D$, of the tire, T, is greater than that of the gap or first spacing, S1, the co-planar orientation of the lower, outer rim surface, $W_{R-L}$, with the upper tire-sidewall-engaging surface 22*b*', 22*c*' results in approximately one-fourth (¼) to one-half (½) of a first (e.g., left) portion of the lower sidewall surface, $T_{SL}$, of the tire, T, disposed adjacent the upper tire-sidewall-engaging surface 22*b*', 22*c*' of the body 22*b*, 22*c* of the second and third tire-engaging devices 20*b*, 20*c***.

With continued reference to FIG. 2F, an eleventh movement according to the direction of arrow, D11, may cause downwardly movement, D, of the wheel, W, such that the lower outer rim surface, $W_{RL}$, of the wheel, W, (proximate the lower bead seat, $W_{SL}$, and drop center, $W_{DC}$, of the wheel, W) is arranged substantially proximate but below the upper tire-sidewall-engaging surface **22*b*', 22*c*' of the body 22*b*, 22*c* of the second and third tire-engaging devices 20*b*, 20*c*. A twelfth movement according to the direction of arrow, D12, may cause a rearwardly (e.g., to the left, L) movement of the wheel, W. The movement according to the direction of the arrows, D11, D12**, may be conducted separately or simultaneously, as desired.

Figure 2G:
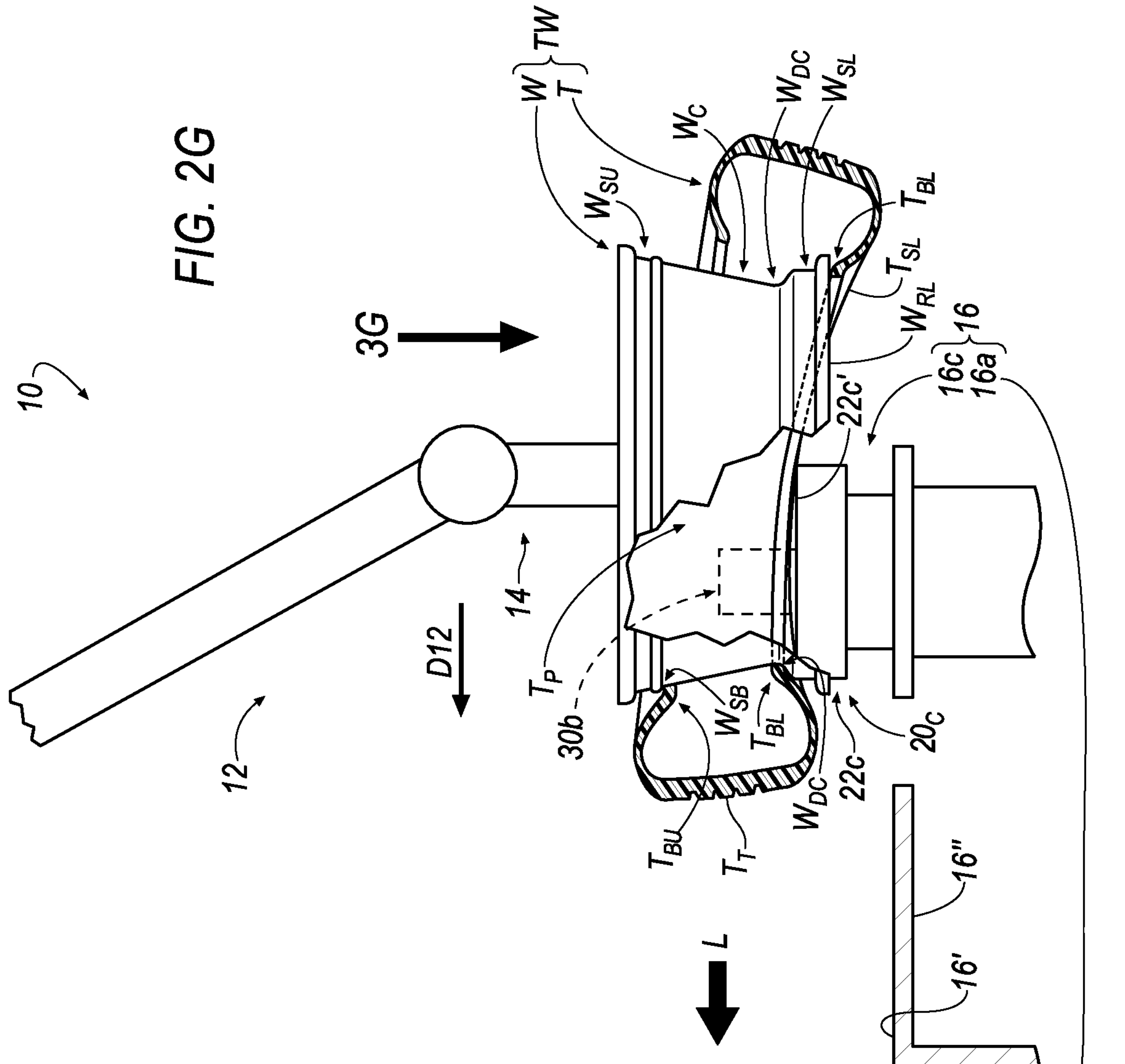
Figure 2G:
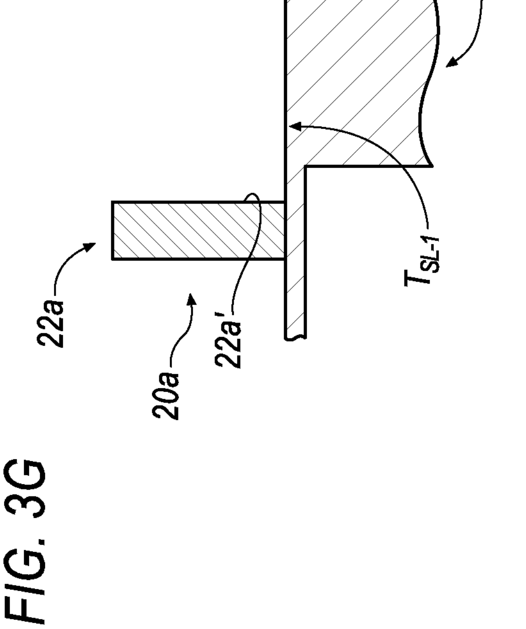

Referring to FIG. 2G, as a result of the movement according to the direction of the arrows D1-D12, the lower bead, $T_{BL}$, of the tire, T, is arranged in a curved, substantially arcuate orientation over the sidewall-engaging surface **22*b*', 22*c*' of the body 22*b*, 22*c* of the second and third tire-engaging devices 20*b*, 20*c*. Further, as a result of the initial rearwardly (e.g., to the left, L) movement of the wheel, W, the tire, T, is advanced through the second spacing, S2 (see, e.g., FIG. 3G), from the left chord, $T_{C1}$, to the right chord, $T_{C3}$; as seen in FIG. 3G, because chords (including, e.g., the central chord, $T_{C2}$) of the tire, T, between the left chord, $T_{C1}$, and the right chord, $T_o$, are greater than that of the left chord, $T_{C1}$, and the right chord, $T_{C3}$, the first and second tire-tread-engaging posts 30*a*, 30*b* interfere with movement of the tire, T, through the second spacing, S2**.

Figure 3G:
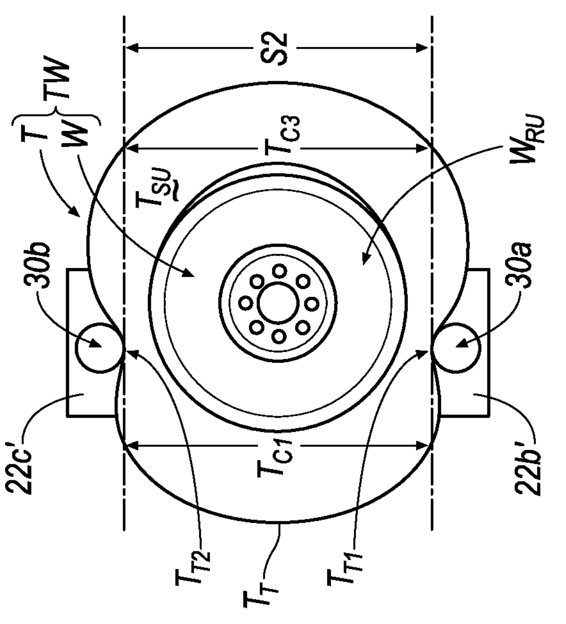
Figure 3H:
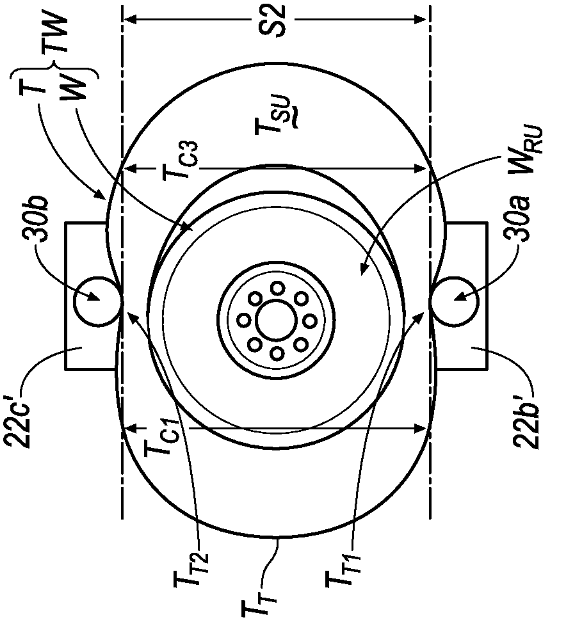
Figure 3I:
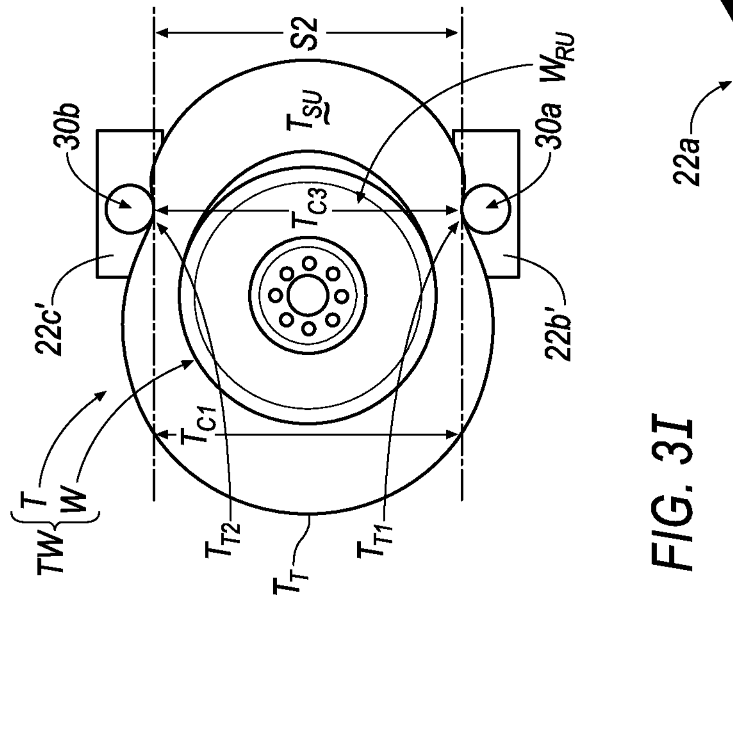

As a result of the above-described interference, as seen in FIG. 3G, the tire, T, temporality deforms such that the diameter, $T_{P-D}$, of the passage, $T_P$, of the tire, T, is temporality upset to include a substantially oval form rather than a circular form. Accordingly, in a substantially similar fashion, the upper tire opening diameter, $T_{OU-D}$, and the lower tire opening diameter, $T_{OL-D}$, are also temporality upset to include a substantially oval form rather than a circular form.

The oval form of the upper tire opening diameter, $T_{OU-D}$, and the lower tire opening diameter, $T_{OL-D}$, reduces a portion of contact (and, as a result, friction) of the lower bead, $T_{BL}$, and the upper bead, $T_{BU}$, of the tire, T, with that of the outer circumferential surface, $W_C$, of the wheel, W. Accordingly, referring to FIGS. 2G-2I and 3G-3I, as the wheel, W, advances the tire, T, rearwardly (e.g., to the left, L) through the second spacing, S2, according to the direction of the arrow, D12, the oval deformation of diameters, $T_{P-D}$, $T_{OU-D}$, $T_{OL-D}$ results in the lower bead, $T_{BL}$, of the tire, T, encountering less resistance or interference with the outer rim surface, $W_{R-L}$, of the wheel, W, as the lower bead, $T_{BL}$, is advanced from an orientation opposite that of the outer rim surface, $W_{RL}$, over the lower bead seat, $W_{SL}$, and to a final position adjacent the drop center, $W_{DC}$, of the wheel, W.

Figure 2H:
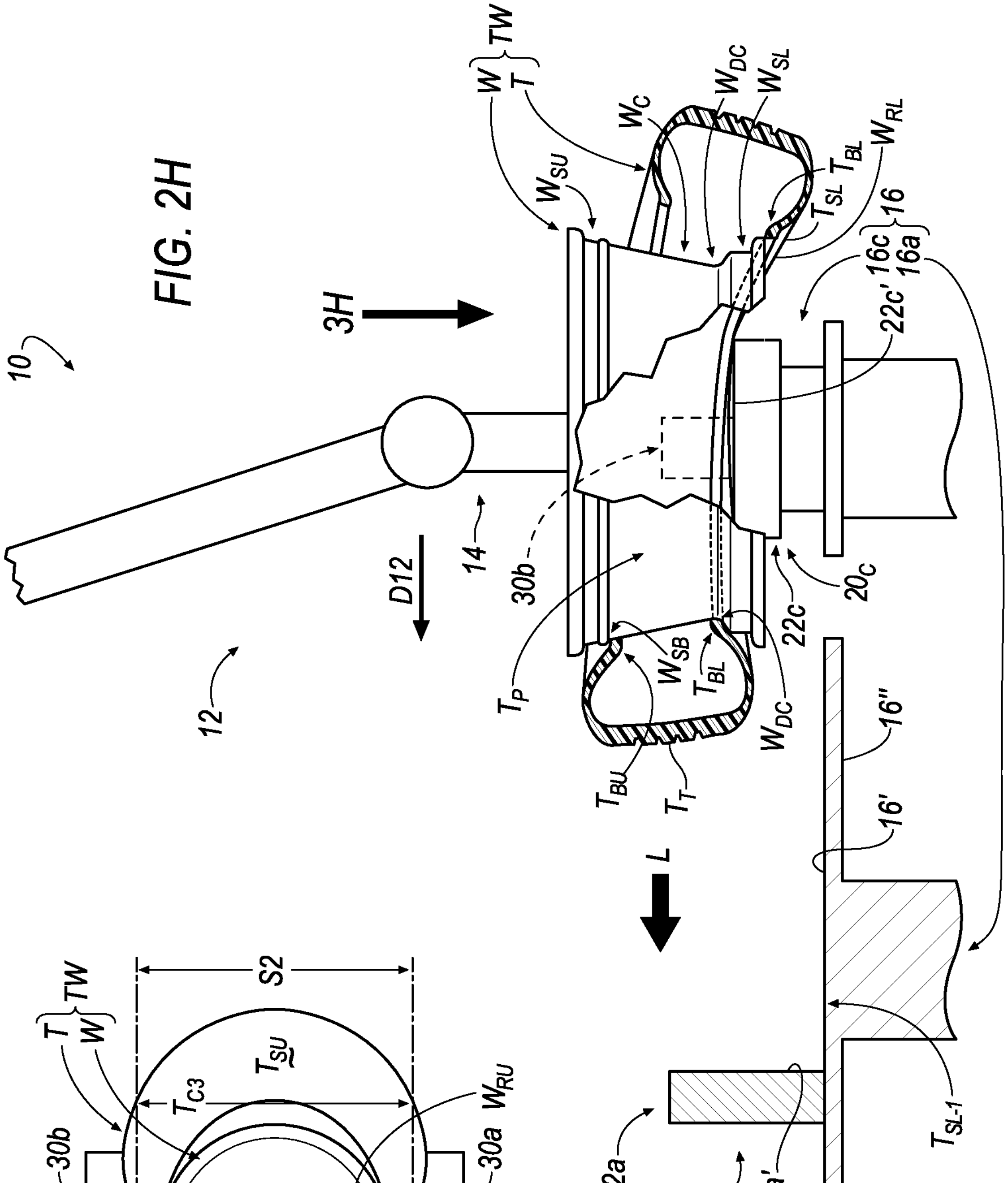
Figure 2I:
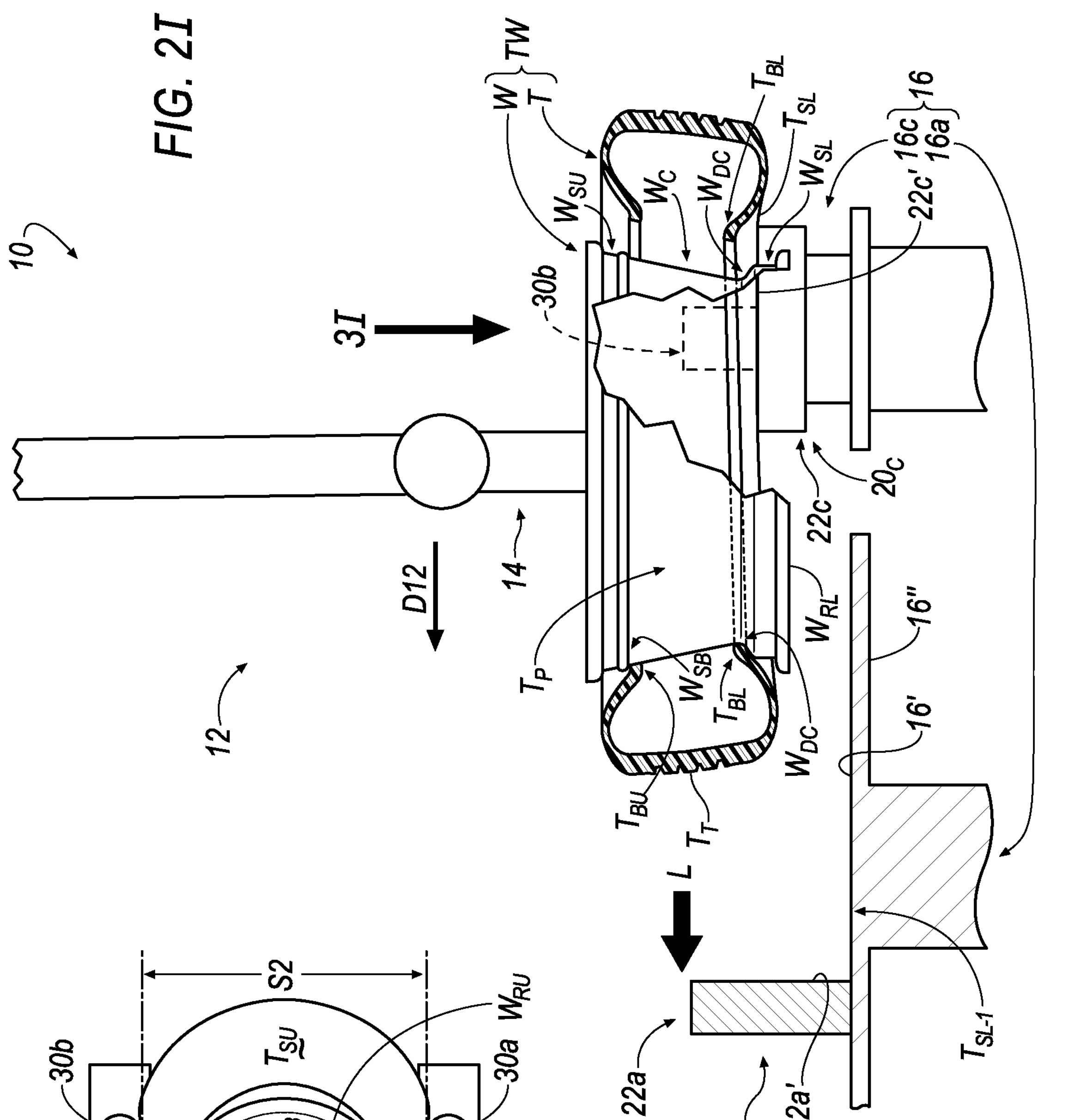
Figure 2J:
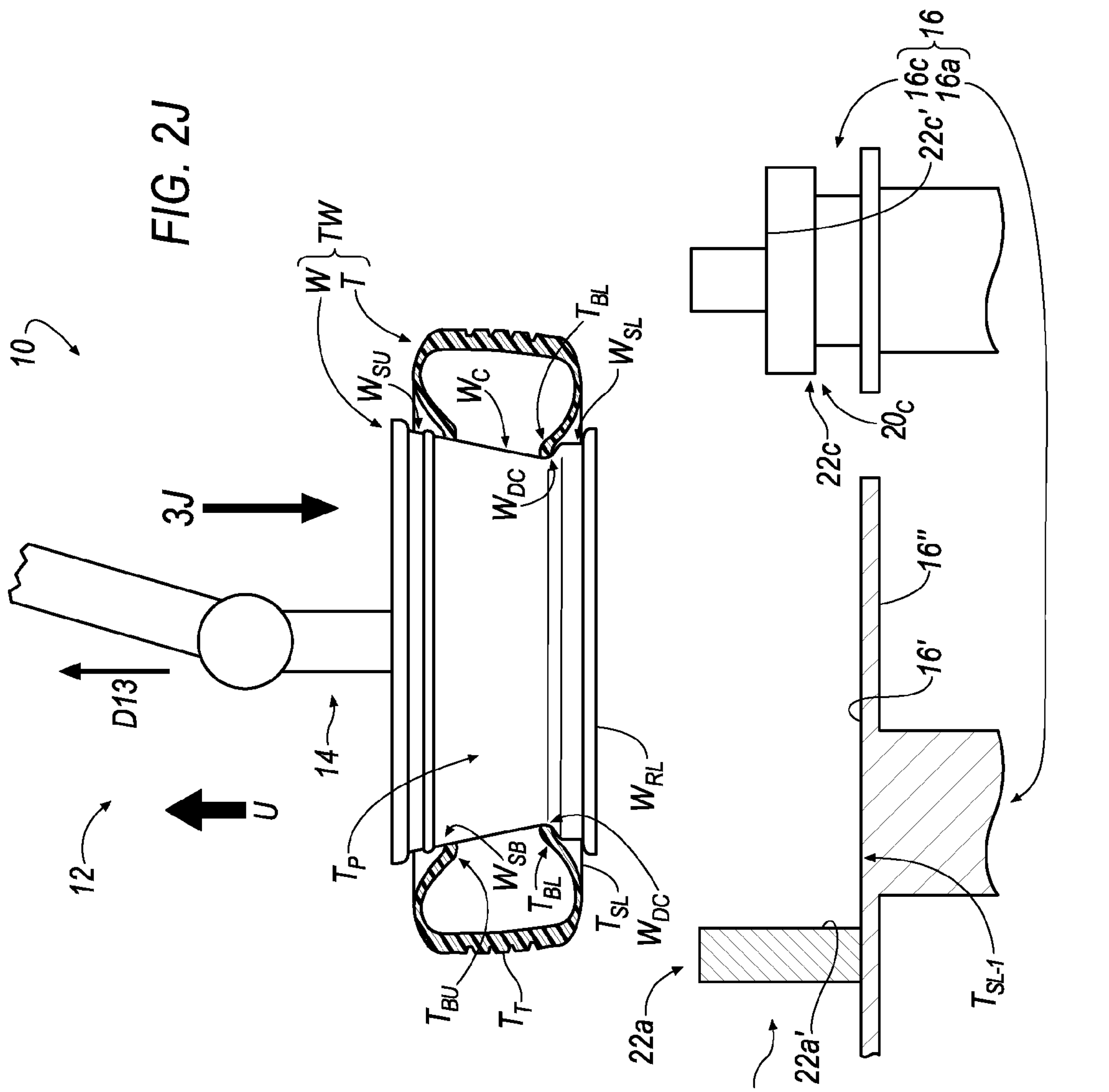
Figure 3J:
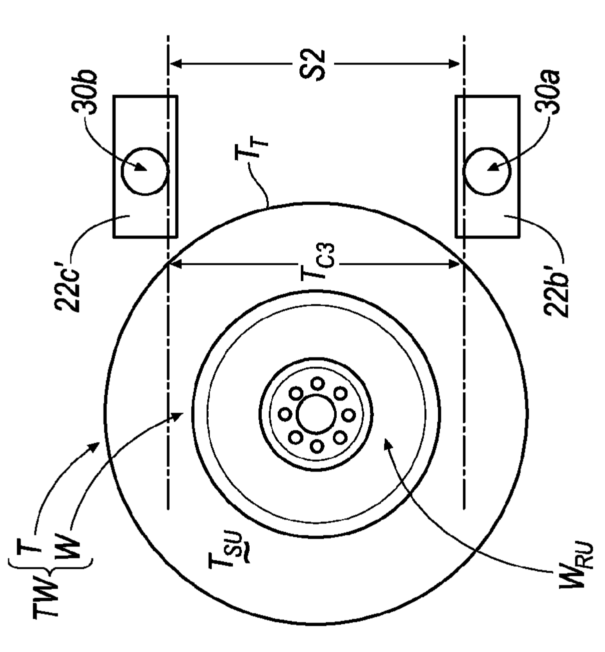

Referring to FIGS. 2J and 3J, once the right chord, $T_{C3}$, has been advanced through the second spacing, S2, from forwardly orientation (e.g., to the right, R) of the first and second tire-tread-engaging posts 30*a*, 30*b* back to the rearwardly orientation (e.g., to the left, L) of the first and second tire-tread-engaging posts 30*a*, 30*b*, the entire circumference of the lower bead, $T_{BL}$, may be said to be advanced to its final "mounted position" adjacent to and about the drop center, $W_{DC}$. Further, the entire circumference of the upper bead, $T_{BU}$, may be said to be arranged in its final "mounted position" adjacent to and about the outer circumferential surface, $W_C$, of the wheel, W, proximate the safety bead, $W_{SB}$.

With continued reference to FIG. 2J, a thirteenth movement according to the direction of arrow, D13, may cause upwardly movement, U, of the wheel, W, and tire, T, away from the support member 16. The robotic arm 12 may move the tire-wheel assembly, TW, to, for example, a subsequent sub-station (not shown), such as, for example, an inflation sub-station in order to inflate the tire-wheel assembly, TW, which may cause the upper bead, $T_{BU}$, to be seated adjacent the upper bead seat, $W_{SU}$, and the lower bead, $T_{BL}$, to be seated adjacent the lower bead seat, $W_{SL}$.

Figure 4A:
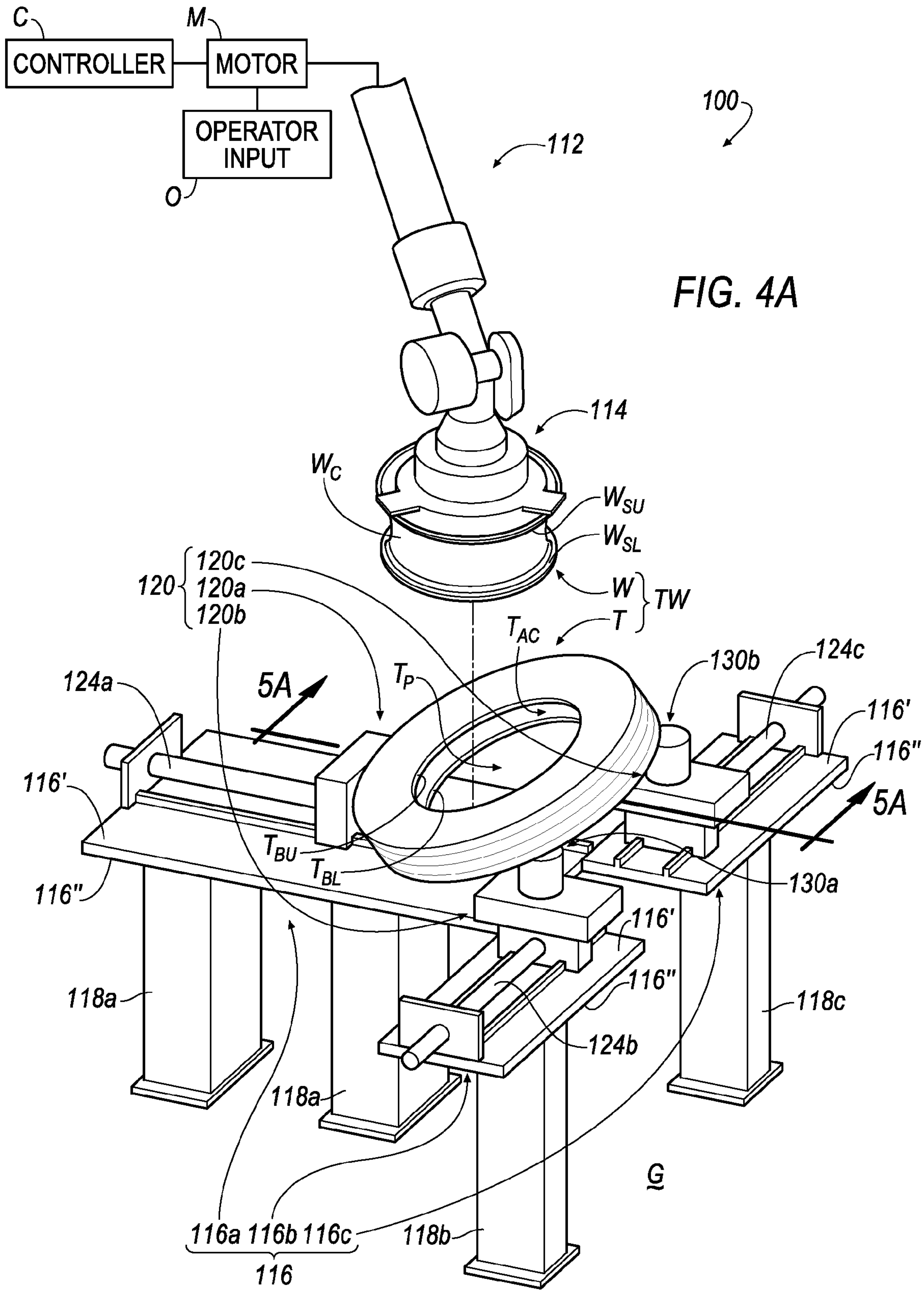
FIG. 4A is a perspective view of a sub-station for processing a tire and a wheel in accordance with an exemplary embodiment of the invention.

Referring to FIG. 4A, a processing sub-station 100 for processing a tire-wheel assembly, TW, is shown according to an embodiment. The "processing" conducted by the processing sub-station 100 may include the act of "joining" or "mounting" a tire, T, to a wheel, W, for forming the tire-wheel assembly, TW. The act of "joining" or "mounting" may mean to physically couple, connect or marry the tire, T, and wheel, W, such that the wheel, W, may be referred to as a male portion that is inserted into a passage, $T_P$, of a tire, T, being a female portion.

As described and shown in the following Figures, although the desired result of the processing sub-station 100 is the joining or mounting of the tire, T, and wheel, W, to form a tire-wheel assembly, TW, it should be noted that the processing sub-station 100 does not inflate the circumferential air cavity, $T_{AC}$, of the tire, T, of the tire-wheel assembly, TW, nor does the processing sub-station 100 contribute to an act of "seating" the upper bead, $T_{BU}$, or the lower bead, $T_{BL}$, of the tire, T, adjacent the upper bead seat, $W_{SU}$, and the lower bead seat, $W_{SL}$, of the wheel, W (because the act of "seating" typically arises from an inflating step where the tire-wheel assembly, TW, is inflated). Accordingly, upon joining or mounting the tire, T, to the wheel, W, the upper bead, $T_{BU}$, or the lower bead, $T_{BL}$, of the tire, T, may be arranged about and/or disposed adjacent the outer circumferential surface, $W_C$, of the wheel, W.

In an implementation, the processing sub-station 100 may be included as part of a "single-cell" workstation. A single-cell workstation may include other sub-stations (not shown) that contribute to the processing of a tire-wheel assembly, TW; other sub-stations may include, for example: a soaping sub-station, a stemming sub-station, an inflating sub-station, a match-marking sub-station, a balancing sub-station and the like. The term "single-cell" indicates that the sub-stations contribute to the production of a tire-wheel assembly, TW, without requiring a plurality of successive, discrete workstations that may otherwise be arranged in a conventional assembly line such that a partially-assembled tire-wheel assembly, TW, is "handed-off" along the assembly line (i.e., "handed-off" meaning that an assembly line requires a partially-assembled tire-wheel assembly, TW, to be retained by a first workstation of an assembly line, worked on, and released to a subsequent workstation in the assembly line for further processing). Rather, a single cell workstation provides one workstation having a plurality of sub-stations each performing a specific task in the process of assembling a tire-wheel assembly, TW. This assembling process takes place wherein the tire and/or wheel "handing-off" is either minimized or completely eliminated. As such, a single-cell workstation significantly reduces the cost and investment associated with owning/renting the real estate footprint associated with a conventional tire-wheel assembly line while also having to provide maintenance for each individual workstation defining the assembly line. Thus, capital investment and human oversight is significantly reduced when a single cell workstation is employed in the manufacture of tire-wheel assemblies, TW.

Referring to FIG. 4A, the processing sub-station 100 includes a device 112. The device 112 may be referred to as a robotic arm. The robotic arm 112 may be located in a substantially central position relative to a plurality of sub-stations (including, e.g., the processing sub-station 100) of a single-cell workstation. The robotic arm 112 may be attached to and extend from a base/body portion (not shown) connected to ground, G.

The robotic arm 112 may include an end effecter 114. The end effecter 114 may include a claw, gripper, or other means for removably-securing the wheel, W, to the robotic arm 112. The end effecter 114 permits the robotic arm 112 to have the ability to retain and not release the wheel, W, throughout the entire procedure performed by the processing sub-station 100 (and, if applied in a single-cell workstation, the ability to retain and not release the wheel, W, throughout the entire assembling procedure of the tire-wheel assembly, TW). Accordingly, the end effecter 114 minimizes or eliminates the need of the robotic arm 112 to "hand-off" the tire-wheel assembly, TW, to (a) subsequent sub-station(s) (not shown).

The processing sub-station 100 may perform several functions/duties including that of: (1) a tire repository sub-station and (2) a mounting sub-station. A tire repository sub-station typically includes one or more tires, T, that may be arranged in a "ready" position for subsequent joining to a wheel, W. A mounting sub-station typically includes structure that assists in the joining of a tire, T, to a wheel, W (e.g., the disposing of a wheel, W, within the passage, $T_P$, of the tire, T).

Referring to FIG. 4A, the processing sub-station 100 may be initialized by joining a wheel, W, to the robotic arm 112 at the end effecter 114. The processing sub-station 100 may also be initialized by positioning the tire, T, upon a support member 116. The support member 116 may include a first support member 116*a*, a second support member 116*b* and a third support member 116*c*. Each of the first, second and third support members 116*a*, 116*b*, 116*c* include an upper surface 116' and a lower surface 116".

The lower surface 116" of each of the first, second and third support members 116*a*, 116*b*, 116*c* may be respectively connected to at least one first leg member 118*a*, at least one second leg member 118*b* and at least one third leg member 118*c*. Each of the at least one first, second and third leg members 118*a*, 118*b*, 118*c* respectively include a length for elevating or spacing each of the first, second and third support members 116*a*, 116*b*, 116*c* from an underlying ground surface, G. Although the robotic arm 112 is not directly connected to the support member 116 (but, rather may be connected to ground, G), the robotic arm 112 may be said to be interfaceable with (as a result of the movements D1-D8 described in the following disclosure) and/or indirectly connected to the support member 116 by way of a common connection to ground, G, due the leg members 118*a*-118*c* connecting the support member 116 to ground, G.

The processing sub-station 100 may further include a plurality of tire-engaging devices 120. The plurality of tire-engaging devices 120 may include a first tire-engaging device 120*a* connected to the upper surface 116' of the first support member 116*a*, a second tire-engaging device 120*b* connected to the upper surface 116' of the second support member 116*b* and a third tire-engaging device 120*c* connected to the upper surface 116' of the third support member 116*c*.

In reference to the processing sub-station 10 of FIGS. 1A-3J, the plurality of tire-engaging devices 20 may be said to be in a fixed orientation with respect to the upper surface 16' of each of the first, second and third support members 16*a*, 16*b*, 16*c*. However, as will be described in the following disclosure, the plurality of tire-engaging devices 120 of the processing sub-station 100 may be said to be in a non-fixed, moveable orientation with respect to the upper surface 116' of each of the first, second and third support members 116*a*, 116*b*, 116*c*.

Figure 4B:
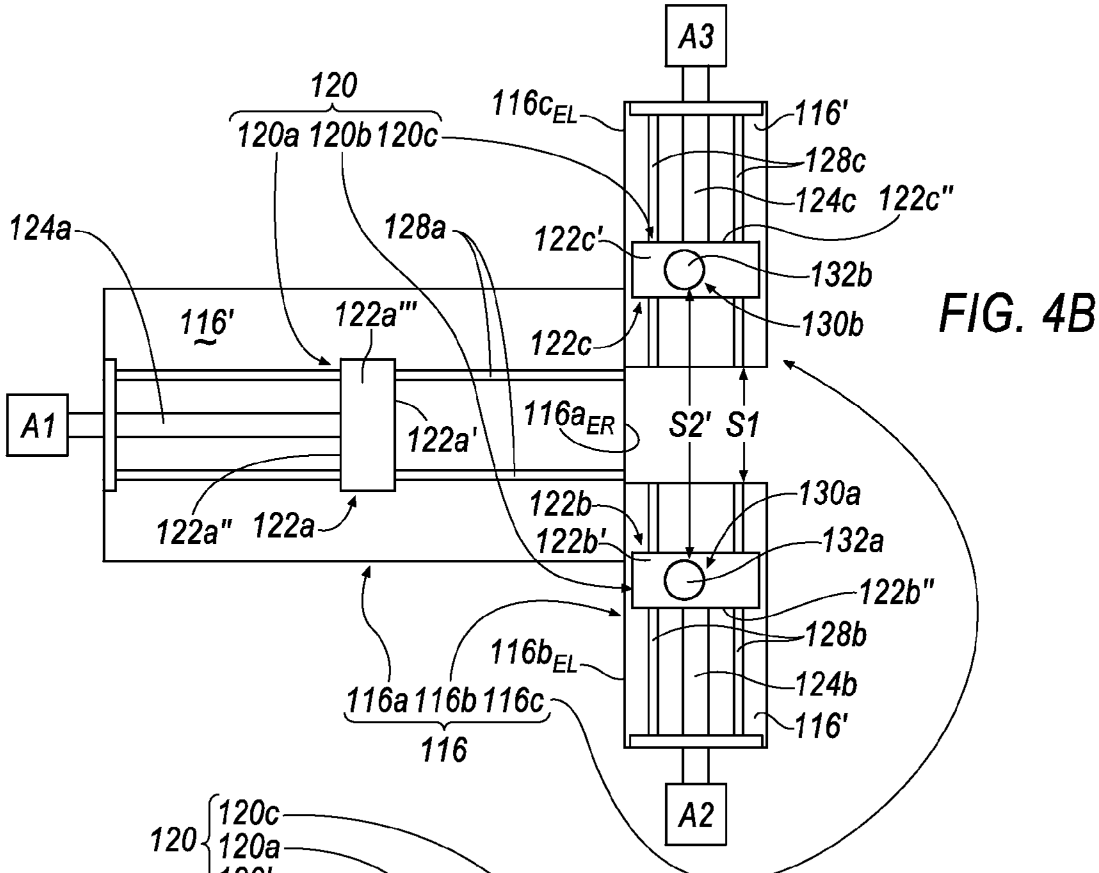
FIG. 4B is a top view of the sub-station of FIG. 4A.
Figure 4C:
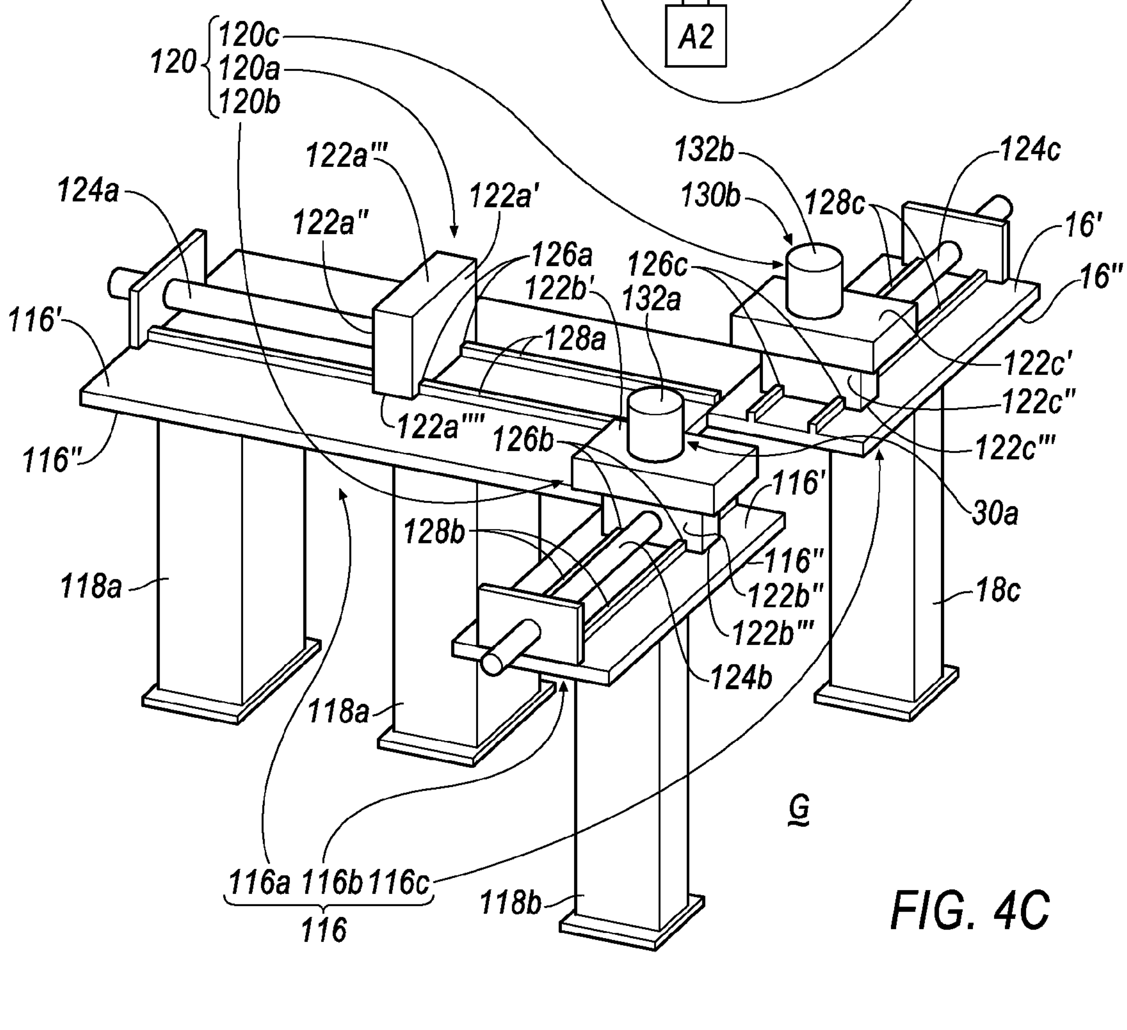
FIG. 4C is a perspective view of a portion of the sub-station of FIG. 4A.

Referring to FIGS. 4B-4C, the first tire-engaging device 120*a* may include a body 122*a* having a front (right) side, tire-tread-engaging surface 122*a*', a rear (left) side surface 122*a*", an upper surface 122*a*"' and a lower surface 122*a*"" (see, e.g., FIG. 4C). Each of the second and third tire-engaging devices 120*b*, 120*c* may include a body 122*b*, 122*c* having an upper tire-sidewall-engaging surface 122*b*', 122*c*' a rear side surface 122*b*", 122*c*" and a lower surface 122*b*"', 122*c*"' (see, e.g., FIG. 4C).

The upper sidewall-engaging surfaces 122*b*', 122*c*' of the second and third tire-engaging devices 120*b*, 120*c* may be co-planar with one another. The upper sidewall-engaging surfaces 122*b*', 122*c*' of the second and third tire-engaging devices 120*b*, 120*c* may be arranged in a spaced-apart relationship with respect to ground, G, that is greater than that of the spaced-apart relationship of the upper surface 116' of the first support member 116*a*; accordingly, the upper sidewall-engaging surfaces 122*b*', 122*c*' of the second and third tire-engaging devices 120*b*, 120*c* may be arranged in a non-co-planar relationship with respect to the upper surface 116' of the first support member 116*a*.

The rear side surface 122*a*" of the body 122*a* of the first tire-engaging device 120*a* may be connected to a first rod 124*a*. The first rod 124*a* may be connected to a first actuator, A1 (see, e.g., FIG. 4B). The lower surface 122*a*"" of the body 122*a* of the first tire-engaging device 120*a* may include at least one female recess 126*a* (see, e.g., FIG. 4C). The at least one female recess 126*a* receives at least one male guide member 128*a* connected to the upper surface 116' of the first support member 116*a*.

The rear side surface 122*b*" of the body 122*b* of the second tire-engaging device 120*b* may be connected to a second rod 124*b*. The second rod 124*b* may be connected to a second actuator, A2 (see, e.g., FIG. 4B). The lower surface 122*b*"' of the body 122*b* of the second tire-engaging device 120*b* may include at least one female recess 126*b* (see, e.g., FIG. 4C). The at least one female recess 126*b* receives at least one male guide member 128*b* connected to the upper surface 116' of the second support member 116*b*.

The rear side surface 122*c*" of the body 122*c* of the second tire-engaging device 120*c* may be connected to a third rod 124*c*. The third rod 124*c* may be connected to a third actuator, A3 (see, e.g., FIG. 4B). The lower surface 122*c*"' of the body 122*c* of the third tire-engaging device 120*c* may include at least one female recess 126*c* (see, e.g., FIG. 4C). The at least one female recess 126*c* receives at least one male guide member 128*c* connected to the upper surface 116' of the third support member 116*c*.

The rods 124*a*-124*c*, female recesses 126*a*-126*c* and male guide members 128*a*-128*c* may assist in or contribute to the movement of the plurality of tire-engaging devices 120 relative the upper surface 116' of each of the first, second and third support members 116*a*, 116*b*, 116*c*. For example, each of the first, second and third rods 124*a*, 124*b*, 124*c* may providing a driving force and/or a reactive force (e.g., by way of a spring) to, respectively, the first, second and third tire-engaging devices 120*a*, 120*b*, 120*c*, in order to respectively cause or react to forward or backward movement of the first, second and third tire-engaging devices 120*a*, 120*b*, 120*c*. If a spring is included as or with one or more of the actuators A1-A3, the spring may bias one or more of the first, second and third rods 124*a*, 124*b*, 124*c* to a particular orientation; accordingly, if an object, such as, for example, one or more of the tire, T, and wheel, W, pushes or exerts a force upon one or more of the first, second and third tire-engaging devices 120*a*, 120*b*, 120*c*, the reactive/biasing force of the spring may act upon one or more of the first, second and third tire-engaging devices 120*a*, 120*b*, 120*c* in order to regulate movement of one or more of the first, second and third tire-engaging devices 120*a*, 120*b*, 120*c* relative to the upper surface 116' of one or more of the first, second and third support members 116*a*, 116*b*, 116*c*. The female recesses 126*a*-126*c* and male guide members 128*a*-128*c* may assist in providing linear movement of the first, second and third tire-engaging devices 120*a*, 120*b*, 120*c* relative to the upper surface 116' of the first, second and third support members 116*a*, 116*b*, 116*c*.

With continued reference to FIGS. 4B-4C, a first tire-tread-engaging post 130*a* may extend from the upper tire-sidewall-engaging surface 122*b*' of the second tire-engaging device 120*b*. A second tire-tread-engaging post 130*b* may extend from the upper tire-sidewall-engaging surface 122*c*' of the third tire-engaging device 120*c*. Each of the first and second tire-tread-engaging posts 130*a*, 130*b* include an upper tire-sidewall-engaging surface 132*a*, 132*b*.

Referring to FIG. 4B, the second and third support members 116*b*, 116*c* are separated by a gap or first spacing, S1. The first tire-tread-engaging post 130*a* is separated from the second tire-tread-engaging post 130*b* by a gap or second spacing, S2'. The second spacing, S2', may be greater than the first spacing, S1. The first spacing, S1, may be approximately equal to, but slightly greater than the diameter, $W_D$, of the wheel, W; further, the tire diameter, $T_D$,/central chord, $T_{C2}$, may be greater than the first spacing, S1. The second spacing, S2', may be approximately equal to the left chord, $T_{C1}$, and the right chord, $T_{C3}$, of the tire, T; further, the tire diameter, $T_D$,/central chord, $T_{C2}$, may be greater than the second spacing, S2'.

The first spacing, S1, of the processing sub-station 100 is substantially similar to the first spacing, S1, of the processing sub-station 10. The second spacing, S2', of the processing sub-station 100 is substantially similar to the second spacing, S2, of the processing sub-station 10; however, the second spacing, S2', of the processing sub-station 100 is different than that of the second spacing, S2, of the processing sub-station 10 due to the movement of the second and third tire-engaging devices 120*b*, 120*c* of the processing sub-station 100. Accordingly, the second spacing, S2', of the processing sub-station 100 may be referred to as a "variable" or "adjustable" second spacing, S2'.

In reference to the processing sub-station 10 of FIGS. 1A-3J, the first, second and third support members 16*a*, 16*b*, 16*c* may be said to be individual units arranged in a spaced-apart relationship. In reference to the processing sub-station 100 of FIGS. 4A-4C, the plurality the first, second and third support members 116*a*, 116*b*, 116*c* may also be said to be individual units; however, as seen, for example, in FIG. 4B, a forward (e.g., right) end $116a_{ER}$ of the first support member 116*a* may be arranged in an abutting or adjacent relationship with respect to a rearward (e.g., left) end $116b_{EL}$ of the second support member 116*b* and a rearward (e.g., left) end $116c_{EL}$ of the third support member 116*c*. Further, as seen in FIG. 4B, the at least one male guide member 128$a$ connected to the upper surface 116' of the first support member 116$a$ may extend all the way to and terminate at the forward (e.g., right) end 116$a_{ER}$ of the first support member 116$a$.

Figures 5A, 6A:
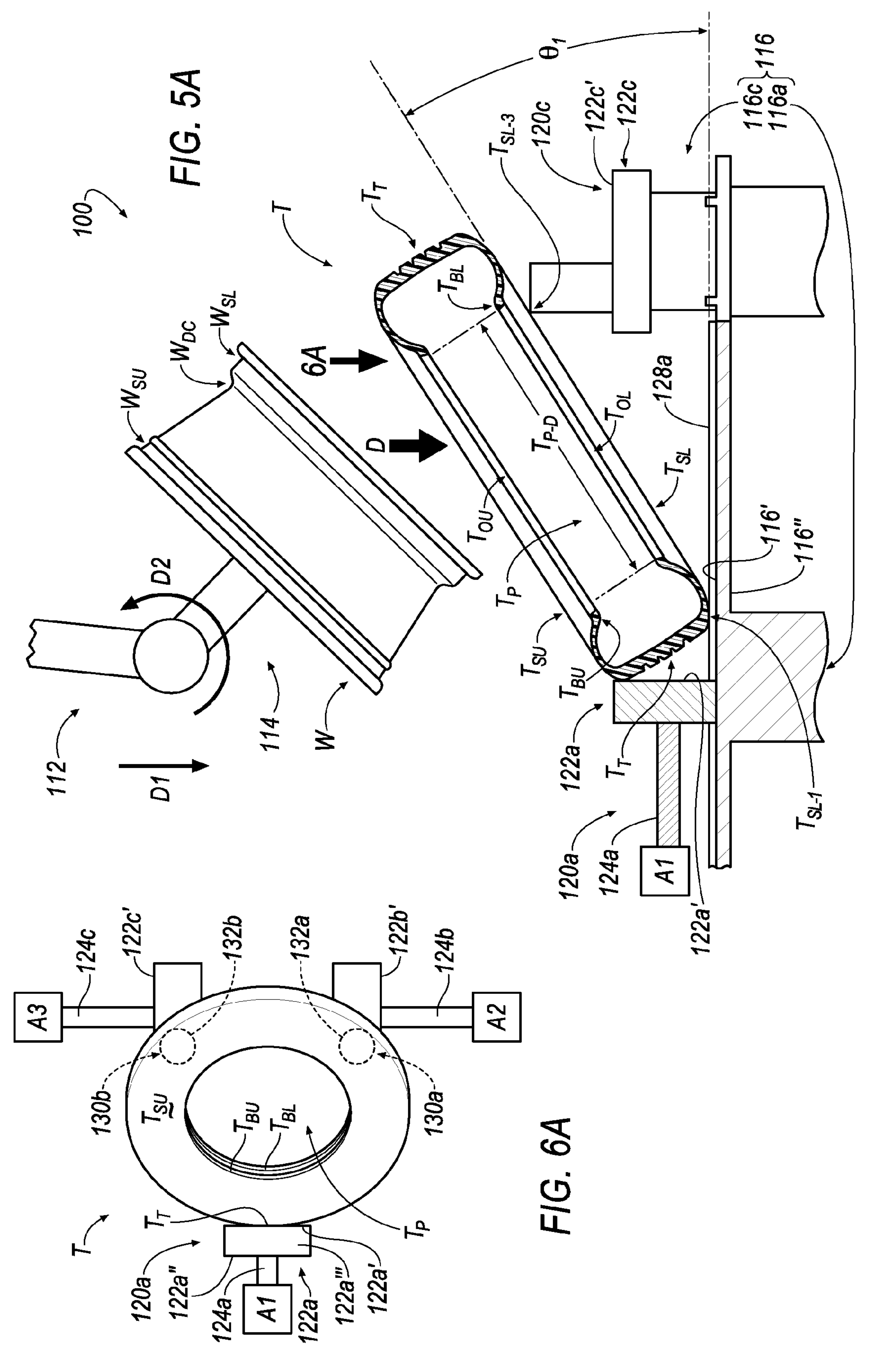
FIGS. 5A-5J illustrate side, partial cross-sectional views of the sub-station, tire and wheel according to line 5A-5A of FIG. 4A in accordance with an exemplary embodiment of the invention.
FIG. 6A-6J illustrate a partial top view of the sub-station, tire and wheel according to lines 6A-6J of FIGS. 5A-5J in accordance with an exemplary embodiment of the invention.

As seen in FIG. 4A with reference to FIGS. 5A and 6A, prior to joining the tire, T, to the wheel, W, the tire, T, may be said to be arranged in a first relaxed, unbiased orientation such that the upper tire opening, $T_{OU}$, and the lower tire opening, $T_{OL}$, define the passage, $T_P$, to include a diameter, $T_{P\text{-}D}$. When the tire, T, is joined to the wheel, W (see, e.g., FIGS. 5J and 6J), the upper bead, $T_{BU}$, and the lower bead, $T_{BL}$, may be arranged proximate but not seated adjacent, respectively, the upper bead seat, $W_{SU}$, and the lower bead seat, $W_{SL}$, of the wheel, W; later, upon inflating the tire, T, at, e.g., an inflation sub-station (not shown), the upper bead, $T_{BU}$, and the lower bead, $T_{BL}$, may be seated (i.e., disposed adjacent), respectively, the upper bead seat, $W_{SU}$, and the lower bead seat, $W_{SL}$, of the wheel, W. Further, when the tire, T, is joined to the wheel, W (see, e.g., FIGS. 5J and 6J), the tire, T, may be said to be arranged in a second substantially relaxed, but somewhat biased orientation such that the diameter, $T_{P\text{-}D}$, of the passage, $T_P$, is substantially circular and substantially similar to its geometry of the first relaxed, unbiased orientation of the tire, T.

Referring to FIG. 5A, the robotic arm 112 is arranged in a spaced-apart orientation with respect to the support member 116, which includes the tire, T, arranged in a "ready" position. As seen in FIGS. 5A and 6A, the "ready" position may include the tread surface, $T_T$, of the tire, T, arranged adjacent the front, tire-tread-engaging surface 122$a$' of the body 122$a$ of the first tire-engaging device 120$a$, and, further, the "ready" position may further include the tire, T, being arranged in a first angularly-offset orientation, $\theta_1$ (see, e.g., FIG. 5A), with respect to the upper surface 116' of the first support member 116$a$.

Referring to FIG. 5A, the first angularly-offset orientation, $\theta_1$, of the tire, T, may result from the non-co-planar relationship the upper sidewall-engaging surfaces 122$b$', 122$c$' of the second and third tire-engaging devices 120$b$, 120$c$ with that of the upper surface 116' of the first support member 116$a$ such that: (1) the first portion, $T_{SL\text{-}1}$, of the lower sidewall surface, $T_{SL}$, being arranged adjacent the upper surface 116' of the first support member 116$a$, (2) as seen in FIGS. 5A and 6A, the second portion, $T_{SL\text{-}2}$, of the lower sidewall surface, $T_{SL}$, being arranged adjacent a portion of the upper tire-sidewall-engaging surface 132$a$ of the first tire-tread-engaging post 130$a$ of the second tire-engaging device 120$b$ (noting that the second portion, $T_{SL\text{-}2}$, is not represented in FIG. 5A due to the cross-sectional reference line of FIG. 4A), and (3) a third portion, $T_{SL\text{-}3}$, of the lower sidewall surface, $T_{SL}$, being arranged adjacent a portion of the upper tire-sidewall-engaging surface 132$b$ of the second tire-tread-engaging post 130$b$ of the third tire-engaging device 120$c$. Accordingly, the support member 116 may provide a three-point support (which is more clearly shown at FIG. 4A) at $T_{SL\text{-}1}$, $T_{SL\text{-}2}$, $T_{SL\text{-}3}$ for the lower sidewall surface, $T_{SL}$, of the tire, T, while remaining portions of the lower sidewall surface, $T_{SL}$, of the tire, T, are not in direct contact with any other portion of the upper surface surfaces 116', 132$a$, 132$b$ of the support member 116 when the tire, T, is arranged in the first angularly-offset orientation, $\theta_1$.

The processing sub-station 100 may execute a mounting procedure by causing a controller, C (see, e.g., FIG. 4A) to send one or more signals to a motor, M (see, e.g., FIG. 4A), that drives movement (according to the direction of the arrows, D1-D9—see FIGS. 5A-5J) of the robotic arm 112. Alternatively or in addition to automatic operation by the controller, C, according to inputs stored in memory, the movement, D1-D9, may result from one or more of a manual, operator input, O (e.g., by way of a joystick, depression of a button or the like).

As seen in FIG. 5A, a first, down, D, movement according to the direction of arrow, D1, may reduce the spaced-apart orientation of robotic arm 112 with respect to the support member 116. A second movement according to the direction of arrow, D2, may cause the end effecter 114 to rotate the wheel, W, in, for example, a counter-clockwise direction. The movement according to the direction of the arrows, D1, D2, may be conducted separately or simultaneously, as desired.

Figure 5B:
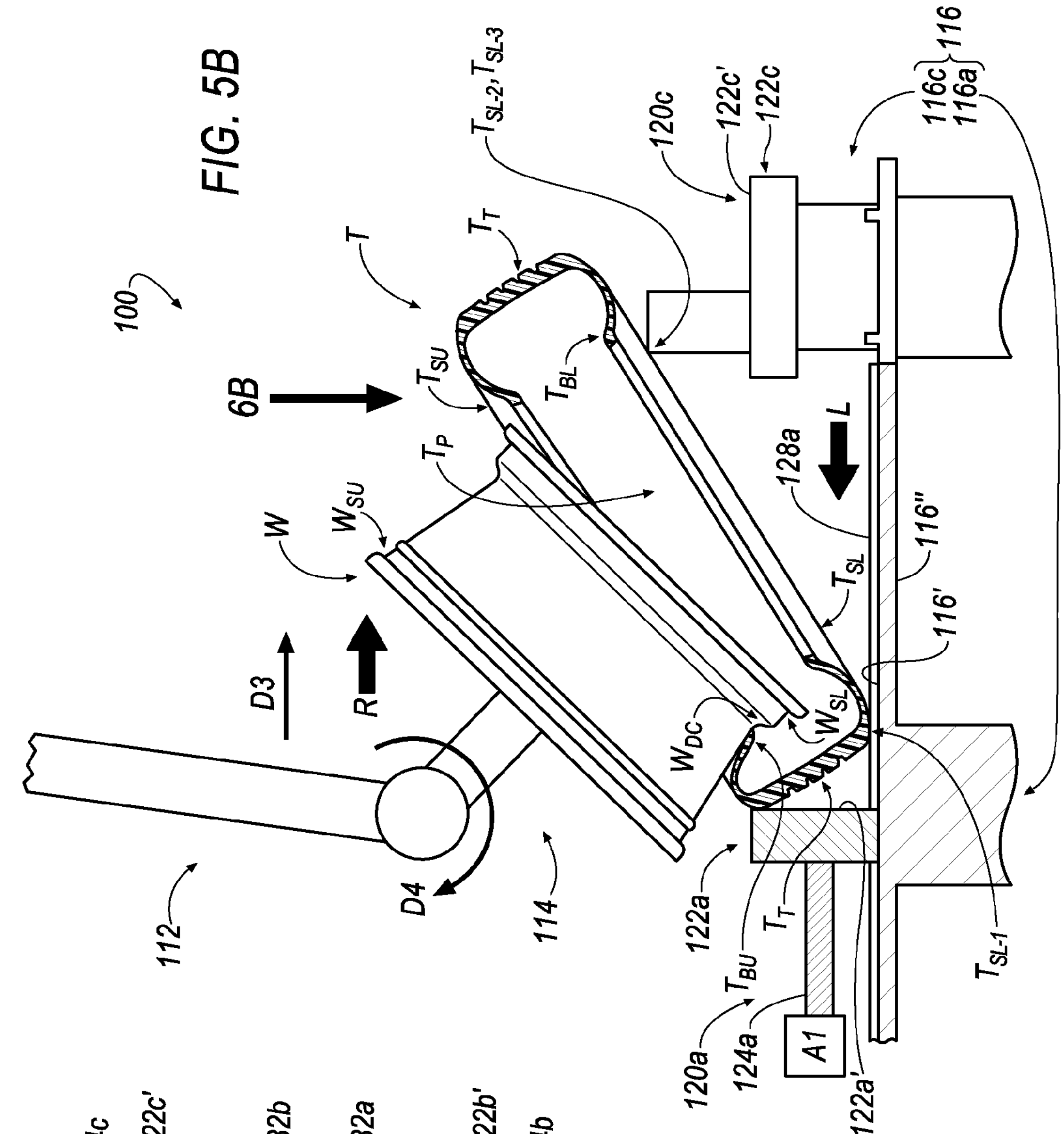
Figure 6B:
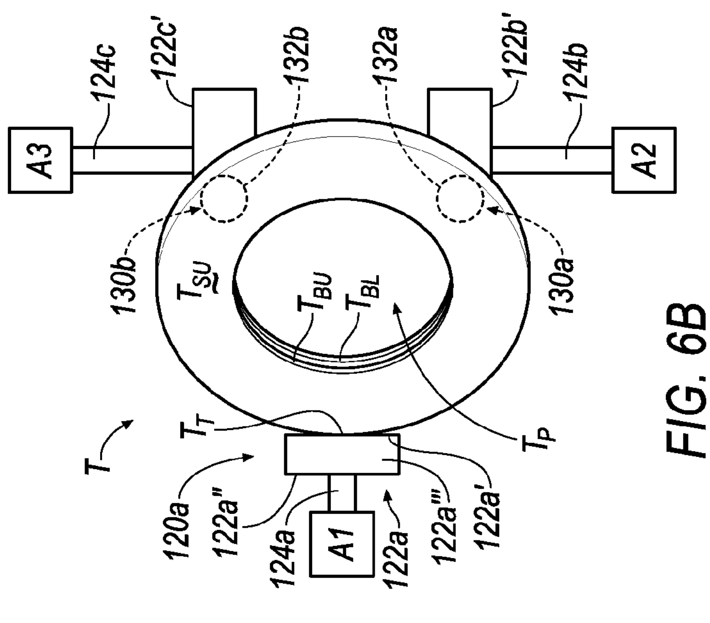

Referring to FIG. 5B, the movement according to the direction of the arrows, D1, D2, may cease upon locating a first (e.g., left) portion of the lower bead seat, $W_{SL}$, and drop center, $W_{DC}$, of the wheel, W, within the passage, $T_P$, of the tire, T, such that a first (e.g., left) portion of the drop center, $W_{DC}$, of the wheel, W, is disposed adjacent a first (e.g., left) portion of the upper bead, $T_{BU}$, of the tire, T. Because a first (e.g., left) portion the tread surface, $T_T$, of the tire, T, is arranged adjacent the front, tire-tread-engaging surface 122$a$' of the body 122$a$ of the first tire-engaging device 120$a$, subsequent movements of the wheel, W, resulting from movement of the robotic arm 112 prevents the tire, T, from moving away (e.g., to the left, L) from the second and third support members 116$b$, 116$c$.

With continued reference to FIG. 5B, a third movement according to the direction of arrow, D3, may cause forwardly (e.g., to the right, R) movement of the wheel, W. A fourth movement according to the direction of arrow, D4, may cause the end effecter 114 to rotate the wheel, W, in, for example, a clockwise direction (i.e., rotationally opposite that of the direction of arrow, D2). The movement according to the direction of the arrows, D3, D4, may be conducted separately or simultaneously, as desired.

Figure 5C:
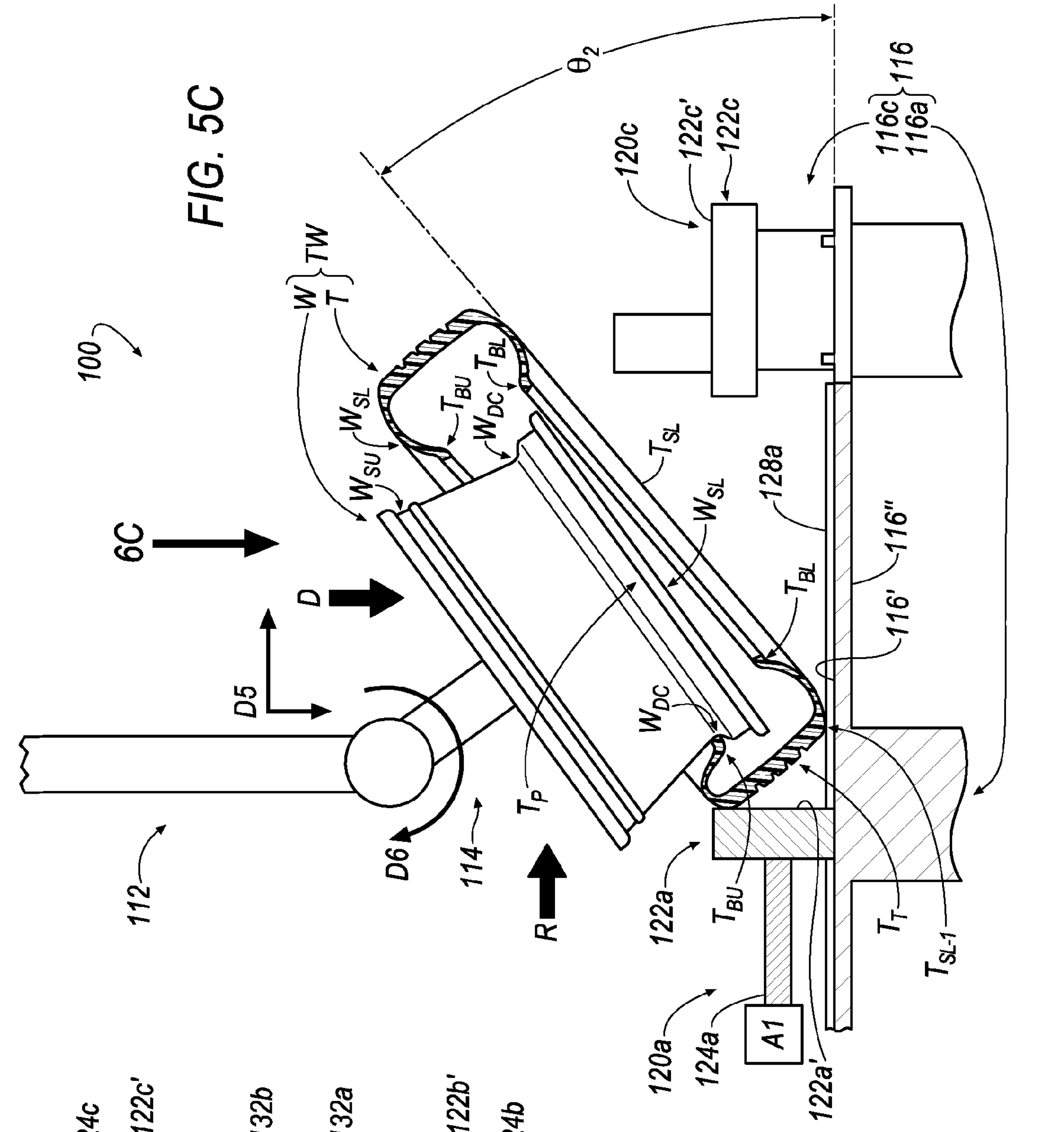
Figure 6C:
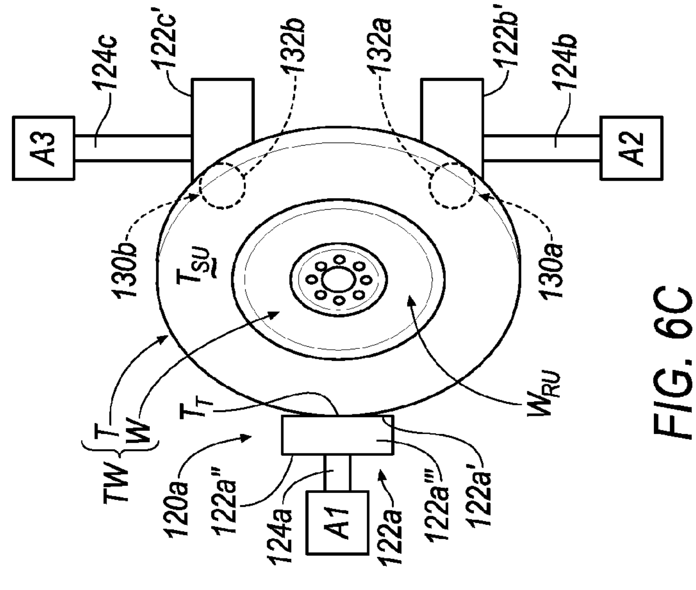

Referring to FIG. 5C, the movement according to the direction of the arrows, D3, D4, may cease upon locating a second (e.g., right) portion of the lower bead seat, $W_{SL}$, and drop center, $W_{DC}$ of the wheel, W, within the passage, $T_P$, of the tire, T, such that a second (e.g., right) portion of the drop center, $W_{DC}$, and lower bead seat, $W_{SL}$, of the wheel, W, are disposed proximate but not adjacent a second (e.g., right) portion of the lower bead, $T_{BL}$, and away from the second (e.g., right) portion of the upper bead, $T_{BU}$, of the tire, T. As stated above, because the first (e.g., left) portion the tread surface, $T_T$, of the tire, T, is arranged adjacent the front, tire-tread-engaging surface 122$a$' of the body 122$a$ of the first tire-engaging device 120$a$, the movements, D3, D4, of the wheel, W, resulting from movement of the robotic arm 112 prevents the tire, T, from moving rearwardly away (e.g., to the left, L), from the second and third support members 116$b$, 116$c$.

Referring to FIG. 5C, although the movement according to the direction of the arrows, D3, D4, does not result in the tire, T, moving rearward with respect to the second and third support members 116$b$, 116$c$, the portions of the lower sidewall surface, $T_{SL}$, of the tire, T, may no longer be arranged adjacent to the upper tire-sidewall-engaging surfaces 132$a$, 132$b$ of the first and second tire-tread-engaging posts 130$a$, 130$b$; this may result from the wheel, W, pressing upon and pivoting the tire, T (about the point of support, $T_{SL\text{-}1}$, adjacent the upper surface 116'), in a counter-clockwise direction. Accordingly, the tire, T, may no longer be arranged adjacent the support member 116 at three points of support; rather, the tire, T, only contact the support member 116 at one point of support, $T_{SL\text{-}1}$, being the upper surface 116' of the first support member 116$a$.

Further, as a result the orientation of the tire, T, being supported at one point of support, $T_{SL-1}$, the tire, T, is no longer arranged at the first angularly-offset orientation, $\theta_1$, with respect to the upper surface 116' of the first support member 116*a*. Rather, as seen in FIG. 5C, the tire, T, is arranged at a second angularly-offset orientation, $\theta_2$, with respect to the lower sidewall surface, $T_{SL}$, and the upper surface 116' of the first support member 116*a*; the second angularly-offset orientation, $\theta_2$, may be greater than that of the first angularly-offset orientation, $\theta_1$.

With continued reference to FIG. 5C, a fifth movement according to the direction of arrow, D5, may cause one or more of a further forwardly (e.g., to the right, R) and downwardly (e.g., down, D) movement of the wheel, W. A sixth movement according to the direction of arrow, D6, may cause the end effecter 114 to rotate the wheel, W, in, for example, a further clockwise direction. The movement according to the direction of the arrows, D5, D6, may be conducted separately or simultaneously, as desired.

Figures 5D, 6D:
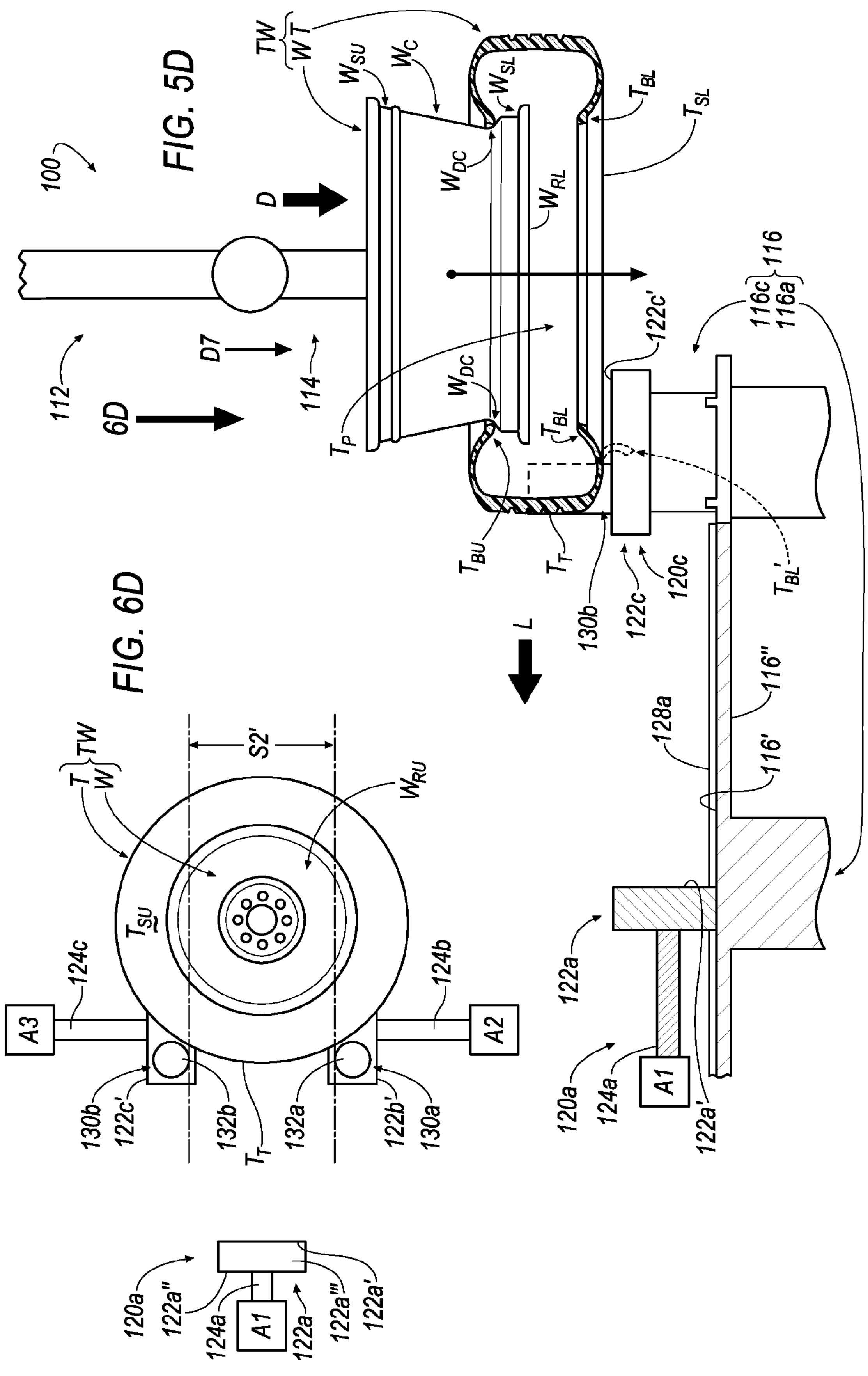
Figure 5D:
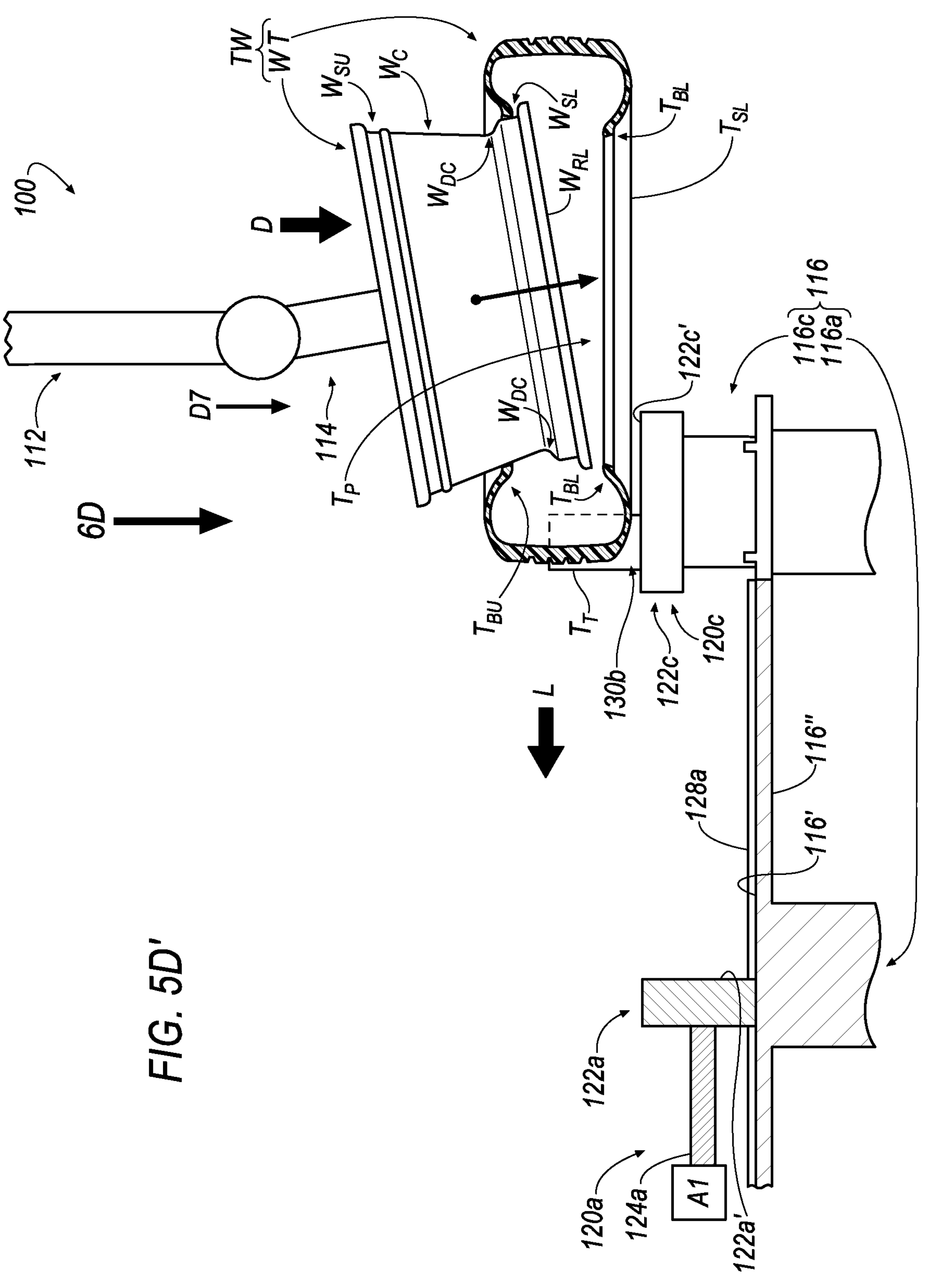

Referring to FIG. 5D, the movement according to the direction of the arrows, D5, D6, may cease upon adjusting an orientation of the wheel, W, relative to the tire, T, as follows: (1) the entire lower bead seat, $W_{SL}$, is located within the passage, $T_P$, of the tire, T, and (2) the entire upper bead, $T_{BU}$, is disposed about and adjacent the drop center, $W_{DC}$, of the wheel, W Further, as seen in FIG. 5D, the movement according to the direction of the arrows, D5, D6, may result in the wheel, W, being disposed within the passage, $T_P$, of the tire, T, and partially connected to the tire, T, such that the robotic arm 112 may utilize the wheel, W, to lift and carry the tire, T, by way of the temporary connection of the entire upper bead, $T_{BU}$, being disposed about and adjacent the drop center, $W_{DC}$, of the wheel, W. Further, the wheel, W, and the tire, T, may be said to be arranged in a "partially mounted" orientation.

Once arranged in the "partially mounted" orientation, the robotic arm 112 may move the wheel, W, and tire, T, forwardly (e.g., to the right, R) such that the front, tire-tread-engaging surface 122*a*' of the body 122*a* of the first tire-engaging device 120*a* is no longer arranged adjacent the tread surface, $T_T$, of the tire, T. Further, the movement according to the direction of the arrows, D5, D6, may result in the wheel, W, carrying the tire, T, up or over the first and second tire-tread-engaging posts 130*a*, 130*b* such that the tire, T, and wheel, W, are arranged substantially forwardly of (e.g., to the right, R) of the first and second tire-engaging posts 130*a*, 130*b*. Yet even further, the movement according to the direction of the arrows, D5. D6. may result in the lower, outer rim surface, $W_{RL}$, of the wheel, W, and the lower sidewall surface, $T_{SL}$, of the tire, T, being arranged proximate, but in a substantially parallel, but spaced-apart relationship with respect to the upper tire-sidewall-engaging surface 122*b*', 122*c*' of the body 122*b*, 122*c* of the second and third tire-engaging devices 120*b*, 120*c*.

With reference to FIG. 6D, which is a top view of FIG. 5D, the tread surface, $T_T$, of the tire, T, is arranged proximate, but in a spaced-apart relationship with respect to the first and second tire-tread-engaging posts 130*a*, 130*b*. Further, as seen in FIG. 5D, because the tread surface, $T_T$, of the tire, T, no longer contacts the front, tire-tread-engaging surface 122*a*' of the body 122*a* of the first tire-engaging device 120*a*, the first tire-engaging device 120*a* may be moved rearwardly (e.g., to the left, L) and away from the second and third tire-engaging devices 120*b*, 120*c*. With continued reference to FIG. 5D, a seventh movement according to the direction of arrow, D7, may cause a downwardly, D, movement of the wheel, W.

Figures 5E, 6E:
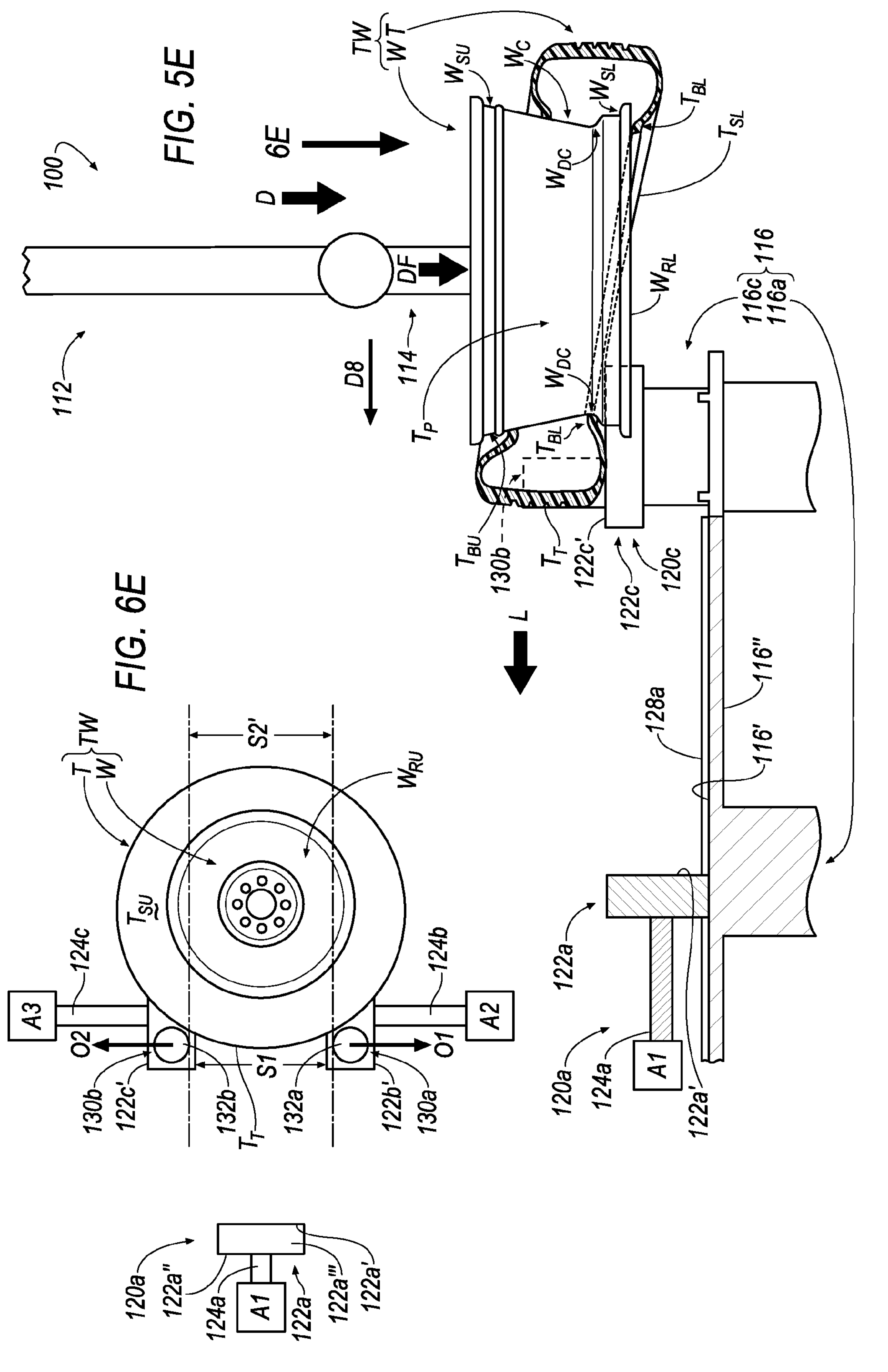
Figure 5E:
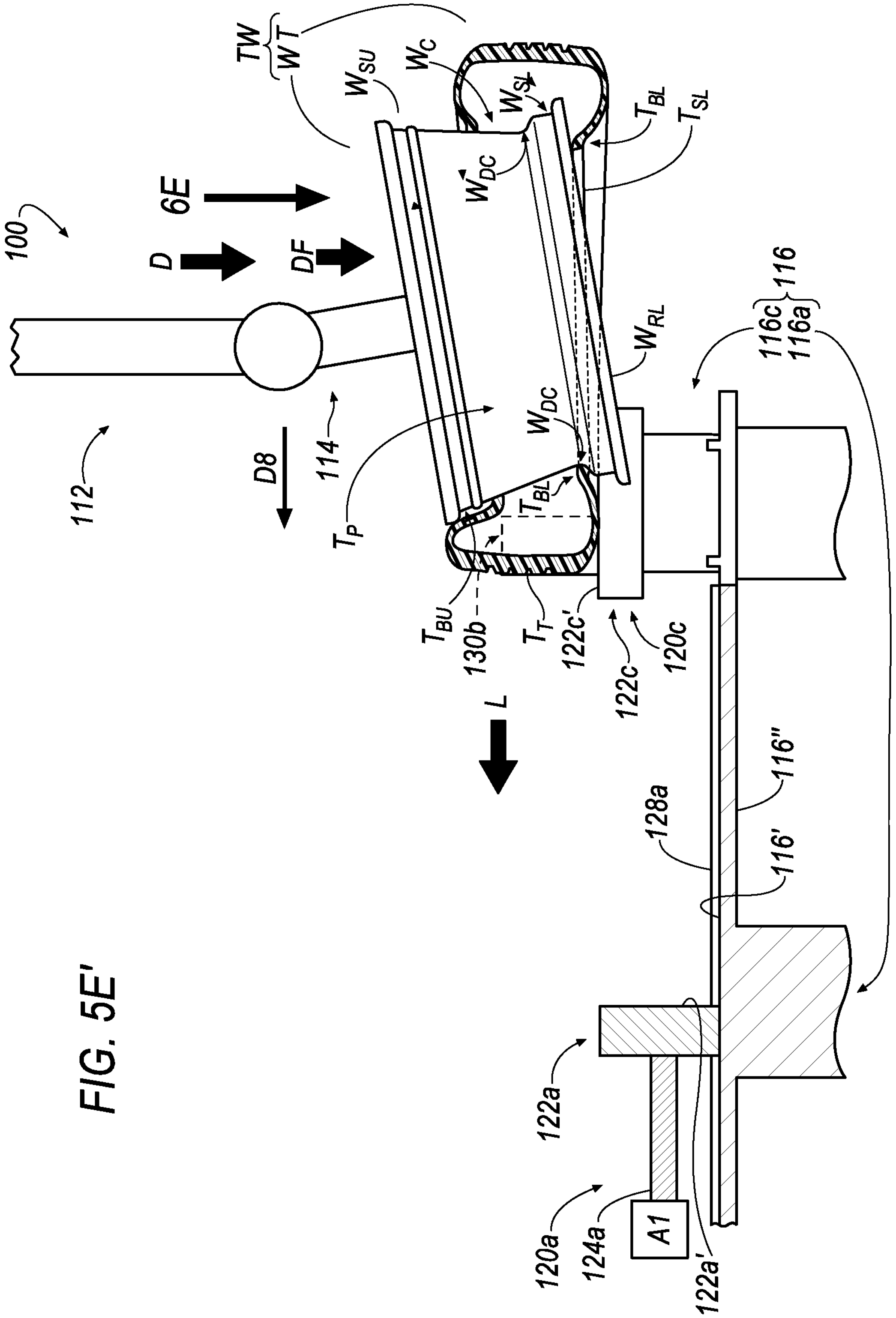

Referring to FIG. 5E, the movement according to the direction of the arrow, D7, results in the wheel, W, "plunging" through the passage, $T_P$, of the tire, T, such that: (1) the first (e.g., left) portion of the lower bead seat, $W_{SL}$, and drop center, $W_{DC}$, of the wheel, W, are orientated out of the passage, $T_P$, of the tire, T, and in a spaced-apart, opposing orientation with the lower sidewall surface, $T_{SL}$, of the tire, T, and (2) a portion (e.g., a right portion) of a lower, outer rim surface, $W_{RL}$, of the wheel, W, (proximate the second (e.g., right) portion of the lower bead seat, $W_{SL}$, and drop center, $W_{DC}$, of the wheel, W), is disposed within the passage, $T_P$, of the tire, T, and adjacent to the second (e.g., right) portion of the lower bead, $T_{BL}$, of the tire, T.

Per the phantom lines of the body 122*c* of the third tire-engaging device 120*c* (as a result of the orientation of the wheel, W, and tire, T), the movement of the robotic arm 112 according to the direction of the arrow, D7, results in a portion of the wheel, W, being arranged in the gap or first spacing, S1, and the left tire chord, $T_{C1}$ (see, e.g., corresponding top view FIG. 6E), being arranged proximate but slightly to the right of the first and second tire-tread-engaging posts 130*a*, 130*b* such that a portion of the tire, T, is arranged in the gap or second spacing, S2', but not adjacent the first and second tire-tread-engaging posts 130*a*, 130*b*.

Because the gap or first spacing, S1, is approximately equal to but greater than a diameter, $W_D$, of the wheel, W, the robotic arm 112 is permitted to move the wheel, W, into/through the gap or first spacing, S1, and below the upper tire-sidewall-engaging surface 122*b*', 122*c*' of the body 122*b*, 122*c* of the second and third tire-engaging devices 120*b*, 120*c*; however, because the diameter, $T_D$, of the tire, T, is greater than that of the gap or first spacing, S1, the movement of robotic arm 112 prohibits movement of the tire, T, through the gap or first spacing, S1, with that of the wheel, W. As a result of the wheel, W, being permitted to pass through the gap or first spacing, S1, without the tire, T, the lower bead seat, $W_{SL}$, and drop center, $W_{DC}$, of the wheel, W, are permitted to "plunge" through (as seen in FIG. 5E) the passage, $T_P$, of the tire, T.

As a result of the wheel, W, plunging through the passage, $T_P$, of the tire, T, a first (e.g., left) portion of the safety bead, $W_{SB}$, of the wheel, W, may be disposed substantially adjacent the first (e.g., left) portion of the upper bead, $T_{BU}$, of the tire, T. Further, as a result of the arrangement of the safety bead, $W_{SB}$, substantially adjacent the first (e.g., left) portion of the upper bead, $T_{BU}$, of the tire, T, and the arrangement of the portion of the lower, outer rim surface, $W_{RL}$, of the wheel, W, adjacent the second (e.g., right) portion of the lower bead, $T_{BL}$, of the tire, T, a substantially downwardly force, DF, is transmitted from the robotic arm 112, to the wheel, W, and to the contact points of the wheel, W, with the tire, T, described above at the safety bead, $W_{SB}$, and lower, outer rim surface, $W_{RL}$. The substantially downwardly force, DF, further causes a portion of the lower sidewall surface, $T_{SL}$, of the tire, T, to no longer be spaced-apart, but, adjacent with respect to and in direct contact with the upper surfaces 122*b*', 122*c*' of the second and third support members 116*b*, 116*c*; accordingly, the downwardly force, DF, is distributed from the wheel, W, and to the tire, T, and ultimately arrives at and is distributed to the upper surfaces 122*b*', 122*c*' of the second and third support members 116*b*, 116*c*.

Figures 5F, 6F:
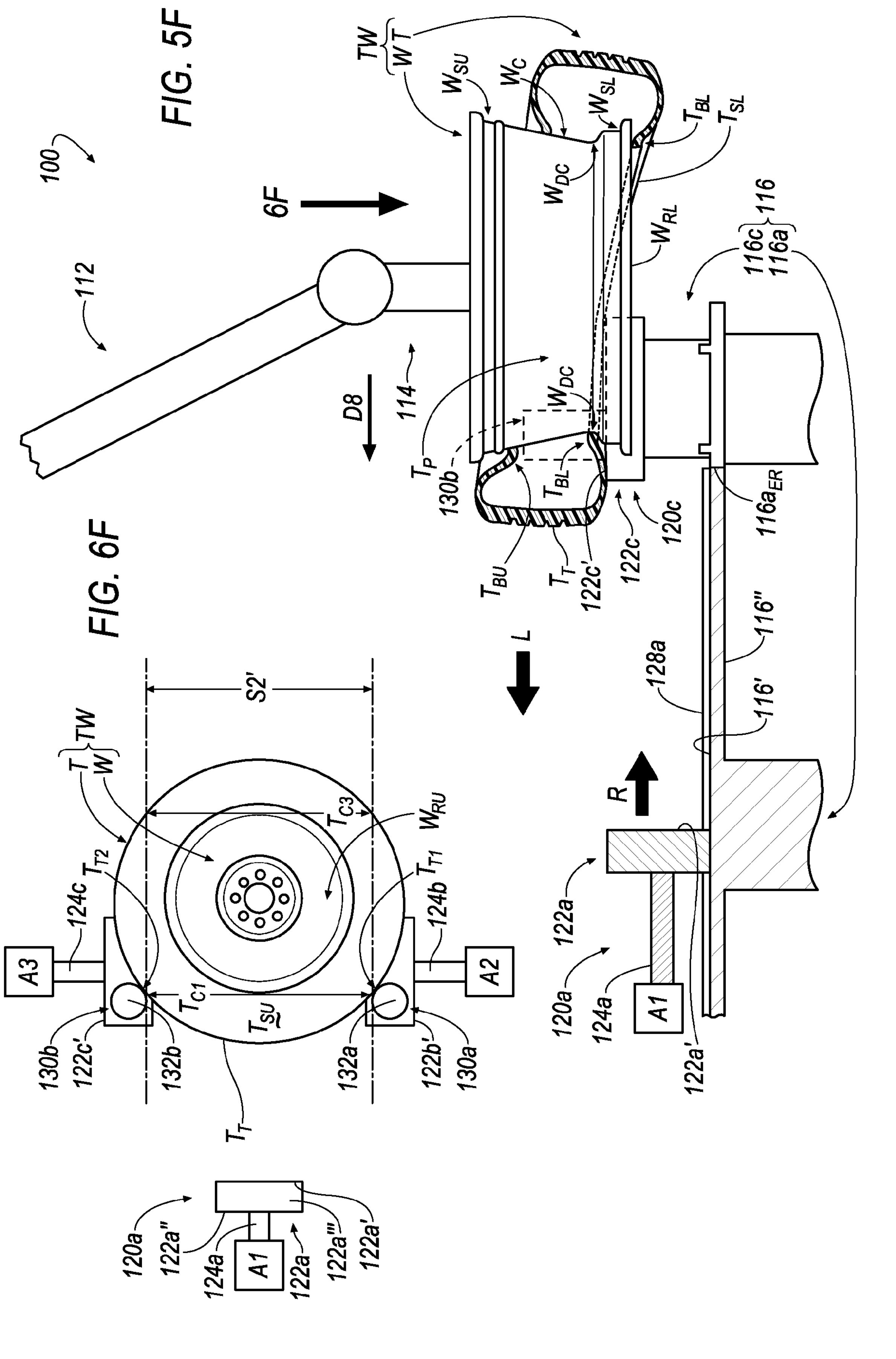

With continued reference to FIG. 5E, an eighth movement according to the direction of arrow, D8, may cause a rearwardly (e.g., to the left, L) movement of the wheel, W. Referring to FIG. 5F, as a result of the movement according to the direction of the arrows D1-D8, the lower bead, $T_{BL}$, of the tire, T, is arranged in a curved, substantially arcuate orientation over the sidewall-engaging surface 122_b_', 122_c_' of the body 122_b_, 122_c_ of the second and third tire-engaging devices 120_b_, 120_c_. Further, as a result of the initial rearwardly (e.g., to the left, L) movement of the wheel, W, the tire, T, is advanced through the second spacing, S2', from the left chord, $T_{C1}$, to the right chord, $T_{C3}$; as seen in FIG. 6F-6J, because chords (including, e.g., the central chord, $T_{C2}$) of the tire, T, between the left chord, $T_{C1}$, to the right chord, $T_{C3}$, are greater than that of the left chord, $T_{C1}$, and the right chord, $T_{C3}$, the first and second tire-tread-engaging posts 130_a_, 130_b_ interfere with movement of the tire, T, through the second spacing, S2'. The interference of the first and second tire-tread-engaging posts 130_a_, 130_b_ with the tire, T, includes the contacting of a first tread surface portion, $T_{T1}$ (see, e.g., FIG. 6F) and a second tread surface portion, $T_{T2}$ (see, e.g., FIG. 6F) of the tread surface, $T_T$, of the tire, T, with that of the tire-tread-engaging posts 130_a_, 130_b_.

Referring back to FIG. 5D, the "plunging" action described above may result in, for example, the wheel, W, pushing upon the tire, T, such that the lower sidewall surface, $T_{SL}$, of the tire, T, contact the upper surfaces 122_b_', 122_c_' of the second and third support members 116_b_, 116_c_. Further, because the diameter, $W_D$, of the wheel, W, is larger than the diameter, $T_D$, of the tire, T, a portion of the lower bead, $T_{BL}$, of the tire, T (see, e.g., phantom portion of the lower bead, $T_{BL}$'), may be deformed or deflected in order to pass the wheel, W, through the passage, $T_P$, of the tire, T. Although such deformation/deflection permits the tire-wheel assembly, TW, to be processed, in some circumstances, the deformation/deflection may not be desirable (e.g., the integrity of the lower bead, $T_{BL}$, of the tire, T, may be unintentionally compromised).

In order to obviate the exemplary deformation, $T_{BL}$', of the tire, T, described above, the direction of the arrows, D5, D6 (from FIG. 5C), may include a directional component that results in the wheel, W, being arranged at an offset angle with respect to the tire, T. As seen in FIG. 5D', the lower sidewall surface, $T_{SL}$, of the tire, T, is arranged in a substantially parallel relationship with respect to the upper surfaces 122_b_', 122_c_' of the second and third support members 116_b_, 116_c_; the wheel, W, however, is not arranged in parallel with respect to the upper surfaces 122_b_', 122_c_' of the second and third support members 116_b_, 116_c_, and, as such, is arranged in a canted or angularly-offset relationship with respect to the tire, T. Referring to FIG. 5E', as a result of the arrangement of the wheel, W, with respect to the tire, T, when the wheel, W, is plunged through the passage, $T_P$, of the tire, T, the portion of the lower bead, $T_{BL}$, of the tire, T, may be less likely to interfere with the movement of the wheel, W, and, as a result, the tire, T, is less likely to be deformed or deflected (as shown at $T_{BL}$' in FIG. 5D) as the wheel, W, passes through the passage, $T_P$, of the tire, T.

Referring to FIG. 6E, in an embodiment, the second and third actuators, A2, A3 may include, for example, motors that may retract the second and third tire-engaging devices 120_b_, 120_c_ in a manner to arrange the first and second tire-tread-engaging posts 130_a_, 130_b_ in order to provide the (variable) second spacing, S2'. Prior to the initial rearwardly (e.g., to the left, L) movement, of the wheel, W, and tire, T, the actuators, A2, A3, may cause an initial, partial retraction of the second and third tire-engaging devices 120_b_, 120_c_ in a manner to arrange the first and second tire-tread-engaging posts 130_a_, 130_b_ according to the direction of arrows, O1, O2.

Referring to FIGS. 6F-6I, upon the initial rearwardly (e.g., to the left, L) movement of the wheel, W, the tire, T, is advanced through the second spacing, S2', without further actuation of the motors, A2, A3; accordingly the first and second tire-tread-engaging posts 130_a_, 130_b_ remain in a fixed orientation and interfere with the tire, T, and press the tire, T, radially inwardly in a manner such that the tire, T, is temporality deformed such that the diameter, $T_{P-D}$, of the passage, $T_P$, of the tire, T, is temporality upset to include a substantially oval form rather than a circular form. Accordingly, in a substantially similar fashion, the upper tire opening diameter, $T_{OU-D}$, and the lower tire opening diameter, $T_{OL-D}$, are also temporality upset to include a substantially oval form rather than a circular form.

The oval form of the upper tire opening diameter, $T_{OU-D}$, and the lower tire opening diameter, $T_{OL-D}$, reduces a portion of contact (and, as a result, friction) of the lower bead, $T_{BL}$, and the upper bead, $T_{BU}$, of the tire, T, with that of the outer circumferential surface, $W_C$, of the wheel, W. Accordingly, referring to FIGS. 5G-5I and 6G-6I, as the wheel, W, advances the tire, T, through the second spacing, S2', the oval deformation of diameters, $T_{P-D}$, $T_{OU-D}$, $T_{OL-D}$ results in the lower bead, $T_{BL}$, of the tire, T, encountering less resistance or interference with the outer rim surface, $W_{R-L}$, of the wheel, W, as the lower bead, $T_{BL}$, is advanced from being orientated opposite the outer rim surface, $W_{RL}$, to being arranged over the lower bead seat, $W_{SL}$, and to a final position adjacent the drop center, $W_{DC}$, of the wheel, W, as the tire, T, is advanced from the forwardly orientation (e.g., to the right, R) of the first and second tire-tread-engaging posts 130_a_, 130_b_ back to the rearwardly orientation (e.g., to the left, L) of the first and second tire-tread-engaging posts 130_a_, 130_b_.

Figures 5G, 6G:
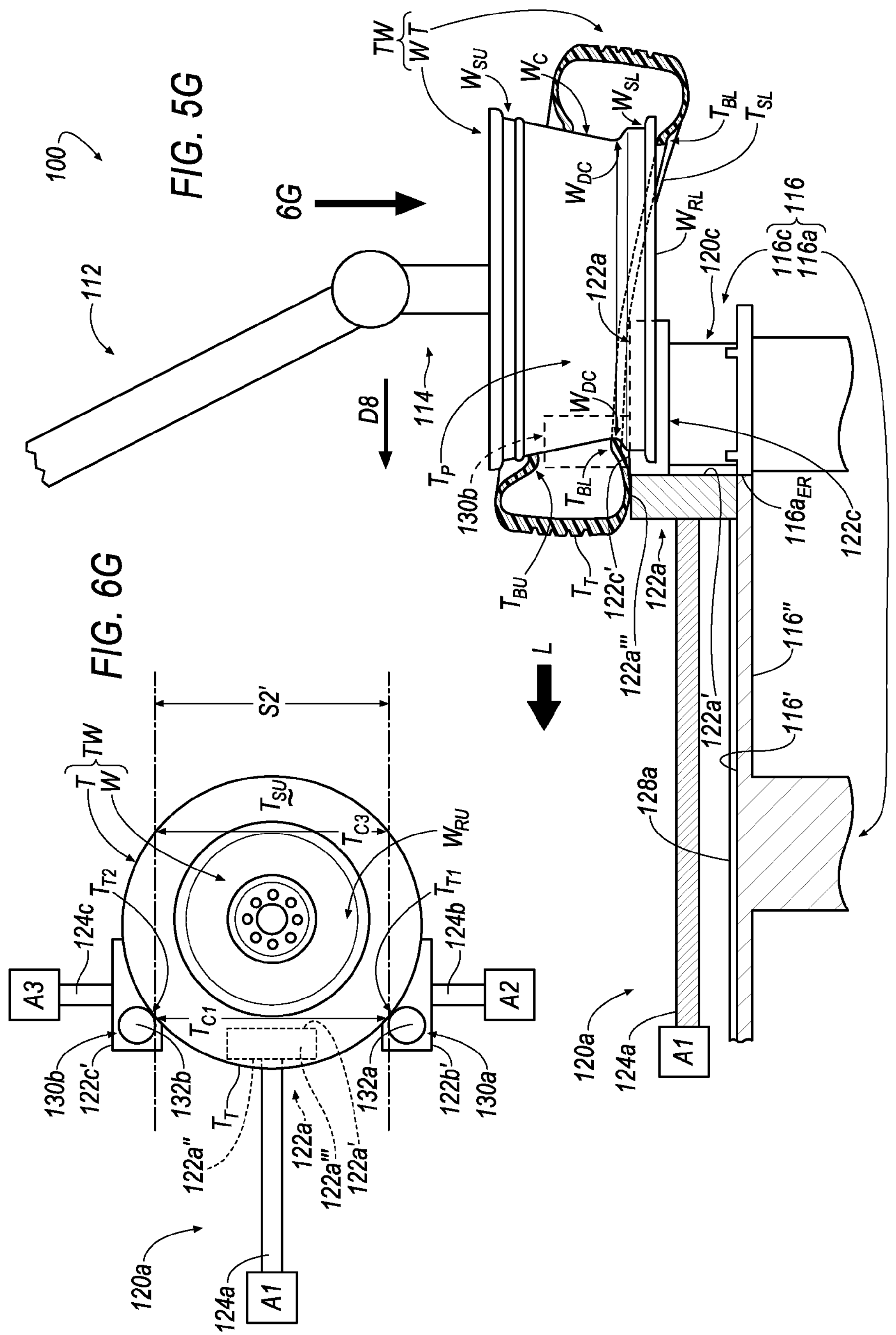
Figures 5H, 6H:
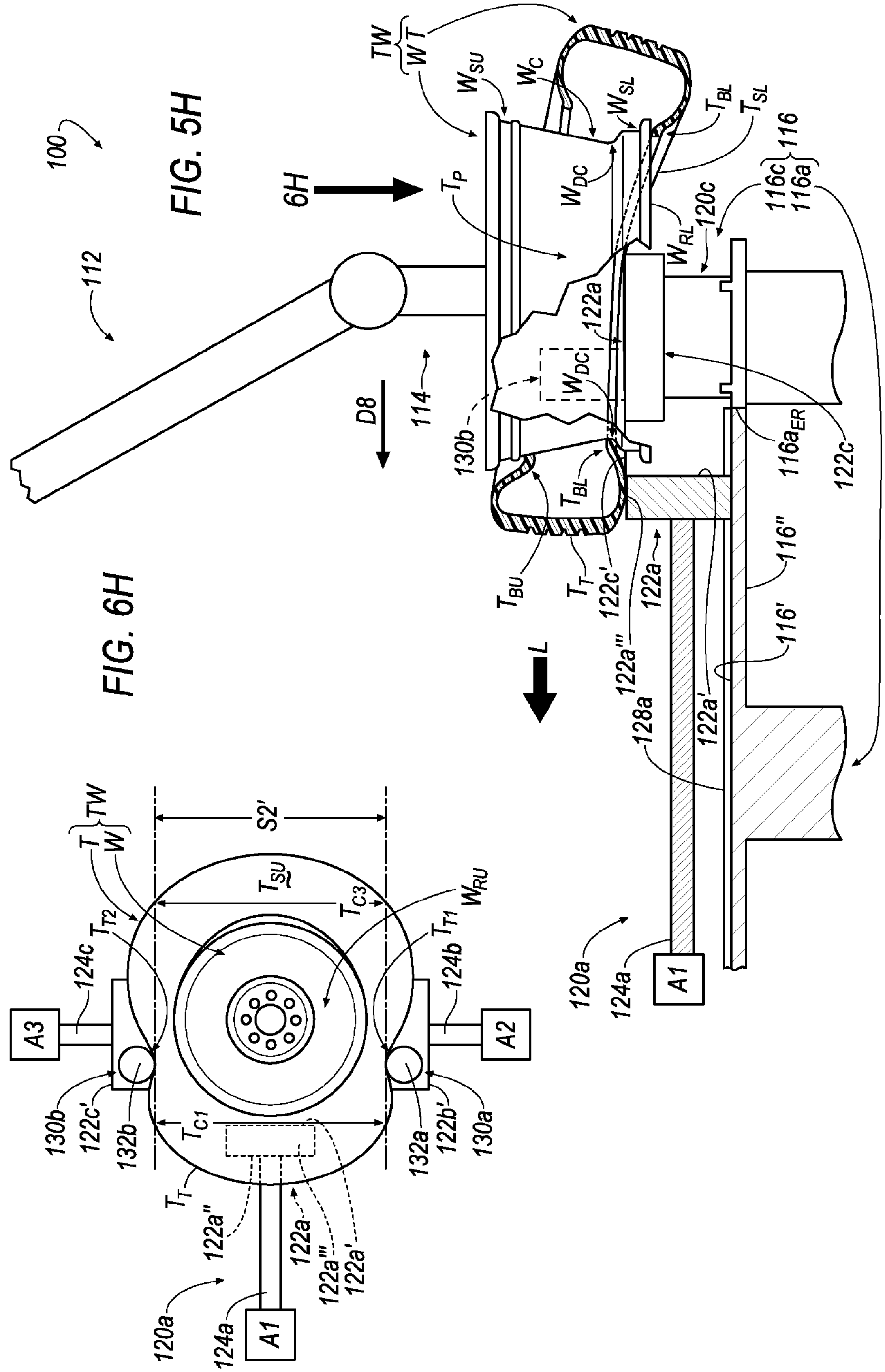
Figures 5I, 6I:
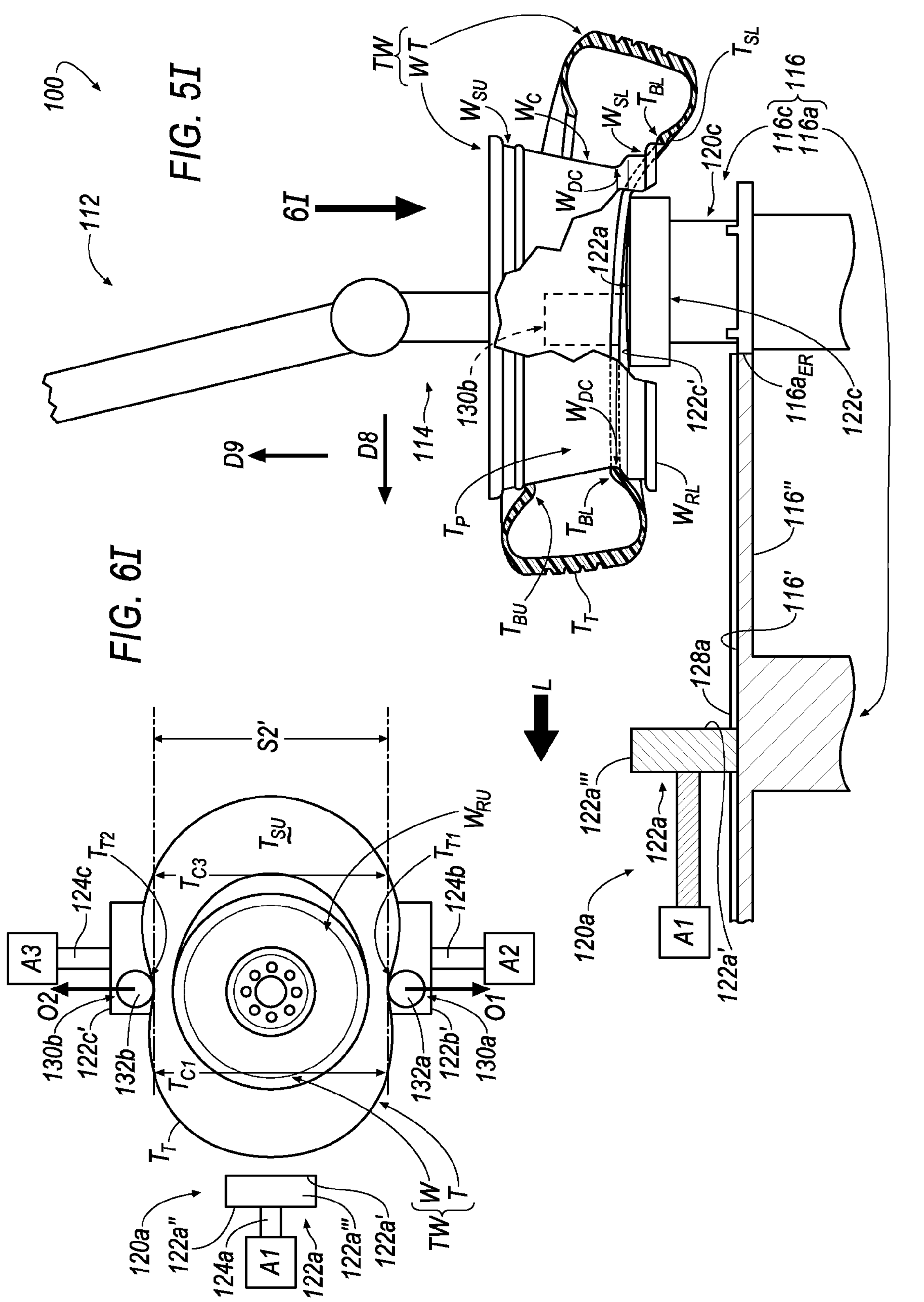
Figures 5J, 6J:
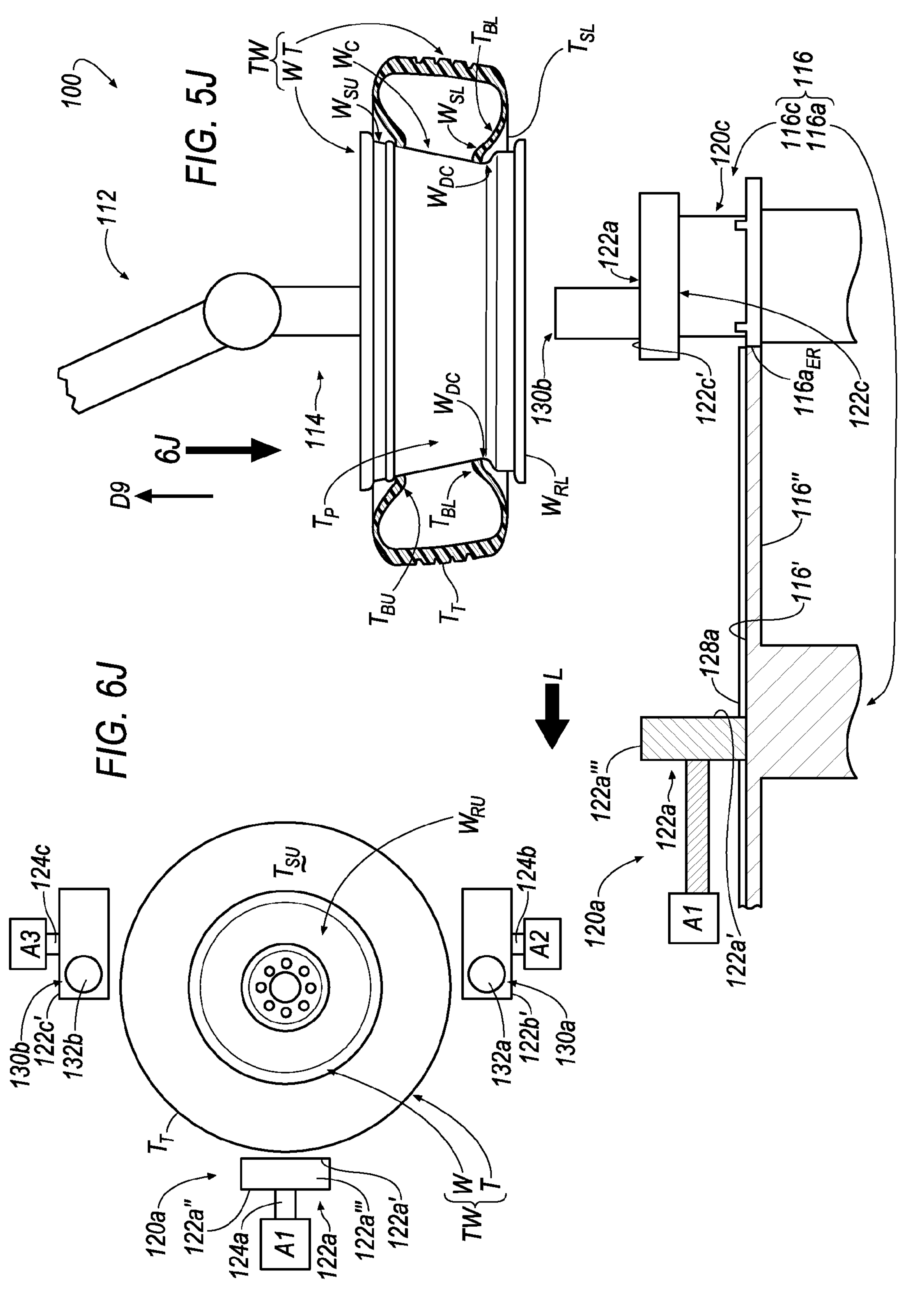

Referring to FIGS. 5I-5J and 6I-6J, once the central chord, $T_{C2}$, or the right chord, $T_{C3}$, has been advanced through the second spacing, S2', the motors, A2, A3, may be actuated in order to further retract the first and second tire-tread-engaging posts 130_a_, 130_b_ outwardly according to the direction of the arrows, O1, O2. Accordingly, as seen in FIG. 6J, the first and second tire-tread-engaging posts 130_a_, 130_b_ may no longer contact the tread surface, $T_T$, of the tire, T. Further, as a result of the movement of the wheel, W, and tire, T, through the spacing, S2', the entire circumference of the lower bead, $T_{BL}$, is advanced to its final "mounted position" adjacent to and about the drop center, $W_{DC}$; further, the entire circumference of the upper bead, $T_{BU}$, is arranged in its final "mounted position" adjacent to and about the outer circumferential surface, $W_C$, of the wheel, W, proximate the safety bead, $W_{SB}$.

In addition to the result of the movement according to the direction of the arrow, D8, and the actuation of the actuators, A2, A3, referring to FIG. 5F, the first actuator, A1, may be actuated in order to move the body 122_a_ of the first tire-engaging device 120_a_ in a forwardly (e.g., right, R) direction along the at least one male guide member 128_a_ toward the forward end $\mathbf{116}a_{ER}$ of the first support member 116_a_; the movement of the first tire-engaging device 120_a_ by way of the actuator, A1, in the forwardly direction may be conducted just prior to, or, in conjunction with the rearwardly, (to the left, L) movement initiated by the robotic arm 112 according to the direction of the arrow, D8.

Referring to FIG. 5G, when driven to the forward end $\mathbf{116}a_{ER}$ of the first support member 116_a_, the upper surface 122_a_''' of the body 122_a_ of the first tire-engaging device 120_a_ may be substantially coplanar with the upper tire-sidewall-engaging surface 122_b_', 122_c_' of the body 122_b_, 122_c_ of the second and third tire-engaging devices 120_b_, 120_c_. Accordingly, the upper surface 122_a_''' of the body 122_a_ of the first tire-engaging device 120_a_ may serve as an "extension surface" of the upper tire-sidewall-engaging surface 122_b_', 122_c_' of the body 122_b_, 122_c_ of the second and third tire-engaging devices 120_b_, 120_c_. Referring to FIGS. 5H-5I, as the tire, T, through the second spacing, S2', rearwardly (e.g., to the left, L), the first actuator, A1, may be actuated in order to move the body 122*a* of the first tire-engaging device 120*a* in a correspondingly, rearwardly (e.g., left, L) direction along the at least one male guide member 128*a* away from the forward end 116$a_{ER}$ of the first support member 116*a*.

With reference to FIG. 5I, after mounting the tire, T, to the wheel, W, a ninth movement of the robotic arm 112 according to the direction of arrow, D9, may cause upwardly movement, U, of the wheel, W, and tire, T, away from the support member 116. The robotic arm 112 may move the tire-wheel assembly, TW, to, for example, a subsequent sub-station (not shown), such as, for example, an inflation sub-station in order to inflate the tire-wheel assembly, TW, which may cause the upper bead, $T_{BU}$, to be seated adjacent the upper bead seat, $W_{SU}$, and the lower bead, $T_{BL}$, to be seated adjacent the lower bead seat, $W_{SL}$.

Figure 7A:
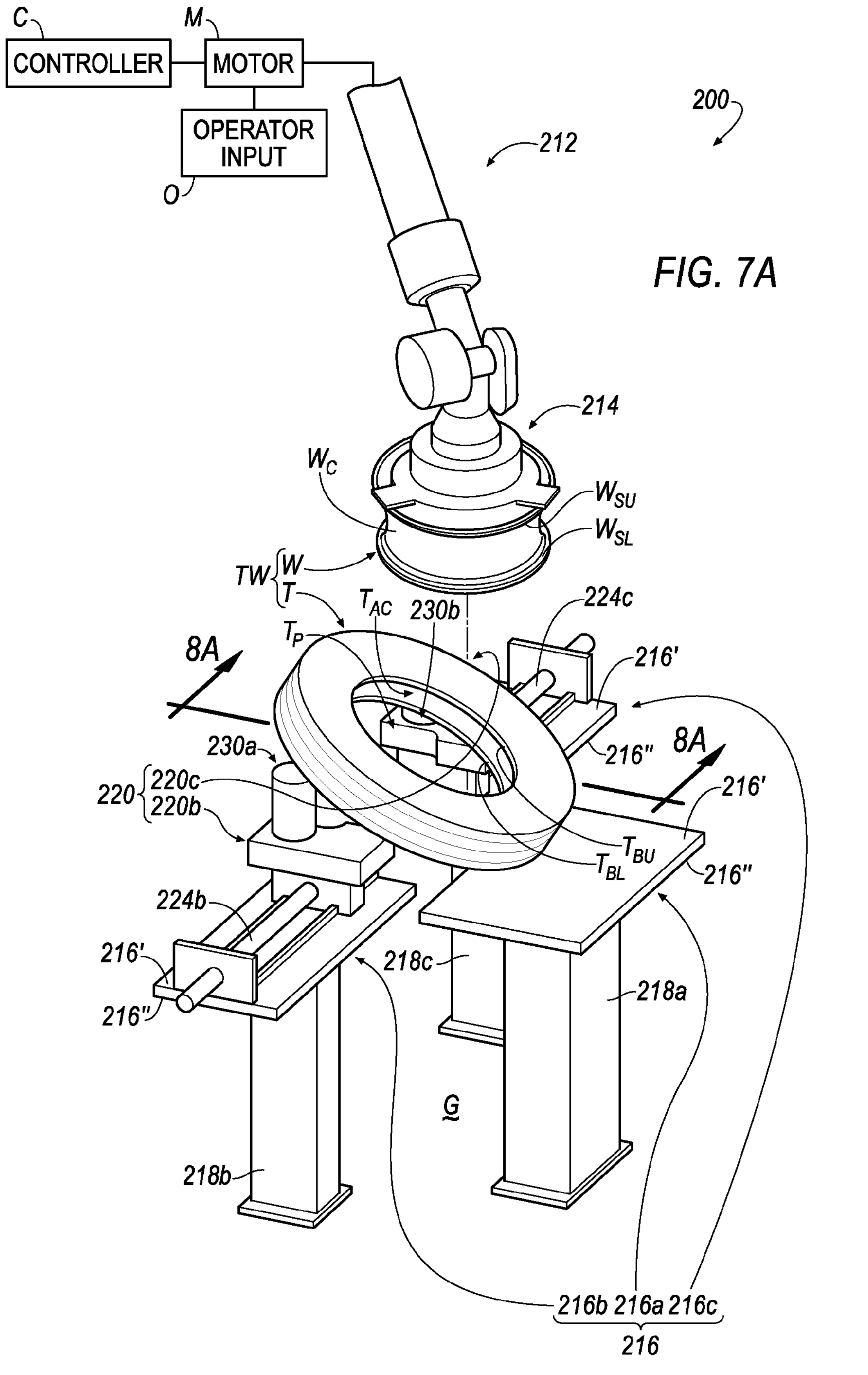
FIG. 7A is a perspective view of a sub-station for processing a tire and a wheel in accordance with an exemplary embodiment of the invention.

Referring to FIG. 7A, a processing sub-station 200 for processing a tire-wheel assembly, TW, is shown according to an embodiment. The "processing" conducted by the processing sub-station 200 may include the act of "joining" or "mounting" a tire, T, to a wheel, W, for forming the tire-wheel assembly, TW. The act of "joining" or "mounting" may mean to physically couple, connect or marry the tire, T, and wheel, W, such that the wheel, W, may be referred to as a male portion that is inserted into a passage, $T_P$, of a tire, T, being a female portion.

As described and shown in the following Figures, although the desired result of the processing sub-station 200 is the joining or mounting of the tire, T, and wheel, W, to form a tire-wheel assembly, TW, it should be noted that the processing sub-station 200 does not inflate the circumferential air cavity, $T_{AC}$, of the tire, T, of the tire-wheel assembly, TW, nor does the processing sub-station 200 contribute to an act of "seating" the upper bead, $T_{BU}$, or the lower bead, $T_{BL}$, of the tire, T, adjacent the upper bead seat, $W_{SU}$, and the lower bead seat, $W_{SL}$, of the wheel, W (because the act of "seating" typically arises from an inflating step where the tire-wheel assembly, TW, is inflated). Accordingly, upon joining or mounting the tire, T, to the wheel, W, the upper bead, $T_{BU}$, or the lower bead, $T_{BL}$, of the tire, T, may be arranged about and/or disposed adjacent the outer circumferential surface, $W_C$, of the wheel, W.

In an implementation, the processing sub-station 200 may be included as part of a "single-cell" workstation. A single-cell workstation may include other sub-stations (not shown) that contribute to the processing of a tire-wheel assembly, TW; other sub-stations may include, for example: a soaping sub-station, a stemming sub-station, an inflating sub-station, a match-marking sub-station, a balancing sub-station and the like. The term "single-cell" indicates that the sub-stations contribute to the production of a tire-wheel assembly, TW, without requiring a plurality of successive, discrete workstations that may otherwise be arranged in a conventional assembly line such that a partially-assembled tire-wheel assembly, TW, is "handed-off" along the assembly line (i.e., "handed-off" meaning that an assembly line requires a partially-assembled tire-wheel assembly, TW, to be retained by a first workstation of an assembly line, worked on, and released to a subsequent workstation in the assembly line for further processing). Rather, a single cell workstation provides one workstation having a plurality of sub-stations each performing a specific task in the process of assembling a tire-wheel assembly, TW. This assembling process takes place wherein the tire and/or wheel "handing-off" is either minimized or completely eliminated. As such, a single-cell workstation significantly reduces the cost and investment associated with owning/renting the real estate footprint associated with a conventional tire-wheel assembly line while also having to provide maintenance for each individual workstation defining the assembly line. Thus, capital investment and human oversight is significantly reduced when a single cell workstation is employed in the manufacture of tire-wheel assemblies, TW.

Referring to FIG. 7A, the processing sub-station 200 includes a device 212. The device 212 may be referred to as a robotic arm. The robotic arm 212 may be located in a substantially central position relative to a plurality of sub-stations (including, e.g., the processing sub-station 200) of a single-cell workstation. The robotic arm 212 may be attached to and extend from a base/body portion (not shown) connected to ground, G.

The robotic arm 212 may include an end effecter 214. The end effecter 214 may include a claw, gripper, or other means for removably-securing the wheel, W, to the robotic arm 212. The end effecter 214 permits the robotic arm 212 to have the ability to retain and not release the wheel, W, throughout the entire procedure performed by the processing sub-station 200 (and, if applied in a single-cell workstation, the ability to retain and not release the wheel, W, throughout the entire assembling procedure of the tire-wheel assembly, TW). Accordingly, the end effecter 214 minimizes or eliminates the need of the robotic arm 212 to "hand-off" the tire-wheel assembly, TW, to (a) subsequent sub-station(s) (not shown).

The processing sub-station 200 may perform several functions/duties including that of: (1) a tire repository sub-station and (2) a mounting sub-station. A tire repository sub-station typically includes one or more tires, T, that may be arranged in a "ready" position for subsequent joining to a wheel, W. A mounting sub-station typically includes structure that assists in the joining of a tire, T, to a wheel, W (e.g., the disposing of a wheel, W, within the passage, $T_P$, of the tire, T).

Referring to FIG. 7A, the processing sub-station 200 may be initialized by joining a wheel, W, to the robotic arm 212 at the end effecter 214. The processing sub-station 200 may also be initialized by positioning the tire, T, upon a support member 216. The support member 216 may include a first support member 216*a*, a second support member 216*b* and a third support member 216*c*. Each of the first, second and third support members 216*a*, 216*b*, 216*c* include an upper surface 216' and a lower surface 216".

The lower surface 216" of each of the first, second and third support members 216*a*, 216*b*, 216*c* may be respectively connected to at least one first leg member 218*a*, at least one second leg member 218*b* and at least one third leg member 218*c*. Each of the at least one first, second and third leg members 218*a*, 218*b*, 218*c* respectively include a length for elevating or spacing each of the first, second and third support members 216*a*, 216*b*, 216*c* from an underlying ground surface, G. Although the robotic arm 212 is not directly connected to the support member 216 (but, rather may be connected to ground, G), the robotic arm 212 may be said to be interfaceable with (as a result of the movements D1-D6 described in the following disclosure) and/or indirectly connected to the support member 216 by way of a common connection to ground, G, due the leg members 218*a*-218*c* connecting the support member 216 to ground, G.

The processing sub-station 200 may further include a plurality of tire-engaging devices 220. The plurality of tire-engaging devices 220 may include a first tire-engaging device 220*b* connected to the upper surface 216' of the second support member 216*b* and a second tire-engaging device 220*c* connected to the upper surface 216' of the third support member 216*c*.

In reference to the processing sub-station 10 of FIGS. 1A-3J, the plurality of tire-engaging devices 20 may be said to be in a fixed orientation with respect to the upper surface 16' of each of the first, second and third support members 16a, 16b, 16c. However, as will be described in the following disclosure, the plurality of tire-engaging devices 220 of the processing sub-station 200 may be said to be in a non-fixed, moveable orientation with respect to the upper surface 216' of each of the second and third support members 216b, 216c. Further, in comparison the processing sub-station 10, the processing sub-station 200 does not include a tire-engaging device connected to the first support member 216a; accordingly the processing sub-station 200 includes the first and second tire-engaging device 220b, 220c connected to the second and third support members 216b, 216c.

Figure 7B:
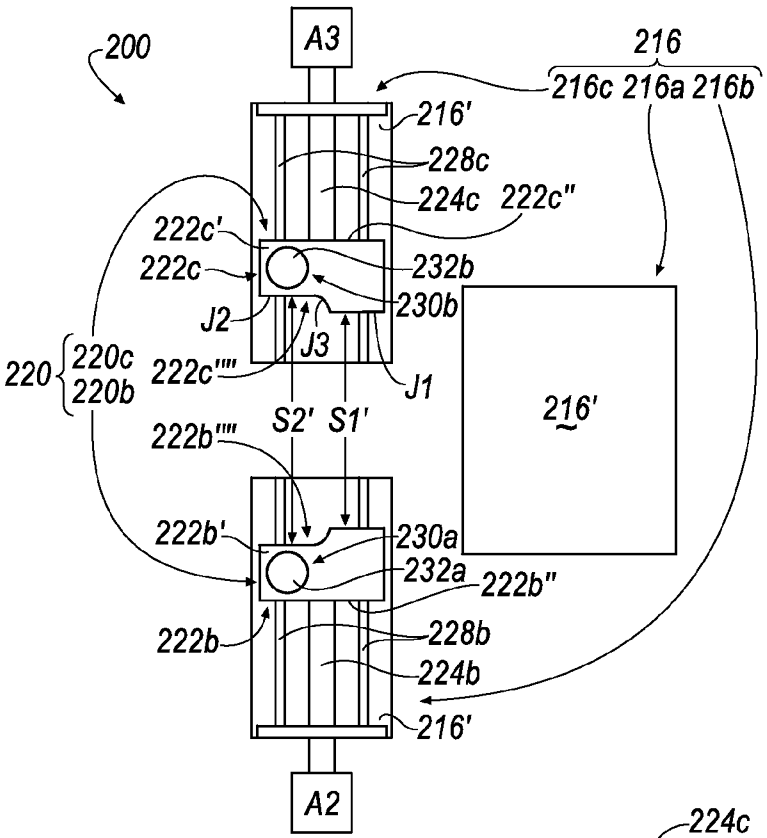
FIG. 7B is a top view of the sub-station of FIG. 7A.
Figure 7C:
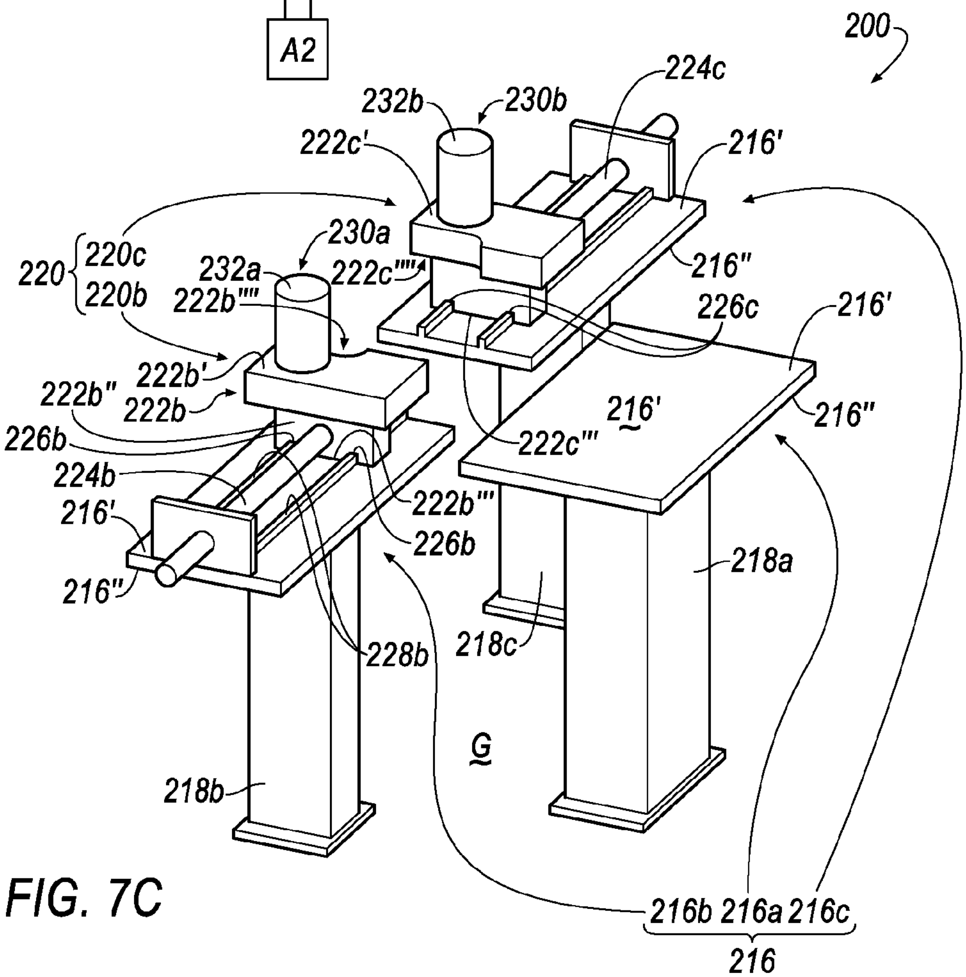
FIG. 7C is a perspective view of a portion of the sub-station of FIG. 7A.

Referring to FIGS. 7B-7C, each of the first and second tire-engaging devices 220b, 220c may include a body 222b, 222c having an upper tire-sidewall-engaging surface 222b', 222c' a rear side surface 222b", 222c" (see, e.g., FIG. 7B), a lower surface 222b'", 222c'" (see, e.g., FIG. 7C) and a side, wheel-circumference-engaging surface 222b"", 222c"". The geometry of the side, wheel-circumference-engaging surface 222b"", 222c"" defines the upper tire-sidewall-engaging surface 222b', 222c' of the first and second tire-engaging devices 220b, 220c to include a substantially "L shape" or "J shape." For example, as seen in FIGS. 7B and 7C, each of the side, wheel-circumference-engaging surfaces 222b"", 222c"" include a first, substantially linear segment, J1, and a second, substantially linear segment, J2, that are connected by a third, substantially arcuate segment, J3.

The upper sidewall-engaging surfaces 222b', 222c' of the first and second tire-engaging devices 220b, 220c may be co-planar with one another. The upper sidewall-engaging surfaces 222b', 222c' of the second and third tire-engaging devices 220b, 220c may be arranged in a spaced-apart relationship with respect to ground, G, that is greater than that of the spaced-apart relationship of the upper surface 216' of the first support member 216a; accordingly, the upper sidewall-engaging surfaces 222b', 222c' of the first and second tire-engaging devices 220b, 220c may be arranged in a non-co-planar relationship with respect to the upper surface 216' of the first support member 216a.

The rear side surface 222b" of the body 222b of the first tire-engaging device 220b may be connected to a first rod 224b. The first rod 224b may be connected to a first actuator, A2. The lower surface 222b'" of the body 222b of the first tire-engaging device 220b may include at least one female recess 226b. The at least one female recess 226b receives at least one male guide member 228b connected to the upper surface 216' of the second support member 116b.

The rear side surface 222c" of the body 222c of the second tire-engaging device 220c may be connected to a second rod 224c. The second rod 224c may be connected to a second actuator, A3. The lower surface 222c'" of the body 222c of the second tire-engaging device 220c may include at least one female recess 226c. The at least one female recess 226c receives at least one male guide member 228c connected to the upper surface 216' of the third support member 216c.

The rods 224b-224c, female recesses 226b-226c and male guide members 228b-228c may assist in or contribute to the movement of the plurality of tire-engaging devices 220 relative the upper surface 216' of each of the second and third support members 216b, 216c. For example, each of the first and second rods 224b, 224c may providing a driving force and/or a reactive force (e.g., by way of a spring) to, respectively, the first, and second tire-engaging devices 220b, 220c, in order to respectively cause or react to forward or backward movement of the first and second tire-engaging devices 220b, 220c. If a spring is part of or included with one or more of the actuators A2, A3, the spring may bias one or more of the first and second rods 224b, 224c to a particular orientation; accordingly, if an object, such as, for example, one or more of the tire, T, and wheel, W, pushes or exerts a force upon one or more of the first and second tire-engaging devices 220b, 220c, the reactive/biasing force may act upon one or more of the first and second tire-engaging devices 220b, 220c in order to regulate movement relative to the upper surface 216' of one or more of the second and third support members 216b, 216c. The female recesses 226b-226c and male guide members 228b-228c may assist in providing linear movement of the first and second tire-engaging devices 220b, 220c relative to the upper surface 216' of the second and third support members 216b, 216c.

With continued reference to FIGS. 7B-7C, a first tire-tread-engaging post 230a may extend from the upper tire-sidewall-engaging surface 222b' of the first tire-engaging device 220b. A second tire-tread-engaging post 230b may extend from the upper tire-sidewall-engaging surface 222c' of the second tire-engaging device 220c. Each of the first and second tire-tread-engaging posts 230a, 230b include an upper tire-sidewall-engaging surface 232a, 232b.

Referring to FIG. 7B, the side, wheel-circumference-engaging surface 222b"", 222c"" of the first and second tire-engaging devices 220b, 200c are separated by a gap or first spacing, S1'. The first tire-tread-engaging post 230a is separated from the second tire-tread-engaging post 230b by a gap or second spacing, S2'. The second spacing, S2', may be greater than the first spacing, S1'. The first spacing, S1', may be approximately equal to, but slightly less than the diameter, $W_D$, of the wheel, W; further, the tire diameter, $T_D$,/central chord, $T_{C2}$, may be greater than the first spacing, S1'. The second spacing, S2', may be approximately equal to the left chord, $T_{C1}$, and the right chord, $T_{C3}$, of the tire, T; further, the tire diameter, $T_D$,/central chord, $T_{C2}$, may be greater than the second spacing, S2'.

Because the first spacing, S1', of the processing sub-station 200 is referenced from the side, wheel-circumference-engaging surface 222b"", 222c"", the first spacing, S1', is different than that of the first spacing, S1, of the processing sub-stations 10, 100. Further, the first spacing, S1', of the processing sub-station is differentiated from the first spacing, S1, of the processing sub-stations 10, 100 due to the fact that the first spacing, S1', is associated with the moveable first and second tire-engaging devices 220b, 220c; accordingly, the first spacing, S1', may be referred to as a "variable" or "adjustable" first spacing, S1'.

The second spacing, S2', of the processing sub-station 200 is substantially similar to the second spacing, S2', of the processing sub-station 100 due to the fact that the first and second tire-engaging devices 220b, 220c are movable (as compared to the second and third tire-engaging devices 120b, 120c of the processing sub-station 100). Accordingly, the second spacing, S2', of the processing sub-station 200 may be referred to as a "variable" or "adjustable" second spacing, S2'.

Figure 8A:
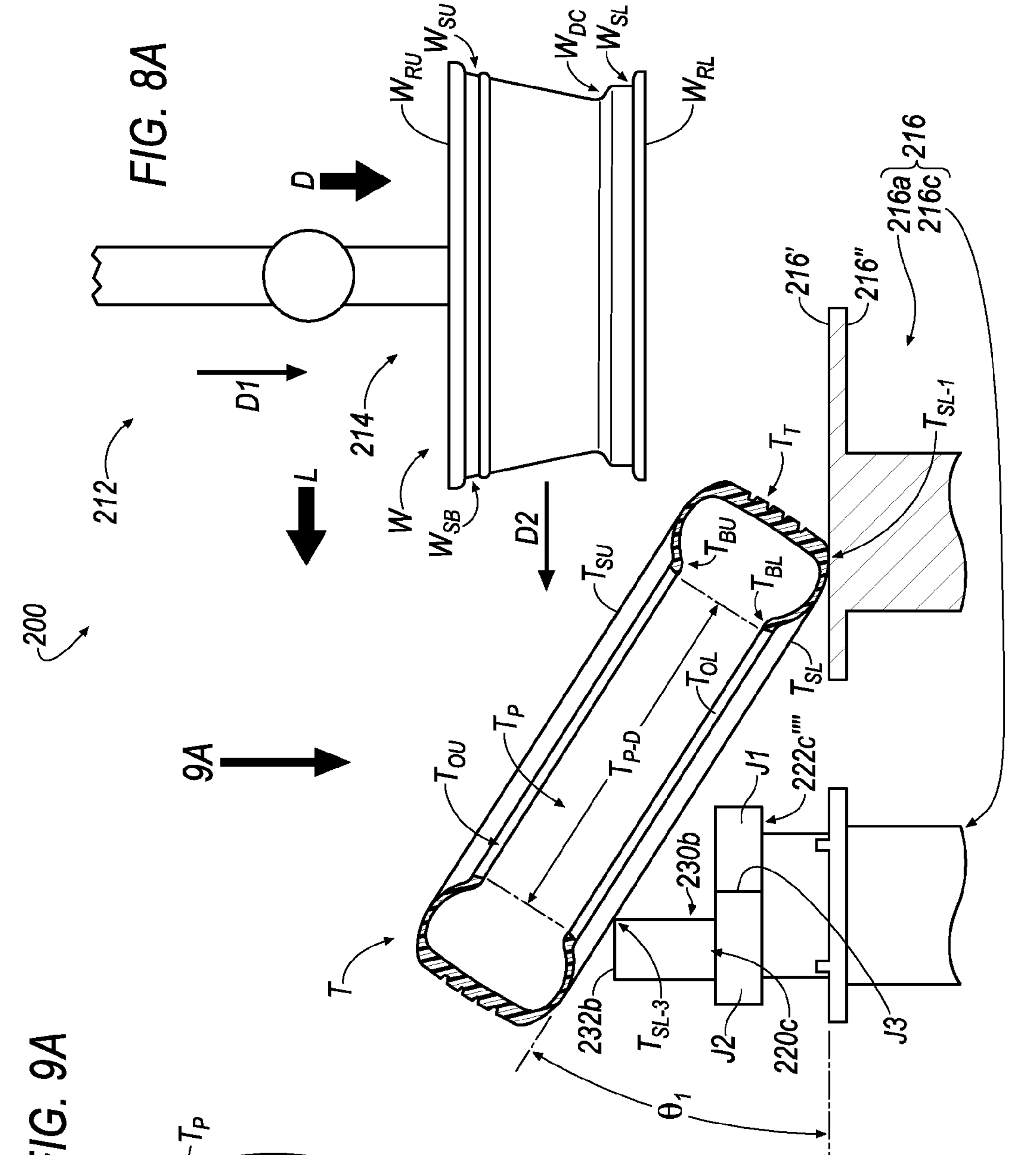
Figure 9A:
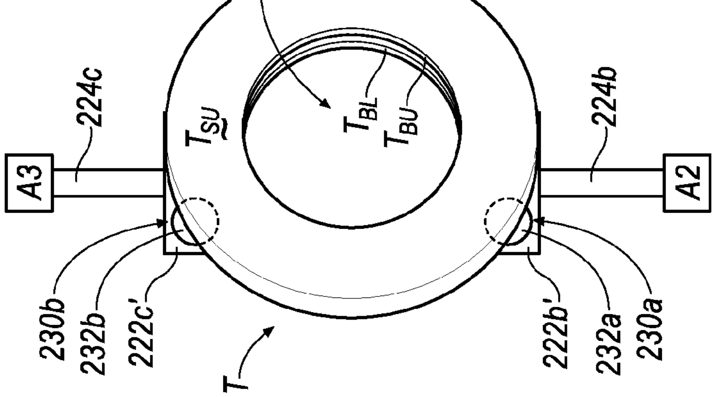

As seen in FIG. 7A with reference to FIGS. 8A and 9A, prior to joining the tire, T, to the wheel, W, the tire, T, may be said to be arranged in a first relaxed, unbiased orientation such that the upper tire opening, $T_{OU}$, and the lower tire opening, $T_{OL}$, define the passage, $T_P$, to include a diameter, $T_{P-D}$. When the tire, T, is joined to the wheel, W (see, e.g., FIGS. 8G and 9G), the upper bead, $T_{BU}$, and the lower bead, $T_{BL}$, may be arranged proximate but not seated adjacent, respectively, the upper bead seat, $W_{SU}$, and the lower bead seat, $W_{SL}$, of the wheel, W; later, upon inflating the tire, T, at, e.g., an inflation sub-station (not shown), the upper bead, $T_{BU}$, and the lower bead, $T_{BL}$, may be seated (i.e., disposed adjacent), respectively, the upper bead seat, $W_{SU}$, and the lower bead seat, $W_{SL}$, of the wheel, W. Further, when the tire, T, is joined to the wheel, W (see, e.g., FIGS. 8G and 9G), the tire, T, may be said to be arranged in a second substantially relaxed, but somewhat biased orientation such that the diameter, $T_{P-D}$, of the passage, $T_P$, is substantially circular and substantially similar to its geometry of the first relaxed, unbiased orientation of the tire, T.

Referring to FIG. 8A, the robotic arm 212 is arranged in a spaced-apart orientation with respect to the support member 216, which includes the tire, T, arranged in a "ready" position. The "ready" position may include a portion of one or more of the lower sidewall surface, $T_{SL}$, and the tread surface, $T_T$, of the tire, T, arranged adjacent the upper surface 216' of the first support member 216*a*. Referring to FIG. 8A, the "ready" position may further include the tire, T, being arranged in a first angularly-offset orientation, $\theta_1$, with respect to the upper surface 116' of the first support member 116*a*.

The first angularly-offset orientation, $\theta_1$, of the tire, T, may result from the non-co-planar relationship the upper sidewall-engaging surfaces 222*b*', 222*c*' of the first and second tire-engaging devices 220*b*, 220*c* with that of the upper surface 216' of the first support member 216*a* such that: (1) the first portion, $T_{SL-1}$, of the lower sidewall surface, $T_{SL}$, being arranged adjacent the upper surface 216' of the first support member 216*a*, (2) the second portion, $T_{SL-2}$, of the lower sidewall surface, $T_{SL}$, being arranged adjacent a portion of the upper tire-sidewall-engaging surface 232*a* of the first tire-tread-engaging post 230*a* of the first tire-engaging device 220*b* (noting that the second portion, $T_{SL-2}$, is not represented in FIG. 8A due to the cross-sectional reference line of FIG. 7A), and (3) a third portion, $T_{SL-3}$, of the lower sidewall surface, $T_{SL}$, being arranged adjacent a portion of the upper tire-sidewall-engaging surface 232*b* of the second tire-tread-engaging post 230*b* of the second tire-engaging device 220*c*. Accordingly, the support member 216 may provide a three-point support (which is more clearly shown at FIG. 7A) at $T_{SL-1}$, $T_{SL-2}$, $T_{SL-3}$ for the lower sidewall surface, $T_{SL}$, of the tire, T, while remaining portions of the lower sidewall surface, $T_{SL}$, of the tire, T, are not in direct contact with any other portion of the upper surface surfaces 216', 232*a*, 232*b* of the support member 216 when the tire, T, is arranged in the first angularly-offset orientation, $\theta_1$.

The processing sub-station 200 may execute a mounting procedure by causing a controller, C (see, e.g., FIG. 7A) to send one or more signals to a motor, M (see, e.g., FIG. 7A), that drives movement (according to the direction of the arrows, D1-D6—see FIGS. 8A-8G) of the robotic arm 212. Alternatively or in addition to automatic operation by the controller, C, according to inputs stored in memory, the movement, D1-D6, may result from one or more of a manual, operator input, O (e.g., by way of a joystick, depression of a button or the like).

As seen in FIG. 8A, a first, down, D, movement according to the direction of arrow, D1, may reduce the spaced-apart orientation of robotic arm 212 with respect to the support member 216. A second movement according to the direction of arrow, D2, may cause the end effecter 214 to move the wheel, W, rearwardly (e.g., to the left, L) toward the tire, T. The movement according to the direction of the arrows, D1, D2, may be conducted separately or simultaneously, as desired.

Figure 8B:
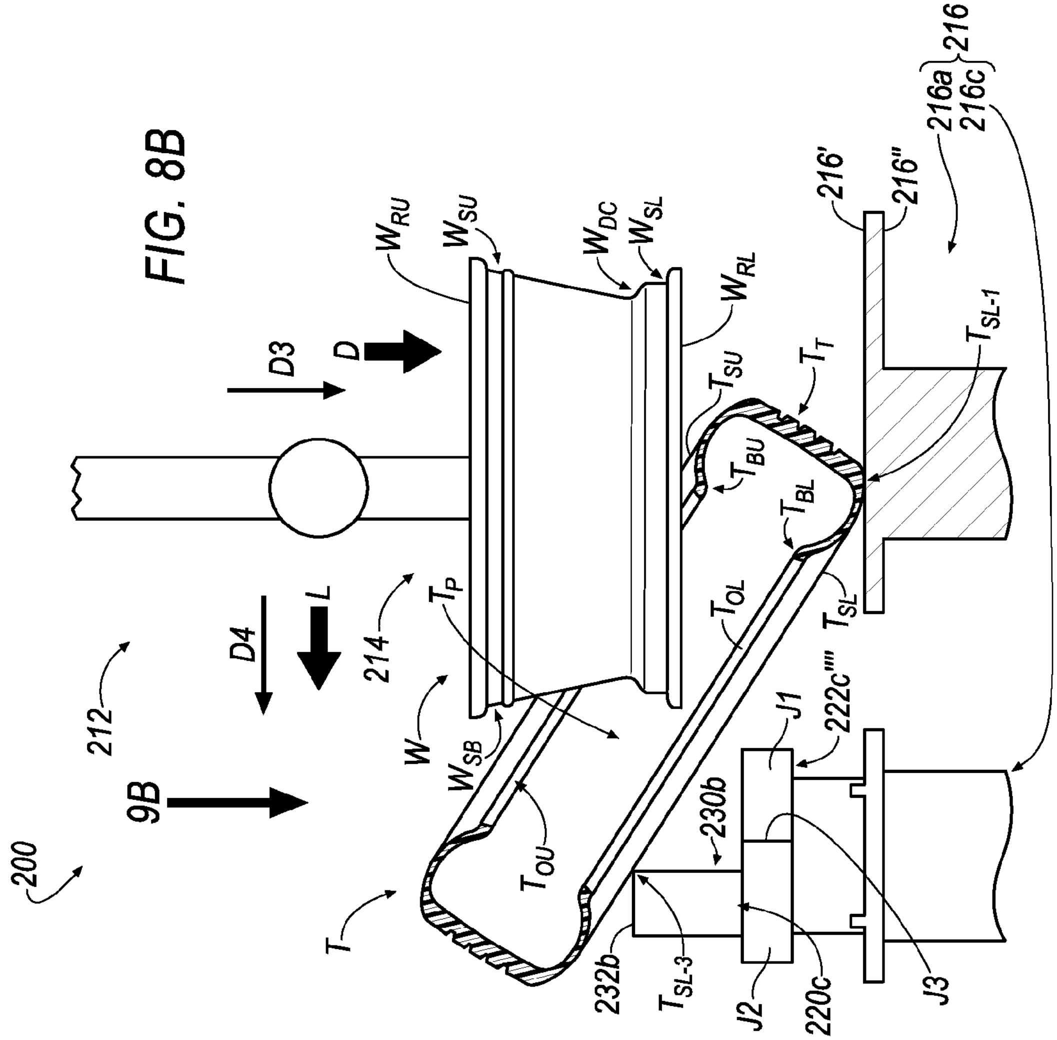
Figure 9B:
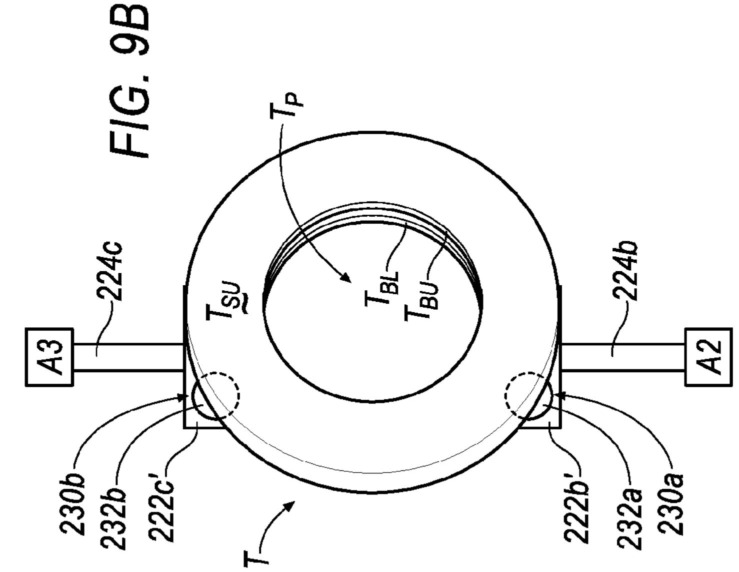

Referring to FIG. 8B, the movement according to the direction of the arrows, D1, D2, may cease upon locating a first (e.g., left) portion of the lower bead seat, $W_{SL}$, and drop center, $W_{DC}$, of the wheel, W, within the passage, $T_P$, of the tire, T. With continued reference to FIG. 8B, a third movement according to the direction of arrow, D3, may cause further downwardly, D, movement of the wheel, W. A fourth movement according to the direction of arrow, D4, may cause further rearwardly (e.g., to the left, L) movement of the wheel, W. The movement according to the direction of the arrows, D3, D4, may be conducted separately or simultaneously, as desired.

Figure 8C:
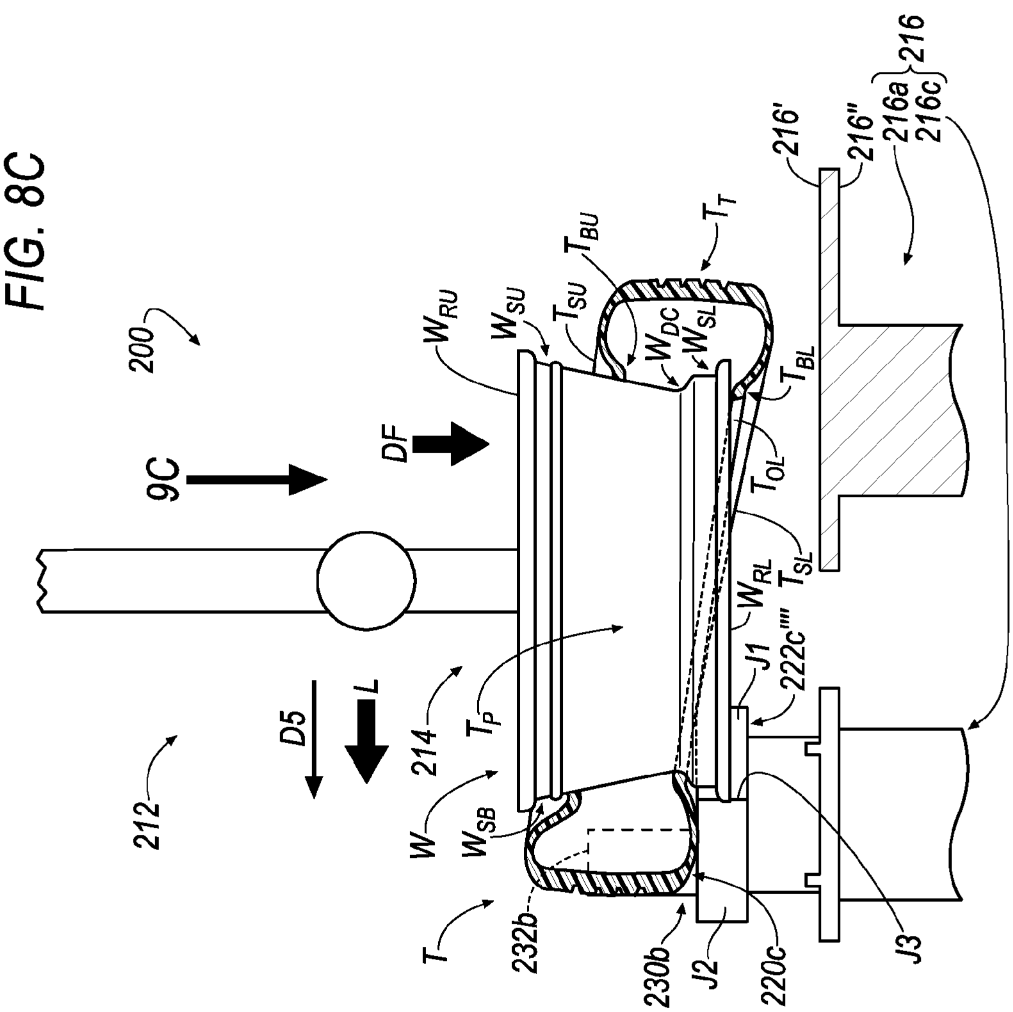

Referring to FIG. 8C, the movement according to the direction of the arrows, D3, D4, may cause the tire, T, to rotate (e.g., in a counter-clockwise direction) as a result of the wheel, W, pushing or exerting a downwardly, D, force upon the tire, T. Accordingly, the portion (e.g., $T_{SL-1}$) of the lower sidewall surface, $T_{SL}$, of the tire, T, is no longer arranged adjacent the upper surface 216' of the first support member 216*a*. Further, as a result of the downwardly, D, force upon the tire, T, the lower sidewall surface, $T_{SL}$, of the tire, T, no longer is arranged adjacent the upper tire-sidewall-engaging surface 232*a*, 232*b* of the first and second tire-tread-engaging posts 230*a*, 230*b*. Thus, the tire, T, may no longer be arranged adjacent the support member 216 at three points of support; rather, the second and third portions (e.g., $T_{SL-2}$, $T_{SL-3}$) that were formerly disposed adjacent the upper tire-sidewall-engaging surface 232*a*, 232*b* of the first and second tire-tread-engaging posts 230*a*, 230*b* are displaced downwardly, D, and contact the upper tire-sidewall-engaging surface 222*b*', 222*c*' of the first and second tire-engaging devices 220*b*, 220*c* to thereby provide two points of support for the lower sidewall surface, $T_{SL}$, of the tire, T. As a result the orientation of the tire, T, being supported upon the upper tire-sidewall-engaging surface 222*b*', 222*c*' of the first and second tire-engaging devices 220*b*, 220*c*, the tire, T, is no longer arranged at the first angularly-offset orientation, $\theta_1$, with respect to the support 216.

Figure 9C:
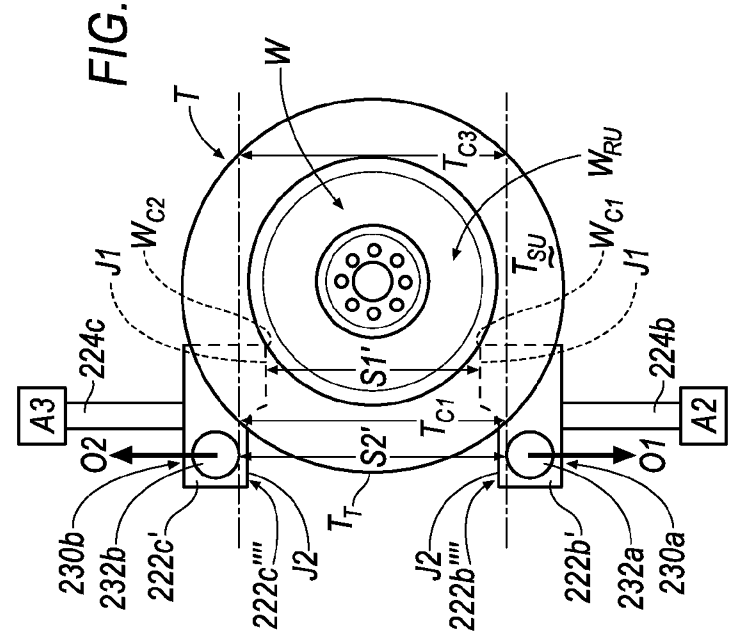
Figure 8D:
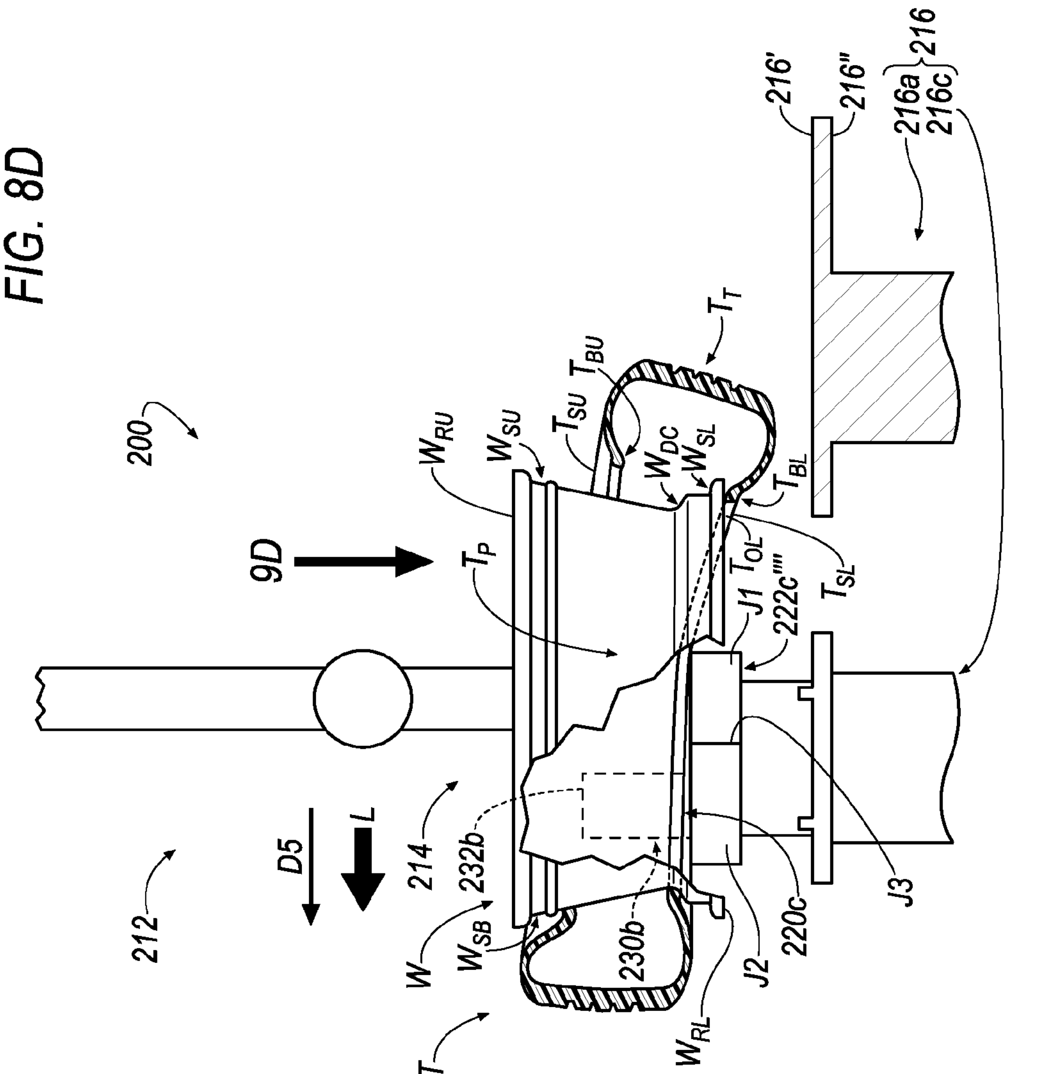

Further, as seen in FIG. 8C, the movement according to the direction of the arrows, D3, D4, may result in the wheel, W, being disposed within the passage, $T_P$, of the tire, T, and partially connected to the tire, T, such that the robotic arm 212 utilizes the wheel, W, to move rearwardly (e.g., to the left, L) such that the tire, T, is moved from the "ready" position to a "partially mounted" position. With reference to FIG. 9C, which is a top view of FIG. 8C, the tread surface, $T_T$, of the tire, T, is arranged proximate, but in a space-apart relationship with respect to the first and second tire-tread-engaging posts 230*a*, 230*b*.

Referring to FIG. 8C, the movement according to the direction of the arrow, D3, D4 results in the wheel, W, "plunging" through the passage, $T_P$, of the tire, T, such that: (1) the first (e.g., left) portion of the lower bead seat, $W_{SL}$, and drop center, $W_{DC}$, of the wheel, W, are orientated out of the passage, $T_P$, of the tire, T, and in a spaced-apart, opposing orientation with the lower sidewall surface, $T_{SL}$, of the tire, T, and (2) a portion (e.g., a right portion) of a lower, outer rim surface, $W_{RL}$, of the wheel, W, (proximate the second (e.g., right) portion of the lower bead seat, $W_{SL}$, and drop center, $W_{DC}$, of the wheel, W), is disposed within the passage, $T_P$, of the tire, T, and adjacent to the second (e.g., right) portion of the lower bead, $T_{BL}$, of the tire, T. Because the gap or first spacing, S1', is approximately equal to but less than the diameter, $T_D$, of the tire, T, the tire, T, is not permitted to move into/through the gap or first spacing, S1', and below the upper tire-sidewall-engaging surface 222*b*', 222*c*' of the body 222*b*, 222*c* of the first and second tire-engaging devices 220*b*, 220*c*.

Further, as seen in FIGS. 8C and 9C, the movement of the robotic arm 212 according to the direction of the arrows, D3, D4 results in a portion of the wheel, W, being arranged between the side, wheel-circumference-engaging surface 222*b*'''', 222*c*'''' of the first and second tire-engaging devices

220$b$, 200$c$ such that a first and second portion, $W_{C1}$, $W_{C2}$, of the circumference, $W_C$, of the wheel, W, respectively engages the side, wheel-circumference-engaging surface 222$b$"", 222$c$"" of the first and second tire-engaging devices 220$b$, 200$c$; further, the wheel, W, may be said to be arranged in the gap or first spacing, S1'. Further, the movement of the robotic arm 212 results in the left tire chord, $T_{C1}$, being arranged proximate but slightly to the right of the first and second tire-tread-engaging posts 230$a$, 230$b$ such that a portion of the tire, T, may be said to be arranged in the gap or second spacing, S2', but not adjacent the first and second tire-tread-engaging posts 230$a$, 230$b$.

As a result of the wheel, W, plunging through the passage, $T_P$, of the tire, T, a first (e.g., left) portion of the safety bead, $W_{SB}$, of the wheel, W, is disposed adjacent the first (e.g., left) portion of the upper bead, $T_{BU}$, of the tire, T. Further, as a result of the arrangement of the safety bead, $W_{SB}$, adjacent the first (e.g., left) portion of the upper bead, $T_{BU}$, of the tire, T, and the arrangement of the portion of the lower, outer rim surface, $W_{R-L}$, of the wheel, W, adjacent the second (e.g., right) portion of the lower bead, $T_{BL}$, of the tire, T, a substantially downwardly force, DF, is transmitted from the robotic arm 212, to the wheel, W, and to the contact points of the wheel, W, with the tire, T, described above at the safety bead, $W_{SB}$, and lower, outer rim surface, $W_{RL}$. The substantially downwardly force, DF, further causes a portion of the lower sidewall surface, $T_{SL}$, of the tire, T, to no longer be spaced-apart, but, adjacent with respect to and in direct contact with the upper surfaces 222', 222$c$' of the first and second tire-engaging devices 220$b$, 220$c$; accordingly, the downwardly force, DF, is distributed from the wheel, W, and to the tire, T, and ultimately arrives at and is distributed to the upper surfaces 222$b$', 222$c$' of the first and second tire-engaging members 220$b$, 220$c$.

With continued reference to FIG. 8C, a fifth movement according to the direction of arrow, D5, may cause a rearwardly (e.g., to the left, L) movement of the wheel, W. Referring to FIG. 5D, as a result of the movement according to the direction of the arrows D1-D5, the lower bead, $T_{BL}$, of the tire, T, is arranged in a curved, substantially arcuate orientation over the sidewall-engaging surface 222$b$', 222$c$' of the body 222$b$, 222$c$ of the first and second tire-engaging devices 220$b$, 220$c$.

Figure 9D:
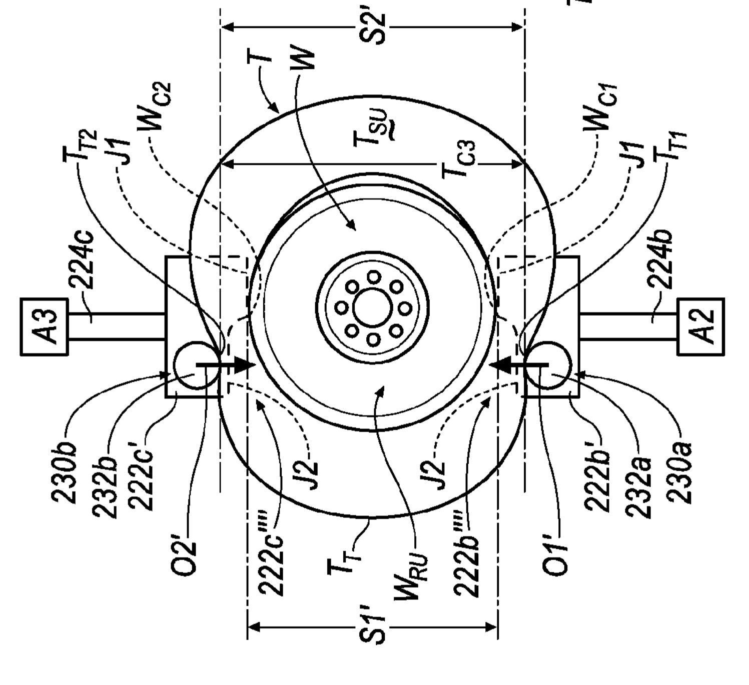
Figure 9F:
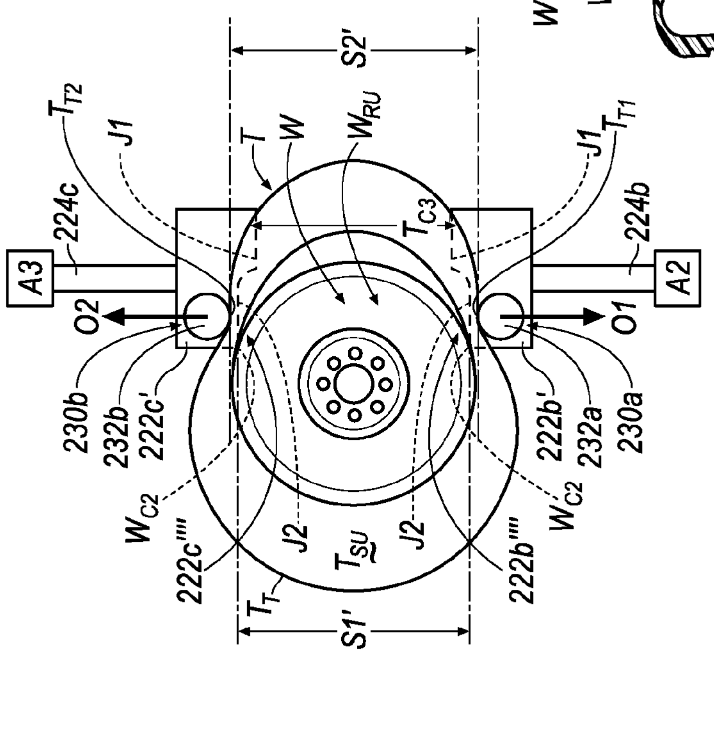

As a result of the initial rearwardly (e.g., to the left, L) movement of the wheel, W, the wheel, W, is advanced through the first spacing, S1', as the tire, T, is advanced through the second spacing, S2', from the left chord, $T_{C1}$, to the right chord, $T_{C3}$. As seen in FIG. 9D-9F, because chords (including, e.g., the central chord, $T_{C2}$) of the tire, T, between the left chord, $T_{C1}$, to the right chord, $T_{C3}$, are greater than that of the left chord, $T_{C1}$, and the right chord, $T_{C3}$, the first and second tire-tread-engaging posts 230$a$, 230$b$ interfere with movement of the tire, T, through the second spacing, S2'. The interference of the first and second tire-tread-engaging posts 230$a$, 230$b$ with the tire, T, includes the contacting of a first tread surface portion, $T_{T1}$, and a second tread surface portion, $T_{T2}$, of the tread surface, $T_T$, of the tire, T, with that of the tire-tread-engaging posts 230$a$, 230$b$.

Further, as a result of the initial rearwardly (e.g., to the left, L) movement of the wheel, W, as seen in FIG. 9D-9F, because the diameter, $W_D$, of the wheel, W, is greater than that of the first spacing, S1', the side, wheel-circumference-engaging surface 222$b$"", 222$c$"" of the first and second tire-engaging devices 220$b$, 200$c$ interfere with movement of the wheel, W, through the first spacing, S1'. The interference of the side, wheel-circumference-engaging surface 222$b$"", 222$c$"" of the first and second tire-engaging devices 220$b$, 200$c$ with the wheel, W, includes the contacting of the first and second portion, $W_{C1}$, $W_{C2}$, of the circumference, $W_C$, of the wheel, W, with that of the side, wheel-circumference-engaging surface 222$b$"", 222$c$"" of the first and second tire-engaging devices 220$b$, 200$c$.

In an embodiment, first and second actuators, A2, A3 may include, for example, motors that may retract/deploy the first and second tire-engaging devices 220$b$, 220$c$ in a manner to provide the (variable) first and second spacings, S1', S2'. Referring to FIGS. 9C-9D, upon the initial rearwardly (e.g., to the left, L) movement of the wheel, W, the first and second portion, $W_{C1}$, $W_{C2}$, of the circumference, $W_C$, of the wheel, W, directly contact the first, substantially linear segment, J1, of the side, wheel-circumference-engaging surface 222$b$"", 222$c$"" of the first and second tire-engaging devices 220$b$, 200$c$; as a result, the first and second actuators, A2, A3, cause the first and second tire-engaging devices 220$b$, 200$c$ to retract and move outwardly (i.e., away from one another) according to the direction of the arrows, O1, O2.

Referring to FIG. 9D, as the wheel, W, is moved rearwardly (e.g., to the left, L), just as the first and second portion, $W_{C1}$, $W_{C2}$, of the circumference, $W_C$, of the wheel, W, cease direct contact of the first, substantially linear segment, J1, of the side, wheel-circumference-engaging surface 222$b$"", 222$c$"" of the first and second tire-engaging devices 220$b$, 220$c$, the first and second actuators, A2, A3, cause the first and second tire-engaging devices 220$b$, 200$c$ to deploy and move inwardly (i.e., toward one another) according to the direction of the arrows, O1', O2', which is opposite the direction of the arrows, O1, O2. Referring to FIG. 9E, as a result of further rearwardly (e.g., to the left, L) movement of the wheel, W, and, as a result of the deployment, according to the direction of the arrows, O1', O2', of the first and second tire-engaging devices 220$b$, 200$c$, the first and second portion, $W_{C1}$, $W_{C2}$, of the circumference, $W_C$, of the wheel, W, directly contact the second, substantially linear segment, J2, of the side, wheel-circumference-engaging surface 222$b$"", 222$c$"" of the first and second tire-engaging devices 220$b$, 200$c$.

Figure 9G:
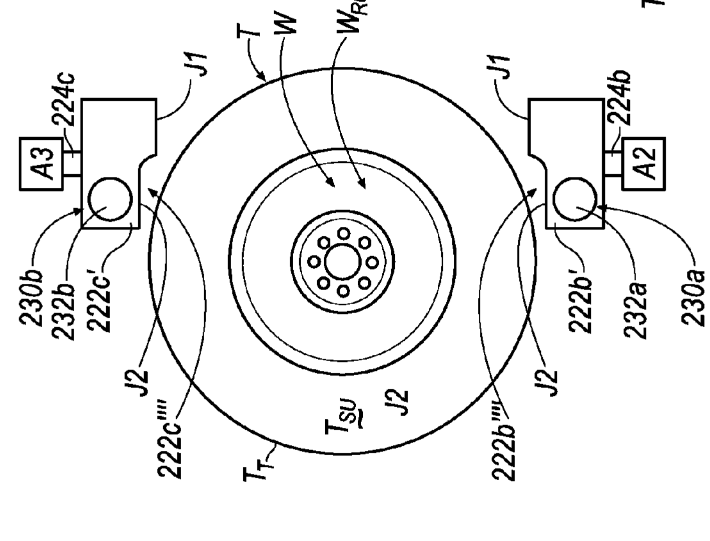

Referring to FIG. 9F, as the wheel, W, is moved rearwardly (e.g., to the left, L), just as the first and second portion, $W_{C1}$, $W_{C2}$, of the circumference, $W_C$, of the wheel, W, cease direct contact of the second, substantially linear segment, J2, of the side, wheel-circumference-engaging surface 222$b$"", 222$c$"" of the first and second tire-engaging devices 220$b$, 220$c$, the first and second actuators, A2, A3, cause the first and second tire-engaging devices 220$b$, 200$c$ to retract and move outwardly (i.e., in opposite directions) according to the direction of the arrows, O1, O2, which is opposite the direction of the arrows, O1', O2'. Referring to FIG. 9G, as a result of further rearwardly (e.g., to the left, L) movement of the wheel, W, and, as a result of the retraction, according to the direction of the arrows, O1, O2, of the first and second tire-engaging devices 220$b$, 220$c$, the first and second portion, $W_{C1}$, $W_{C2}$, of the circumference, $W_C$, of the wheel, W, no longer contact the second, substantially linear segment, J2, of the side, wheel-circumference-engaging surface 222$b$"", 222$c$"".

During the contact of the side, wheel-circumference-engaging surface 222$b$"", 222$c$"" of the first and second tire-engaging devices 220$b$, 200$c$ with the wheel, W, as described above, the tire, T, is concurrently advanced through the second spacing, S2'. Although each of the first and second tire-tread-engaging posts 230$a$, 230$b$ is concurrently moved with its corresponding side, wheel-circumference-engaging surface 222$b$"", 222$c$"", the second spacing S2', includes a geometry that results in interference with the tire, T, in order to cause the first and second tire-tread-engaging posts 230$a$, 230$b$ to press the tire, T, radially inwardly in a manner such that the tire, T, is temporality deformed. As a result of the tire, T, being deformed, the diameter, $T_{P-D}$, of the passage, $T_P$, of the tire, T, is temporality upset to include a substantially oval form rather than a circular form. Accordingly, in a substantially similar fashion, the upper tire opening diameter, $T_{OU-D}$, and the lower tire opening diameter, $T_{OL-D}$, are also temporality upset to include a substantially oval form rather than a circular form.

The oval form of the upper tire opening diameter, $T_{OU-D}$, and the lower tire opening diameter, $T_{OL-D}$, reduces a portion of contact (and, as a result, friction) of the lower bead, $T_{BL}$, and the upper bead, $T_{BU}$, of the tire, T, with that of the outer circumferential surface, $W_C$, of the wheel, W. Accordingly, referring to FIGS. 8D-8F and 9D-9F, as the wheel, W, advances the tire, T, through the second spacing, S2', the oval deformation of diameters, $T_{P-D}$, $T_{OU-D}$, $T_{OL-D}$ results in the lower bead, $T_{BL}$, of the tire, T, encountering less resistance or interference with the outer rim surface, $W_{RL}$, of the wheel, W, as the lower bead, $T_{BL}$, is advanced from the outer rim surface, $W_{RL}$, over the lower bead seat, $W_{SL}$, and to a final position adjacent the drop center, $W_{DC}$, of the wheel, W, as the tire, T, is advanced from the forwardly orientation (e.g., to the right, R) of the first and second tire-tread-engaging posts 230*a*, 230*b* to a rearwardly orientation (e.g., to the left, L) of the first and second tire-tread-engaging posts 230*a*, 230*b*.

Figure 8F:
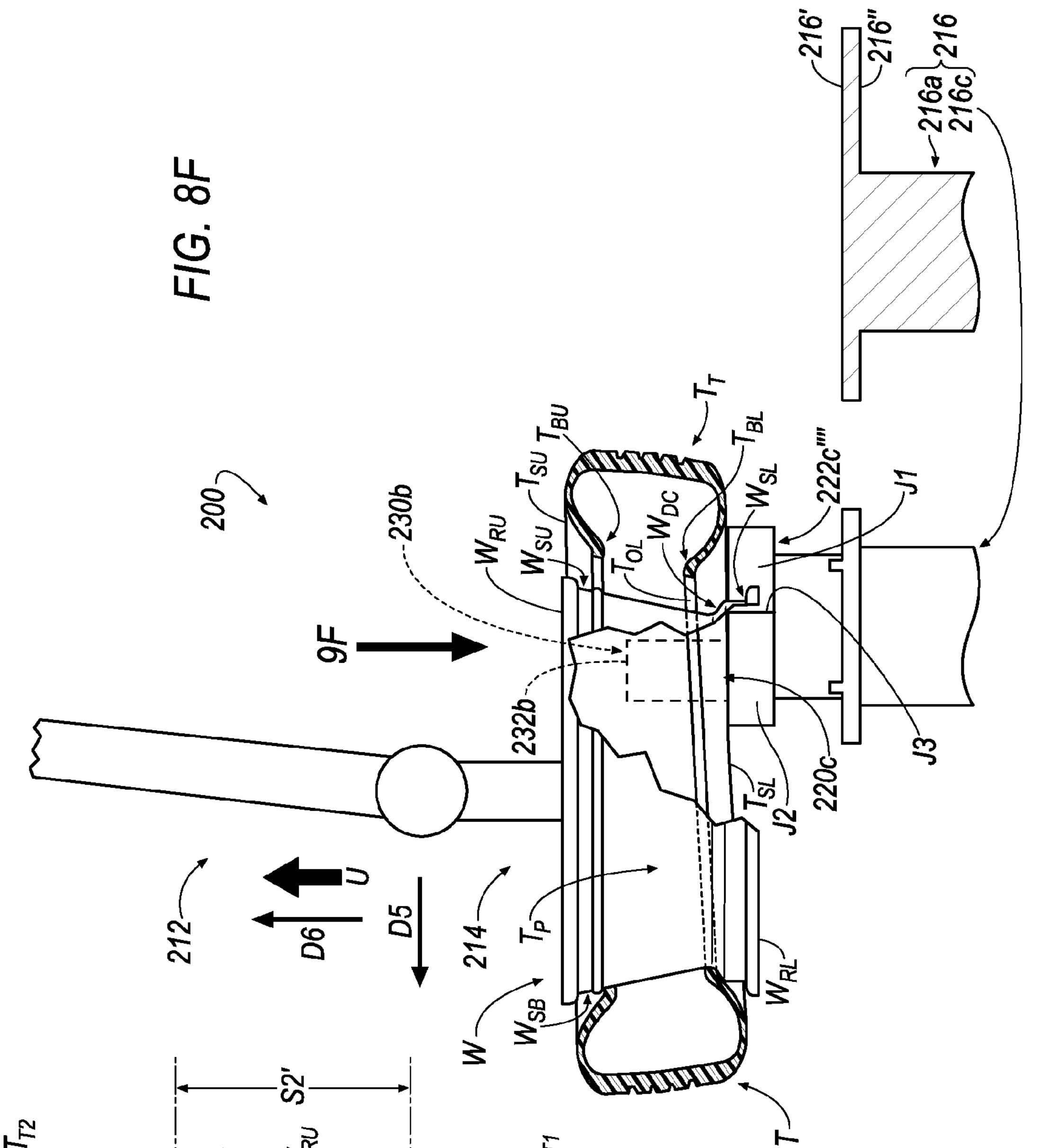

Referring to FIGS. 8F and 9F, once the central chord, $T_{C2}$, or the right chord, $T_{C3}$, has been advanced through the second spacing, S2' (and, just as the first and second portion, $W_{C1}$, $W_{C2}$, of the circumference, $W_C$, of the wheel, W, cease direct contact of the second, substantially linear segment, J2, of the side, wheel-circumference-engaging surface 222*b*'''', 222*c*'''' of the first and second tire-engaging devices 220*b*, 220*c*), the motors, A2, A3, may be actuated in order to retract the first and second tire-engaging devices 220*b*, 220*c* such that the first and second tire-tread-engaging posts 230*a*, 230*b* are correspondingly moved outwardly according to the direction of the arrows, O1, O2. Accordingly, as seen in FIG. 9G, the first and second tire-tread-engaging posts 230*a*, 230*b* may no longer contact the tread surface, $T_T$, of the tire, T. Further, as seen in FIG. 8G, as a result of the movement of the wheel, W, and tire, T, through the spacing, S2', the entire circumference of the lower bead, $T_{BL}$, is advanced to its final "mounted position" adjacent to and about the drop center, $W_{DC}$; further, the entire circumference of the upper bead, $T_{BU}$, is arranged in its final "mounted position" adjacent to and about the outer circumferential surface, $W_C$, of the wheel, W, proximate the safety bead, $W_{SB}$.

Figure 8G:
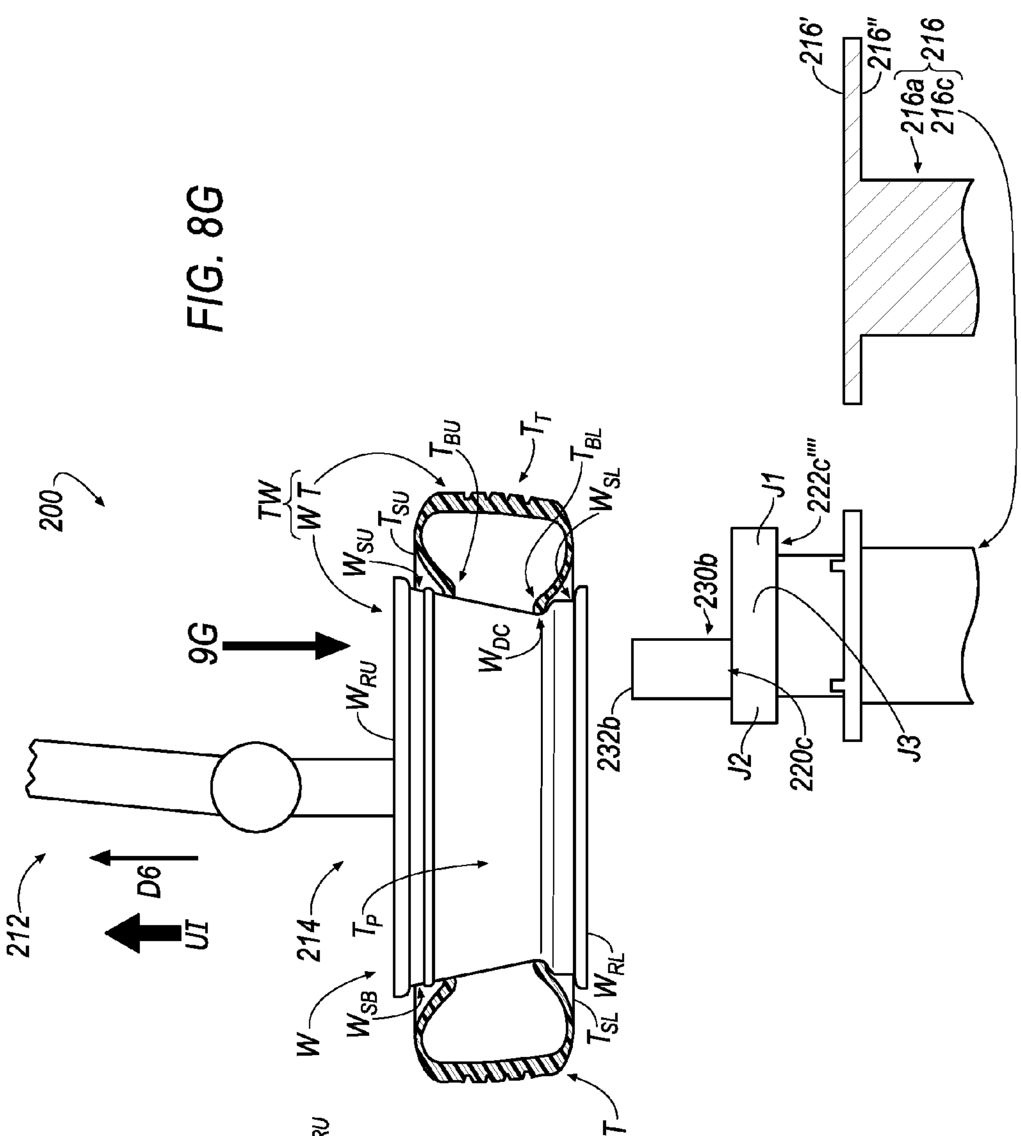

With reference to FIGS. 8F-8G, a sixth movement according to the direction of arrow, D6, may cause upwardly movement, U, of the wheel, W, and tire, T, away from the support member 216. The robotic arm 212 may move the tire-wheel assembly, TW, to, for example, a subsequent sub-station (not shown), such as, for example, an inflation sub-station in order to inflate the tire-wheel assembly, TW, which may cause the upper bead, $T_{BU}$, to be seated adjacent the upper bead seat, $W_{SU}$, and the lower bead, $T_{BL}$, to be seated adjacent the lower bead seat, $W_{SL}$.

Figure 10A:
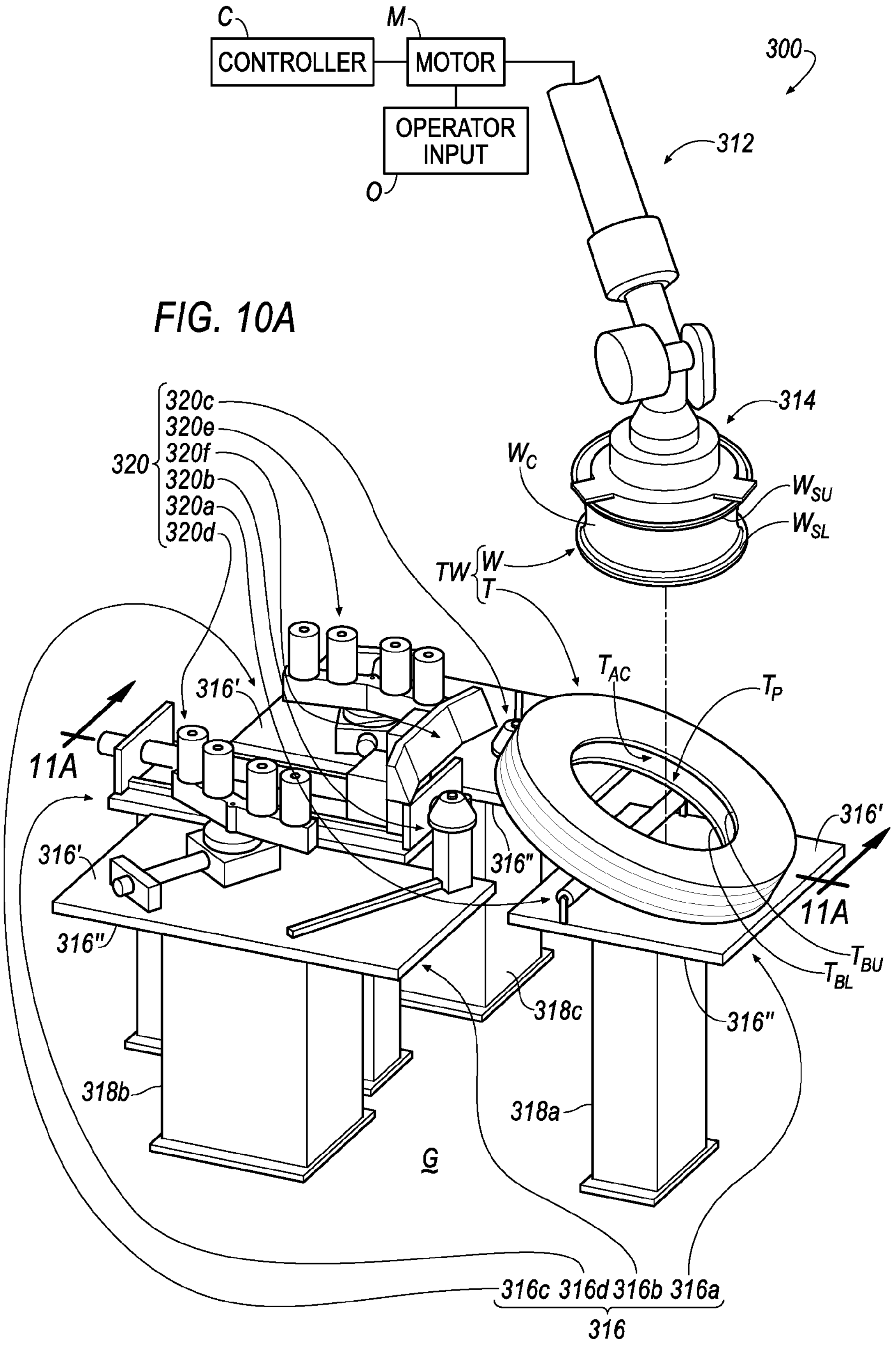
FIG. 10A is a perspective view of a sub-station for processing a tire and a wheel in accordance with an exemplary embodiment of the invention.

Referring to FIG. 10A, a processing sub-station 300 for processing a tire-wheel assembly, TW, is shown according to an embodiment. The "processing" conducted by the processing sub-station 300 may include the act of "joining" or "mounting" a tire, T, to a wheel, W, for forming the tire-wheel assembly, TW. The act of "joining" or "mounting" may mean to physically couple, connect or marry the tire, T, and wheel, W, such that the wheel, W, may be referred to as a male portion that is inserted into a passage, $T_P$, of a tire, T, being a female portion.

As described and shown in the following Figures, although the desired result of the processing sub-station 300 is the joining or mounting of the tire, T, and wheel, W, to form a tire-wheel assembly, TW, it should be noted that the processing sub-station 300 does not inflate the circumferential air cavity, $T_{AC}$, of the tire, T, of the tire-wheel assembly, TW, nor does the processing sub-station 300 contribute to an act of "seating" the upper bead, $T_{BU}$, or the lower bead, $T_{BL}$, of the tire, T, adjacent the upper bead seat, $W_{SU}$, and the lower bead seat, $W_{SL}$, of the wheel, W (because the act of "seating" typically arises from an inflating step where the tire-wheel assembly, TW, is inflated). Accordingly, upon joining or mounting the tire, T, to the wheel, W, the upper bead, $T_{BU}$, or the lower bead, $T_{BL}$, of the tire, T, may be arranged about and/or disposed adjacent the outer circumferential surface, $W_C$, of the wheel, W.

In an implementation, the processing sub-station 300 may be included as part of a "single-cell" workstation. A single-cell workstation may include other sub-stations (not shown) that contribute to the processing of a tire-wheel assembly, TW; other sub-stations may include, for example: a soaping sub-station, a stemming sub-station, an inflating sub-station, a match-marking sub-station, a balancing sub-station and the like. The term "single-cell" indicates that the sub-stations contribute to the production of a tire-wheel assembly, TW, without requiring a plurality of successive, discrete workstations that may otherwise be arranged in a conventional assembly line such that a partially-assembled tire-wheel assembly, TW, is "handed-off" along the assembly line (i.e., "handed-off" meaning that an assembly line requires a partially-assembled tire-wheel assembly, TW, to be retained by a first workstation of an assembly line, worked on, and released to a subsequent workstation in the assembly line for further processing). Rather, a single cell workstation provides one workstation having a plurality of sub-stations each performing a specific task in the process of assembling a tire-wheel assembly, TW. This assembling process takes place wherein the tire and/or wheel "handing-off" is either minimized or completely eliminated. As such, a single-cell workstation significantly reduces the cost and investment associated with owning/renting the real estate footprint associated with a conventional tire-wheel assembly line while also having to provide maintenance for each individual workstation defining the assembly line. Thus, capital investment and human oversight is significantly reduced when a single cell workstation is employed in the manufacture of tire-wheel assemblies, TW.

Referring to FIG. 10A, the processing sub-station 300 includes a device 312. The device 312 may be referred to as a robotic arm. The robotic arm 312 may be located in a substantially central position relative to a plurality of sub-stations (including, e.g., the processing sub-station 300) of a single-cell workstation. The robotic arm 312 may be attached to and extend from a base/body portion (not shown) connected to ground, G.

The robotic arm 312 may include an end effecter 314. The end effecter 314 may include a claw, gripper, or other means for removably-securing the wheel, W, to the robotic arm 312. The end effecter 314 permits the robotic arm 312 to have the ability to retain and not release the wheel, W, throughout the entire procedure performed by the processing sub-station 300 (and, if applied in a single-cell workstation, the ability to retain and not release the wheel, W, throughout the entire assembling procedure of the tire-wheel assembly, TW). Accordingly, the end effecter 314 minimizes or eliminates the need of the robotic arm 312 to "hand-off" the tire-wheel assembly, TW, to (a) subsequent sub-station(s) (not shown).

The processing sub-station 300 may perform several functions/duties including that of: (1) a tire repository sub-station and (2) a mounting sub-station. A tire repository sub-station typically includes one or more tires, T, that may be arranged in a "ready" position for subsequent joining to a wheel, W. A mounting sub-station typically includes structure that assists in the joining of a tire, T, to a wheel, W (e.g., the disposing of a wheel, W, within the passage, $T_P$, of the tire, T).

Referring to FIG. 10A, the processing sub-station 300 may be initialized by joining a wheel, W, to the robotic arm 312 at the end effecter 314. The processing sub-station 300 may also be initialized by positioning the tire, T, upon a support member 316. The support member 316 may include a first support member 316*a*, a second support member 316*b*, a third support member 316*c* and fourth support member 316*d*. Each of the first, second, third and fourth support members 316*a*, 316*b*, 316*c*, 316*d* include an upper surface 316' and a lower surface 316''. In the illustrated embodiment of FIG. 10A, the tire, T, may be arranged upon the first support member 316*a*.

The lower surface 316'' of each of the first, second, third and fourth support members 316*a*, 316*b*, 316*c*, 316*d* may be respectively connected to at least one first leg member 318*a*, at least one second leg member 318*b*, at least one third leg member 318*c* and at least one fourth leg member 318*d*. Each of the at least one first, second, third and fourth leg members 318*a*, 318*b*, 318*c*, 318*d* respectively include a length for elevating or spacing each of the first, second, third and fourth support members 316*a*, 316*b*, 316*c*, 316*d* from an underlying ground surface, G. Although the robotic arm 312 is not directly connected to the support member 316 (but, rather may be connected to ground, G), the robotic arm 312 may be said to be interfaceable with (as a result of the movements D1-D3 described in the following disclosure) and/or indirectly connected to the support member 316 by way of a common connection to ground, G, due the leg members 318*a*-318*d* connecting the support member 316 to ground, G.

The processing sub-station 300 may further include a plurality of tire-engaging devices 320. The plurality of tire-engaging devices 320 may include a first tire-engaging device 320*a* connected to the upper surface 316' of the first support member 316*a*, a second tire-engaging device 320*b* connected to the upper surface 316' of the second support member 316*b*, a third tire-engaging device 320*c* connected to the upper surface 316' of the third support member 316*c*, a fourth tire-engaging device 320*d* connected to the upper surface 316' of the second support member 316*b*, a fifth tire-engaging device 320*e* connected to the upper surface 316' of the third support member 316*c* and a sixth tire-engaging device 320*f* connected to the upper surface 316' of the fourth support member 316*d*.

In reference to the processing sub-station 10 of FIGS. 1A-3J, the plurality of tire-engaging devices 20 may be said to be in a fixed orientation with respect to the upper surface 16' of each of the first, second and third support members 16*a*, 16*b*, 16*c*. However, as will be described in the following disclosure, one or more of the plurality of tire-engaging devices 320 of the processing sub-station 300 may be said to be in a non-fixed, moveable orientation with respect to the upper surface 316' of one or more of the first, second, third and fourth support members 316*a*-316*d*.

Figure 10B:
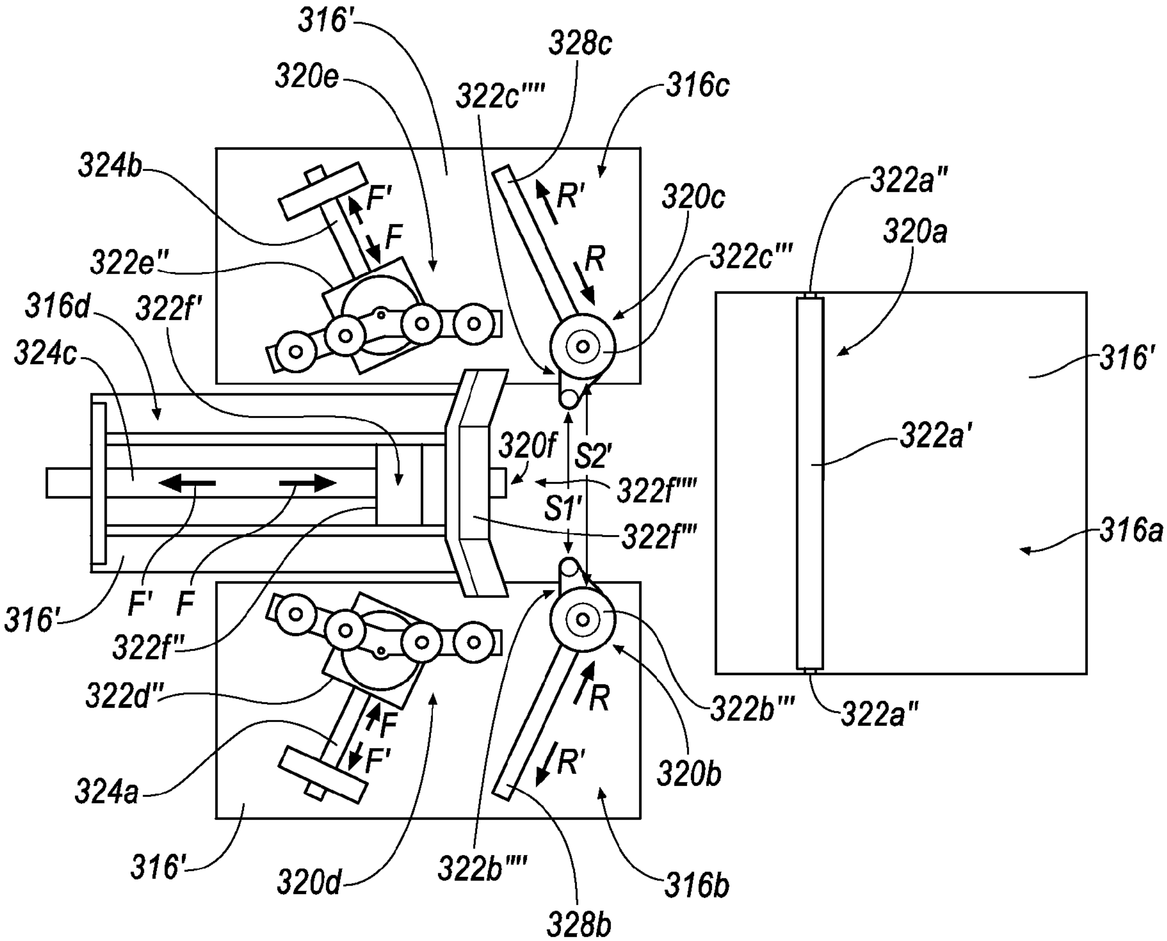
FIG. 10B is a top view of the sub-station of FIG. 10A.
Figure 10C:
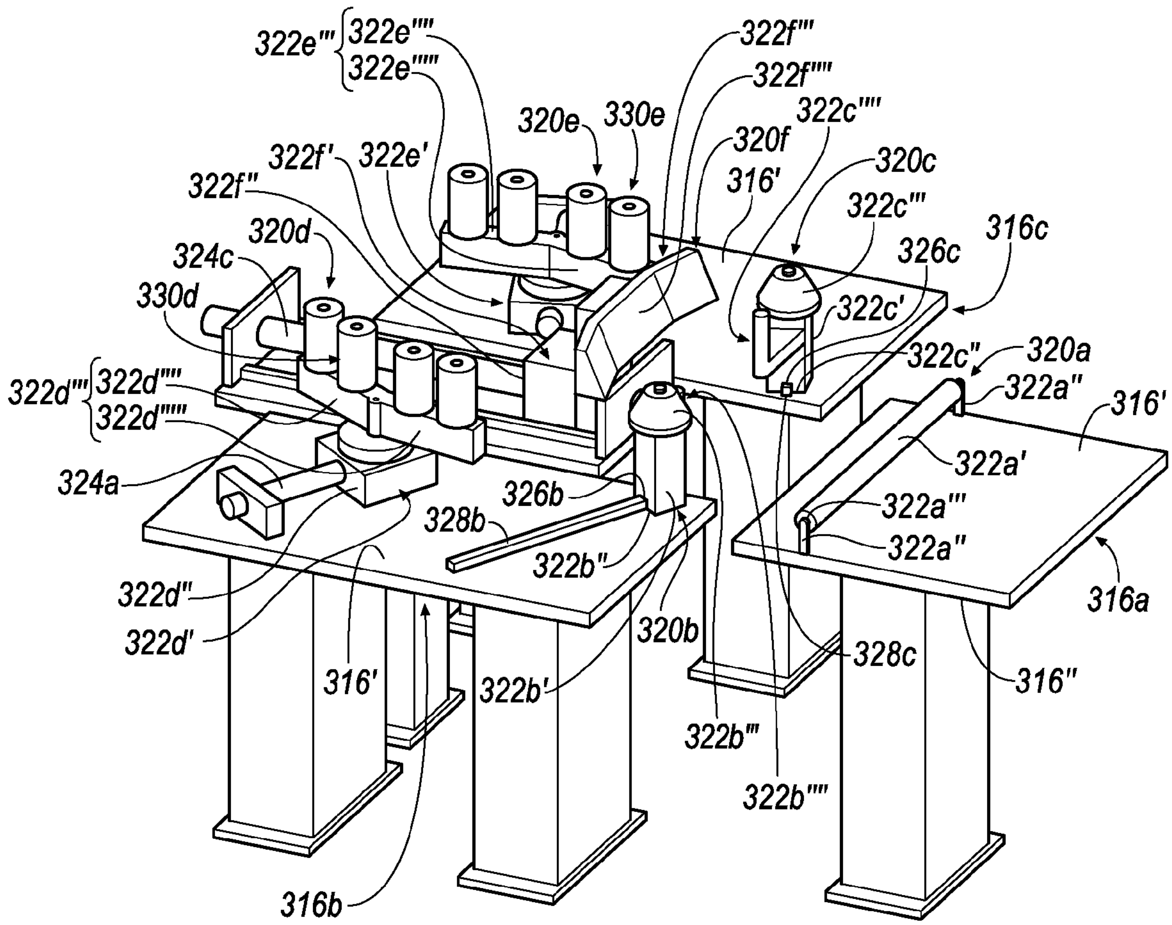
FIG. 10C is a perspective view of a portion of the sub-station of FIG. 10A.

Referring to FIGS. 10B-10C, the first tire-engaging device 320*a* includes a substantially cylindrical body 322*a'* that is supported by one or more brackets 322*a''*. The one or more brackets 322*a''* may support the substantially cylindrical body 322*a'* at a distance away from the upper surface 316' of the first support member 316*a*. The one or more brackets 322*a''* may include a pair of brackets. The substantially cylindrical body 322*a'* may be a tubular body having an axial passage.

A central pin 322*a'*41 may be disposed within the axial passage. The central pin 322*a'''* may be connected and fixed to the pair of brackets 322*a''*; accordingly, the substantially tubular, cylindrical body 322*a'* may be movably-disposed about the central pin 322*a'''* such that the substantially tubular, cylindrical body 322*a'* is permitted to move in a rotating/rolling motion relative to a fixed orientation of the central pin 322*a'''*. Alternatively, the substantially cylindrical body 322*a'* may not include an axial passage and may rotatably-connected-to or non-movably-fixed-to the pair of brackets 322*a''*.

Referring to FIGS. 10B-10C, each of the second and third tire-engaging devices 320*b*, 320*c* may include a tire tread engaging post/body 322*b'*, 322*c'* having a lower surface 322*b''*, 322*c''* including at least one female recess 326*b*, 326*c*. The at least one female recess 326*c*, 326*c* receives at least one male guide member 328*b*, 328*c* connected to the upper surface 316' of each of the second and third support members 316*b*, 316*c*. Accordingly, as will be explained in the following disclosure, upon one or more of the tire, T, and the wheel, W, contacting the second and third tire-engaging devices 320*b*, 320*c*, the tire tread engaging post/body 322*b'*, 322*c'* may be slidably-moved relative to the upper surface 316' and along the male guide member 328*b*, 328*c* in a repeatable, controlled fashion.

The tire tread engaging post/body 322*b'*, 322*c'* may further include an upper, tire-sidewall-engaging surface 322*b'''*, 322*c'''* and a laterally-extending wheel-engaging portion 322*b''''*, 322*c''''*. The upper tire-sidewall-engaging surface 322*b'''*, 322*c'''* may include a substantially conical geometry and may be rotatably-disposed relative to a non-rotatable, but slidable orientation with respect to the tire tread engaging post/body 322*b'*, 322*c'*. The laterally-extending wheel-engaging portion 322*b''''*, 322*c''''* may include a substantially L-shaped member that is fixed to a lateral side surface of the tire tread engaging post/body 322*b'*, 322*c'*. The laterally-extending wheel-engaging portions 322*b''''*, 322*c''''* may be arranged directly facing one another in an opposing, spaced-apart relationship; further, as seen in FIGS. 10B-10C, each tire tread engaging post/body 322*b'*, 322*c'* may be arranged in a default orientation near an end of each male guide member 328*b*, 328*c* such that the laterally-extending wheel-engaging portions 322*b''''*, 322*c''''* are spaced apart at a distance that is less than the diameter, $W_D$, of the wheel, W.

Referring to FIGS. 10B-10C, each of the fourth and fifth tire-engaging devices 320*d*, 320*e* may include a body 322*d'*, 322*e'* having a side surface 322*d''*, 322*e''* connected, respectively, to a first rod 324*a* and a second rod 324*b*. The first rod 324*a* may be connected to a first actuator, A1 (see, e.g., FIGS. 12A-12I), and, the second rod 324*b* may be connected to a second actuator, A2 (see, e.g., FIGS. 12A-12I). As will be explained in the following disclosure, the actuators A1, A2, may push or pull the body 322*d'*, 322*e'* such that the body 322*d'*, 322*e'* is movably-disposed relative to the upper surface 316' of each of the second and third support members 316*b*, 316*c* in a repeatable, controlled fashion.

The body 322*d'*, 322*e'* may further include a tire-tread-surface-engaging member 322*d'''*, 322*e'''*. The tire-tread-surface-engaging member 322*d'''*, 322*e'''* may be movably-connected to an upper surface of the body 322*d'*, 322*e'* such that the tire-tread-surface-engaging member 322*d'''*, 322*e'''* is permitted to rotate or swivel relative to the body 322*d'*, 322*e'*.

The tire-tread-surface-engaging member 322*d'''*, 322*e'* may include a first linear segment 322*d''''*, 322*e''''* and a second linear segment 322*d'''''*, 322*e'''''* that are arranged to form an obtuse angle. Although the tire-tread-surface-engaging member 322*d*''', 322*e*''' may include a first linear segment 322*d*'''', 322*e*'''' and a second linear segment 322*d*''''', 322*e*''''' forming an obtuse angle, the tire-tread-surface-engaging member 322*d*''', 322*e*''' may include one curved segment having an arc shape (i.e., the tire-tread-surface-engaging member 322*d*''', 322*e*''' may be alternatively referred to as an arcuate segment).

Each tire-tread-surface-engaging member 322*d*''', 322*e*''' may include an array of tire-tread-engaging posts 330*d*, 330*e*. In an embodiment, each tire-tread-surface-engaging member 322*d*''', 322*e*''' may include four tire-tread-engaging posts 330*d*, 330*e* comprising a first pair of posts 330*d*, 330*e* arranged upon the first linear segment 322*d*'''', 322*e*'''' and a second pair of posts arranged upon the second linear segment 322*d*''''', 322*e*'''''. One or more of each of the tire-tread engaging posts 330*d*, 330*e* may rotate relative to the first/second linear segment 322*d*'''', 322*e*''''/322*d*''''', 322*e*'''''; rotation of one or more of the tire-tread engaging posts 330*d*, 330*e* relative to the first/second linear segment 322*d*'''', 322*e*''''/322*d*''''', 322*e*''''' may occur upon contact of the tread surface, $T_T$, of the tire, T, with the one or more of the tire-tread engaging posts 330*d*, 330*e*.

Referring to FIGS. 10B-10C, the sixth tire-engaging device 320*f* may include a body 322*f*' having a side surface 322*f*''' connected to a third rod 324*c*. The third rod 324*c* may be connected to a third actuator, A3 (see, e.g., FIGS. 12A-12I). As will be explained in the following disclosure, the actuator, A3, may push or pull the body 322*f*' such that the body 322*f*' is movably-disposed relative to the upper surface 316' of the fourth support member 316*d* in a repeatable, controlled fashion.

The body 322*f*' may further include a tire-tread-surface-engaging member 322*f*'''. The tire-tread-surface-engaging member 322*f*''' may be fixed to an upper surface of the body 322*f*' in a non-rotatable fashion.

The tire-tread-surface-engaging member 322*f*''' may form a cradle 322*f*'''' formed by first, second and third linear segments. Although the cradle 322*f*'''' may include first, second and third linear segments, the cradle 322*f*'''' may include one curved segment having an arc shape (i.e., the cradle 322*f*'''' may be alternatively referred to as an arcuate or C-shaped cradle).

Referring to FIG. 10B, the actuators, A1-A3 (not shown), and rods 324*a*-324*c* may assist in or contribute to the movement of the fourth, fifth and sixth tire-engaging devices 320*d*-320*f* relative the upper surface 316' of each of the second, third and fourth support members 316*b*-316*d* by way of a push or pull driving force, F/F', whereas movement of the second and third tire-engaging devices 320*b*, 320*c* may be regulated/biased with a reactive force, R (by way of, e.g., a spring, not shown). Accordingly, if an object, such as, for example, one or more of the tire, T, and wheel, W, pushes or exerts a force upon one or more of the second and third tire-engaging devices 320*b*-320*c*, the reactive/biasing force, R, may permit, but resist, movement (in a direction according to arrow, R', that is opposite the direction of the reactive force, R) relative to the upper surface 316' of the second and third support members 316*b*-316*c*. Although one or more of an actuator and a rod is/are not shown connected to the second and third tire-engaging devices 320*b*, 320*c*, an actuator and/or rod may be coupled to the second and third tire-engaging devices 320*b*, 320*c* to permit a similar movement as described above with respect to the fourth, fifth and sixth tire-engaging devices 320*d*-320*f*.

Referring to FIG. 10B, the laterally-extending wheel-engaging portion 322*b*'''', 322*c*'''' of the second and third tire-engaging devices 320*b*, 320*c* are separated by a gap or first spacing, S1'. Additionally, the substantially conical upper tire-sidewall-engaging surfaces 322*b*''', 322*c*''' are separated by a gap or second spacing, S2'. The first spacing, S1', may be approximately equal to, but slightly less than the diameter, $W_D$, of the wheel, W; the second spacing, S2', may be approximately equal to, but slightly less than the diameter, $T_D$, of the tire, T. The first and second spacings, S1'/S2', of the processing sub-station 300 is substantially similar to the first/second spacing, S1'/'S2', of the processing sub-station 200 due to the fact that the first/second spacings, S1'/S2' are associated with the moveable tire-engaging devices; accordingly, the first and second spacing, S1', S2', of the processing sub-station 300 may be similarly referred to as a "variable" or "adjustable" first and second spacing, S1', S2'.

Referring to FIGS. 10A, 11A and 12A, prior to joining the tire, T, to the wheel, W, the tire, T, may be said to be arranged in a first relaxed, unbiased orientation such that the upper tire opening, $T_{OU}$, and the lower tire opening, $T_{OL}$, define the passage, $T_P$, to include a diameter, $T_{P-D}$. When the tire, T, is joined to the wheel, W (see, e.g., FIGS. 11J and 12J), the upper bead, $T_{BU}$, and the lower bead, $T_{BL}$, may be arranged proximate but not seated adjacent, respectively, the upper bead seat, $W_{SU}$, and the lower bead seat, $W_{SL}$, of the wheel, W; later, upon inflating the tire, T, at, e.g., an inflation sub-station (not shown), the upper bead, $T_{BU}$, and the lower bead, $T_{BL}$, may be seated (i.e., disposed adjacent), respectively, the upper bead seat, $W_{SU}$, and the lower bead seat, $W_{SL}$, of the wheel, W. Further, when the tire, T, is joined to the wheel, W (see, e.g., FIGS. 11J and 12J), the tire, T, may be said to be arranged in a second substantially relaxed, but somewhat biased orientation such that the diameter, $T_{P-D}$, of the passage, $T_P$, is substantially circular and substantially similar to its geometry of the first relaxed, unbiased orientation of the tire, T.

Referring to FIG. 11A, the robotic arm 312 is arranged in a spaced-apart orientation with respect to the first support member 316*a*, which includes the tire, T, arranged in a "ready" position. The "ready" position may include a portion (i.e., $T_{SL-1}$, $T_{SL-2}$ and $T_{SL-3}$) of one or more of the lower sidewall surface, $T_{SL}$, and the tread surface, $T_T$, of the tire, T, arranged adjacent the upper surface 316' of the first support member 316*a*. Referring to FIG. 11A, the "ready" position may further include the tire, T, being arranged in a first angularly-offset orientation, $\theta_1$, with respect to the upper surface 316' of the first support member 316*a*.

The first angularly-offset orientation, $\theta_1$, of the tire, T, results from the non-co-planar relationship of the substantially cylindrical body 322*a*' of the first tire-engaging device 320*a* that engages the lower sidewall surface, $T_{SL}$, of the tire, T (at $T_{SL-2}$ and $T_{SL-3}$), with that of a portion of the upper surface 316' of the first support member 316*a* (at $T_{SL-1}$) such that: (1) the first portion, $T_{SL-1}$, of the lower sidewall surface, $T_{SL}$, of the tire, T, is arranged adjacent the upper surface 316' of the first support member 316*a*, (2) the second portion, $T_{SL-2}$, of the lower sidewall surface, $T_{SL}$, of the tire, T, is arranged adjacent a portion of the substantially cylindrical body 322*a*' of the first tire-engaging device 320*a* (noting that the second portion, $T_{SL-2}$, is not represented in FIG. 11A due to the cross-sectional reference line of FIG. 10A), and (3) a third portion, $T_{SL-3}$, of the lower sidewall surface, $T_{SL}$, of the tire, T, is arranged adjacent a portion of the substantially cylindrical body 322*a*' of the first tire-engaging device 320*a*. Accordingly, the support member 316 may provide a three-point support (which is more clearly shown at FIG. 10A) at $T_{SL-1}$, $T_{SL-2}$, $T_{SL-3}$ for the lower sidewall surface, $T_{SL}$, of the tire, T, while remaining portions of the lower sidewall surface, $T_{SL}$, of the tire, T, are not in direct contact with any other portion of the support member 316 when the tire, T, is arranged in the first angularly-offset orientation, $\theta_1$.

The processing sub-station 300 may execute a mounting procedure by causing a controller, C (see, e.g., FIG. 10A) to send one or more signals to a motor, M (see, e.g., FIG. 10A), that drives movement (according to the direction of the arrows, D1-D3—see FIGS. 11A-11I) of the robotic arm 312. Alternatively or in addition to automatic operation by the controller, C, according to inputs stored in memory, the movement, D1-D3, may result from one or more of a manual, operator input, O (e.g., by way of a joystick, depression of a button or the like).

As seen in FIG. 11A, the wheel, W, may be arranged above and be substantially aligned-with the passage, $T_P$, of the tire, T. A first, down, D, movement according to the direction of arrow, D1, may reduce the spaced-apart orientation of robotic arm 312 with respect to the support member 316 such that the wheel, W, may also be moved closer with respect to the tire, T, that is positioned upon the support member 316.

Figure 11B:
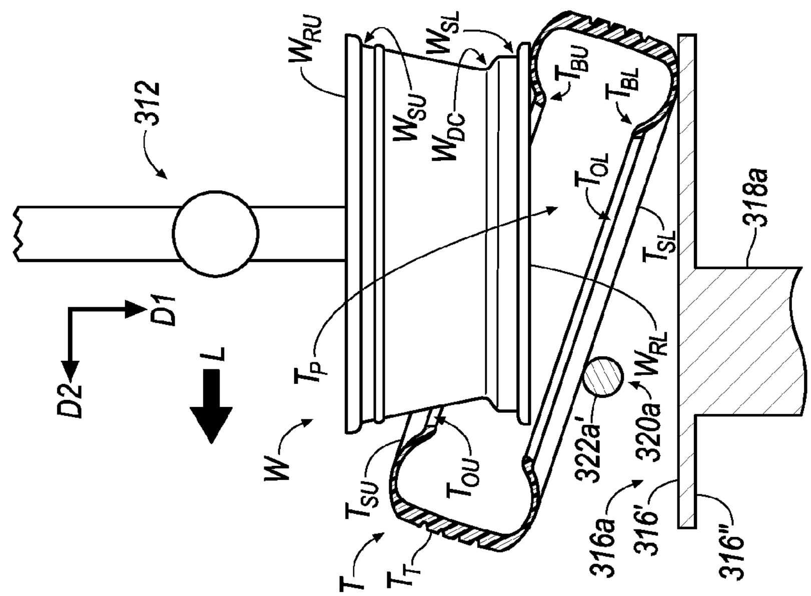
Figure 12B:
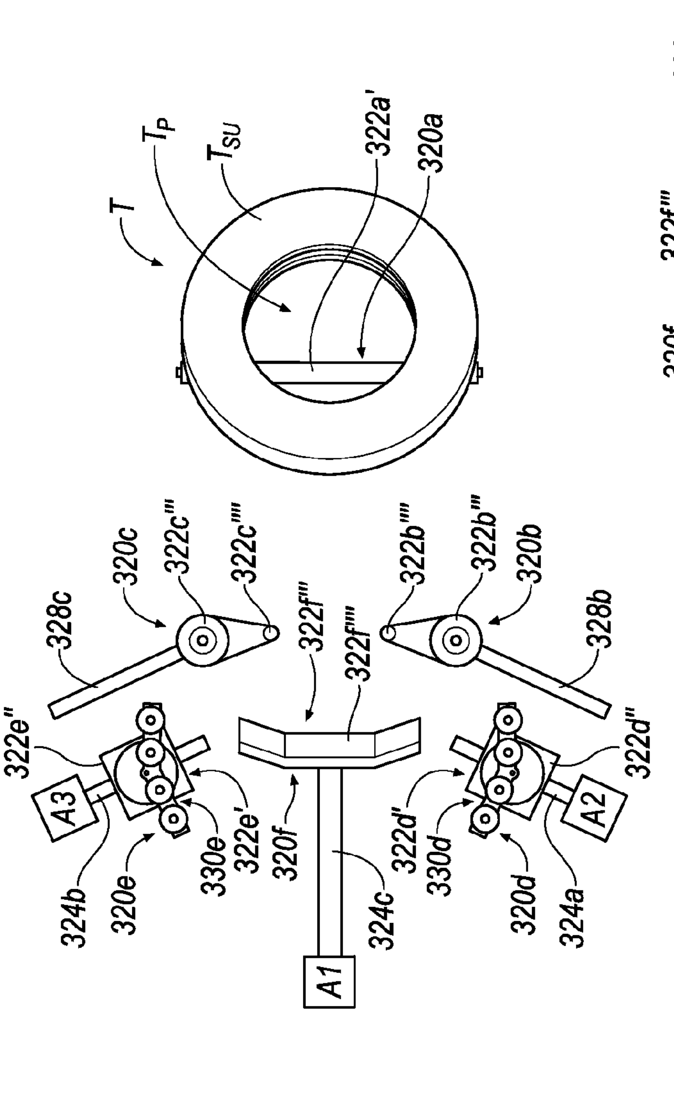
Figure 12B:
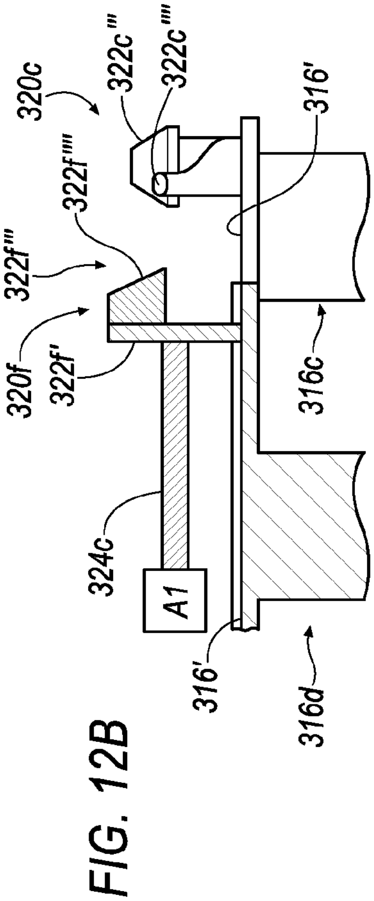

Referring to FIG. 11B, the robotic arm 312 may continue movement according to the direction of the arrow, D1, upon locating a first (e.g., left) portion of the lower bead seat, $W_{SL}$, and drop center, $W_{DC}$, of the wheel, W, within the passage, $T_P$, of the tire, T. The robotic arm 312 may then conduct a second movement according to the direction of arrow, D2, to cause the robotic arm 312 to directly move the wheel, W (and, as a result of the orientation of the wheel, W, within the passage, $T_P$, of the tire, T, indirectly move the tire, T), rearwardly (e.g., to the left, L).

Figure 11C:
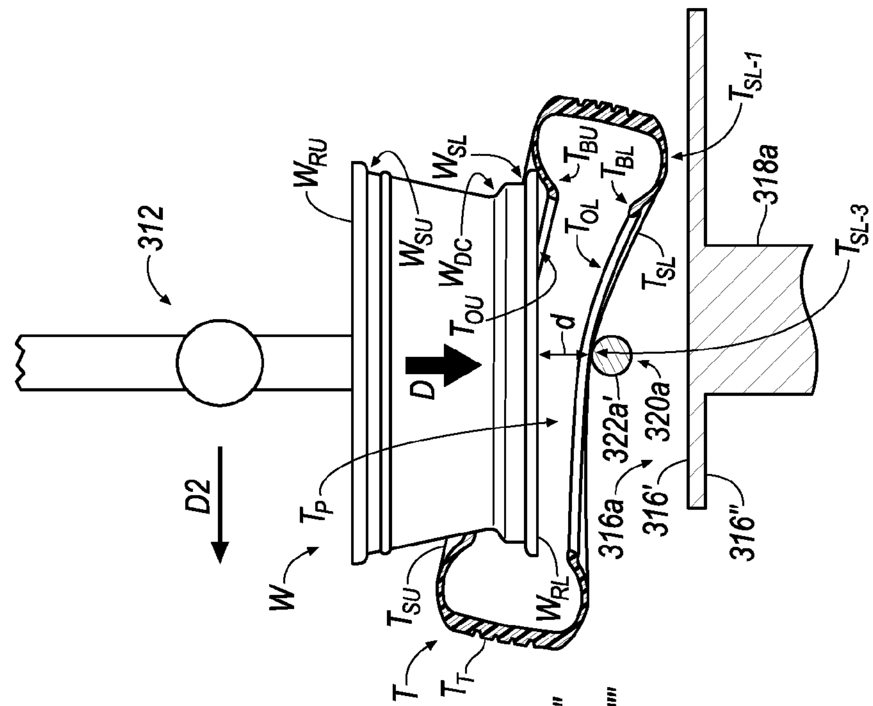
Figure 12C:
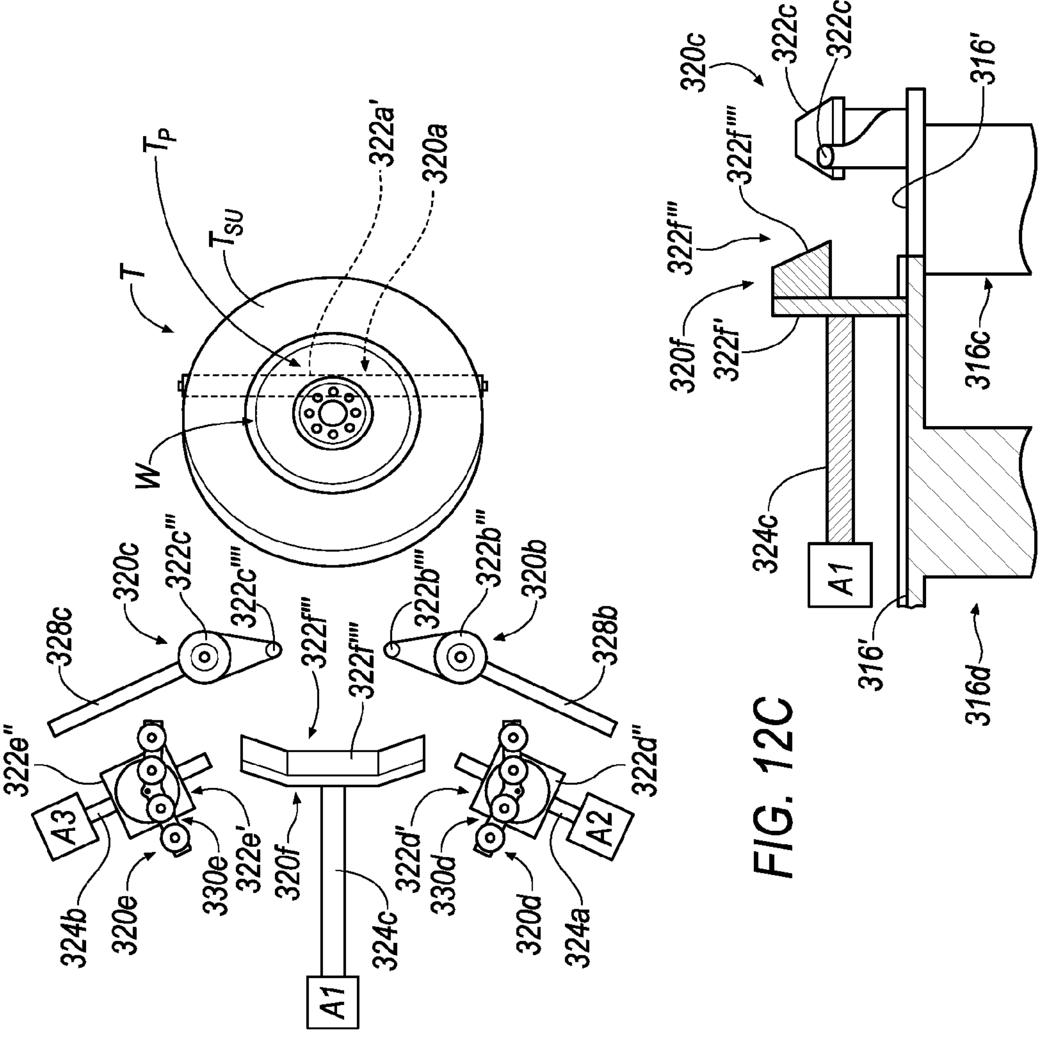

Referring to FIG. 11C, the movement according to the direction of the arrow, D1, may continue such that the wheel, W, pushes or exerts a downwardly, D, force upon the tire, T, such that a portion of the lower, outer rim surface, $W_{RL}$, of the wheel, W, is partially disposed within the passage, $T_P$, while a portion of the lower, outer rim surface, $W_{RL}$, of the wheel, W, is disposed adjacent and pushes down upon the upper sidewall surface, $T_{SU}$, of the tire, T; accordingly, the tire, T, may be leveraged about the substantially cylindrical body 322*a*' such that a portion (e.g., $T_{SL-1}$) of the lower sidewall surface, $T_{SL}$, of the tire, T, is no longer arranged adjacent the upper surface 316' of the first support member 316*a*. Thus, the tire, T, may no longer be arranged adjacent the support member 316 at three points of support; rather, the second and third portions (e.g., $T_{SL-2}$, $T_{SL-3}$) are still arranged adjacent the substantially cylindrical body 322*a*' of the first tire-engaging device 320*a* to thereby provide two points of support for the lower sidewall surface, $T_{SL}$, of the tire, T. As a result the orientation of the tire, T, being supported upon the substantially cylindrical body 322*a*' of the first tire-engaging device 320*a*, the tire, T, is no longer arranged at the first angularly-offset orientation, $\theta_1$, with respect to the support member 316.

Referring to FIG. 11C, downward movement according to the direction of the arrow, D1, may cease when, for example, the lower, outer rim surface, $W_{RL}$, of the wheel, W, is arranged in a space-apart relationship with respect to the substantially cylindrical body 322*a*' at a distance, d. During the downward movement according to the direction of the arrow, D1 (in the view according to FIG. 11B), or, in an alternative embodiment, just after ceasing the downward movement according to the direction of the arrow, D1, the robotic arm 312 may cause rearwardly movement (e.g., to the left) of the wheel, W, and the tire, T, according to the direction of the arrow, D2.

Figures 11D, 12D:
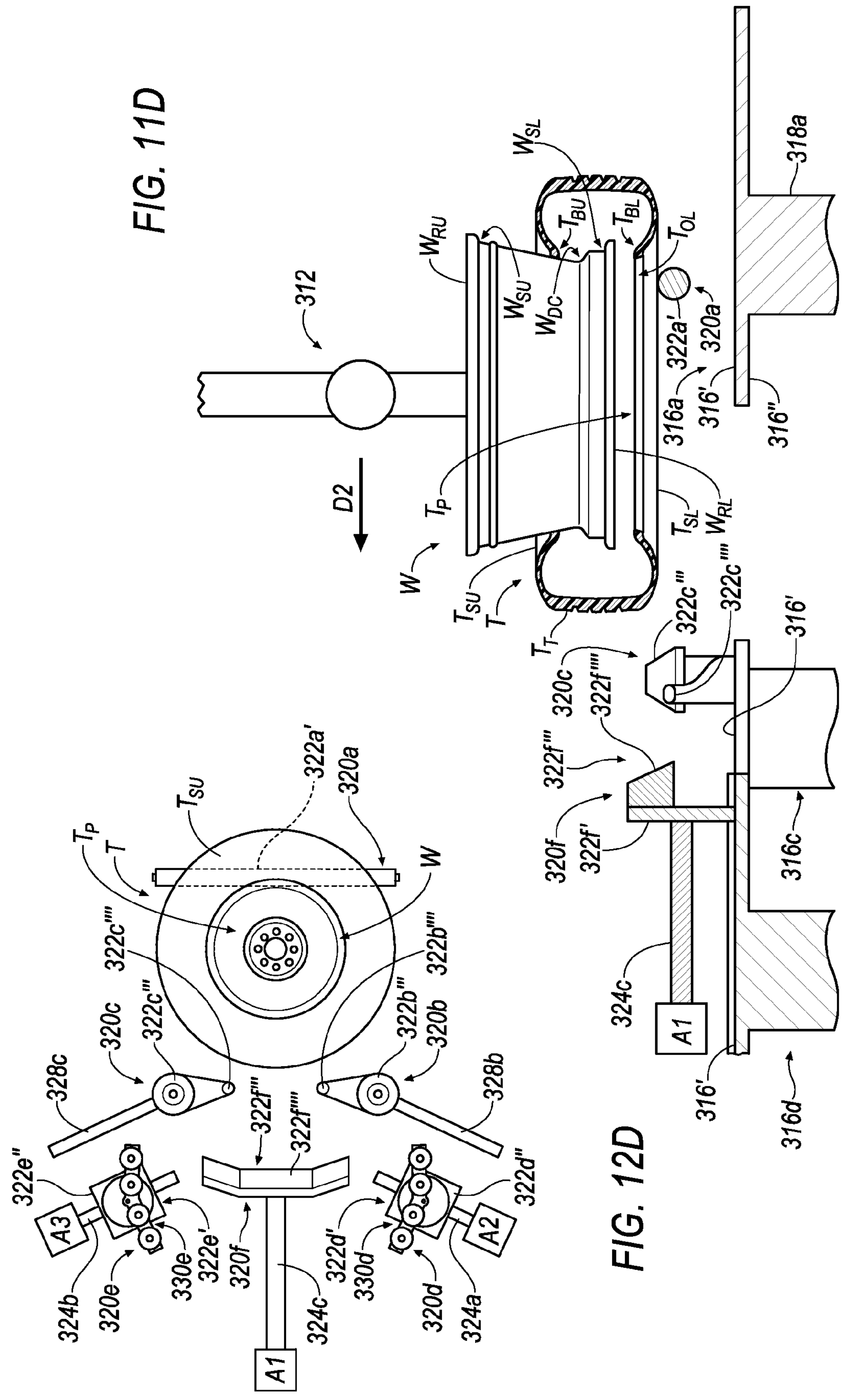

Referring to FIGS. 11D-11E, the movement according to the direction of the arrow, D2, results in the lower sidewall surface, $T_{SL}$, of the tire, T, to being "dragged over" the substantially cylindrical body 322*a*' of the first tire-engaging device 320*a* due to the rearwardly (e.g., to the left, L) movement in conjunction with the lower, outer rim surface, $W_{RL}$, of the wheel, W, being disposed adjacent and pushing down upon the upper sidewall surface, $T_{SU}$, of the tire, T. Accordingly, as the wheel, W, drags the lower sidewall surface, $T_{SL}$, of the tire, T, over the substantially cylindrical body 322*a*', the upper and lower beads, $T_{BU}$, $T_{BL}$, of the tire, T, are arranged closer in proximity to one anther. As the wheel, W, is advanced rearwardly (e.g., to the left, L) past the substantially cylindrical body 322*a*', the upper bead, $T_{BU}$, of the tire, T, is urged or flexed over one or both of the lower bead seat, $W_{SL}$, and drop center, $W_{DC}$, of the wheel, W, such that the lower, outer rim surface, $W_{RL}$, of the wheel, W, is no longer disposed adjacent the upper sidewall surface, $T_{SU}$, of the tire, T. Accordingly, as seen in FIG. 11D, the tire, T, is arranged relative to the wheel, W, such that the upper bead, $T_{BU}$, of the tire, T, circumscribes the wheel, W, and is arranged proximate the drop center, $W_{DC}$, while the lower, outer rim surface, $W_{RL}$, the lower bead seat, $W_{SL}$, and the drop center, $W_{DC}$, of the wheel, W, are arranged within the passage, $T_P$, of the tire, T; accordingly, the robotic arm 312 utilizes the wheel, W, to move rearwardly (e.g., to the left, L) such that the tire, T, is moved from the "ready" position (of FIGS. 11A-11C) to a "partially mounted" position (of FIG. 11D) upon the wheel, W.

Referring to FIG. 11E, once the tire, T, is arranged relative to the wheel, W, as described above, the second movement according to the direction of arrow, D2, continues while the robotic arm 312 may slightly lower the wheel, W, and the tire, T, according to a second downwardly direction according to the direction of the arrow, D3. The movement according to the direction of the arrows, D2, D3, may be conducted separately or simultaneously, as desired.

Referring to FIG. 11F, the third movement according to the direction of the arrow, D3, may result in the robotic arm 312 arranging at least a portion of the tire, T, in alignment with the substantially conical upper tire-sidewall-engaging surface 322*b*''', 322*c*''' and at least a portion of the wheel, W, in alignment with the laterally-extending wheel-engaging portion 322*b*'''', 322*c*'''' of the second and third tire-engaging devices 320*b*, 320*c*. Further, the third movement according to the direction of the arrows, D2, D3, eventually results in, the tire, T, being arranged in an orientation of contact with the second and third tire-engaging devices 320*b*, 320*c*, and, then eventually results in the wheel, W, being arranged in an orientation of contact with the second and third tire-engaging devices 320*b*, 320*c*.

As described above, the first spacing, S1', may be approximately equal to, but slightly less than the diameter, $W_D$, of the wheel, W, and, the second spacing, S2', may be approximately equal to, but slightly less than the diameter, $T_D$, of the tire, T. Accordingly, as the robotic arm 312 advances the tire, T, and the wheel, W, rearwardly (e.g., to the left, L) according to the direction of the arrow, D2, past/through the spacing, S1', S2' as seen in FIGS. 12E-12I, one or more of the tread surface, $T_T$, tire, T, and the lower rim surface, $W_{RL}$, of the wheel, W, engages and pushes, R' (see FIGS. 12F-12G) the second and third tire-engaging devices 320*b*, 320*c* outward.

The second and third tire-engaging devices 320*b*, 320*c* may at least partially resist, R, as seen in FIG. 10B) the movement imparted to the tire, T (i.e., the second and third tire-engaging devices 320*b*, 320*c* may provide a countering, "push-back" force according to the direction of the arrow, R), such that the tire, T, is permitted to flex relative to a fixed orientation of the wheel, W, that is joined to the robotic arm 312. As described above, the push-back force, R, may arise from any desirable structure, such as, for example, a spring (not shown) that is connected to the second and third tire-engaging devices 320$b$, 320$c$. Referring to FIGS. 12F-12I, the push-back force, R, results in the laterally-extending wheel-engaging portion 322$b''''$, 322$c''''$ of the second and third tire-engaging devices 320$b$, 320$c$ 'tracing'/following a portion of the lower rim surface, $W_{RL}$, of the wheel, W, while the substantially conical upper tire-sidewall-engaging surface 322$b'''$, 322$c''''$ 'traces'/follows a portion of the tread surface, $T_T$, of the tire, T.

As seen in FIGS. 11F-11I, the countering push-back force, R, provided by the second and third tire-engaging members 320$b$, 320$c$ may result in the substantially conical upper tire-sidewall-engaging surface 322$b'''$, 322$c'''$ interfering with movement of the tire, T, through the spacing, S2', according to the direction of the arrow, D2; as a result of the interference, the tire, T, physically deforms relative to the wheel, W, in a manner that results in the lower bead, $T_{BL}$, of the tire, T, being permitted to flex or wrap-over the lower rim surface, $W_{RL}$, of the wheel, W, as seen in FIGS. 11F-11I. Continued movement according to the direction of the arrow, D2, results in the lower bead, $T_{BL}$, of the tire, T, circumscribing the wheel, W, about the drop center, $W_{DC}$ (see FIG. 11I), once the tire, T, and the wheel, W, is passed through the spacing, S1', S2'.

Figure 11G:
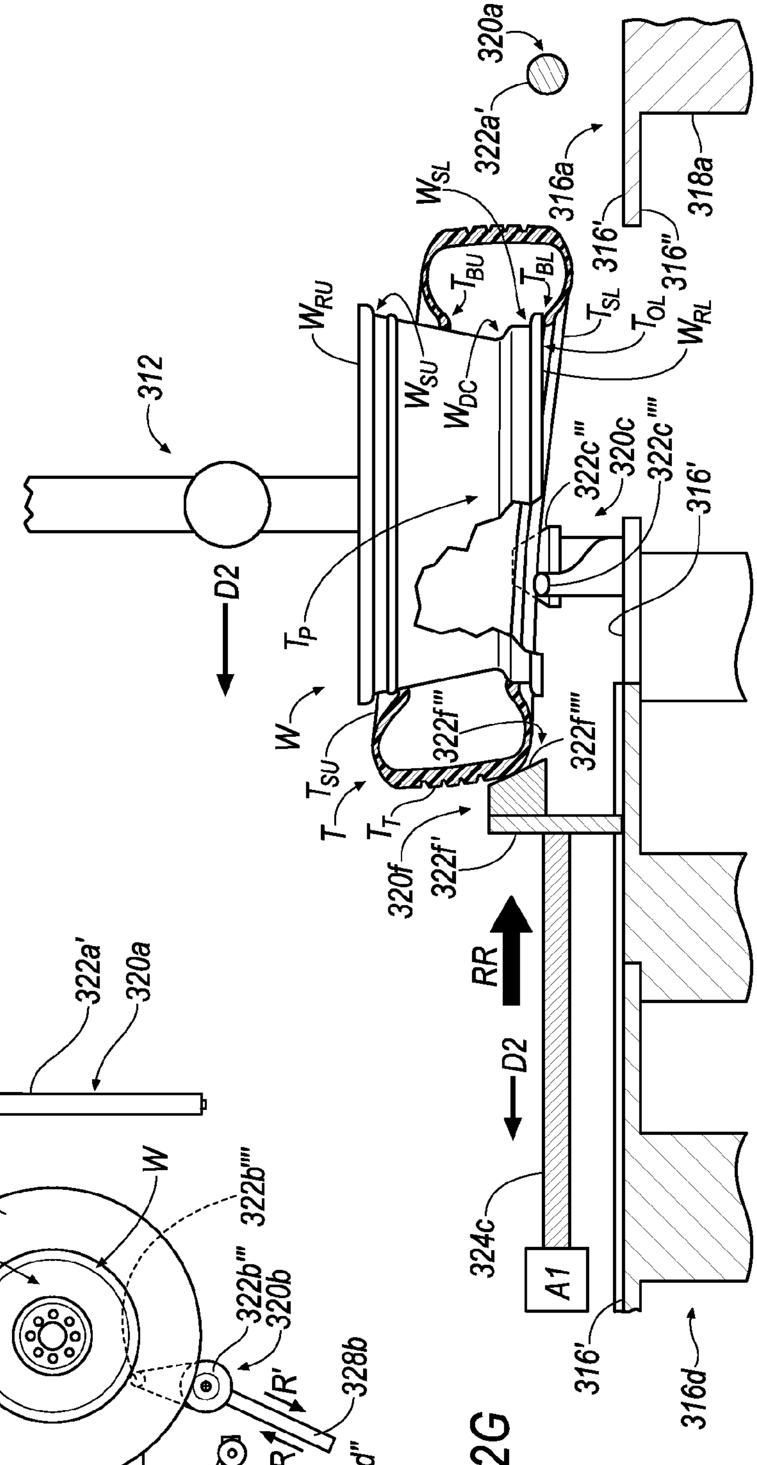
Figure 12G:
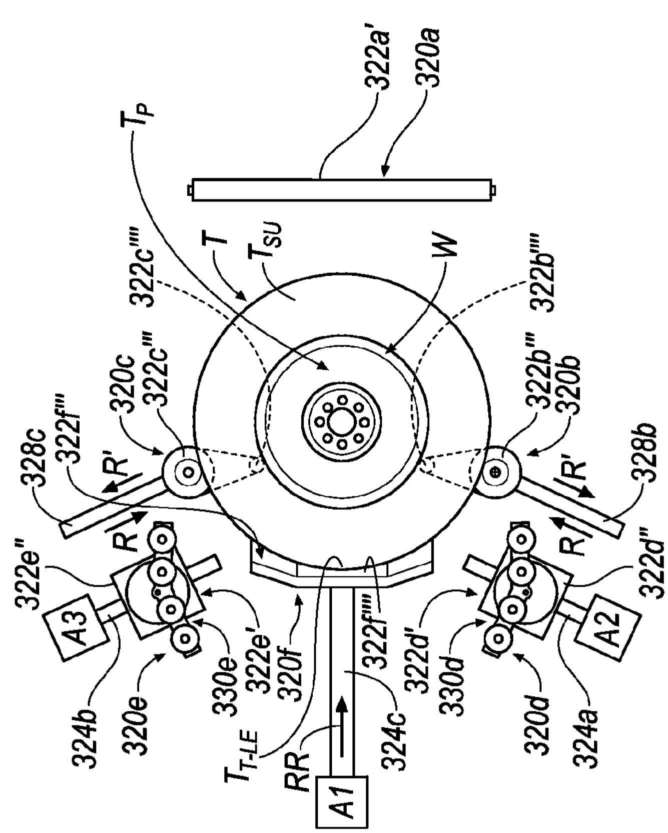
Figure 11H:
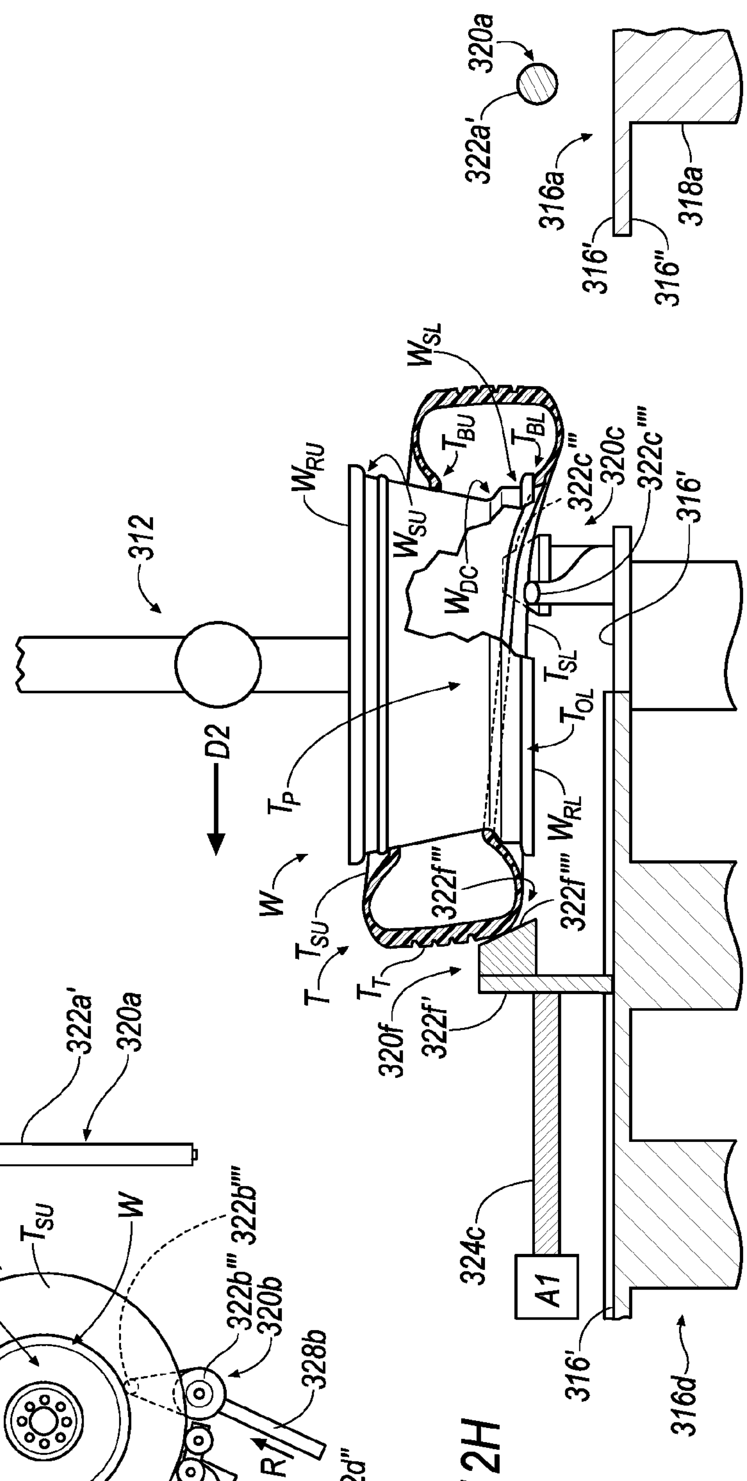

In addition to the push-back force, R, provided by the second and third tire-engaging devices 320$b$, 320$c$, additional push-back force RR and RRR may be provided by the fourth, fifth and sixth tire-engaging devices 320$d$, 320$e$, 320$f$. Referring to FIGS. 11G and 12G, continued movement of the robotic arm 312 according to the direction of the arrow, D2, results in a leading-end, $T_{T\text{-}LE}$ (see FIG. 12G), of the tread surface, $T_T$, of the tire, T, coming into contact with the cradle 322$f''''$ of the sixth tire-engaging device 320$f$; as seen, comparatively in FIGS. 11F-12F and 11G-12G, the actuator, A1, may retract (according to the direction of the arrow, D2) the cradle 322$f''''$ as the robotic arm 312 advances the wheel, W, and the tire, T. The speed of retraction of the sixth tire-engaging device 320$f$ according to the direction of the arrow, D2, may be slower than the speed of advancement of the tire, T, and the wheel, W, according to the direction of the arrow, D2, such that the sixth tire-engaging device may interfere with movement of (and, as a result, "push-back," RR, upon) the tire, T, as the tire, T, is moved through the spacing, S2', in order to contribute to the physical manipulation of the orientation of the tire, T, relative to the wheel, W, described above.

In an alternative embodiment, upon the leading-end, $T_{T\text{-}LE}$, of the tread surface, $T_T$, of the tire, T, coming into contact with the cradle 322$f''''$, the sixth tire-engaging device 320$f$ may move in concert with the robotic arm 312 according to the direction of the arrow, D2; accordingly the cradle 322$f''''$ may provide a support surface for the tire, T, that may serve as a leverage surface to assist in the manipulation of the tire, T, and not necessarily contribute to an interference of the tire, T, as the tire, T, is moved through the spacing, S2'. In another embodiment, the sixth tire-engaging device 320$f$ may remain in a static, fixed orientation after the leading-end, $T_{T\text{-}LE}$, of the tread surface, $T_T$, of the tire, T, comes into contact with the cradle 322$f''''$ and, then, subsequently, move in concert with the robotic arm 312 according to the direction of the arrow, D2. In another embodiment, the speed of retraction of the sixth tire-engaging device 320$f$ according to the direction of the arrow, D2, may be faster than the speed of advancement of the tire, T, and the wheel, W, according to the direction of the arrow, D2 (e.g., after, as described above, remaining in a static orientation). Accordingly, the first actuator, A1, may control the timing and/or speed of movement of the sixth tire-engaging device 320$f$ according to the direction of the arrow, D2, in any desirable manner in order to control a particular physical manipulation of an orientation of the tire, T, relative the wheel, W.

Referring to FIGS. 11$h$ and 12H, the second and third actuators, A2, A3, may be actuated for driving the fourth and fifth tire-engaging devices 320$d$, 320$e$ toward the tread surface, $T_T$, of the tire, T, such that the array of tire-tread-engaging posts 330$d$, 330$e$ come into contact with and engage portions of the tread surface, $T_T$, of the tire, T. The actuators, A2, A3, may drive the array of tire-tread-engaging posts 330$d$, 330$e$ into contact with and engage portions of the tread surface, $T_T$, of the tire, T, before, during or after the leading-end, $T_{T\text{-}LE}$, of the tread surface, $T_T$, of the tire, T, comes into contact with the cradle 322$f''''$ of the sixth tire-engaging device 320$f$; in the illustrated embodiment, the leading-end, $T_{T\text{-}LE}$, of the tread surface, $T_T$, of the tire, T, comes into contact with the cradle 322$f''''$ first (see FIGS. 11G and 12G) and then secondly, the array of tire-tread-engaging posts 330$d$, 330$e$ into contact with and engage portions of the tread surface, $T_T$, of the tire, T (see FIGS. 11H and 12H).

In a substantially similar manner as described above, the second and third actuators, A2, A3, may drive or retract the array of tire-tread-engaging posts 330$d$, 330$e$ into a dis/engaged orientation with respect to the tread surface, $T_T$, of the tire, T. If driven to an engaged orientation with the tread surface, $T_T$, of the tire, T, the array of tire-tread-engaging posts 330$d$, 330$e$ may "push-back," RRR, upon the tire, T, as the tire, T, is moved through the spacing, S2', by the robotic arm 312 in order to contribute to the manipulation of the orientation of the tire, T, relative to the wheel, W. Alternatively, as similarly described above, the array of tire-tread-engaging posts 330$d$, 330$e$ may provide a support surface for the tire, T, that may serve as a leverage surface to assist in the manipulation of the tire, T, and not necessarily contribute to an interference of the tire, T, as the tire, T, is moved through the spacing, S2'.

Figure 12H:
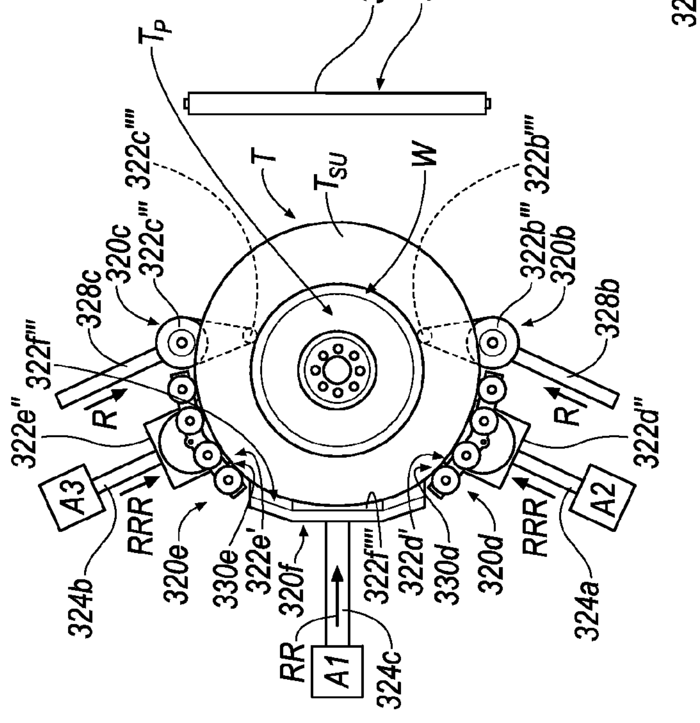
Figure 11I:
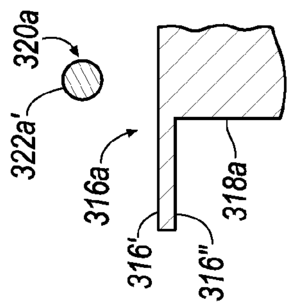
Figure 12I:
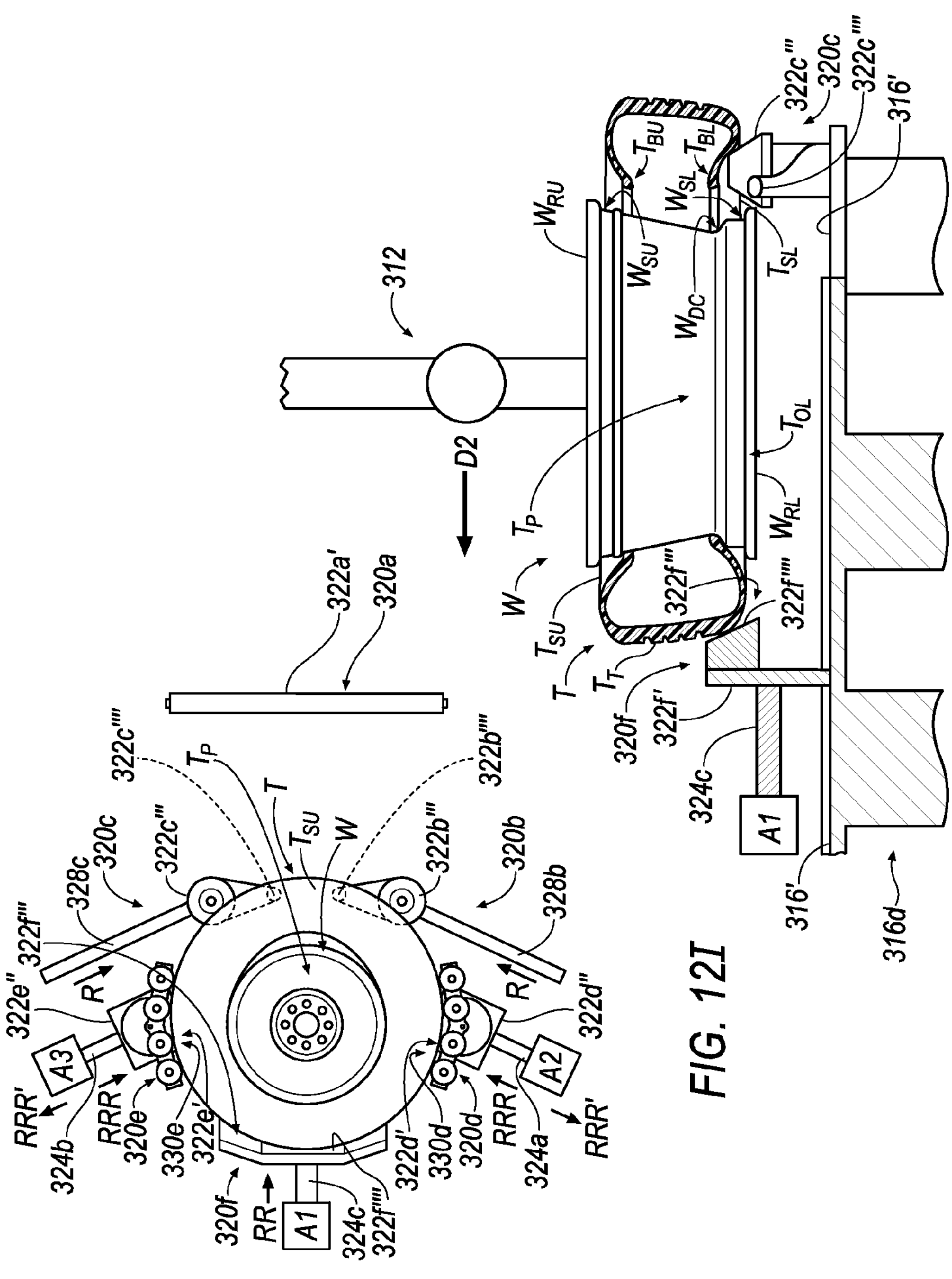
Figure 12J:
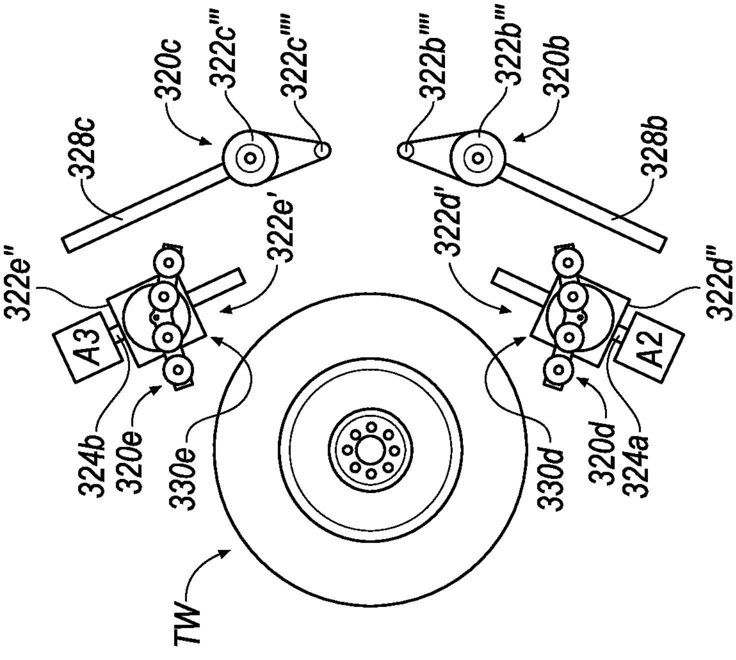

Referring to FIGS. 12H-12I, the push-back force, RRR, may also results in the array of tire-tread-engaging posts 330$d$, 330$e$ 'tracing'/following a portion of the tread surface, $T_T$, of the tire, T, in a substantially similar fashion as that of the substantially conical upper tire-sidewall-engaging surface 322$b'''$, 322$c'''$. The tracing conducted by the array of tire-tread-engaging posts 330$d$, 330$e$ is permitted by the swiveling-connection of the tire-tread-surface-engaging member 322$d'''$, 322$e'''$ and the body 322$d'$, 322$e'$ of each of the fourth and fifth tire-engaging devices 320$d$, 320$e$.

Figure 11J:
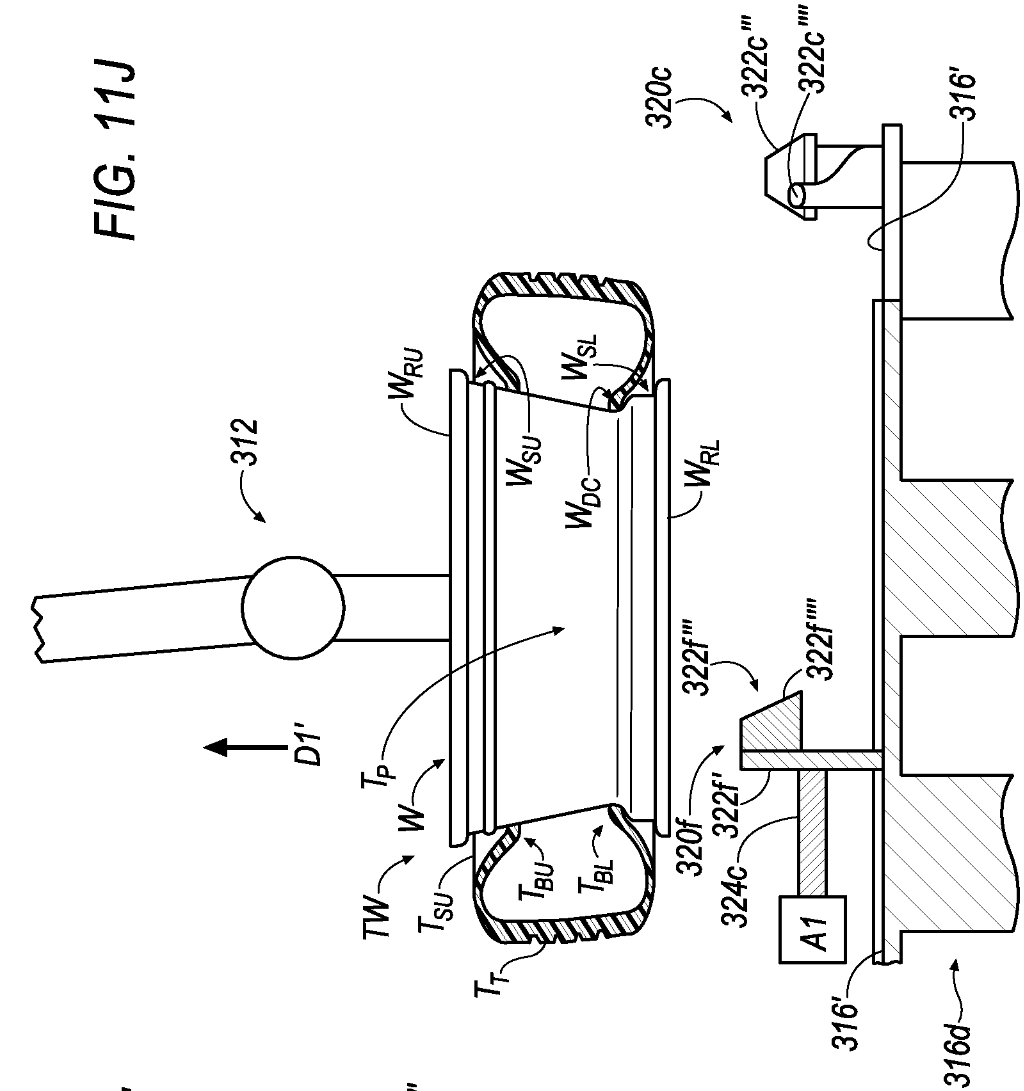

Referring to FIG. 12I, once the robotic arm 312 has moved the tire, T, through the spacing, S2', the movement according to the direction of the arrow, D2, may cease; additionally, the second and third actuators, A2, A3, may retract the fourth and fifth tire-engaging devices 320$d$, 320$e$ to a "ready orientation" according to the direction of the arrow, RRR', which is opposite that of the direction of the arrow, RRR, that is substantially similar to what is shown in FIG. 12A. Additionally, as seen in FIG. 12I, the second and third tire-engaging devices 320$b$, 320$c$ may be returned to a "ready orientation" that is substantially similar to what is shown in FIG. 12A as a result of, for example, a spring (not shown) that provides the "push-back" force, R, being fully expanded. Referring to FIG. 11J, as a result of the tire, T, now being mounted to the wheel, W, by the processing sub-station 300, the robotic arm 312 may move upwardly according to the direction of the arrow, D1', which is substantially opposite the direction of the arrow, D1, to carry the tire-wheel assembly, TW, to another processing sub-station, such as, for example, an inflation sub-station (not shown) for inflating the tire-wheel assembly, TW, which may cause the upper bead, $T_{BU}$, to be seated adjacent the upper bead seat, $W_{SU}$, and the lower bead, $T_{BL}$, to be seated adjacent the lower bead seat, $W_{SL}$.

Figure 13A:
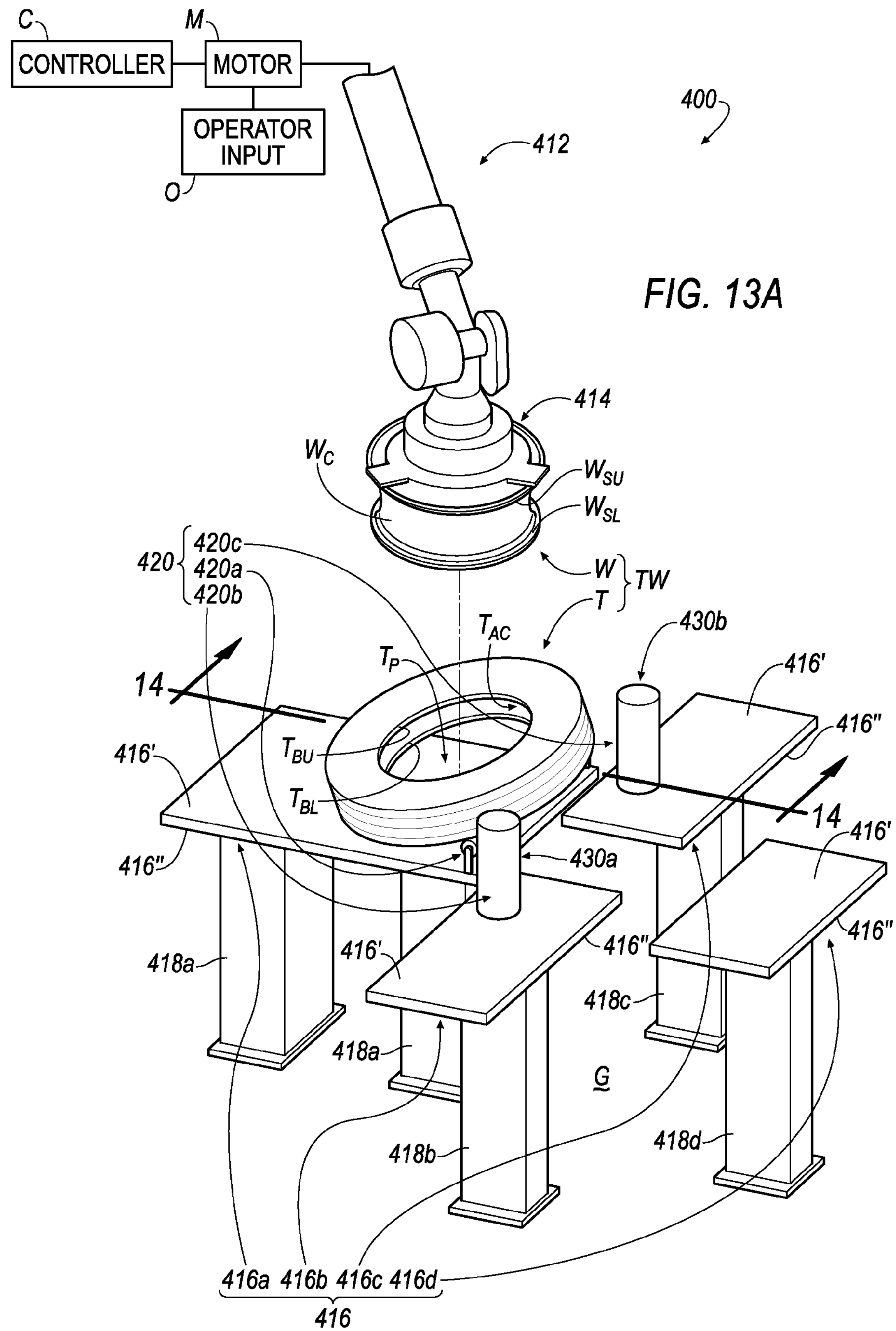
FIG. 13A is a perspective view of a sub-station for processing a tire and a wheel in accordance with an exemplary embodiment of the invention.

Referring to FIG. 13A, a processing sub-station 400 for processing a tire-wheel assembly, TW, is shown according to an embodiment. The "processing" conducted by the processing sub-station 400 may include the act of "joining" or "mounting" a tire, T, to a wheel, W, for forming the tire-wheel assembly, TW. The act of "joining" or "mounting" may mean to physically couple, connect or marry the tire, T, and wheel, W, such that the wheel, W, may be referred to as a male portion that is inserted into a passage, $T_P$, of a tire, T, being a female portion.

As described and shown in the following Figures, although the desired result of the processing sub-station 400 is the joining or mounting of the tire, T, and wheel, W, to form a tire-wheel assembly, TW, it should be noted that the processing sub-station 400 does not inflate the circumferential air cavity, $T_{AC}$, of the tire, T, of the tire-wheel assembly, TW, nor does the processing sub-station 400 contribute to an act of "seating" the upper bead, $T_{BU}$, or the lower bead, $T_{BL}$, of the tire, T, adjacent the upper bead seat, $W_{SU}$, and the lower bead seat, $W_{SL}$, of the wheel, W (because the act of "seating" typically arises from an inflating step where the tire-wheel assembly, TW, is inflated). Accordingly, upon joining or mounting the tire, T, to the wheel, W, the upper bead, $T_{BU}$, or the lower bead, $T_{BL}$, of the tire, T, may be arranged about and/or disposed adjacent the outer circumferential surface, $W_C$, of the wheel, W.

In an implementation, the processing sub-station 400 may be included as part of a "single-cell" workstation. A single-cell workstation may include other sub-stations (not shown) that contribute to the processing of a tire-wheel assembly, TW; other sub-stations may include, for example: a soaping sub-station, a stemming sub-station, an inflating sub-station, a match-marking sub-station, a balancing sub-station and the like. The term "single-cell" indicates that the sub-stations contribute to the production of a tire-wheel assembly, TW, without requiring a plurality of successive, discrete workstations that may otherwise be arranged in a conventional assembly line such that a partially-assembled tire-wheel assembly, TW, is "handed-off" along the assembly line (i.e., "handed-off" meaning that an assembly line requires a partially-assembled tire-wheel assembly, TW, to be retained by a first workstation of an assembly line, worked on, and released to a subsequent workstation in the assembly line for further processing). Rather, a single cell workstation provides one workstation having a plurality of sub-stations each performing a specific task in the process of assembling a tire-wheel assembly, TW. This assembling process takes place wherein the tire and/or wheel "handing-off" is either minimized or completely eliminated. As such, a single-cell workstation significantly reduces the cost and investment associated with owning/renting the real estate footprint associated with a conventional tire-wheel assembly line while also having to provide maintenance for each individual workstation defining the assembly line. Thus, capital investment and human oversight is significantly reduced when a single cell workstation is employed in the manufacture of tire-wheel assemblies, TW.

Referring to FIG. 13A, the processing sub-station 400 includes a device 412. The device 412 may be referred to as a robotic arm. The robotic arm 412 may be located in a substantially central position relative to a plurality of sub-stations (including, e.g., the processing sub-station 400) of a single-cell workstation. The robotic arm 412 may be attached to and extend from a base/body portion (not shown) connected to ground, G.

The robotic arm 412 may include an end effecter 414. The end effecter 414 may include a claw, gripper, or other means for removably-securing the wheel, W, to the robotic arm 412. The end effecter 414 permits the robotic arm 412 to have the ability to retain and not release the wheel, W, throughout the entire procedure performed by the processing sub-station 400 (and, if applied in a single-cell workstation, the ability to retain and not release the wheel, W, throughout the entire assembling procedure of the tire-wheel assembly, TW). Accordingly, the end effecter 414 minimizes or eliminates the need of the robotic arm 412 to "hand-off" the tire-wheel assembly, TW, to (a) subsequent sub-station(s) (not shown).

The processing sub-station 400 may perform several functions/duties including that of: (1) a tire repository sub-station and (2) a mounting sub-station. A tire repository sub-station typically includes one or more tires, T, that may be arranged in a "ready" position for subsequent joining to a wheel, W. A mounting sub-station typically includes structure that assists in the joining of a tire, T, to a wheel, W (e.g., the disposing of a wheel, W, within the passage, $T_P$, of the tire, T).

Referring to FIG. 13A, the processing sub-station 400 may be initialized by joining a wheel, W, to the robotic arm 412 at the end effecter 414. The processing sub-station 400 may also be initialized by positioning the tire, T, upon a support member 416. The support member 416 may include a first support member 416*a*, a second support member 416*b*, a third support member 416*c* and a fourth support member 416*d*. Each of the first, second, third and fourth support members 416*a*, 416*b*, 416*c*, 416*d* include an upper surface 416' and a lower surface 416".

The lower surface 416" of each of the first, second, third and fourth support members 416*a*, 416*b*, 416*c*, 416*d* may be respectively connected to at least one first leg member 418*a*, at least one second leg member 418*b*, at least one third leg member 418*c* and at least one fourth leg member 418*d*. Each of the at least one first, second, third and fourth leg members 418*a*, 418*b*, 418*c*, 418*d* respectively include a length for elevating or spacing each of the first, second, third and fourth support members 416*a*, 416*b*, 416*c*, 416*d* from an underlying ground surface, G. Although the robotic arm 412 is not directly connected to the support member 416 (but, rather may be connected to ground, G), the robotic arm 412 may be said to be interfaceable with (as a result of the movements D1-D5 described in the following disclosure) and/or indirectly connected to the support member 416 by way of a common connection to ground, G, due the leg members 418*a*-418*d* connecting the support member 416 to ground, G.

The processing sub-station 400 may further include a plurality of tire-engaging devices 420. The plurality of tire-engaging devices 420 may include a first tire-engaging device 420*a* connected to the upper surface 416' of the first support member 416*a*, a second tire-engaging device 420*b* connected to the upper surface 416' of the second support member 416*b* and a third tire-engaging device 420*c* connected to the upper surface 416' of the third support member 416*c*.

Figure 13B:
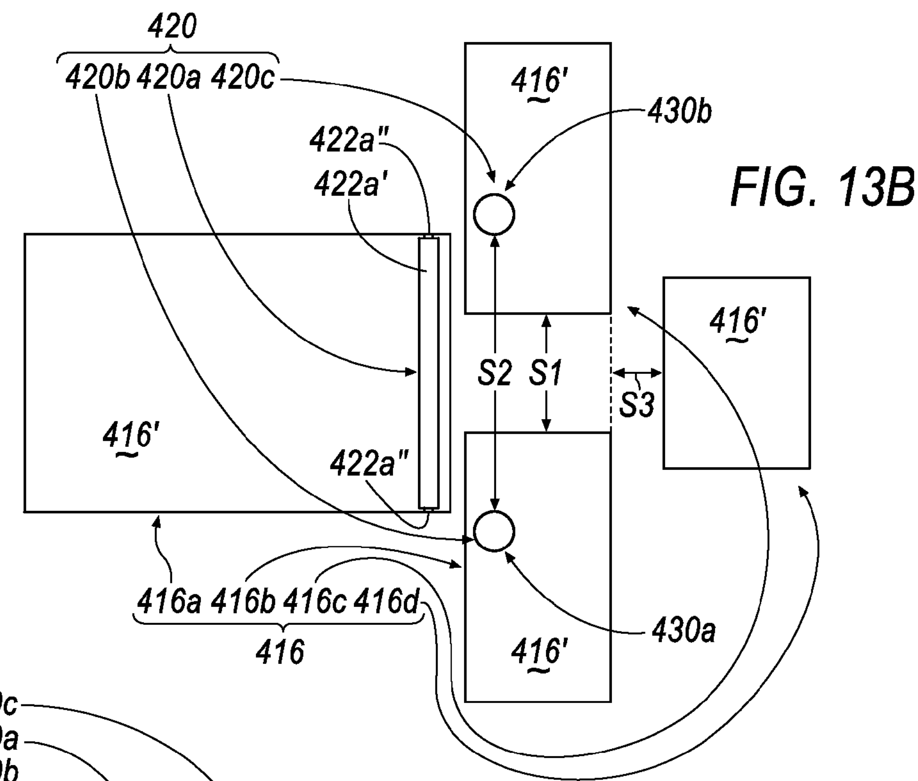
FIG. 13B is a top view of the sub-station of FIG. 13A.
Figure 13C:
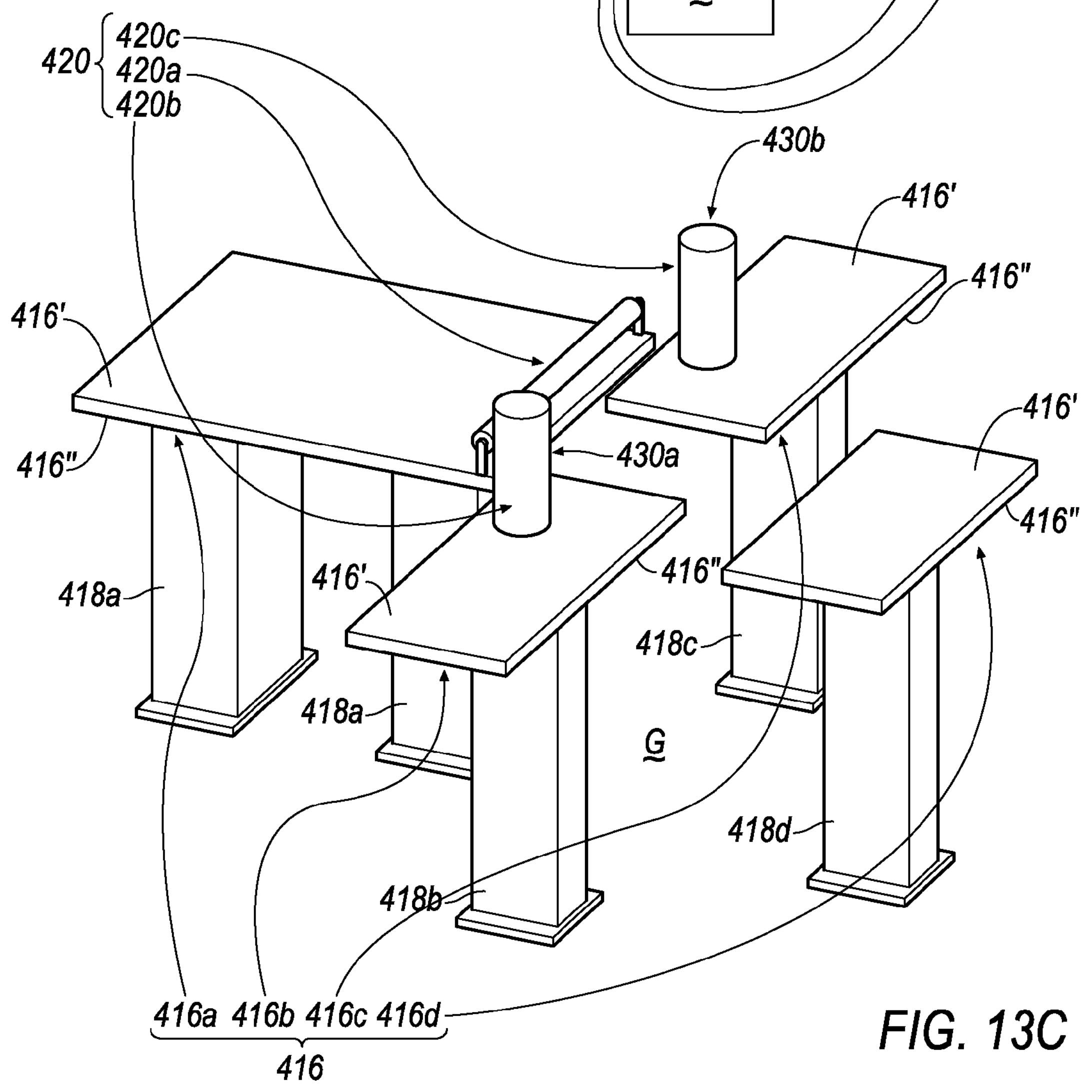
FIG. 13C is a perspective view of a portion of the sub-station of FIG. 13A.

Referring to FIGS. 13B-13C, the first tire-engaging device 420*a* includes a substantially cylindrical body 422*a'* that is supported by one or more brackets 422*a"*. The one or more brackets 422*a"* may support the substantially cylindrical body 422*a'* at a distance away from the upper surface 416' of the first support member 416*a*. The one or more brackets 422*a"* may include a pair of brackets. The substantially cylindrical body 422*a'* may be a tubular body having an axial passage (nor shown). A central pin (not shown) may be disposed within the axial passage. The central pin may be connected and fixed to the pair of brackets 422a"; accordingly, the substantially tubular, cylindrical body 422a' may be movably-disposed about the central pin such that the substantially tubular, cylindrical body 422a' is permitted to move in a rotating/rolling motion relative to a fixed orientation of the central pin. Alternatively, the substantially cylindrical body 422a' may not include an axial passage and may rotatably-connected-to or non-movably-fixed-to the pair of brackets 422a".

Referring to FIG. 13A, the second tire-engaging device 420b includes a first tire-tread-engaging post 430a that may extend from the upper surface 416' of the second support member 416b. The third tire-engaging device 420c includes a second tire-tread-engaging post 430b that may extend from the upper surface 416' of the third support member 416c.

Referring to FIG. 13B, the second and third support members 416b, 416c are separated by a gap or first spacing, S1. The first tire-tread-engaging post 430a is separated from the second tire-tread-engaging post 430b by a gap or second spacing, S2. The fourth support member 416d is separated from the second and third support members 416b, 416c by a third gap or spacing, S3.

The second spacing, S2, is greater than the first spacing, S1. The first spacing, S1, may be approximately equal to, but slightly greater than the diameter, $W_D$, of the wheel, W; further, the tire diameter, $T_D$,/central chord, $T_{C2}$, may be greater than the first spacing, S1. The second spacing, S2, may be approximately equal to the left chord, $T_{C1}$, and the right chord, $T_{C3}$, of the tire, T; further, the tire diameter, $T_D$,/central chord, $T_{C2}$, may be greater than the second spacing, S2. The third spacing, S3, may be approximately equal to, but slightly greater than the diameter, $W_D$, of the wheel, W, and less than the diameter, $T_D$, of the tire, T.

Figure 14A:
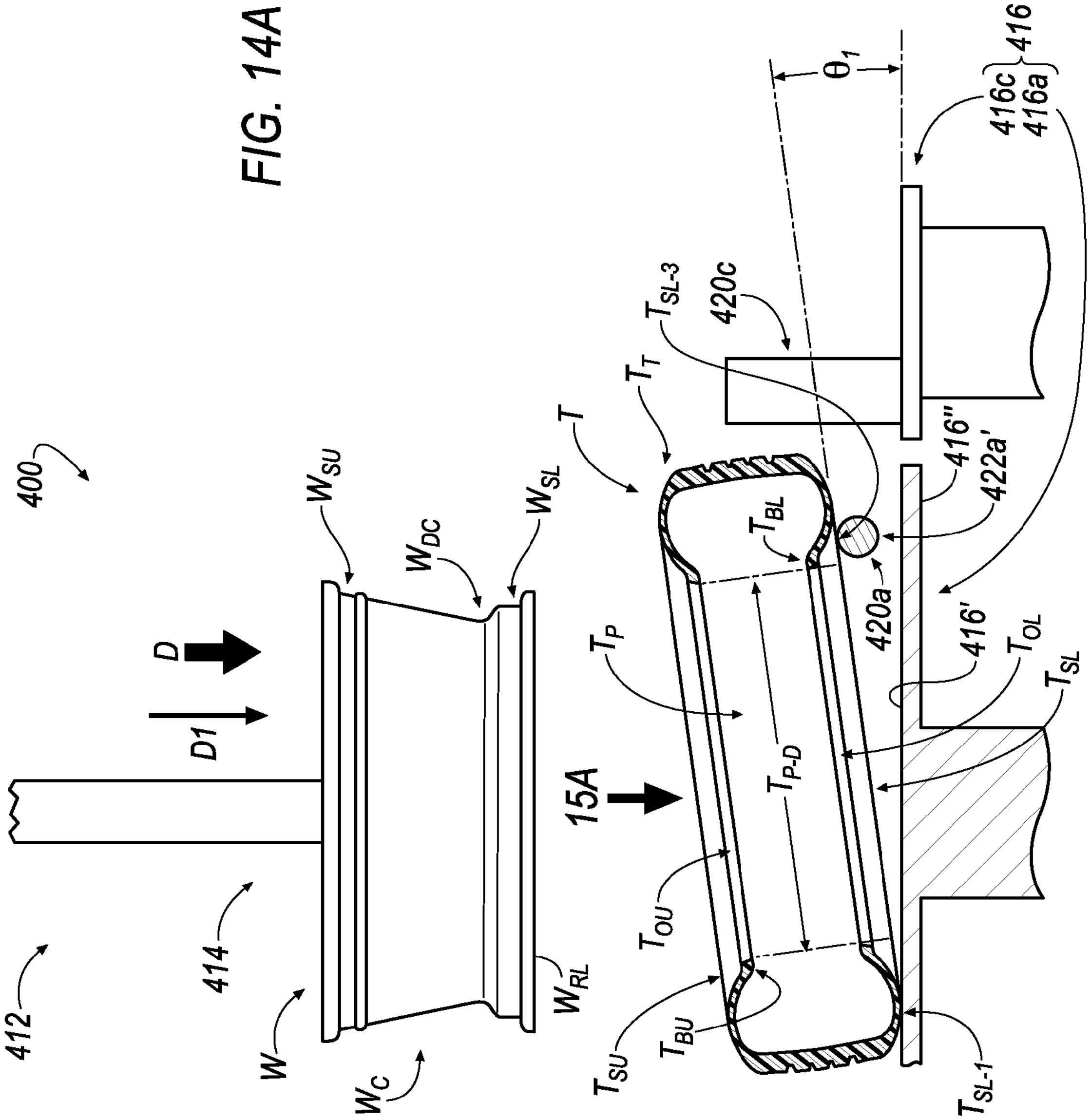
FIGS. 14A-14J illustrate side, partial cross-sectional views of the sub-station, tire and wheel according to line 14A-14J of FIG. 13A in accordance with an exemplary embodiment of the invention.
Figure 15A:
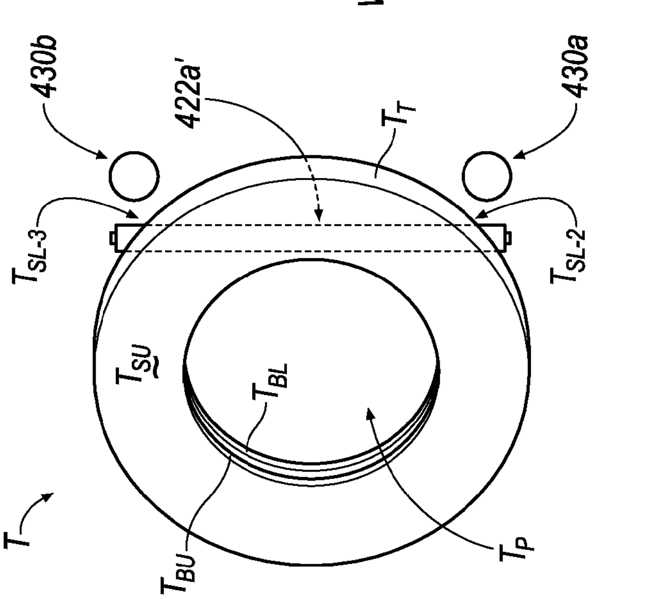
FIG. 15A-15J illustrate a partial top view of the sub-station, tire and wheel according to lines 15A-15J of FIGS. 14A-14J in accordance with an exemplary embodiment of the invention.

As seen in FIG. 14A and with reference to FIG. 15A, prior to joining the tire, T, to the wheel, W, the tire, T, may be said to be arranged in a first relaxed, unbiased orientation such that the upper tire opening, $T_{OU}$, and the lower tire opening, $T_{OL}$, define the passage, $T_P$, to include a diameter, $T_{P\text{-}D}$. When the tire, T, is eventually joined to the wheel, W (see, e.g., FIG. 14J), the upper bead, $T_{BU}$, and the lower bead, $T_{BL}$, may be arranged proximate but not seated adjacent, respectively, the upper bead seat, $W_{SU}$, and the lower bead seat, $W_{SL}$, of the wheel, W; later, upon inflating the tire, T, at, e.g., an inflation sub-station (not shown), the upper bead, $T_{BU}$, and the lower bead, $T_{BL}$, may be seated (i.e., disposed adjacent), respectively, the upper bead seat, $W_{SU}$, and the lower bead seat, $W_{SL}$, of the wheel, W. Further, when the tire, T, is joined to the wheel, W (see, e.g., FIG. 14J), the tire, T, may be said to be arranged in a second substantially relaxed, but somewhat biased orientation such that the diameter, $T_{P\text{-}D}$, of the passage, $T_P$, is substantially circular and substantially similar to its geometry of the first relaxed, unbiased orientation of the tire, T.

Referring to FIG. 14A, the robotic arm 412 is arranged in a spaced-apart orientation with respect to the support member 416, which includes the tire, T, arranged in a "ready" position. The "ready" position may include a portion of the lower sidewall surface, $T_{SL}$, of the tire, T, arranged adjacent the substantially cylindrical body 422a' of the first tire-engaging device 420a. The "ready" position may further include the tire, T, being arranged in a first angularly-offset orientation, $\theta_1$, with respect to the upper surface 416' of the first support member 416a.

The first angularly-offset orientation, $\theta_1$, of the tire, T, may result from the non-co-planar relationship the substantially cylindrical body 422a' of the first tire-engaging device 420a with that of the upper surface 416' of the first support member 416a such that: (1) the first portion, $T_{SL\text{-}1}$, of the lower sidewall surface, $T_{SL}$, is arranged adjacent the upper surface 416' of the first support member 416a, (2) the second portion, $T_{SL\text{-}2}$, of the lower sidewall surface, $T_{SL}$, is arranged adjacent the substantially cylindrical body 422a' of the first tire-engaging device 420a (noting that, in FIG. 14A, the second portion, $T_{SL\text{-}2}$, is not represented due to the line-of-view of the cross-sectional reference line of FIG. 13A, but, however, is shown in FIG. 15A), and (3) a third portion, $T_{SL\text{-}3}$, of the lower sidewall surface, $T_{SL}$, is arranged adjacent the substantially cylindrical body 422a' of the first tire-engaging device 420a. Accordingly, the support member 416 may provide a three-point support (which is more clearly shown at FIG. 13A) at $T_{SL\text{-}1}$, $T_{SL\text{-}2}$, $T_{SL\text{-}3}$ for the lower sidewall surface, $T_{SL}$, of the tire, T, while remaining portions of the lower sidewall surface, $T_{SL}$, of the tire, T, are not in direct contact with any other portion of the upper surface surfaces 416', 422b', 422c' of the support member 416 when the tire, T, is arranged in the first angularly-offset orientation, $\theta_1$.

The processing sub-station 400 may execute a mounting procedure by causing a controller, C (see, e.g., FIG. 13A) to send one or more signals to a motor, M (see, e.g., FIG. 13A), that drives movement (according to the direction of the arrows, D1-D5—see FIGS. 14A-14J) of the robotic arm 412. Alternatively or in addition to automatic operation by the controller, C, according to inputs stored in memory, the movement, D1-D5, may result from one or more of a manual, operator input, O (e.g., by way of a joystick, depression of a button or the like).

Figure 14B:
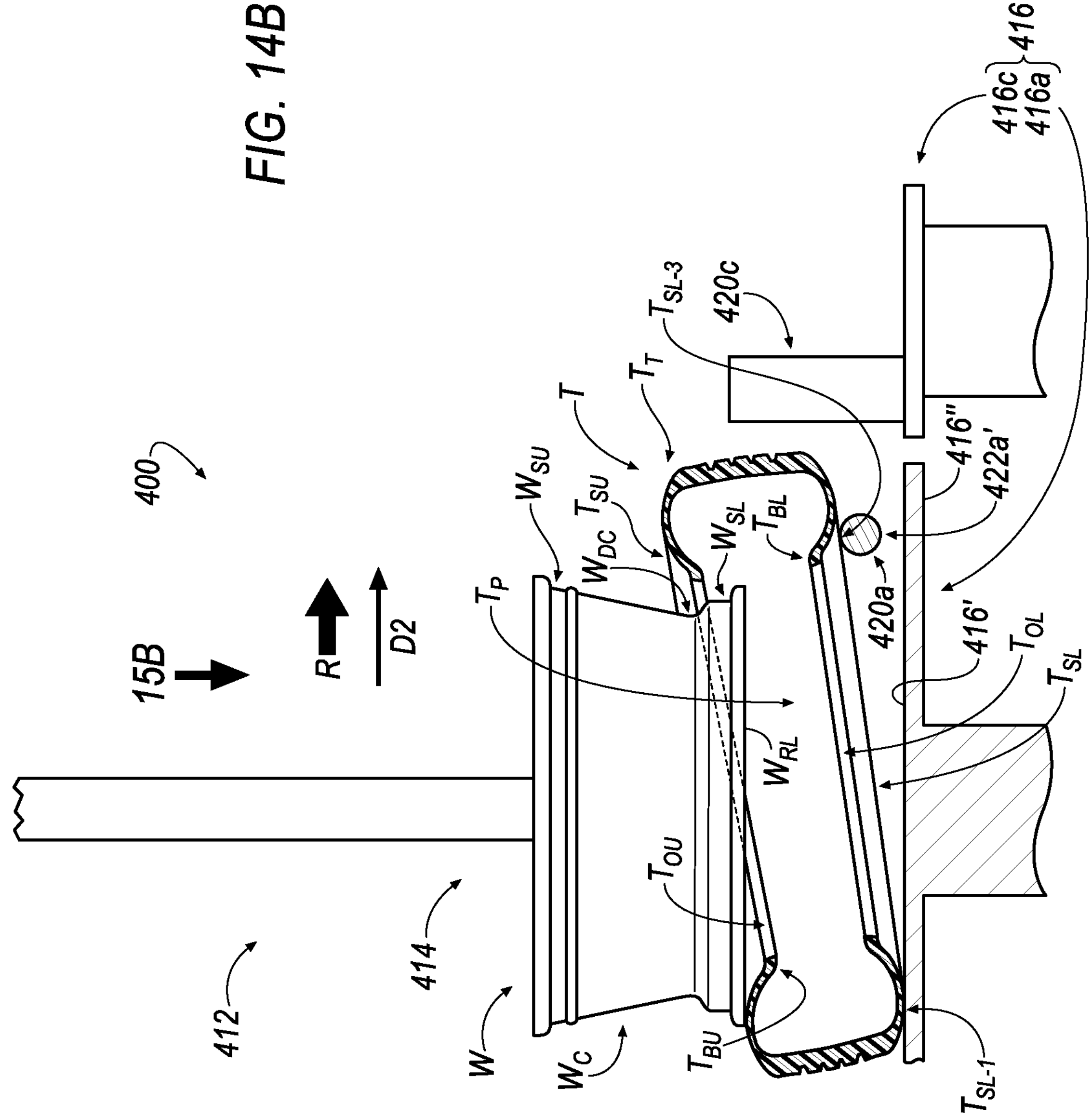
Figure 15B:
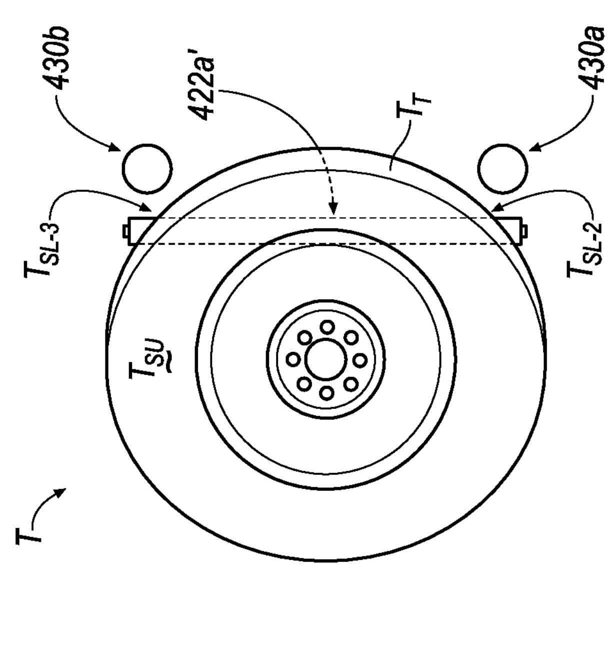

As seen in FIG. 14A, a first, down, D, movement according to the direction of arrow, D1, may reduce the spaced-apart orientation of robotic arm 412 with respect to the support member 416. Referring to FIG. 14B, the movement according to the direction of the arrow, D1, may cease upon locating: (1) a first (e.g., left) portion of the lower rim surface, $W_{RL}$, of the wheel, W, adjacent a first (e.g., left) portion of the upper sidewall surface, $T_{SU}$, of the tire, T, and (2) a second (e.g. right) portion of the lower bead seat, $W_{SL}$, and drop center, $W_{DC}$, of the wheel, W, within the passage, $T_P$, of the tire, T, such that a portion of the drop center, $W_{DC}$, of the wheel, W, is disposed in a spaced-apart relationship with respect to a first (e.g., right) portion of the upper bead, $T_{BU}$, of the tire, T.

Figure 14C:
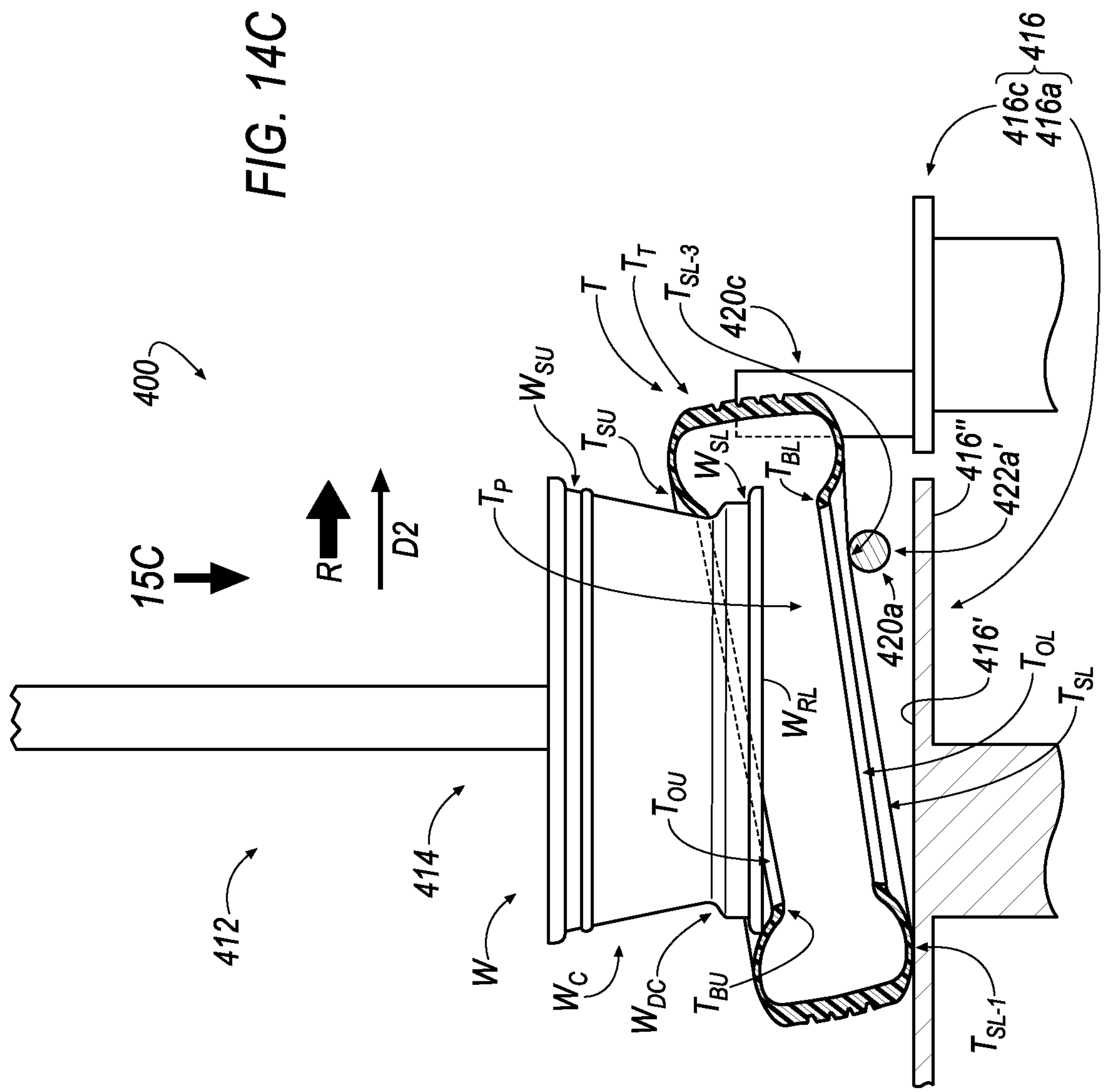
Figure 15C:
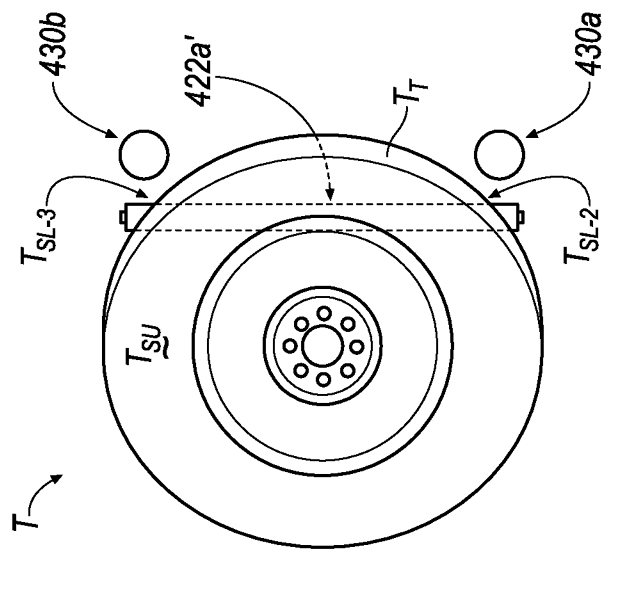

With continued reference to FIG. 14B, a second movement according to the direction of arrow, D2, may cause forwardly (e.g., to the right, R) movement of the wheel, W. Referring to FIG. 14C, the movement according to the direction of the arrow, D2, results in the spaced-apart relationship of the drop center, $W_{DC}$, of the wheel, W, and the first (e.g., right) portion of the upper bead, $T_{BU}$, of the tire, T, being reduced such that the drop center, $W_{DC}$, of the wheel, W, and the first (e.g., right) portion of the upper bead, $T_{BU}$, of the tire, T, are eventually in direct contact with one another. With corresponding reference to FIG. 15C, the tread surface, $T_T$, of the tire, T, is arranged in a spaced-apart relationship with respect to the first tire-tread-engaging post 430a and the second tire-tread-engaging post 430b.

In addition to the drop center, $W_{DC}$, of the wheel, W, and the first (e.g., right) portion of the upper bead, $T_{BU}$, of the tire, T, eventually being in direct contact with one another, movement according to the direction of the arrow, D2, also results in a change in orientation of the lower rim surface, $W_{RL}$, of the wheel, W, with respect to the first (e.g., left) portion of the upper sidewall surface, $T_{SU}$, of the tire, T. For example, as seen in FIG. 14C, movement according to the direction of the arrow, D2, results in the lower rim surface, $W_{RL}$, of the wheel, W, being arranged in an opposing relationship with a lesser amount of a portion of the first (e.g., left) portion of the upper sidewall surface, $T_{SU}$, of the tire, T but more so in a substantially opposing relationship with a left portion of the upper bead, $T_{BU}$, of the tire, T.

Figure 14D:
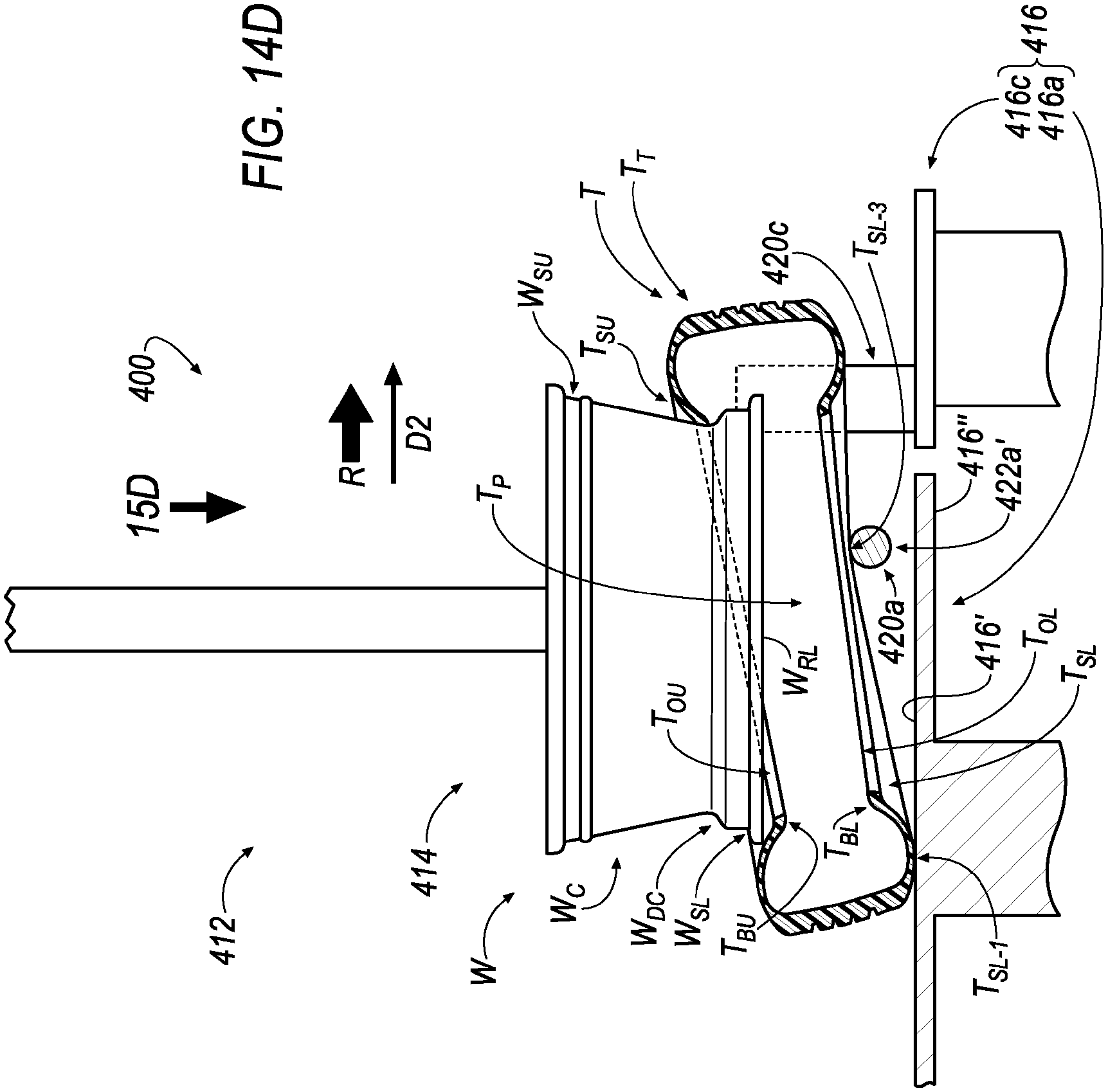
Figure 15D:
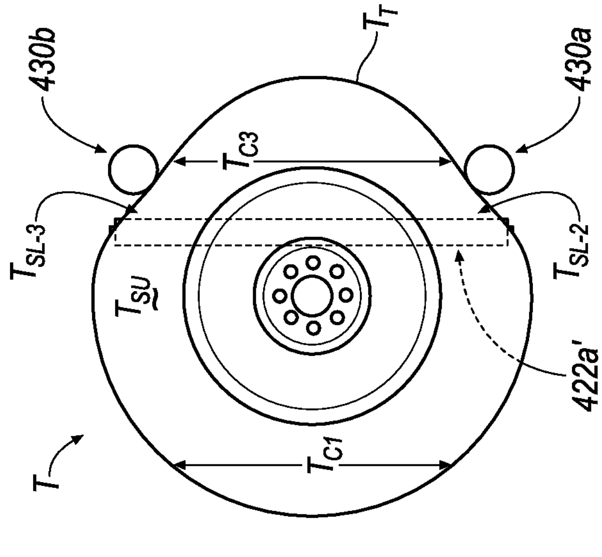

Referring to FIGS. 14C-14D, after the drop center, $W_{DC}$, of the wheel, W, and the first (e.g., right) portion of the upper bead, $T_{BU}$, of the tire, T, are eventually in direct contact with one another, further movement according to the direction of the arrow, D2, results in the lower sidewall surface, $T_{SL}$, of the tire, T, being dragged across the substantially cylindrical body 422*a*' of the first tire-engaging device 420*a* from left-to-right as the tread surface, $T_T$, of the tire, T, is moved closer to the first tire-tread-engaging post 430*a* and the second tire-tread-engaging post 430*b* such that, as seen in FIGS. 14D and 15D, the tread surface, $T_T$, is ultimately arranged in direct contact with both of the first tire-tread-engaging post 430*a* and the second tire-tread-engaging post 430*b*.

Figure 14E:
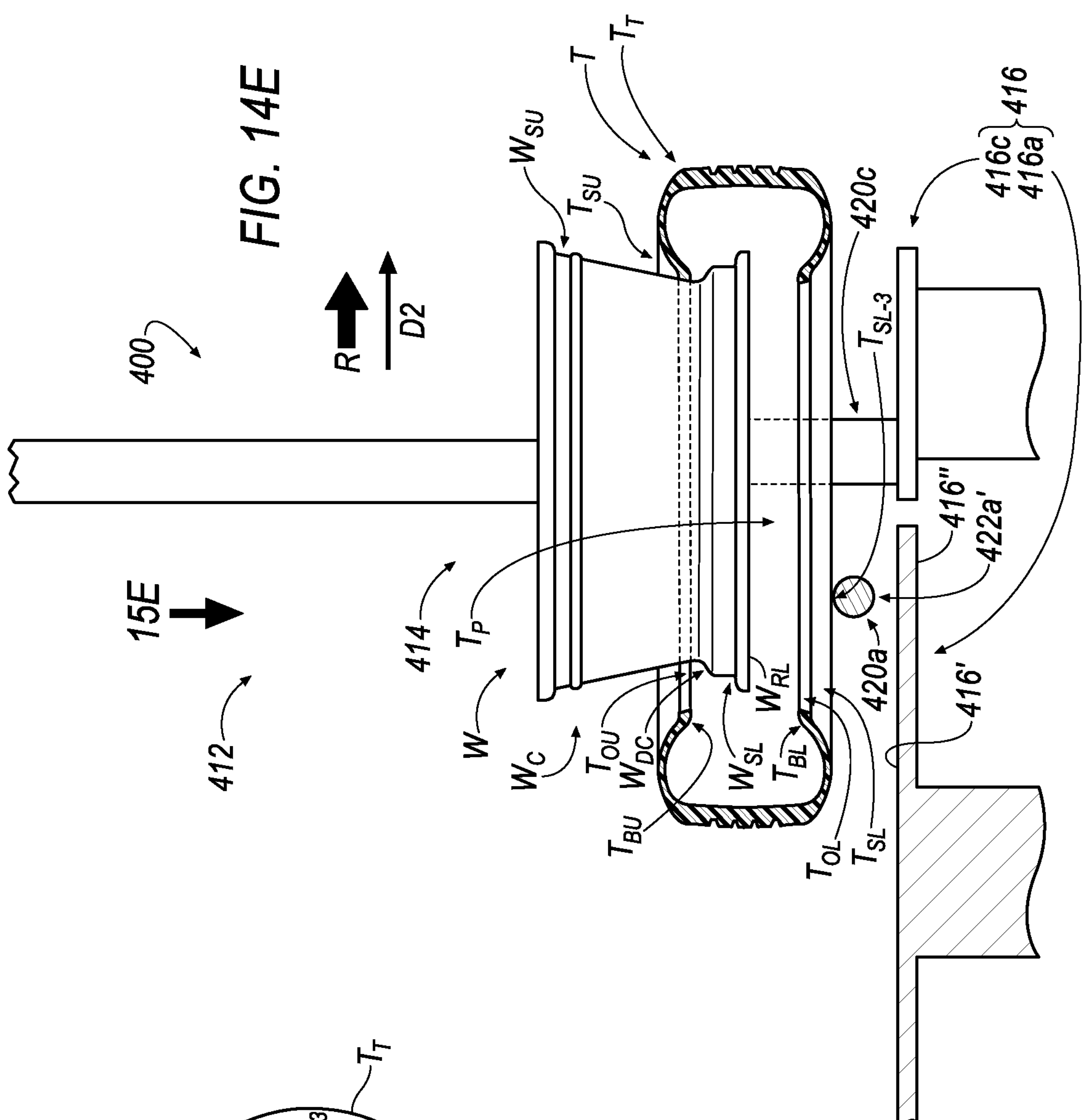
Figure 15E:
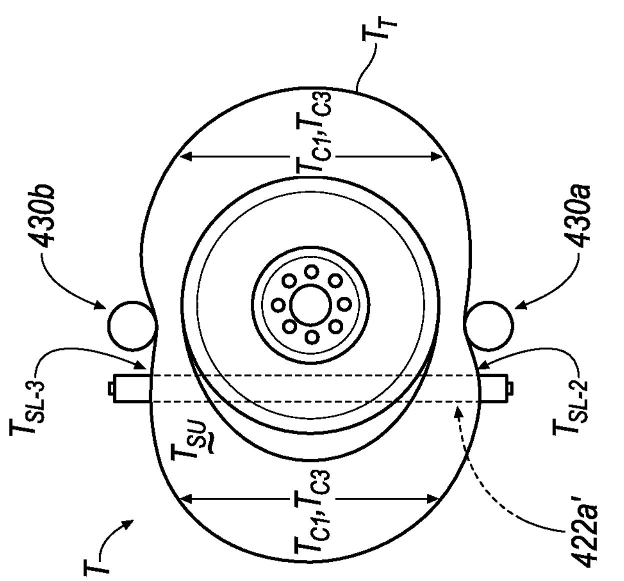
Figure 14F:
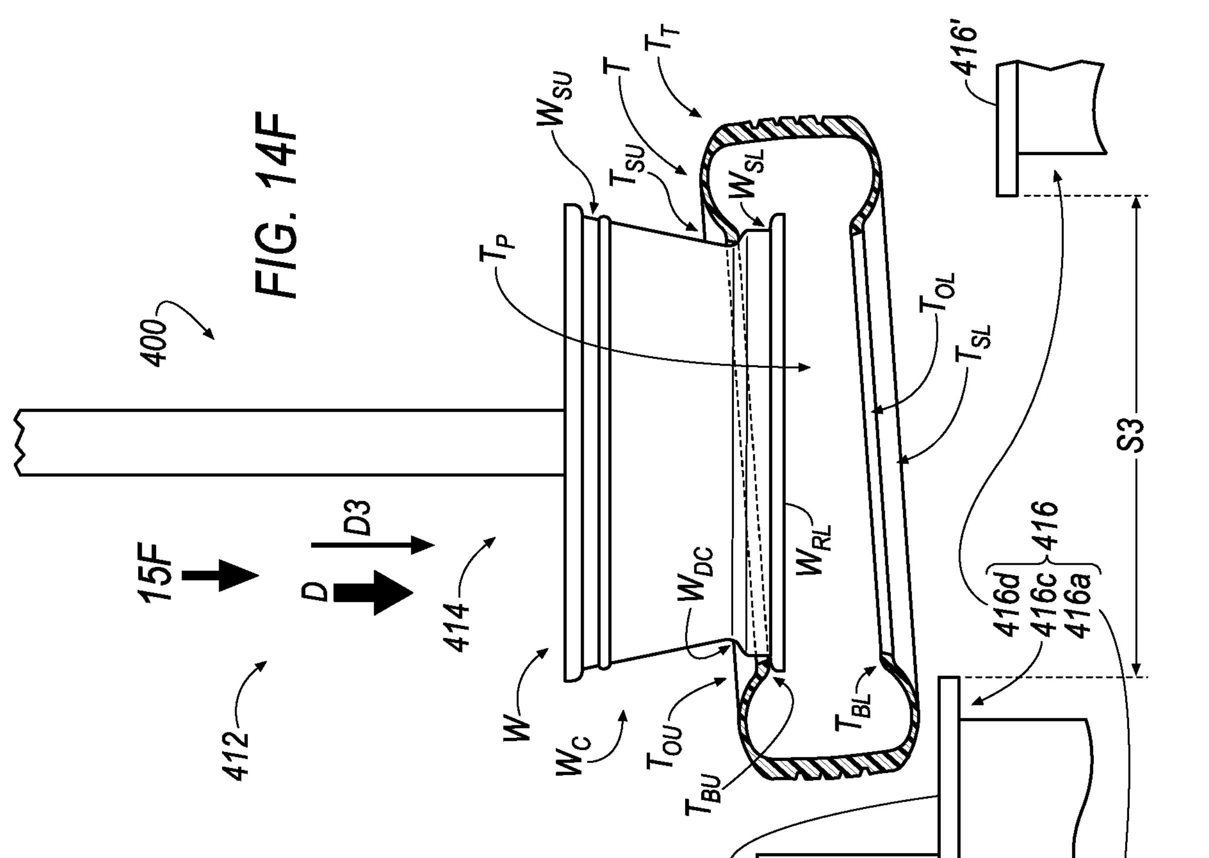
Figure 14F:
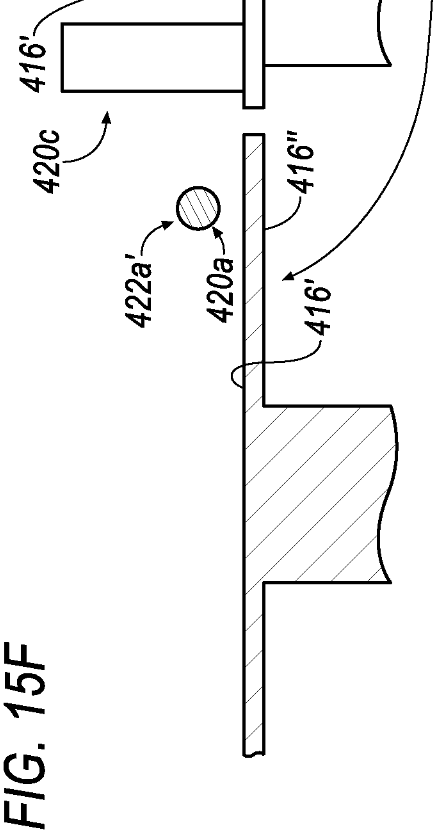

Referring to FIGS. 14D-14F, as a result of the forwardly (e.g., to the right, R) movement of the wheel, W, according to the direction of the arrow, D2, the tire, T, is advanced through the second spacing, S2, formed by the first and second tire-tread-engaging pasts 430*a*, 430*b* from the right chord, $T_{C3}$, to the left chord, $T_{C1}$; because chords (including, e.g., the central chord, $T_{C2}$) of the tire, T, between the left chord, $T_{C1}$, and the right chord, $T_{C3}$, are greater than that of the left chord, $T_{C1}$, and the right chord, $T_{C3}$, the first and second tire-tread-engaging posts 430*a*, 430*b* interfere with movement of the tire, T, through the second spacing, S2.

As a result of the above-described interference, the tire, T, temporality deforms such that the diameter, $T_{P-D}$, of the passage, $T_P$, of the tire, T, is temporality upset to include a substantially oval form rather than a circular form. Accordingly, in a substantially similar fashion, the upper tire opening diameter, $T_{OU-D}$, and the lower tire opening diameter, $T_{OL-D}$, are also temporality upset to include a substantially oval form rather than a circular form.

The oval form of the upper tire opening diameter, $T_{OU-D}$, and the lower tire opening diameter, $T_{OL-D}$, reduces a portion of contact (and, as a result, friction) of the upper bead, $T_{BU}$, of the tire, T, with that of the outer circumferential surface, $W_C$, of the wheel, W, and, as such permits at least a partial mounting of the tire, T, to the wheel, W, to occur. Accordingly, as seen in FIGS. 14D-14F and 15D-15F, as the wheel, W, advances the tire, T, forwardly (e.g., to the right, R) through the second spacing, S2, according to the direction of the arrow, D2, the oval deformation of at least the diameter, $T_{OU-D}$, results in an oval deformation of the upper bead, $T_{BU}$, of the tire, T, such that the first (e.g., left) portion of the lower rim surface, $W_{RL}$, of the wheel, W, encounters less resistance or interference with the upper bead, $T_{BU}$, of the tire, T, as the left portion of the upper bead, $T_{BU}$, of the tire, T, is moved from the substantially opposing relationship with a left portion of the upper bead, $T_{BU}$, of the tire, T, as seen in FIG. 14E to a different orientation substantially adjacent one or more of the outer circumferential surface, $W_C$, and drop center, $W_{DC}$, of the wheel, W.

Figure 15F:
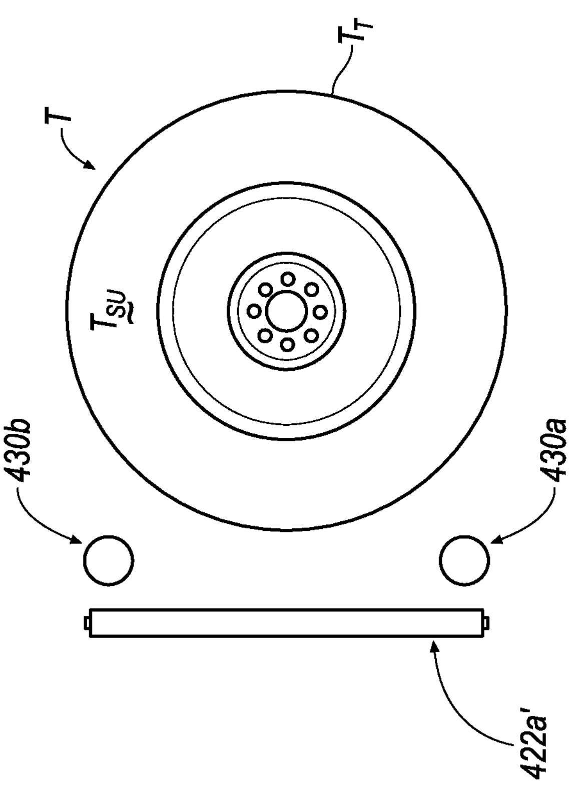

Referring to FIGS. 14F and 15F, once the left chord, $T_{C1}$, has been advanced through the second spacing, S2, from a rearwardly orientation (e.g., to the left, L) of the first and second tire-tread-engaging posts 430*a*, 430*b* to a forwardly orientation (e.g., to the right, R) of the first and second tire-tread-engaging posts 430*a*, 430*b*, the entire circumference of the upper bead, $T_{BU}$, of the tire, T, may be said to be arranged in a preliminary "mounted position" adjacent/about one or more of the outer circumferential surface, $W_C$, and the drop center, $W_{DC}$, of the wheel, W. As illustrated, however, the entire circumference of the lower bead, $T_{BL}$, of the tire, T, may be said to be arranged in "un-mounted position" due to the lower bead, $T_{BL}$, of the tire, T, being arranged in a non-adjacent orientation with respect to any portion of the wheel, W.

Figure 14G:
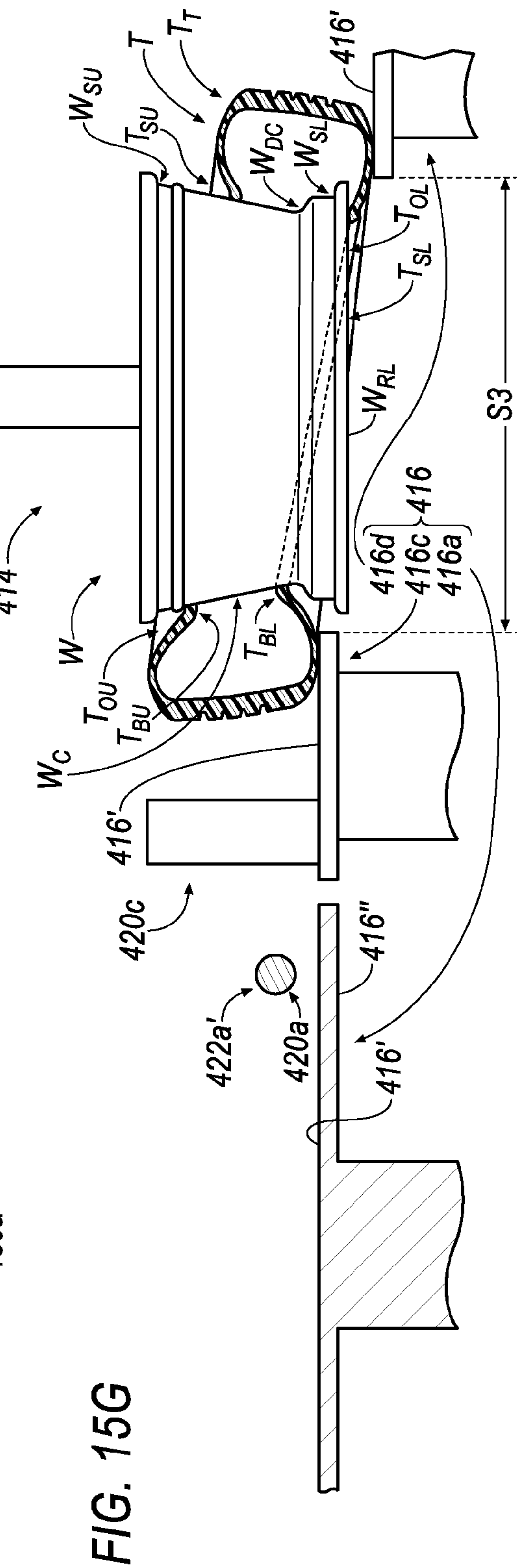
Figure 15G:
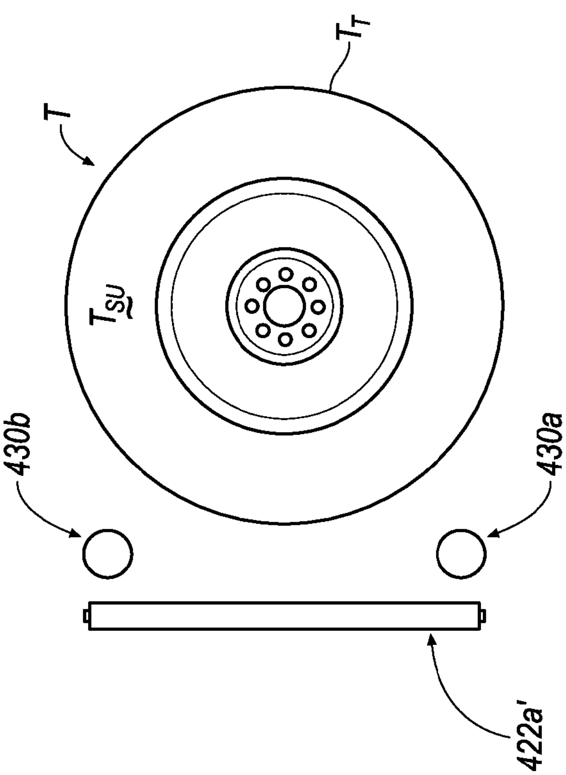

As seen in FIG. 14F, the movement according to the direction of the arrow, D2, may cease upon arranging the wheel, W, above the third spacing, S3. Then, as seen in FIG. 14F, a second, down, D, movement according to the direction of arrow, D3, may occur in order to move the wheel, W, toward the support member 416. Referring to FIG. 14G, the movement according to the direction of the arrow, D3, may cease upon locating: (1) the left portion of the lower sidewall surface, $T_{SL}$, of the tire, T, adjacent the upper surface 416' of each of the second support member 416*b* and the third support member 416*c*, (2) the right portion of the lower sidewall surface, $T_{SL}$, of the tire, T, adjacent the upper surface 416' of the fourth support member 416*d*, and (3) the lower bead seat, $W_{SL}$, of the wheel, W, substantially coplanar with both of the second support member 416*b* and the third support member 416*c*. Additionally, as shown in FIGS. 14F-14G, the upper surface 416' of the second and third support members 416*b*, 416*c* are not co-planar with but arranged at a higher orientation when compared to the orientation of the upper surface 416' of the fourth support member 416*d*.

As seen in FIG. 14G, a result of the movement according to the direction of the arrow, D3, the wheel, W, is permitted to plunge through the passage, $T_P$, of the tire, T, in order to arrange the tire, T, relative to the wheel, W, in a "further mounted" orientation. As seen in FIG. 14G, movement according to the direction of the arrow, D3, results in: (1) the left portion of the lower bead seat, $W_{SL}$, and drop center, $W_{DC}$, of the wheel, W, being orientated out of the passage, $T_P$, of the tire, T, and in a spaced-apart, opposing orientation with the left portion of the lower bead, $T_{BL}$, of the tire, T, and (2) a right portion of a lower, outer rim surface, $W_{RL}$, of the wheel, W, proximate the right portion of the lower bead seat, $W_{SL}$, such that a right portion of the lower sidewall surface $T_{SL}$ of the tire, T, is disposed adjacent the upper surface 416' of the fourth support member 416*d*, and (3) the drop center, $W_{DC}$, of the wheel, W, being disposed within the passage, $T_P$, of the tire, T, and adjacent to the right portion of the lower bead, $T_{BL}$, of the tire, T, while (4) the upper bead, $T_{BU}$, of the tire, T, substantially circumscribes the circumferential surface, $W_C$, of the wheel, W.

Referring to FIG. 14G, after the movement according to the direction of the arrow, D3, has ceased, an upward movement, U, according to the direction of arrow, D4, may occur in order to move the wheel, W, away from the support member 416 and then, subsequently, a rearwardly movement to the left, L, according to the direction of arrow, D5, may occur. The upward movement, U, according to the direction of the arrow, D4, results in the lower bead seat, $W_{SL}$, of the wheel, W, being no longer substantially coplanar with both of the second support member 416*b* and the third support member 416*c*, but, rather, the lower bead seat, $W_{SL}$, and lower, outer rim surface, $W_{RL}$, of the wheel, W, are arranged at least above the upper surface 416' of both of the second support member 416*b* and the third support member 416*c*.

Figure 14H:
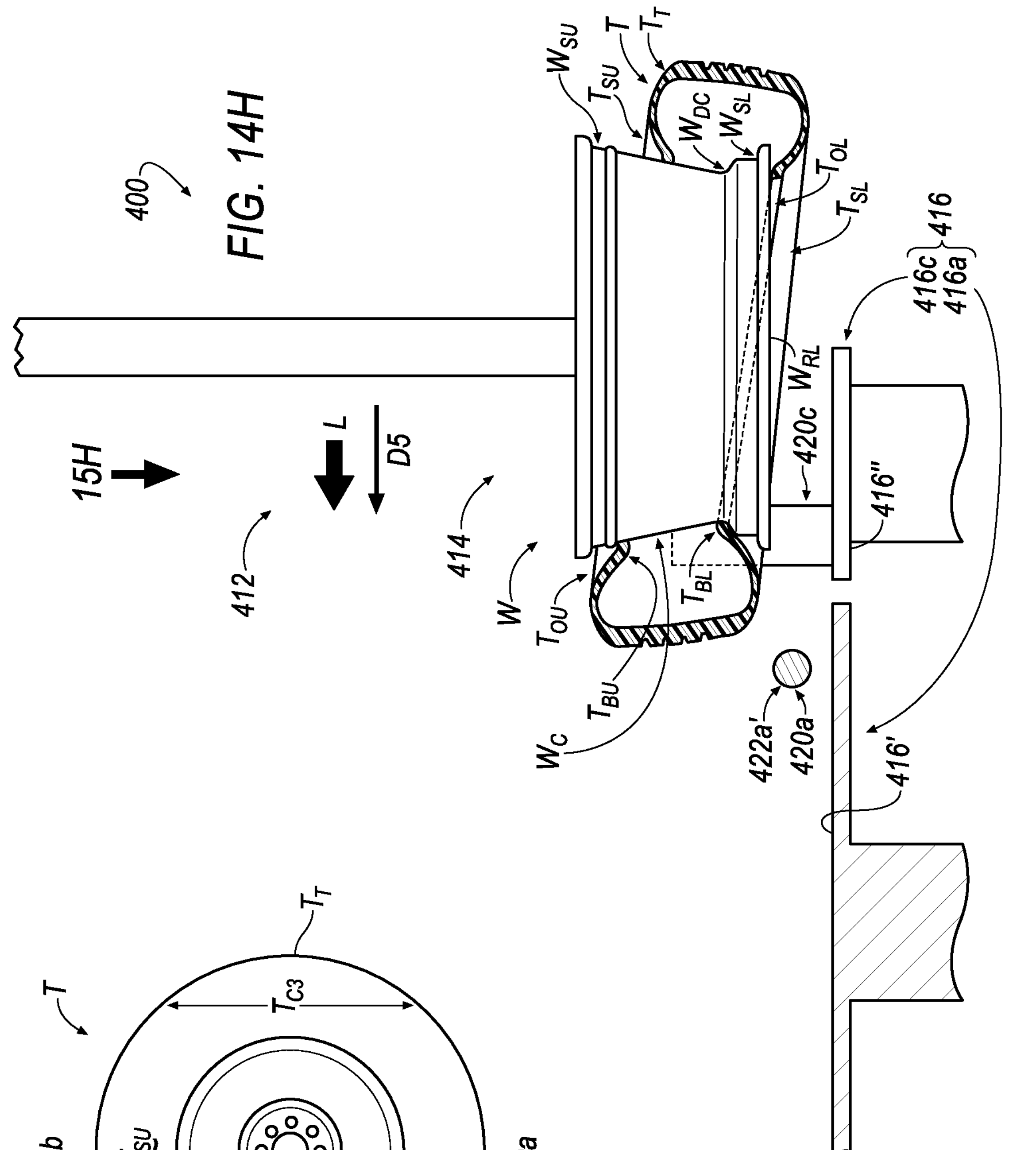
Figure 15H:
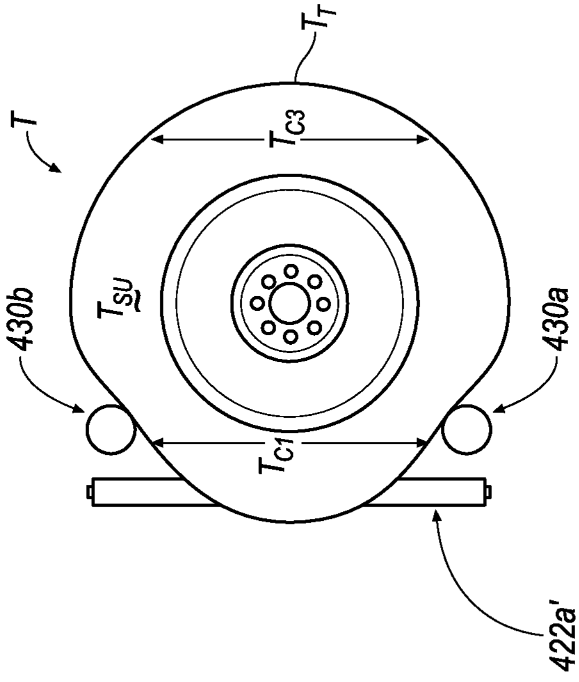

Referring to FIG. 14H, as a result of the rearwardly (e.g., to the left, L) movement of the wheel, W, according to the direction of the arrow, D5, the tire, T, is advanced toward the first and second tire-tread-engaging posts 430*a*, 430*b* and through the second spacing, S2, formed by the first and second tire-tread-engaging pasts 430*a*, 430*b* from the left chord, $T_{C1}$, to the right chord, $T_{C3}$; as similarly explained above, because chords (including, e.g., the central chord, $T_{C2}$) of the tire, T, between the left chord, $T_{C1}$, and the right chord, $T_{C3}$, are greater than that of the left chord, $T_{C1}$, and the right chord, $T_{C3}$, the first and second tire-tread-engaging posts 430*a*, 430*b* interfere with movement of the tire, T, through the second spacing, S2.

As a result of the above-described interference, the tire, T, in a similar manner as explained above, temporality deforms such that the diameter, $T_{P-D}$, of the passage, $T_P$, of the tire, T, is temporality upset to include a substantially oval form rather than a circular form. Accordingly, in a substantially similar fashion, the upper tire opening diameter, $T_{OU-D}$, and the lower tire opening diameter, $T_{OL-D}$, are also temporality upset to include a substantially oval form rather than a circular form.

Figure 14I:
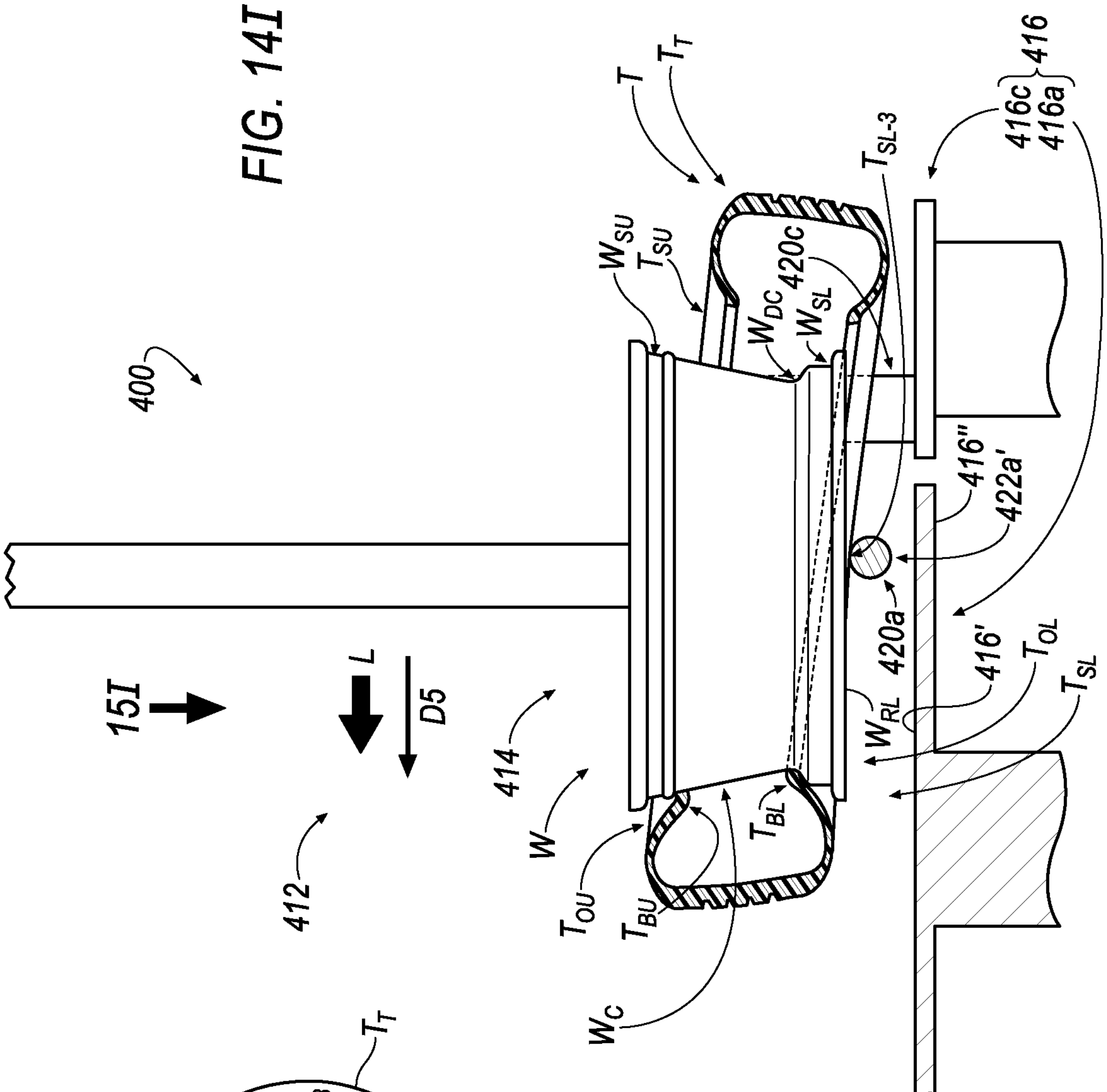
Figure 15I:
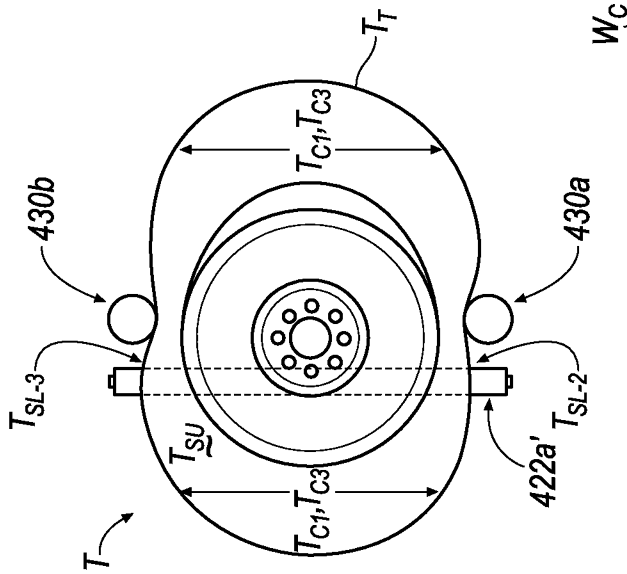
Figure 14J:
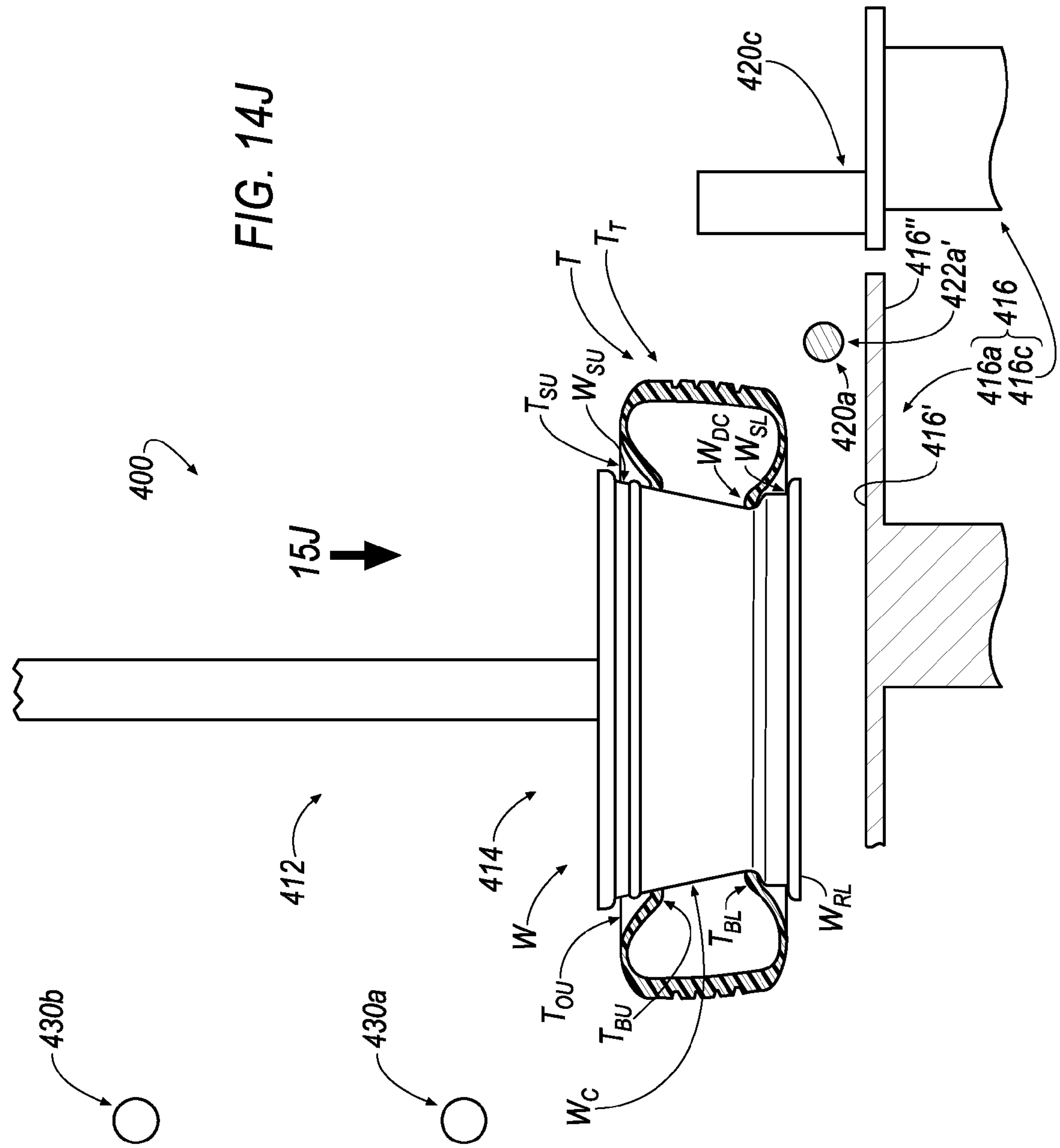
Figure 15J:
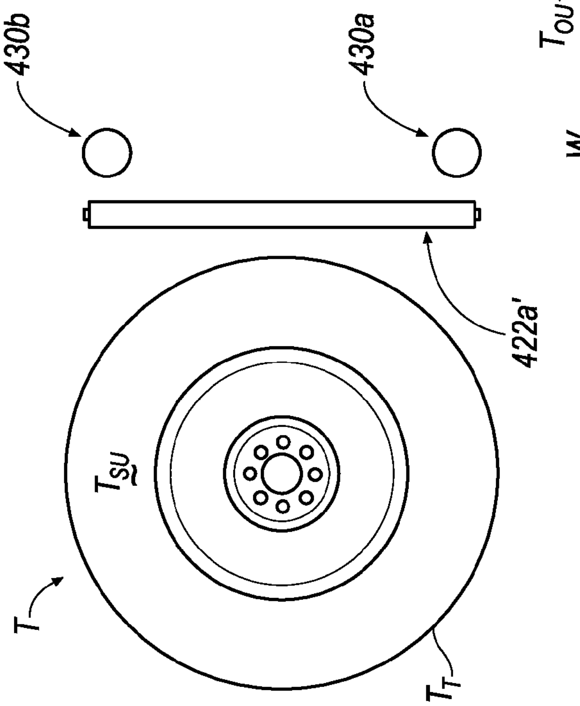

The oval form of the upper tire opening diameter, $T_{OU-D}$, and the lower tire opening diameter, $T_{OL-D}$, reduces a portion of contact (and, as a result, friction) of the lower bead, $T_{BL}$, of the tire, T, with that of the outer circumferential surface, $W_C$, of the wheel, W, and, as such permits a further mounting of the tire, T, to the wheel, W, to occur such that the partial mounting of the tire, T, with the wheel, W, transitions to a "full mounting" of the tire, T, with the wheel, W. Accordingly, as seen in FIGS. 14H-14I and 15H-15I, as the wheel, W, advances the tire, T, rearwardly (e.g., to the left, L) through the second spacing, S2, according to the direction of the arrow, D5, the oval deformation of at least the diameter, $T_{OL-D}$, results in an oval deformation of the lower bead, $T_{BL}$, of the tire, T, such that the right portion of the lower rim surface, $W_{RL}$, of the wheel, W, encounters less resistance or interference with the lower bead, $T_{BL}$, of the tire, T, as the right portion of the lower bead, $T_{BL}$, of the tire, T, is moved from an un-mounted orientation with respect to the drop center, $W_{DC}$, of the wheel, W, to a mounted orientation (see, e.g., FIG. 14J) with respect to the drop center, $W_{DC}$, of the wheel, W. Referring to FIG. 14I, as the tire, T, is moved through the second spacing, S2, the lower sidewall surface, $T_{SL}$, of the tire, T, may contact and be biased by the substantially cylindrical body 422*a*' in order to assist movement of the lower bead, $T_{BL}$, of the tire, T, from the un-mounted orientation with respect to the drop center, $W_{DC}$, of the wheel, W, to the mounted orientation. Referring to FIG. 14J, once the tire, T, has been completely moved through the second spacing, S2, according to the direction of the arrow, D5, the tire, T, may be said to be mounted to the wheel, W, such that the upper bead, $T_{BU}$, of the tire, T, circumscribes the outer circumferential surface, $W_C$, and as the lower bead, $T_{BL}$, of the tire, T, circumscribes and is disposed adjacent the drop center, $W_{DC}$, of the wheel, W.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. For example most embodiments shown herein depict engaging a wheel (by way of a robotic arm) and manipulating the wheel to mount a tire thereon. However, nothing herein shall be construed to limit the scope of the present invention to only manipulating a wheel to mount a tire thereon. The exemplary embodiments are merely illustrative and should not be considered restrictive in any way. The scope of the invention is defined by the appended claims and their equivalents, rather than by the preceding description.

What is claimed is:

1. A method for processing a tire and a wheel for forming a tire wheel assembly, comprising the steps of:

arranging the tire relative to a tire support member of the apparatus, wherin a tire-engaging device is rotably-supported upon the tire support member, wherein;

a first portion of a sidewall surface of the tire is arranged adjacent an upper surface of the tire support member, and wherein, a second portion of the sidewall surface of the tire is arranged adjacent a first portion of the tire-engaging device, and wherein, a third portion of the sidewall surface of the tire is arranged adjacent a second portion of the tire-engaging device;

partially arranging the wheel within a passage of the tire such that one or both of an upper bead of the tire and a lower bead of the tire is/are not entirely arranged about a circumference of the wheel;

moving the wheel through a gap formed by a first tire engaging post and a second tire engaging post of the apparatus;

utilizing the movement of the wheel to impart corresponding movement of the tire through the gap for contacting the tire with the tire engaging posts, causing one or both of a substantially circular, upper tire opening and a substantially circular, lower tire opening that form the passage of the tire to be manipulated to have a substantially non-circular form to permit both of the upper bead of the tire and the lower bead of the tire to be arranged about the circumference of the wheel.

2. the method according to claim 1, wherein the first, second and third portions of the sidewall of the tire are arranged relative to the tire support member and the tire-engaging device permits the tire to be disposed upon the tire support member at an angularly-offset orientation with respect to the upper surface of the tire support member.

3. The method according to claim 1, wherein the first and second tire tread engaging posts are fixed relative to one another to render the gap as having a non-variable geometry.

4. The method according to claim 1, wherein the gap is less than a diameter of the tire.

5. The method according to claim 1, wherein, prior to the partially arranging step, further comprising the step of removably-coupling the wheel to an end effecter of a movable robotic arm, wherein the moving the wheel step is conducted by movements of one or more of the robotic arm and the effecter, wherein, upon arranging the upper bead of the tire and the lower bead of the tire about the circumference of the wheel is indirectly joined to the end effecter by way of the wheel.

* * * * *

UNITED STATES PATENT AND TRADEMARK OFFICE

CERTIFICATE OF CORRECTION

PATENT NO. : 8,991,466 B2
APPLICATION NO. : 13/340315
DATED : March 31, 2015
INVENTOR(S) : Lawrence J. Lawson et al.

It is certified that error appears in the above-identified patent and that said Letters Patent is hereby corrected as shown below:

In the Claims:

At column 48, claim number 1, line number 10, delete "wherin" and insert --wherein--; delete "rotably" and insert --rotatably--.

At column 48, claim number 2, line number 36, delete the first instance of "the" and insert --The--.

Signed and Sealed this
Eleventh Day of August, 2015

Michelle K. Lee
*Director of the United States Patent and Trademark Office*